(12) United States Patent
Yamanashi

(10) Patent No.: US 6,327,100 B1
(45) Date of Patent: Dec. 4, 2001

(54) ZOOM LENS

(75) Inventor: Takanori Yamanashi, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/499,608

(22) Filed: Feb. 7, 2000

(30) Foreign Application Priority Data

| Feb. 8, 1999 | (JP) | 11-029967 |
| Mar. 2, 1999 | (JP) | 11-054220 |
| Mar. 2, 1999 | (JP) | 11-054221 |
| Mar. 23, 1999 | (JP) | 11-077548 |

(51) Int. Cl.$^7$ ................................. G02B 15/15
(52) U.S. Cl. ........................... 359/689; 359/683
(58) Field of Search .................. 359/689, 683, 359/676, 691, 692

(56) References Cited

U.S. PATENT DOCUMENTS

| 4,822,152 | 4/1989 | Yamanashi . |
| 5,666,229 | 9/1997 | Ohtake . |

OTHER PUBLICATIONS

Patent Abstracts of Japan, JP 07027979, Otake Motoyuki.
Patent Abstracts of Japan, JP 08029688, Nishio Teruhiro et al.
Patent Abstracts of Japan, JP 09159918, Ota Kohei.
Patent Abstracts of Japan, JP 08110471, Murata Yasunori.

*Primary Examiner*—Scott J. Sugarman
(74) *Attorney, Agent, or Firm*—Pillsbury Winthrop LLP

(57) ABSTRACT

The invention relates to a zoom lens system which, albeit having a high zoom ratio, is reduced in terms of length during lens collapsing and at the wide-angle end as well as the telephoto end, with well-corrected aberrations. The zoom lens system comprises a front lens group G1 located nearest to the object side and a rear lens group G3 located nearest to the image side with at least one lens group located between G1 and G3. The group G1 has positive or negative refracting power and the group G3 has negative refracting power. For zooming from the wide-angle end to the telephoto end, a separation between adjacent lens groups varies. Specific conditions are satisfied with respect to the focal length of G3, the amount of movement of G3, and the zoom ratio shared by G3.

13 Claims, 60 Drawing Sheets

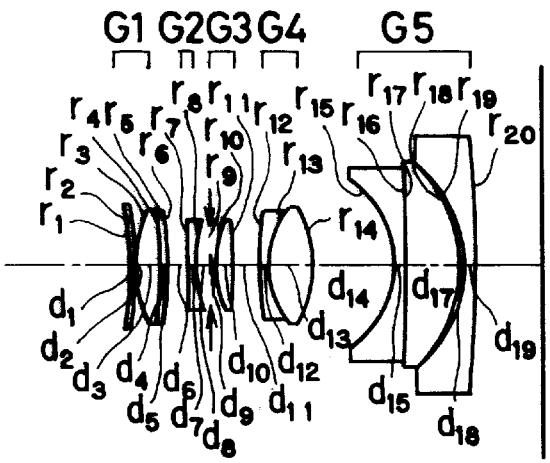
FIG. 53 (a)
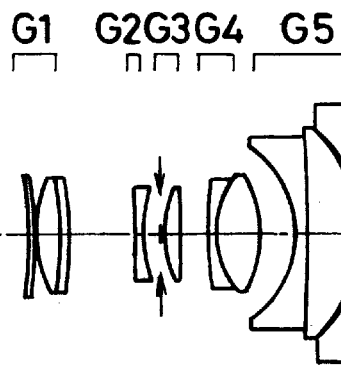
FIG. 53 (b)
FIG. 53 (c)
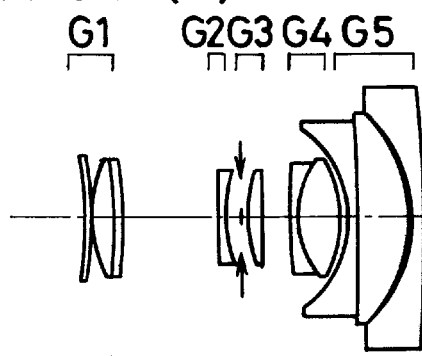

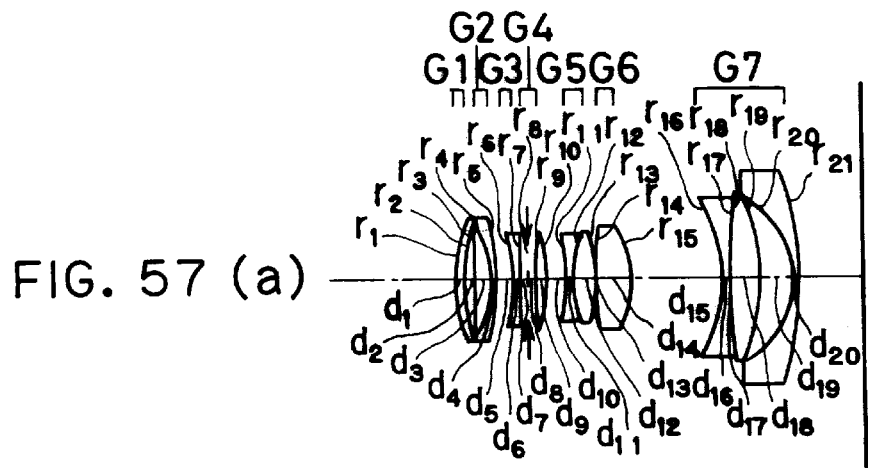
FIG. 57 (a)
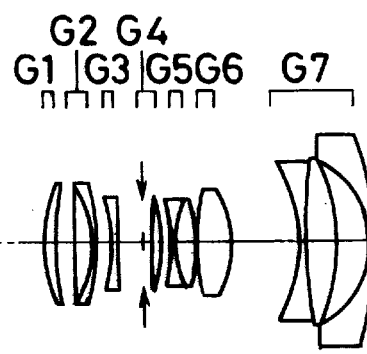
FIG. 57 (b)
FIG. 57 (c)
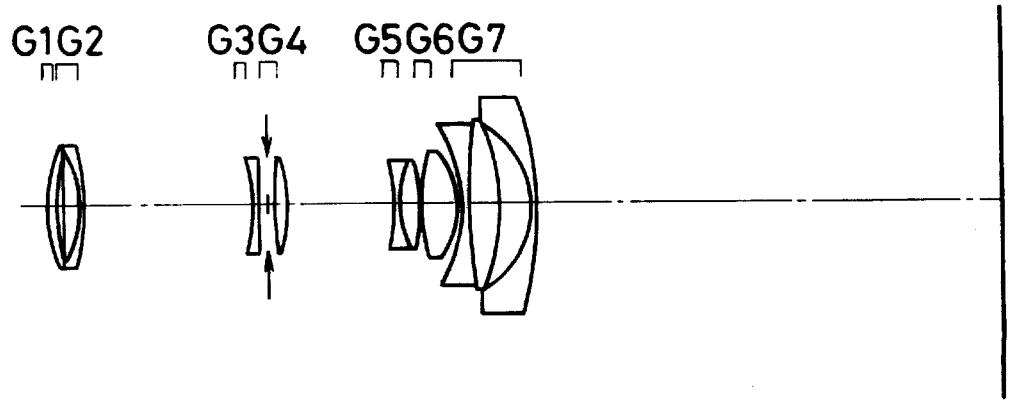

ZOOM LENS

BACKGROUND OF THE INVENTION

The present invention relates generally to a zoom lens, and more particularly to a zoom lens system having a low telephoto ratio.

So far, two-group zoom lens systems have been used primarily for zoom lenses having a relatively low magnification, and three-group zoom lens systems have been adopted mainly for zoom lenses having a higher magnification. These zoom lens systems are operated in various zooming modes; however, this results in an increase in the number of lens groups involved. To reduce the number of lens groups and lens elements, the aperture ratios of the systems at their telephoto ends are reduced depending on their operating modes, while full use is made of aspherical surfaces.

For zoom lenses used on compact cameras, there is a zoom lens system disclosed in JP-B 8-3580 published under the name of the applicant. The zoom lens system set forth in JP-B 8-3580 comprises, in order from its object side, a first lens group having positive refracting power, a second lens group having positive refracting power and a third lens group having negative refractive power. For zooming from the wide-angle end to the telephoto end of the zoom lens system, each lens group moves toward the object side. This zoom lens system becomes shortest at the wide-angle end and longest at the telephoto end.

This zoom lens system is characterized in that the amount of zooming movement of the third lens group is larger than those of the rest, thereby achieving a higher zoom ratio. The publication teaches that focusing is effected by the movement of the second lens group, thereby achieving the most stable image-formation capabilities.

For four-group zoom lenses used on compact cameras, on the other hand, there is a zoom lens system disclosed in JP-B 8-30783 published under the name of the applicant, which comprises, in order from its object side, a first lens group having positive refracting power, a second lens group having negative refracting power, a third lens group having positive refracting power and a fourth lens group having negative refracting power. From the wide-angle end to the telephoto end of the zoom lens system, each lens group moves toward the object side.

This zoom lens system is characterized in that the zoom ratio is allocated to each lens group by the movement of each lens group, thereby achieving a high magnification. For zooming from the wide-angle end to the telephoto end, the second lens group is allowed to move toward the object side, so that size reductions are achievable at the wide-angle end.

Some proposals have been made to divide each lens group into subgroups for zooming movement (JP-A's 7-27979, 8-29688, 8-110471 and 9-159918).

To reduce the size of lens systems as mentioned above, many proposals have so far been made of taking full advantage of aspherical surfaces having great ability to correct for aberrations, thereby reducing the number of lenses forming one lens group. Many proposals have also been made of using a radial type gradient index lenses.

Most of actual zoom lens systems for compact cameras have a mechanism for accommodating them in camera bodies irrespective of their types. To this end, a lens collapsible mount mechanism is provided in a space defined in a lens position at the wide-angle end where the zoom lens system becomes shortest to move the zoom lens system therein. It is thus possible to reduce the size of the camera during lens collapsing.

In taking actual shots, however, the zoom lens system must be used in the form of the original optical system, and so a lens mount (for holding the lens system) projects from the camera body. Especially in the case of a zoom lens system having a high zoom ratio, the amount of movement of lenses in association with zooming becomes large at the telephoto end. This means that the overall length of the lens system, i.e., the lens mount increases largely. For this reason, the center of gravity shifts more largely at the telephoto end than during lens collapsing or at the wide-angle end, making the balance of the camera worse and rendering the camera difficult to handle.

SUMMARY OF THE INVENTION

In view of such situations as mentioned above, an object of the present invention is to provide a zoom lens system which, albeit having a high zoom ratio, has its overall length reduced during storage and at its wide-angle end and at its telephoto end as well, and has well-corrected aberrations.

According to the first aspect of the invention, the aforesaid object is achieved by the provision of a zoom lens system comprising a front lens group located nearest to an object side of said zoom lens system, a rear lens group located nearest to an image side of said zoom lens system and at least one lens group located between said front lens group and said rear lens group, wherein:

said front lens group has positive or negative refracting power, said rear lens group has negative refracting power and a separation between adjacent lens groups varies for zooming from a wide-angle end to a telephoto end of said zoom lens system, and conditions (I), (II) and (III) are satisfied:

$$0.02 < |f_L|/f_T < 0.3 \tag{I}$$

$$0.1 < \Delta X_{LT}/f_T < 0.7 \tag{II}$$

$$1.5 < \beta_{LT}/\beta_{LW} < 6 \tag{III}$$

where $f_L$ is a focal length of said rear lens group, $f_T$ is the focal length of said zoom lens system at said telephoto end, $\Delta X_{LT}$ is the amount, on the basis of said wide-angle end, of zooming movement of said rear lens group to said telephoto end, $\beta_{LT}$ is the transverse magnification of said rear lens group at said telephoto end, and $\beta_{LW}$ is the transverse magnification of said rear lens group at said wide-angle end.

According to the second aspect of the present invention, there is provided a zoom lens system comprising, in order from an object side of said zoom lens system, a first lens group having positive refracting power, a second lens group having positive refracting power and a third lens group having negative refracting power, wherein:

each of said respective lens groups moves to said object side upon zooming from a wide-angle end to a telephoto end of said zoom lens system while a separation between said first lens group and said second lens group becomes wide and a separation between said second lens group and said third lens group becomes narrow, and conditions (1), (2) and (3) are satisfied:

$$0.03 < |f_3|/f_T < 0.25 \tag{1}$$

$$0.2 < \Delta X_{3T}/f_T < 0.44 \tag{2}$$

$$1.5 < \beta_{3T}/\beta_{3W} < 6.0 \tag{3}$$

where $f_3$ is the focal length of said third lens group, $f_T$ is the focal length of said zoom lens system at said telephoto end, $\Delta X_{3T}$ is the amount, on the basis of said wide-angle end, of zooming movement of said third lens group to said telephoto end, $\beta_{3T}$ is the transverse magnification of said third lens group at said telephoto end, and $\beta_{3W}$ is the transverse magnification of said third lens group at said wide-angle end.

According to the third aspect of the present invention, there is provided a zoom lens system comprising, in order from an object side of said zoom lens system, a first lens group having positive refracting power, a second lens group having positive refracting power, a third lens group having positive refracting power and a fourth lens group having negative refracting power, wherein:

each of said lens groups moves to said object side upon zooming from a wide-angle end to a telephoto end of said zoom lens system while a separation between said first lens group and said second lens group becomes wide and a separation between said third lens group and said fourth lens group becomes narrow, and conditions (4), (5) and (6) are satisfied:

$$0.02 < |f_4|/f_T < 0.3 \quad (4)$$

$$0.1 < \Delta X_{4T}/f_T < 0.5 \quad (5)$$

$$1.5 < \beta_{4T}/\beta_{4W} < 6.0 \quad (6)$$

where $f_4$ is the focal length of said fourth lens group, $f_T$ is the focal length of said zoom lens system at said telephoto end, $\Delta X_{4T}$ is the amount, on the basis of said wide-angle end, of zooming movement of said fourth lens group to said telephoto end, $\beta_{4T}$ is the transverse magnification of said fourth lens group at said telephoto end, and $\beta_{4W}$ is the transverse magnification of said fourth lens group at said wide-angle end.

According to the fourth aspect of the present invention, there is provided a zoom lens system comprising, in order from an object side of said zoom lens system, a first lens group having positive refracting power, a second lens group having negative refracting power, a third lens group having positive refracting power and a fourth lens group having negative refracting power, wherein:

each of said lens groups moves to said object side upon zooming from a wide-angle end to a telephoto end of said zoom lens system while a separation between said first lens group and said second lens group becomes wide and a separation between said third lens group and said fourth lens group becomes narrow, and conditions (7), (8) and (9) are satisfied:

$$0.02 < |f_4|/f_T < 0.3 \quad (7)$$

$$0.2 < \Delta X_{4T}/f_T < 0.6 \quad (8)$$

$$1.5 < \beta_{4T}/\beta_{4W} < 6.0 \quad (6)$$

where $f_4$ is the focal length of said fourth lens group, $f_T$ is the focal length of said zoom lens system at said telephoto end, $\Delta X_{4T}$ is the amount, on the basis of said wide-angle end, of zooming movement of said fourth lens group to said telephoto end, $\beta_{4T}$ is the transverse magnification of said fourth lens group at said telephoto end, and $\beta_{4W}$ is the transverse magnification of said fourth lens group at said wide-angle end.

According to the fifth aspect of the invention, there is provided a zoom lens system including a first lens group located nearest to an object side of said zoom lens system and a final lens group located nearest to an image side of said zoom lens system and comprising at least five lens groups in all, wherein:

each of said lens groups moves to said object side upon zooming from a wide-angle end to a telephoto end of said zoom lens system, and conditions (10), (11) and (12) are satisfied:

$$0.02 < |f_L|/f_T < 0.3 \quad (10)$$

$$0.1 < \Delta X_{LT}/f_T < 0.7 \quad (11)$$

$$1.5 < \beta_{LT}/\beta_{LW} < 6 \quad (12)$$

where $f_L$ is the focal length of said final lens group, $f_T$ is the focal length of said zoom lens system at said telephoto end, $\Delta X_{LT}$ is the amount, on the basis of said wide-angle end, of zooming movement of said final lens group to said telephoto end, $\beta_{LT}$ is the transverse magnification of said final lens group at said telephoto end, and $\beta_{LW}$ is the transverse magnification of said final lens group at said wide-angle end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 53(a), 53(b) and 53(c) are sectional views of the lens arrangement according to Example 27 of the zoom lens system of the invention.

FIGS. 57(a), 57(b) and 57(c) are sectional views of the lens arrangement according to Example 29 of the zoom lens system of the invention.

DESCRIPTION OF THE PREFERRED EMBODIMENTS

Figure 1:
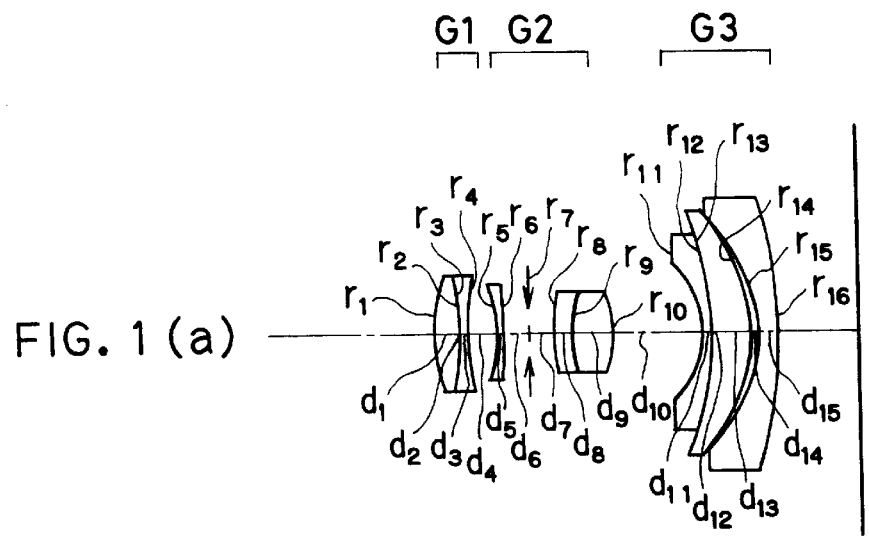
FIGS. 1(a), 1(b) and 1(c) are sectional views of the lens arrangement according to Example 1 of the zoom lens system of the invention.
Figure 1:
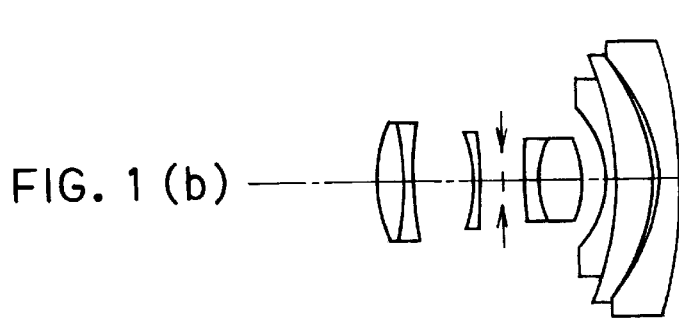
Figure 1:
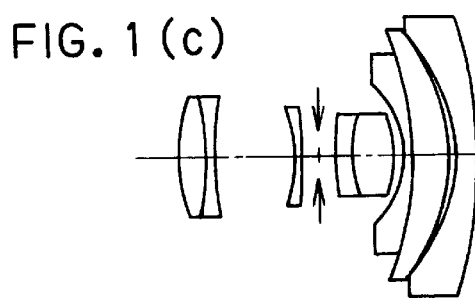

The aim of the present invention is to reduce the size of a conventional zoom compact camera. That is, an optical system is downsized so that an lens unit having high zoom ratios can be housed in a small camera.

More specifically, the basic zoom lens system of the invention has a paraxial lens arrangement comprising a front lens group located nearest to its object side, a rear lens group located nearest to its image side and at least one lens group between the front lens group and the rear lens group. The front lens group has positive or negative refracting power, and the rear lens group has negative refracting power. For wide-angle end-to-telephoto end zooming, the separation between adjacent lens groups varies. The zoom lens systems of the invention having three-group, four-group and five-group constructions will now be explained in this order.

The zoom lens system of three-group construction according to the invention comprises, in order from its object side, a first lens group having positive refracting power, a second lens group having positive refracting power and a third lens group having negative refracting power. Each of the lens groups moves to the object side during zooming from the wide-angle end to the telephoto end while the separation between the first lens group and the second lens group becomes wide and the separation between the second lens group and the third lens group becomes narrow.

In the present invention, such an arrangement is used for the reason that the overall length of the lens system can be reduced at the wide-angle end. An additional advantage of this arrangement is that when, for instance, the second lens group is moved for focusing, it is possible to reduce the amount of focusing movement. This advantage makes it unnecessary to provide a space larger than required between the first lens group and the second lens group. With this arrangement, it is thus possible to achieve compactness efficiently. In addition, the separation between the first lens group and the second lens group becomes wide at the telephoto end, and so there is no possible mechanical interference between both lens groups even when the amount of focusing movement of the second lens group increases. This embodiment is also preferred in this regard.

How the aforesaid arrangement is used to obtain a small telephoto ratio while high zoom ratios are maintained will be explained below. With a conventional method making use of an aspherical surface while a small aperture ratio is maintained at the telephoto end, the size of a camera body may be reduced at the wide-angle end and during lens collapsing. However, the amount of movement of the lens groups upon zooming to the telephoto end becomes large, and so the zoom lens system is ill-balanced. It is here noted that the amount of movement of the lens system depends chiefly on zoom ratios and the focal length of a zooming portion. In other words, when the amount of movement of the lens system is reduced, the overall length of the lens system may be reduced. Instead, however, it is difficult to achieve high zoom ration because the zoom ratio itself should be kept low.

According to the zoom lens system of the invention, therefore, small telephoto ratios are achieved while high zoom ratios are kept by the proper determination of the zoom ratio of the third lens group that is a main zooming portion, i.e., the focal length of the third lens group. More exactly, it is desired for the third lens group to satisfy the following condition (1):

$$0.03 < |f_3|/f_T < 0.25 \tag{1}$$

Here $f_3$ is the focal length of the third lens group, and $f_T$ is the focal length of the zoom lens system at the telephoto end.

Condition (2) is provided to reduce the amount of movement of the zoom lens system at higher magnifications, and this condition is important to reduce the telephoto ratio of the system at the telephoto end. When the lower limit to condition (1) is not reached, the focal length of the third lens group becomes very short and so a power profile favorable for reducing the telephoto ratio is obtained. However, the power of the third lens group becomes too strong to make correction for aberrations. To make satisfactory correction for aberrations, additional lenses are needed, resulting in an increase in the number of lenses and a failure in achieving size reductions. Exceeding the upper limit to condition (1) is preferable because aberrations are easily correctable. However, the amount of movement of the third lens group for zooming increases, resulting in a failure in achieving size reductions.

For the zoom lens system of the invention, it is preferable that the third lens group satisfies condition (2):

$$0.2 < \Delta X_{3T}/f_T < 0.44 \tag{2}$$

where $f_T$ is the focal length of said zoom lens system at the telephoto end, and $\Delta X_{3T}$ is the amount, on the basis of the wide-angle end, of zooming movement of the third lens group to the telephoto end.

Condition (2) is provided to reduce the amount of movement of the third lens group at higher magnifications, and this condition is important to achieve compactness while high zoom ratios are maintained. When the lower limit to condition (2) is not reached, the amount of movement of the third lens group becomes very small and so compactness is achievable. However, the power of the third lens group becomes too strong to make correction for aberrations. To make satisfactory correction for aberrations, additional lenses are needed, resulting in an increase in the number of lenses and a failure in achieving size reductions. Exceeding the upper limit to condition (2) is preferable because aberrations are easily correctable. However, the overall length and telephoto ratio of the zoom lens system at the telephoto end are on the same level as those of a conventional zoom lens system; any zoom lens system having a small telephoto ratio cannot be achieved.

Preferably in the zoom lens system of the invention, the third lens group should further satisfy the following condition (3):

$$1.5 < \beta_{3T}/\beta_{3W} < 6.0 \tag{3}$$

where $\beta_{3T}$ is the transverse magnification of the third lens group at the telephoto end, and $\beta_{3W}$ is the transverse magnification of the third lens group at the wide-angle end.

Condition (3), too, is provided to achieve higher magnifications, defining the zoom ratio shared by the third lens group. When the lower limit to condition (3) is not reached, the zooming range needed for the zoom lens system of the invention becomes narrows; it is impossible to achieve any zoom lens system having higher zoom ratios that is one of the objects of the invention. When the upper limit to condition (3) is exceeded, on the other hand, it is difficult to maintain image-formation capabilities while the amount of zooming movement is limited to within the range defined by condition (2).

More specifically in this embodiment, it is important that the first lens group comprises a doublet composed of at least one positive lens having a strong convex surface on its object side and one double-concave lens or negative meniscus lens, the second lens group includes an aperture stop and comprises a doublet composed of one negative lens and one positive lens, and the third lens group comprises a doublet composed of at least one negative lens having a strong concave surface on its object side and a positive lens. In this embodiment of the invention, each lens group comprises at least a positive lens and a negative lens, so that various aberrations and chromatic aberration produced at each lens group can be satisfactorily corrected.

By the "strong" in "a strong convex surface on its object side" in the first lens group is intended a convex surface having a small absolute value for the radius of curvature of the surface. Therefore, a lens "having a strong convex surface on its object side" means that the lens has a convex surface having a small radius of curvature on its object side. The doublet composed of a positive lens and a negative lens is broken down into two types, one called a cemented type wherein two lenses are in physical contact with each other, and another called an air-spaced type wherein two lenses are in no close contact with each other but are proximately located with a slight air space located between them. Which type is to be selected depends on the overall lens arrangement of a zoom lens system, a balance between the aberrations corrected, sensitivity to decentration errors, etc.

Then, the construction of each lens group is explained.

When the first lens group is constructed of a doublet composed of a positive lens and a negative lens, it is desired that at least one aspherical surface is used in the first lens group, so that spherical aberration at the telephoto end can be satisfactorily corrected. Especially when the aspherical surface is used for the object-side surface of the positive lens, this effect becomes strikingly prominent.

The construction of the second lens group varies depending on where to locate an aperture stop. As already explained, however, the second lens group should comprise at least a doublet composed of a positive lens and a negative lens. It is also desired to use at least one aspherical surface in the second lens group.

Here, if the aspherical surface is used for the surface located nearest to the object side in the second lens group, it is then possible to make satisfactory correction for distortion and coma. If the doublet is made up of a negative lens and a positive lens in order from its object side with an aspherical surface used for the convex surface located on its image side, it is then possible to make satisfactory correction for all off-axis aberrations. If an aspherical surface is used for the concave surface of a lens located nearest to the image side of the second lens group and concave with respect to the aperture stop, it is then possible to make satisfactory correction for various aberrations.

It is desired that the aspherical surface be configured in such a way that the amount of asphericity with respect to a reference surface increases farther off the optical axis. Generally in this case, the aspherical configuration has no point of inflection. However, it is understood that the aspherical configuration may possibly have a point of inflection depending on what state all aberrations are corrected in.

For focusing, it is preferable to move the second lens group integrally in the optical axis direction. The amount of movement in this case is small. With the doublet located in the second lens group and a proper power profile of the second lens group, however, it is desired to reduce residual chromatic aberration by the second lens group itself.

If the second lens group is constructed symmetrically with respect to the aperture stop, it is then possible to place field curvature under satisfactory control, thereby achieving high optical performance. Preferably in this case, the zoom lens system is constructed symmetrically with respect to the aperture stop.

The aperture stop should preferably be located nearest to the object side of the second lens group or within the second lens group, although it may be located nearest to the image side of the second lens group. It is understood that the optimum lens arrangement of the second lens group is determined depending on the position of the aperture stop.

The third lens group is important to accomplish the object of the present invention. That is, the third lens group must comprise at least one positive lens and a negative lens that is located between the positive lens and the image side of the third lens group and has a strong concave surface on the object side of the third lens group.

Preferably in view of correction of aberrations, the third lens group should comprise three lenses or, in order from its object side, a doublet consisting of one negative lens (especially, a negative meniscus lens) having a strong concave surface on its object side and a positive lens, and a negative meniscus lens having a strong concave surface on its object side. This lens arrangement is particularly preferable to satisfactorily keep the image-formation capabilities of the peripheral portion (field curvature at the wide-angle end of the zoom lens system, etc.).

An aspherical surface or surfaces should be used at least for the aforesaid surface or surfaces of strong concavity, so that the image-formation capabilities (of correcting for coma and astigmatism) at the wide-angle end of the zoom lens system can be ensured. The use of an aspherical surface for the surface of the positive lens on the object side enables coma to be corrected in a well-balanced state, thereby achieving high magnifications and small telephoto ratios while aberrations are better corrected.

It is here noted that the surface of strong concavity takes part in peripheral performance at the wide-angle end of the zoom lens system. It is thus preferable that when an aspherical surface is used for this surface, the aspherical surface is configured in such a way that the amount of asphericity with respect to a reference surface increases in the minus direction from the optical axis toward the periphery of the zoom lens system. In some cases, it is more preferable that the aspherical surface is configured in such a way that the point of inflection appears in the vicinity of an effective diameter.

The foregoing are the explanations of the respective lens groups. The use of the aspherical surface in the first lens group is primarily effective for correction of spherical aberration, and the use of the aspherical surface in the third lens group is important to ensure the image-formation capabilities, and especially the flatness of the image plane, of the peripheral portion of the zoom lens system.

When the zoom lens system of the invention is built up of four lens groups, the second lens group and the third lens group are designed to move independently to make correction for field curvature variations in an intermediate focal length zone, thereby achieving such a high zoom ratio as expressed by a magnification of at least 4.

According to another preferable embodiment of the invention, there is provided a zoom lens system comprising, in order from its object side, a first lens group having positive refracting power, a second lens group having positive refracting power, a third lens group having positive refracting power and a fourth lens group having negative refracting power, wherein for zooming from a wide-angle end to a telephoto end of said zoom lens system, each of said lens groups moves toward said object side while a separation between said first lens group and said second lens group becomes wide and a separation between said third lens group and said fourth lens group becomes narrow.

According to this embodiment of the zoom lens system of the invention, small telephoto ratios are achieved while high zoom ratios are kept by the proper determination of the zoom ratio of the fourth lens group that is a main zooming portion, i.e., the focal length of the fourth lens group. More exactly, it is desired for the fourth lens group to satisfy the following condition (4):

$$0.02 < |f_4|f_T < 0.3 \tag{4}$$

Here $f_4$ is the focal length of the fourth lens group, and $f_T$ is the focal length of the zoom lens system at the telephoto end.

Condition (4) is provided to reduce the amount of movement of the zoom lens system at higher magnifications, and this condition is important to reduce the telephoto ratio of the system at the telephoto end. When the lower limit of 0.02 in condition (4) is not reached, the focal length of the fourth lens group becomes very short and so a power profile favorable for reducing the telephoto ratio is obtained. However, the power of the fourth lens group becomes too strong to make correction for aberrations. To make satisfactory correction for aberrations, additional lenses are needed, resulting in an increase in the number of lenses and a failure in achieving size reductions. Exceeding the upper limit of 0.3 in condition (4) is preferable because aberrations are easily correctable. However, the amount of movement of the fourth lens group for zooming increases, resulting in a failure in achieving size reductions.

For the zoom lens system of the invention, it is preferable that the fourth lens group satisfies condition (5):

$$0.1 < \Delta X_{4T}/f_T < 0.5 \quad (5)$$

where $f_T$ is the focal length of said zoom lens system at the telephoto end, and $\Delta X_{4T}$ is the amount, on the basis of the wide-angle end, of zooming movement of the fourth lens group to the telephoto end.

Condition (5) is provided to reduce the amount of movement of the fourth lens group at higher magnifications, and this condition is important to achieve compactness while high zoom ratios are maintained. When the lower limit of 0.1 in condition (5) is not reached, the amount of movement of the fourth lens group becomes very small and so compactness is achievable. However, the power of the fourth lens group becomes too strong to make correction for aberrations. To make satisfactory correction for aberrations, additional lenses are needed, resulting in an increase in the number of lenses and a failure in achieving size reductions. Exceeding the upper limit of 0.5 in condition (5) is preferable because aberrations are easily correctable. However, the overall length and telephoto ratio of the zoom lens system at the telephoto end are on the same level as those of a conventional zoom lens system; any zoom lens system having a small telephoto ratio cannot be achieved.

Preferably in the zoom lens system of the invention, the fourth lens group should further satisfy the following condition (6):

$$1.5 < \beta_{4T}/\beta_{4W} < 6.0 \quad (6)$$

where $\beta_{4T}$ is the transverse magnification of the fourth lens group at the telephoto end, and $\beta_{4W}$ is the transverse magnification of the fourth lens group at the wide-angle end.

Condition (6), too, is provided to achieve higher magnifications, defining the zoom ratio shared by the fourth lens group. When the lower limit of 1.5 in condition (6) is not reached, the zooming range needed for the zoom lens system of the invention becomes narrows; it is impossible to achieve any zoom lens system having higher zoom ratios that is one of the objects of the invention. When the upper limit of 6.0 in condition (6) is exceeded, on the other hand, it is difficult to maintain image-formation capabilities while the amount of zooming movement is limited to within the range defined by condition (5).

More specifically in this embodiment, it is important that the first lens group comprises a doublet composed of at least one positive lens and a negative lens, the second lens group includes an aperture stop and comprises at least one negative lens, the third lens group comprises a doublet composed of a negative lens and a positive lens, and the fourth lens group comprises at least a negative lens and a positive lens. With such an arrangement, the overall length of the lens system can be shortest at the wide-angle end. An additional advantage of this arrangement is that even when, for instance, the second and third lens groups are designed to move for focusing, it is possible to reduce the amount of focusing movement. This advantage makes it unnecessary to provide a space larger than required between the first lens group and the second lens group. With this arrangement, it is thus possible to achieve compactness efficiently.

In addition, the separation between the first lens group and the second lens group becomes wide in a telephoto mode, and so there is no possible mechanical interference between both lens groups even when the amount of focusing movement of the second lens group increases. It is here noted that the sensitivity of the separation between the second lens group and the third lens group to the image plane tends to increase, and so each lens group should be designed in such a way that its holding accuracy can be ensured.

More preferably in this embodiment, a positive lens is added to the second lens group, so that each lens group comprises at least a positive lens and a negative lens, because various aberrations and chromatic aberration produced at each lens group can be satisfactorily corrected. The doublet, when composed of a positive lens and a negative lens, is broken down into two types, as already explained. Which type is to be selected depends on the overall lens arrangement of a zoom lens system, a balance between the aberrations corrected, sensitivity to decentration errors, etc.

Then, the construction of each lens group is explained.

When the first lens group is constructed of a doublet composed of a positive lens and a negative lens, it is desired that at least one aspherical surface is used in the first lens group, so that spherical aberration at the telephoto end can be satisfactorily corrected. Especially when the aspherical surface is used for the object-side surface of the positive lens, this effect becomes strikingly prominent.

The construction of the second lens group varies depending on where to locate an aperture stop. As already explained, however, the second lens group should comprise a negative lens. It is desired to use at least one aspherical surface in the second lens group. Here, if the aspherical surface is used for the surface located nearest to the object side in the second lens group, it is then possible to make satisfactory correction for distortion and coma.

It is desired that the aspherical surface be configured in such a way that the amount of asphericity with respect to a reference surface increases from the optical axis in the outer diameter direction. Generally in this case, the aspherical configuration has no point of inflection. However, it is understood that the aspherical configuration may possibly have a point of inflection depending on what state all aberrations are corrected in.

In consideration of the fact that the second lens group is moved for focusing in the optical axis direction, it is preferable to reduce residual chromatic aberration by the second lens group itself. The amount of movement in this case is small. To make satisfactory correction for the residual chromatic aberration, however, it is of importance to locate a doublet in the second lens group and impart a proper power profile thereto.

The aperture stop should preferably be located nearest to the object side of the second lens group or within the second lens group, although it may be located nearest to the image side of the second lens group. It is understood that the optimum lens arrangement of the second lens group is determined depending on the position of the aperture stop.

In consideration of the fact that the third lens group may move together with the second lens group for focusing, it is preferable that the third lens group is composed of a doublet consisting of a positive lens and a negative lens, thereby correcting for the residual chromatic aberration by itself. It is here noted that when the doublet is made up of a negative lens and a positive lens in order from the object side of the third lens group while an aspherical surface is used for the convex surface located nearest to its image side, all off-axis aberrations can be satisfactorily corrected. If an aspherical surface is used for the surface of the lens that is convex with respect to the aperture stop in the second lens group, various aberrations can then be satisfactorily corrected.

For instance, if the second and third lens groups are constructed symmetrically with respect to the aperture stop, it is then possible to place field curvature under satisfactory control, thereby achieving high optical performance. Preferably in this case, the zoom lens system is constructed symmetrically with respect to the aperture stop.

The fourth lens group is important to accomplish the object of the present invention. That is, the fourth lens group must comprise at least one positive lens and a negative lens that is located between the positive lens and the image side of the third lens group and has a strong concave surface on the object side of the third lens group.

Preferably in view of correction of aberrations, the fourth lens group should comprise three lenses or, in order from its object side, a doublet consisting of one negative lens (especially, a negative meniscus lens) having a strong concave surface on its object side and a positive lens, and a negative meniscus lens having a strong concave surface on its object side. This lens arrangement is particularly preferable to satisfactorily keep the image-formation capabilities of the peripheral portion (field curvature, etc.).

An aspherical surface or surfaces should be used at least for the aforesaid surface or surfaces of strong concavity, so that the image-formation capabilities (of correcting for coma and astigmatism) at the wide-angle end of the zoom lens system can be ensured. The use of an aspherical surface for the surface of the positive lens on the object side enables coma to be corrected in a well-balanced state, thereby achieving high magnifications and small telephoto ratios while aberrations are better corrected.

It is here noted that the surface of strong concavity takes part in peripheral performance at the wide-angle end of the zoom lens system. It is thus preferable that when an aspherical surface is used for this surface, the aspherical surface is configured in such a way that the amount of asphericity with respect to a reference surface increases in the minus direction from the optical axis toward the periphery of the zoom lens system. In some cases, it is more preferable that the aspherical surface is configured in such a way that the point of inflection appears in the vicinity of an effective diameter.

The foregoing are the explanations of the respective lens groups. The use of the aspherical surface in the first lens group is primarily effective for correction of spherical aberration, and the use of the aspherical surface in the fourth lens group is important to ensure the image-formation capabilities, and especially the flatness of the image plane, of the peripheral portion of the zoom lens system.

The "strong" in "a strong convex surface on its object side" in the fourth lens group has the same meanings as already explained.

According to yet another preferable embodiment of the invention, there is provided a zoom lens system of four-group construction, comprising a first lens group having positive refracting power, a second lens group having negative refracting power, a third lens group having positive refracting power and a fourth lens group having negative refracting power, wherein for zooming from a wide-angle end to a telephoto end of said zoom lens system, each of said lens groups moves toward said object side while a separation between said first lens group and said second lens group becomes wide and a separation between said third lens group and said fourth lens group becomes narrow.

In this embodiment of the zoom lens system of the invention, it is desired for the fourth lens group to satisfy the following condition (7):

$$0.02 < |f_4|/f_T < 0.3 \tag{7}$$

Here $f_4$ is the focal length of the fourth lens group, and $f_T$ is the focal length of the zoom lens system at the telephoto end.

Condition (7) is provided to reduce the amount of movement of the zoom lens system at higher magnifications, and this condition is important to reduce the telephoto ratio of the system at the telephoto end. When the lower limit of 0.02 in condition (7) is not reached, the focal length of the fourth lens group becomes very short and so a power profile favorable for reducing the telephoto ratio is obtained. However, the power of the fourth lens group becomes too strong to make correction for aberrations. To make satisfactory correction for aberrations, additional lenses are needed, resulting in an increase in the number of lenses and a failure in achieving size reductions. Exceeding the upper limit of 0.3 in condition (7) is preferable because aberrations are easily correctable. However, the amount of movement of the fourth lens group for zooming increases, resulting in a failure in achieving size reductions.

For the zoom lens system of the invention, it is preferable that the fourth lens group satisfies condition (8):

$$0.2 < \Delta X_{4T}/f_T < 0.6 \tag{8}$$

where $f_T$ is the focal length of said zoom lens system at the telephoto end, and $\Delta X_{4T}$ is the amount, on the basis of the wide-angle end, of zooming movement of the fourth lens group to the telephoto end.

Condition (8) is provided to reduce the amount of movement of the fourth lens group at higher magnifications, and this condition is important to achieve compactness while high zoom ratios are maintained. When the lower limit of 0.2 in condition (8) is not reached, the amount of movement of the fourth lens group becomes very small and so compactness is achievable. However, the power of the fourth lens group becomes too strong to make correction for aberrations. To make satisfactory correction for aberrations, additional lenses are needed, resulting in an increase in the number of lenses and a failure in achieving size reductions. Exceeding the upper limit of 0.6 in condition (8) is preferable because aberrations are easily correctable. However, the overall length and telephoto ratio of the zoom lens system at the telephoto end are on the same level as those of a conventional zoom lens system; any zoom lens system having a small telephoto ratio cannot be achieved.

Preferably in the zoom lens system of the invention, the fourth lens group should further satisfy the following condition (9):

$$1.5 < \beta_{4T}/\beta_{4W} < 6.0 \tag{9}$$

where $\beta_{4T}$ is the transverse magnification of the fourth lens group at the telephoto end, and $\beta_{4W}$ is the transverse magnification of the fourth lens group at the wide-angle end.

Condition (9), too, is provided to achieve higher magnifications, defining the zoom ratio shared by the fourth lens group. When the lower limit of 1.5 in condition (9) is not reached, the zooming range needed for the zoom lens system of the invention becomes narrows; it is impossible to achieve any zoom lens system having higher zoom ratios that is one of the objects of the invention. When the upper limit of 6.0 in condition (9) is exceeded, on the other hand, it is difficult to maintain image-formation capabilities while the amount of zooming movement is limited to within the range defined by condition (8).

As is the case with the aforesaid zoom lens system of +++− construction, it is important in this zoom lens system that the first lens group comprises a doublet composed of at least one positive lens and a negative lens, the second lens group includes an aperture stop and comprises at least one negative lens, the third lens group comprises a doublet composed of a negative lens and a positive lens, and the fourth lens group comprises at least a negative lens and a positive lens. With such an arrangement, the overall length of the lens system can be shortest at the wide-angle end. For instance, even when focusing is effected at the wide-angle end with the second and third lens groups, it is possible to reduce the amount of focusing movement. This advantage makes it unnecessary to provide a space larger than required between the first lens group and the second lens group. With this arrangement, it is thus possible to achieve compactness efficiently.

In addition, the separation between the first lens group and the second lens group becomes wide in a telephoto mode, and so there is no possible mechanical interference between both lens groups even when the amount of focusing movement of the second lens group increases at the telephoto end. It is here noted that the sensitivity of the separation between the second lens group and the third lens group to the image plane tends to increase, and so each lens group should be designed in such a way that its holding accuracy can be ensured.

More preferably in this embodiment, a positive lens is added to the second lens group, so that each lens group comprises at least a positive lens and a negative lens, because various aberrations and chromatic aberration produced at each lens group can be satisfactorily corrected. The same holds of when the doublet is composed of a positive lens and a negative lens.

Then, the construction of each lens group is explained.

The first lens group is the same as that in the four-group zoom lens system of +++− construction.

The construction of the second lens group varies depending on where to locate an aperture stop. As already explained, however, the second lens group should comprise a negative lens. It is desired to use at least one aspherical surface in the second lens group. Here, if the aspherical surface is used for the surface located nearest to the object side in the second lens group, it is then possible to make satisfactory correction for distortion and coma.

For the use of aspherical surfaces, the integral movement for focusing of the second lens group in the optical axis direction, the position of the aperture stop, the focusing movement of the third lens group together with the second lens group, and the symmetry of the third and second lens groups with respect to the aperture stop, see the explanations made in conjunction with the aforesaid four-group zoom lens system of +++− construction.

For the fourth lens group, too, see the explanation made in conjunction with the aforesaid four-group zoom lens system of +++− construction.

According to a further embodiment of the zoom lens system of the invention, there is provided a zoom lens system comprising at least five lens groups wherein each lens group is so movable that field curvature variations in an intermediate focal zone can be corrected. In some cases, lens groups that move together on a driving mechanism may also be located.

More specifically, there is provided a zoom lens system comprising a first lens group that has positive or negative refracting power and is located nearest to an object side of the zoom lens system and a final lens group located nearest to an image side of the zoom lens system or at least five lens groups in all, wherein for zooming from a wide-angle end to a telephoto end of the zoom lens system, each of said zoom lens group moves toward said object side while the following condition (10) is satisfied:

$$0.02<|f_L|/f_T<0.3 \qquad (10)$$

Here $f_L$ is the focal length of the final lens group, and $f_T$ is the focal length of the zoom lens system at the telephoto end.

Condition (10) is important to reduce the length of the zoom lens system at the telephoto end. When the lower limit of 0.02 is not reached, the focal length of the final lens group becomes very short and so a power profile favorable for size reductions is obtained. However, it is difficult to make correction for aberrations, and the number of lenses becomes larger than required. Exceeding the upper limit of 0.3 is preferable because aberrations are easily correctable. However, the amount of zooming movement of the final lens group increases in relation to the following condition (11), resulting in a failure in achieving size reductions.

It is preferable that the first lens group comprises a doublet composed of at least one positive lens and a negative lens as already explained, and the final lens group comprises at least a negative lens and a positive lens.

With such a zoom arrangement, the overall length of the lens system can be shortest at the wide-angle end. For instance, even when inner focusing is effected at the wide-angle end, it is possible to reduce the amount of focusing movement. This advantage makes it unnecessary to provide a space larger than required between the lens groups, resulting in efficient size reductions. On the other hand, the sensitivity of the moving separation between the focusing lens groups with respect to the image plane (focusing sensitivity) tends to increase, and so accuracy should be ensured.

When the amount of movement of the zoom lens system is reduced while higher magnifications are achieved, it is preferable that the following condition (11) is satisfied:

$$0.1<\Delta X_{LT}/f_T<0.7 \qquad (11)$$

where $f_T$ is the focal length of said zoom lens system at the telephoto end, and $\Delta X_{LT}$ is the amount, on the basis of the wide-angle end, of zooming movement of the final lens group to the telephoto end.

For a zoom lens system wherein the telephoto ratio at the telephoto end is reduced while high zoom ratios are maintained, it is a requisite to increase the power of the final lens group having negative refracting power. Exceeding the upper limit of 0.7 in condition (11) is contrary to the purpose of the present invention, because. However, the overall length of the zoom lens system at the telephoto end is on the same level as that of a conventional zoom lens system. When the lower limit of 0.1 is not reached, on the other hand, size reductions are achievable. However, it is very difficult to make correction for aberrations; any desired image-formation capabilities are not achievable.

Preferably in the zoom lens system of the invention, the following condition (12) is satisfied:

$$1.5<\beta_{LT}/\beta_{LW}<6.0 \qquad (12)$$

where $\beta_{LT}$ is the transverse magnification of the final lens group at the telephoto end, and $\beta_{LW}$ is the transverse magnification of the final lens group at the wide-angle end.

Condition (12), too, is provided to achieve higher magnifications, defining the zoom ratio shared by the final lens group. When the lower limit of 1.5 in condition (12) is not reached, the zooming range needed for the zoom lens system of the invention becomes narrows; it is impossible to achieve any zoom lens system having higher zoom ratios that is one of the objects of the invention. When the upper limit of 6.0 in condition (12) is exceeded, on the other hand, it is difficult to maintain image-formation capabilities while the amount of zooming movement is limited to within the range defined by condition (11), although a paraxial solution may be obtained.

For the zoom lens system with the predetermined power profile and proper lens arrangement of each lens group, it is a requisite that the first lens group comprise at least one positive or negative lens and the second lens group comprise at least a negative lens and a positive lens. To reduce aberration variations during zooming and focusing, it is particularly preferable to reduce various aberrations and chromatic aberration produced at each lens group, as explained below.

The optimum lens arrangement must be envisaged for image-formation capabilities. It is understood that proper combinations of lens arrangements with optical elements are actually needed to maintain the image-formation capabilities. In the present invention, the first lens group comprises at least a positive or negative lens. By use of at least one aspherical surface, it is possible to make satisfactory correction for spherical aberration in the telephoto zone. The final lens group must comprise at least one positive lens and one negative lens. When the value of condition (10) is small, the final lens group should preferably comprise three lenses or one negative lens, a positive lens and a negative lens. This is particularly important to maintain the image-formation capabilities of the peripheral portion on the wide-angle side. In view of correction of field curvature in a wide-angle zone, it is preferable to use an aspherical surface of the concave surface of the negative lens on its object side or the surface of the positive lens on its image side. For the final lens group of three or –+– lenses, an aspherical surface has a great effect on the peripheral performance on the wide-angle side when used for the concave surface of the third negative lens on its object side. By use of at least one or two aspherical surfaces, it is easy to achieve an optical system ensuring the image-formation capabilities on the wide-angle side. In particular, one or two such aspherical surfaces has relation to the peripheral performance in the wide-angle zone, and so tend to increase in the amount of asphericity.

To achieve the optical system according to the present invention in view of the foregoing, it is more desired to satisfy the requirements shown in the following examples.

Examples 1 to 30 of the present invention will now be explained.

EXAMPLE 1

Figure 2:
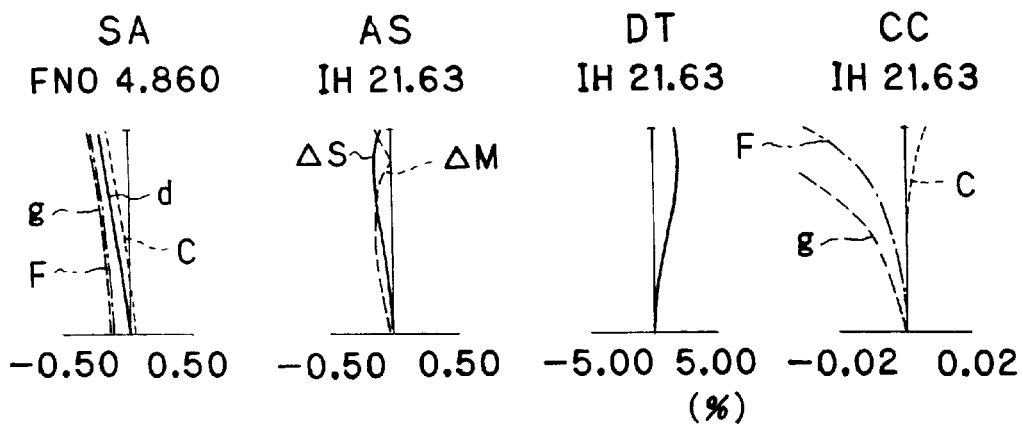
FIGS. 2(a), 2(b) and 2(c) are aberration diagrams for Example 1 of the invention.
Figure 2:
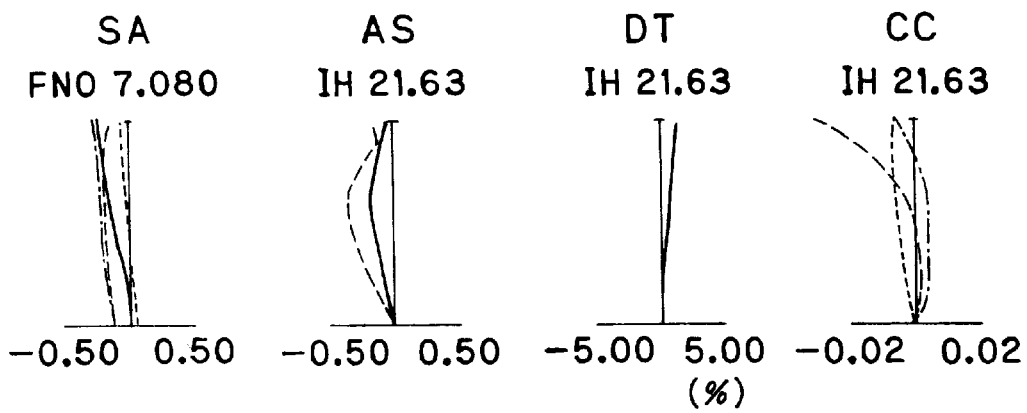
Figure 2:
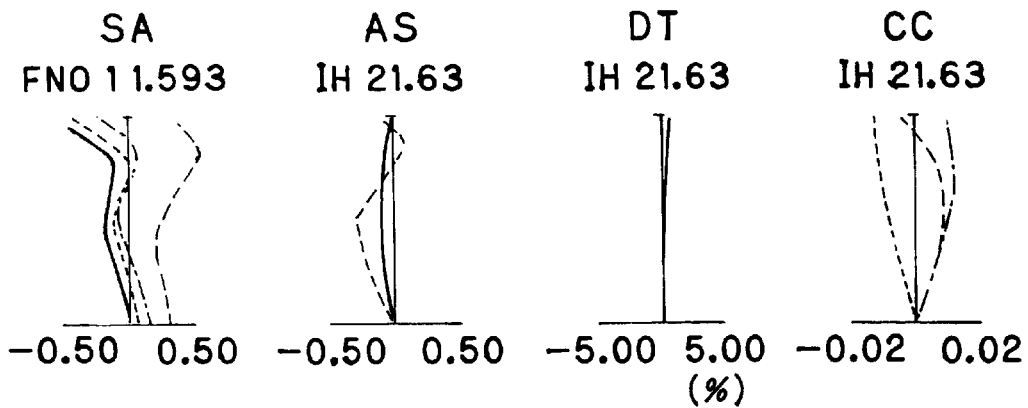

Example 1 is directed to a zoom lens system having a zoom ratio of 3.4 and consisting of three lens groups or eight lenses in all, as shown FIGS. 1(a), 1(b) and 1(c) that are sectional lens arrangement views of the zoom lens system at its wide-angle end (a), intermediate setting (b) and telephoto end (c). FIGS. 2(a), 2(b) and 2(c) are aberration diagrams for the zoom lens system at its wide-angle end (a), intermediate setting (b) and telephoto end (c). More exactly, FIGS. 2(a), 2(b) and 2(c) show spherical aberration SA, astigmatism AS, distortion DT and chromatic aberration of magnification CC of the zoom lens system at its wide-angle end (a), intermediate setting (b) and telephoto end (c). The same will apply hereinafter. In FIGS. 2(a), 2(b) and 2(c), "IH" stands for an image height.

In this example, the first lens group consists of, in order from its object side, a double-convex lens having a strong concave surface toward the object side and a double-concave lens which form together a doublet with a slight space located therebetween. The second lens group consists of, in order from its object side, a negative meniscus lens concave on the object side, an aperture stop and a positive cemented doublet made up of a negative meniscus lens convex on its object side and a double-convex lens. The third lens group consists of, in order from its object side, an air-spaced doublet made up of a negative meniscus lens having a strong concave surface its the object side and a positive meniscus lens having a strong convex surface on its image side with a slight space located between both lenses and a negative meniscus lens having a strong concave surface on its object side.

For zooming from the wide-angle end to the telephoto end of the zoom lens system, the separation between the first lens group and the second lens group becomes wide and the separation between the second lens group and the third lens group becomes narrow. In a telephoto mode, the cemented positive doublet located nearest to the image side in the second lens group is engaged within the concavity of the negative meniscus lens located nearest to the object side in the third lens group.

The zoom lens system according to this example has a telephoto ratio of 0.657 at the telephoto end, which is much smaller than that of a conventional lens system, so that sufficient size reductions can be achieved.

In this example, one aspherical surface is used for the object-side surface of the positive lens in the first lens group to make good correction for spherical aberration. In the second lens group, one aspherical surface is used for the object-side surface of the negative meniscus lens located nearest to the object side in the second lens group to make good correction for distortion, and another aspherical surface is used for the image-side surface of the positive lens in the doublet located between the stop and the image side to make well-balanced correction for off-axis aberrations.

The third lens group comprises an air-spaced doublet made of a negative meniscus lens and a positive meniscus lens with a slight space located between both lenses, as already explained. However, it is noted that a cemented doublet may be used as this air-spaced doublet. By locating this doublet nearest to the object side in the third lens group, it is then possible to make particularly effective correction for aberrations at the wide-angle end.

By using one aspherical surface for the objet-side, strong concave surface of the doublet-forming negative meniscus lens, it is possible to make better correction for aberrations at the wide-angle end. Besides, one aspherical surface is used for the object-side surface of the negative meniscus lens located on the image side of the positive meniscus lens to make good correction for field curvature. It is here acceptable to use one aspherical surface for the image side of the doublet-forming positive menaces lens.

It is noted that the aspherical surface used for the object side of the doublet-forming negative meniscus lens tends to increase in the amount of asphericity with an increasing outer diameter (from the optical axis to its periphery).

EXAMPLE 2

Figure 3:
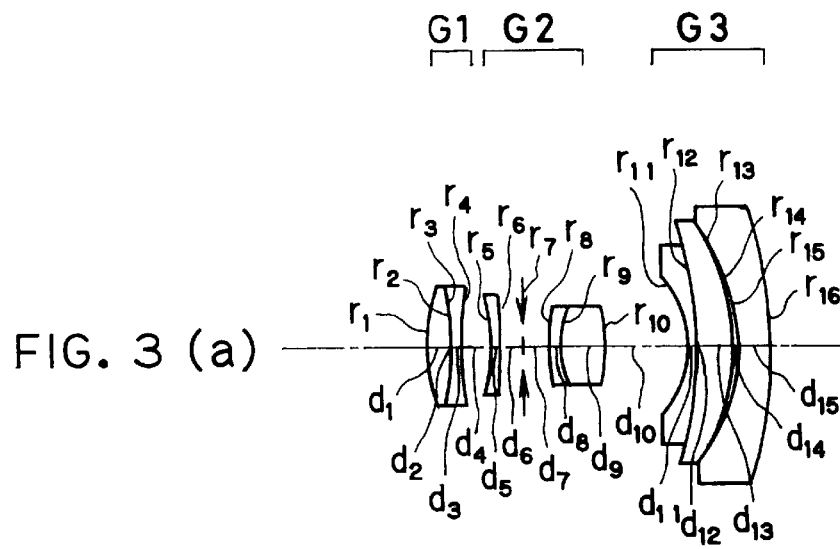
FIGS. 3(a), 3(b) and 3(c) are sectional views of the lens arrangement according to Example 2 of the zoom lens system of the invention.
Figure 3:
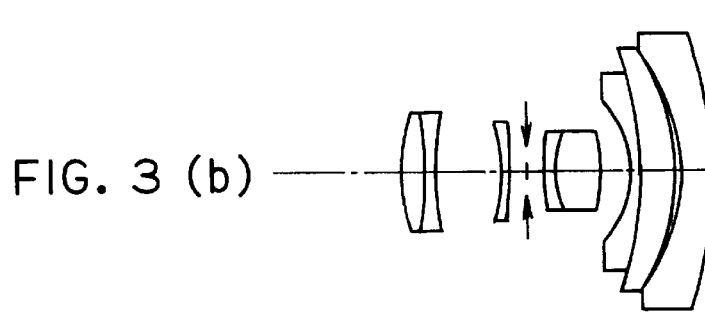
Figure 3:
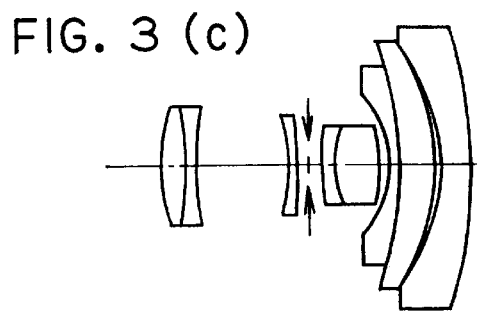
Figure 4:
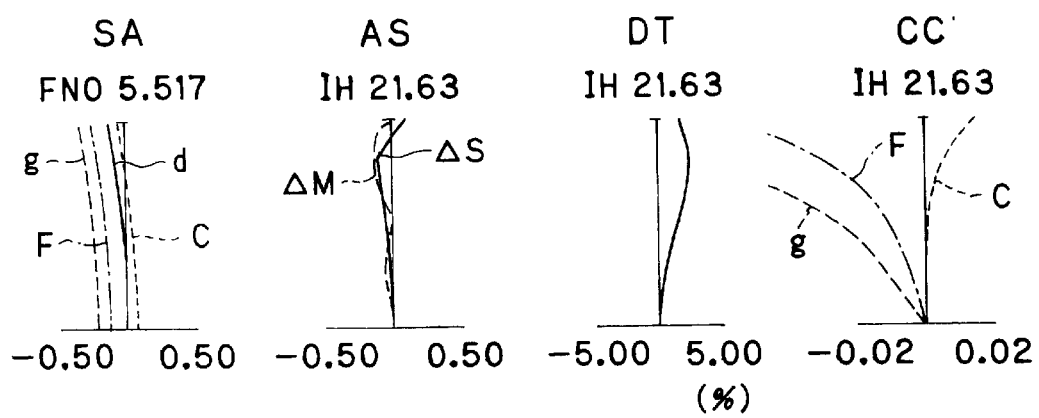
FIGS. 4(a), 4(b) and 4(c) are aberration diagrams for Example 2 of the invention.
Figure 4:
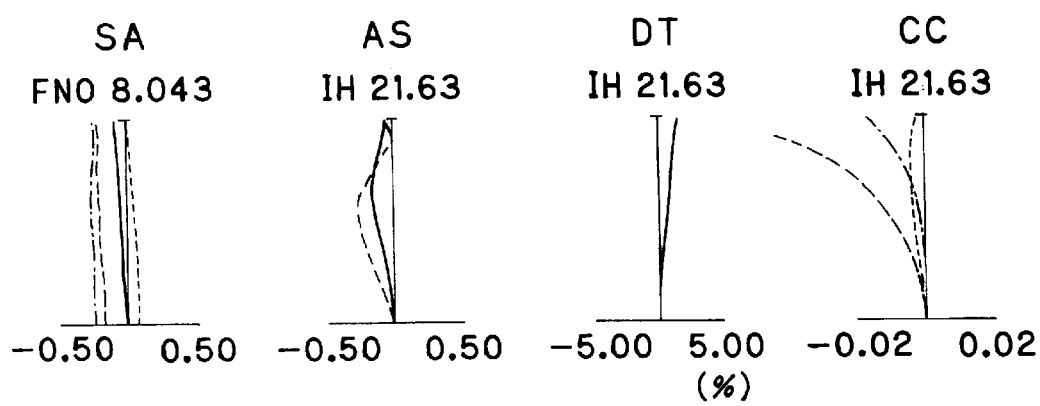
Figure 4:
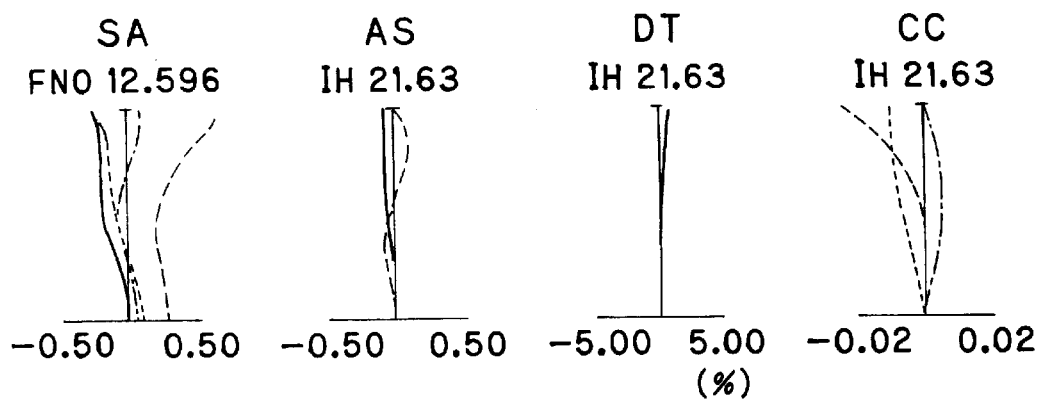

As is the case with Example 1, Example 2 is directed to a zoom lens system having a zoom ratio of 3.4 and consisting of three lens groups or eight lenses in all, as shown in FIGS. 3(a), 3(b) and 3(c) that are sectional lens arrangement views of the zoom lens system at its wide-angel end (a), intermediate setting (b) and telephoto end (c). FIGS. 4(a), 4(b) and 4(c) are aberration diagrams for the zoom lens system at its wide-angel end (a), intermediate setting (b) and telephoto end (c).

An explanation of the zoom lens system according to this example is omitted because the arrangements of the first, second and third lens groups and where to use aspherical surfaces are the same as in Example 1.

The zoom lens system according to this example has a somewhat larger F-number as compared with Example 1. However, this zoom lens system has a small telephoto ratio of 0.636 at its telephoto end. Thus, the telephoto ratio is much smaller than that of a conventional lens system as in Example 1, so that sufficient size reductions are achievable.

EXAMPLE 3

Figure 5:
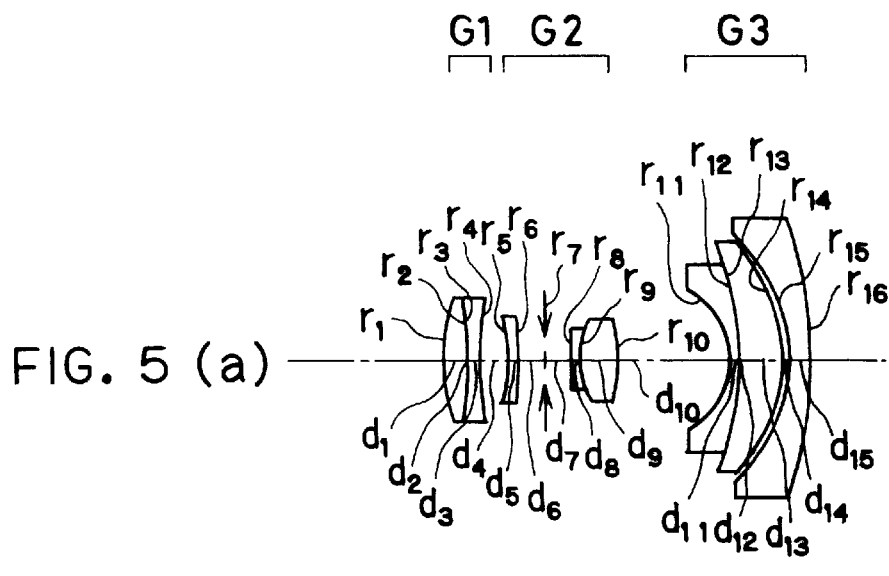
FIGS. 5(a), 5(b) and 5(c) are sectional views of the lens arrangement according to Example 3 of the zoom lens system of the invention.
Figure 5:
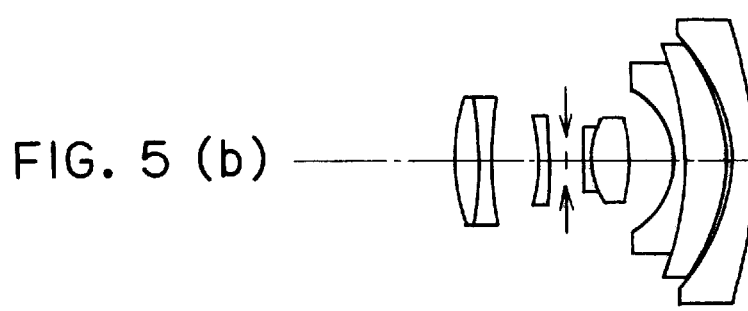
Figure 5:
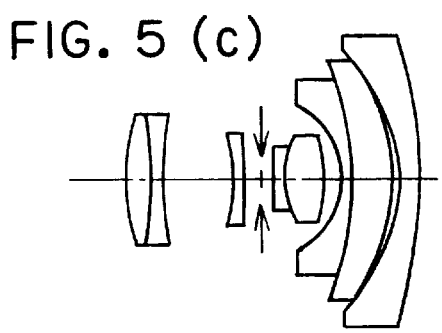
Figure 6:
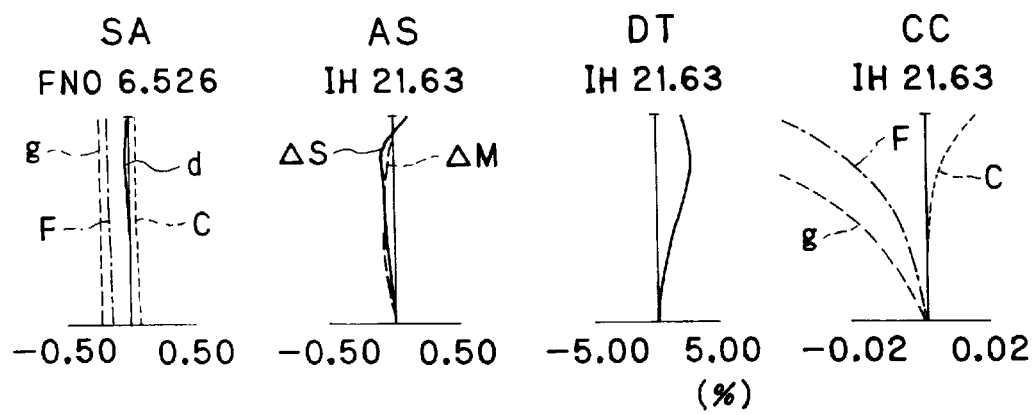
FIGS. 6(a), 6(b) and 6(c) are aberration diagrams for Example 3 of the invention.
Figure 6:
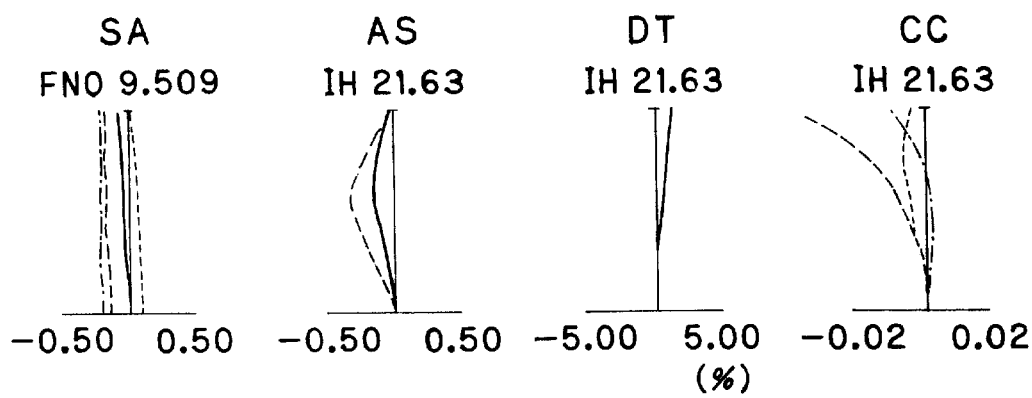
Figure 6:
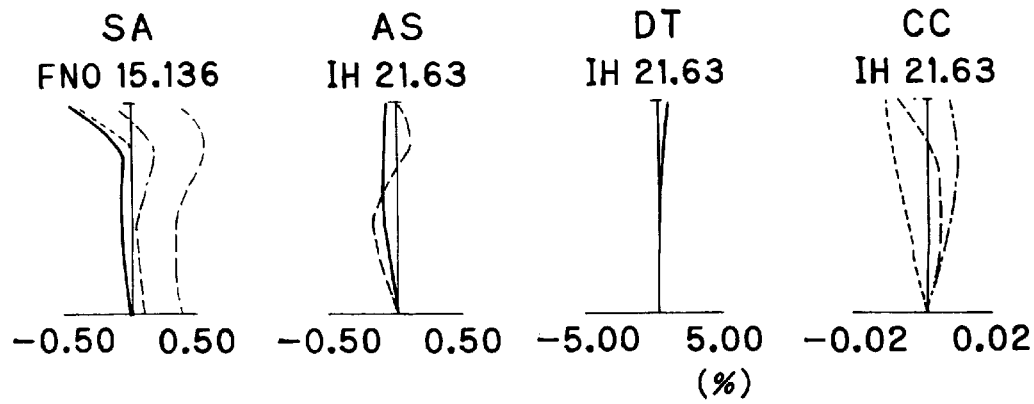

As is the case with Example 1, Example 3 is directed to a zoom lens system having a zoom ratio of 3.4 and consisting of three lens groups or eight lenses in all, as shown in FIGS. 5(a), 5(b) and 5(c) that are sectional lens arrangement views of the zoom lens system at its wide-angel end (a), intermediate setting (b) and telephoto end (c). FIGS. 6(a), 6(b) and 6(c) are aberration diagrams for the zoom lens system at its wide-angel end (a), intermediate setting (b) and telephoto end (c).

An explanation of the zoom lens system according to this example is again omitted because the arrangements of the first, second and third lens groups and where to use aspherical surfaces are the same as in Example 1.

The zoom lens system according to this example has a somewhat larger F-number as compared with Example 1. However, this zoom lens system has a small telephoto ratio of 0.632 at its telephoto end. Thus, the telephoto ratio is much smaller than that of a conventional lens system as in Example 1, so that sufficient size reductions are achievable.

In the zoom lens system of this example, the balance between various aberrations are generally satisfactory. Due to the large refracting power of each lens group, however, the amount of chromatic aberration of magnification remaining at the wide-angle end is somewhat large.

EXAMPLE 4

Figure 7:
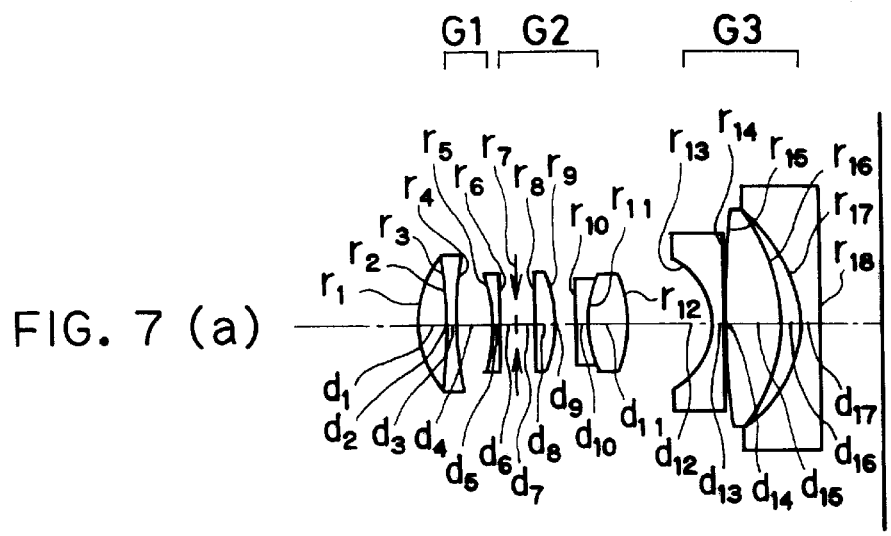
FIGS. 7(a), 7(b) and 7(c) are sectional views of the lens arrangement according to Example 4 of the zoom lens system of the invention.
Figure 7:
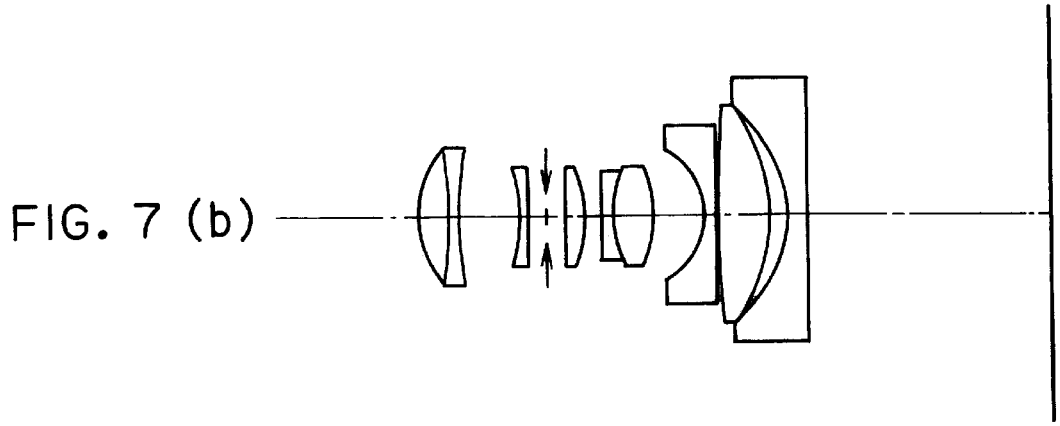
Figure 7:
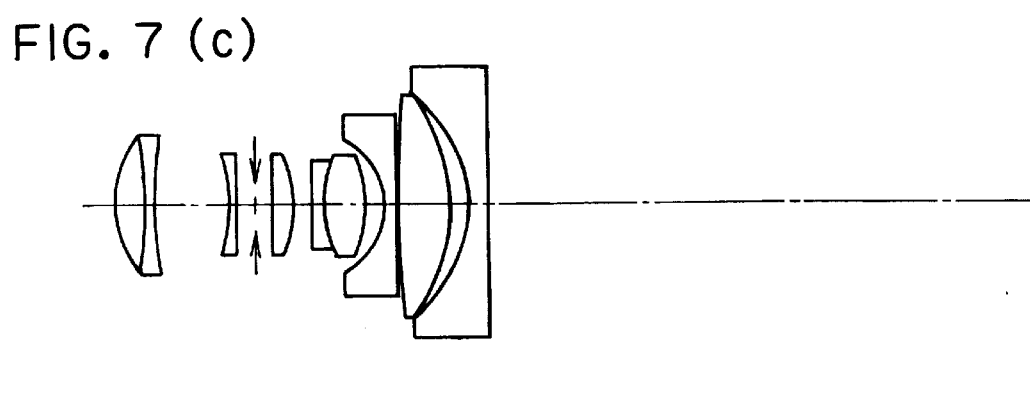
Figure 8:
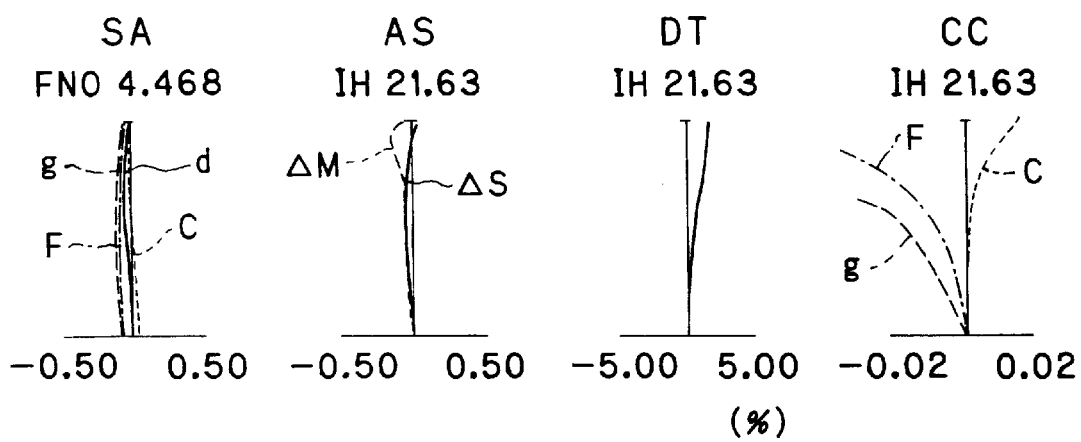
FIGS. 8(a), 8(b) and 8(c) are aberration diagrams for Example 4 of the invention.
Figure 8:
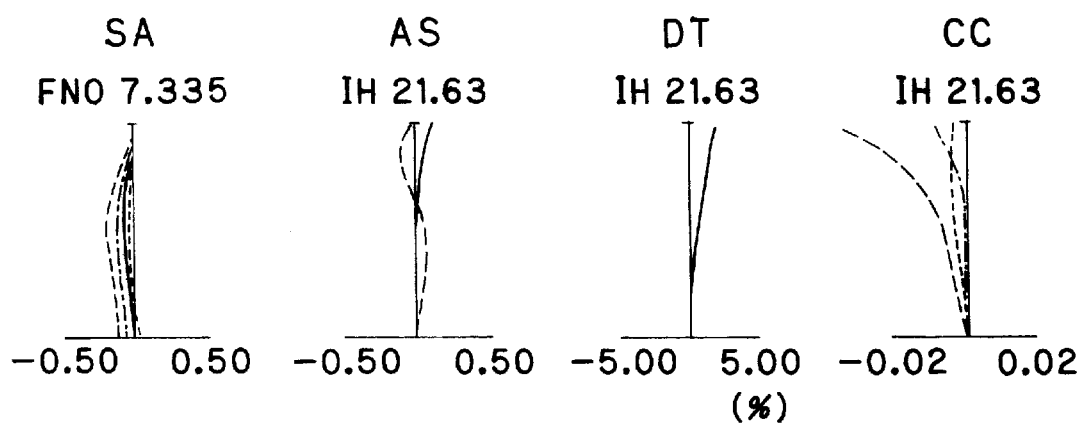
Figure 8:
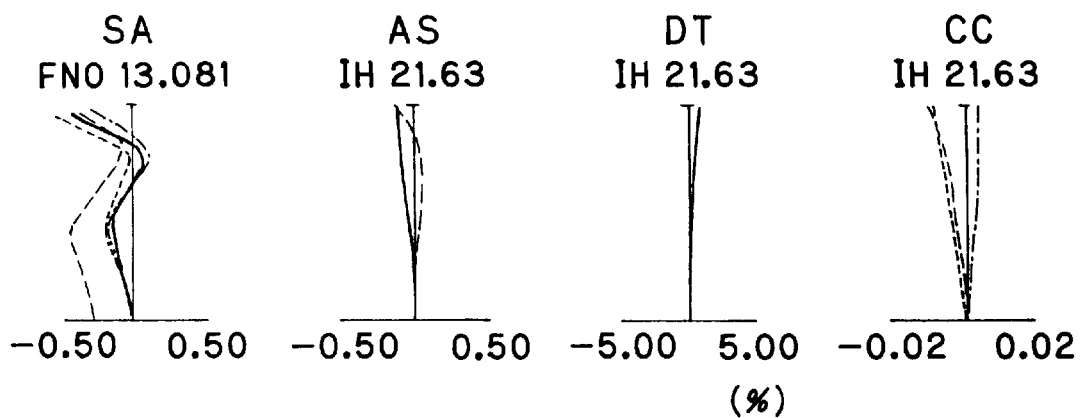

Example 4 is directed to a zoom lens system having a zoom ratio of 3.9 and consisting of three lens groups or nine lenses in all, as shown in FIGS. 7(a), 7(b) and 7(c) that are sectional lens arrangement views of the zoom lens system at its wide-angel end (a), intermediate setting (b) and telephoto end (c). FIGS. 8(a), 8(b) and 8(c) are aberration diagrams for the zoom lens system at its wide-angel end (a), intermediate setting (b) and telephoto end (c).

In this example, the first lens group consists of, in order from its object side, a double-convex lens having a strong convex surface on its object side and a double-concave lens which form together an air-spaced doublet with a slight space located therebetween. The second lens group consists of, in order from its object side, a negative meniscus lens concave on its object side, an aperture stop, a double-convex lens and a positive cemented doublet consisting of a negative meniscus lens convex on its object side and a double-convex lens. The third lens group consists of, in order from its object side, a negative lens having a strong concave surface on its object side and an opposite, substantially plane surface and a double-convex lens having a strong convex surface on its image side, which form together an air-spaced doublet with a slight space located therebetween, and a negative meniscus lens having a strong concave surface on its object side.

The zoom lens system of this example has a higher zoom ratio and a longer focal length at the telephoto end, as compared with Example 1. However, this zoom lens system has a small telephoto ratio of 0.637 at the telephoto end. Thus, the telephoto ratio is much smaller than that of a conventional lens system as in Example 1, so that sufficient size reductions are achievable.

According to this example, the telephoto ratio can thus be kept small while the zoom ratio is magnified. This is because the second lens group further contains one double-convex lens unlike the second lens group in Example 1. This double-convex lens is located just in the rear (or on the image side) of the aperture stop, and one aspherical surface is used for its object-side surface, so that spherical aberration is prevented from becoming worse at the telephoto end and, hence, the zoom ratio can be magnified while the aberration is prevented from becoming worse.

An anomalous dispersion glass having a low refractive index and low dispersion is used for the double-convex lens in the first lens group to reduce the amount of longitudinal chromatic aberration produced, and a high-index special flint glass (having a relatively high refractive index and a low Abbes number) is used for the positive meniscus lens in the third lens group to achieve performance improvements by making use of anomalous dispersion.

Regarding the use of aspherical surfaces, this example is the same as Example 1 in terms of the first lens group. This is also true of the second lens group with the exception of the additional double-convex lens. In the third lens group, one aspherical surface is used for the object-side surface of the negative meniscus lens on its image side in Example 1 whereas one aspherical surface is used for the image-side surface of the double-convex lens in this example. It is noted that longitudinal spherical aberration and longitudinal chromatic aberration of magnification are better corrected in this example than in Example 1.

EXAMPLE 5

Figure 9:
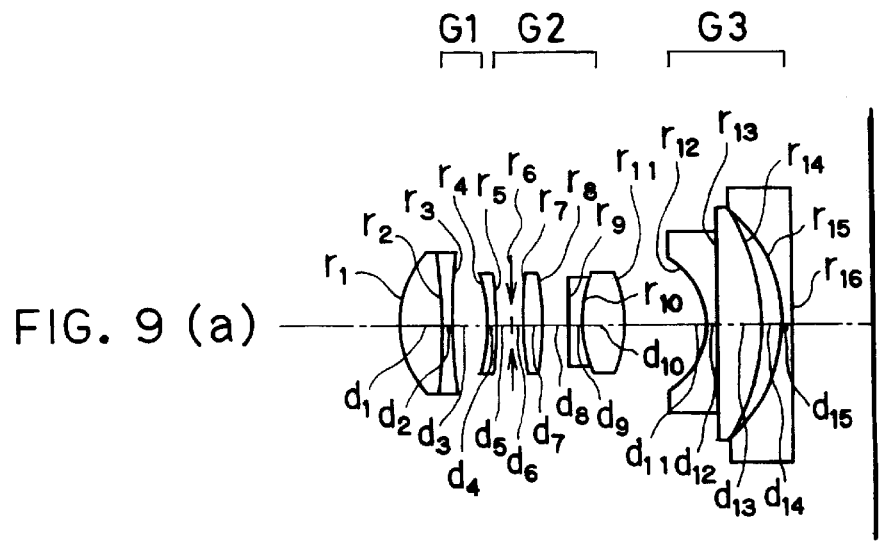
FIGS. 9(a), 9(b) and 9(c) are sectional views of the lens arrangement according to Example 5 of the zoom lens system of the invention.
Figure 9:
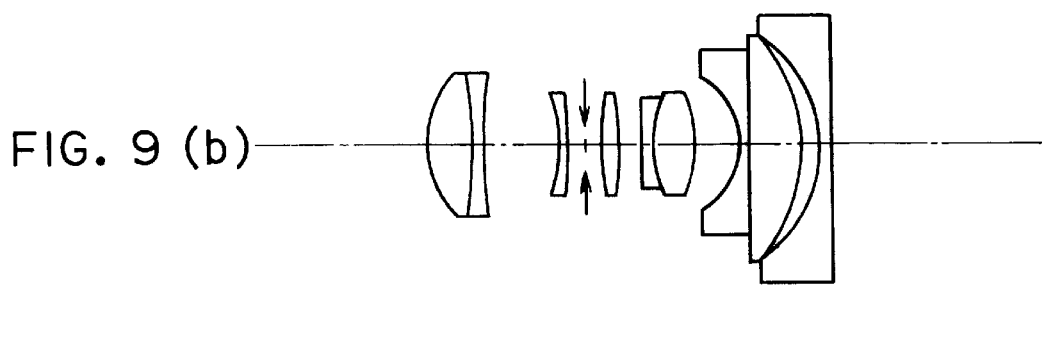
Figure 9:
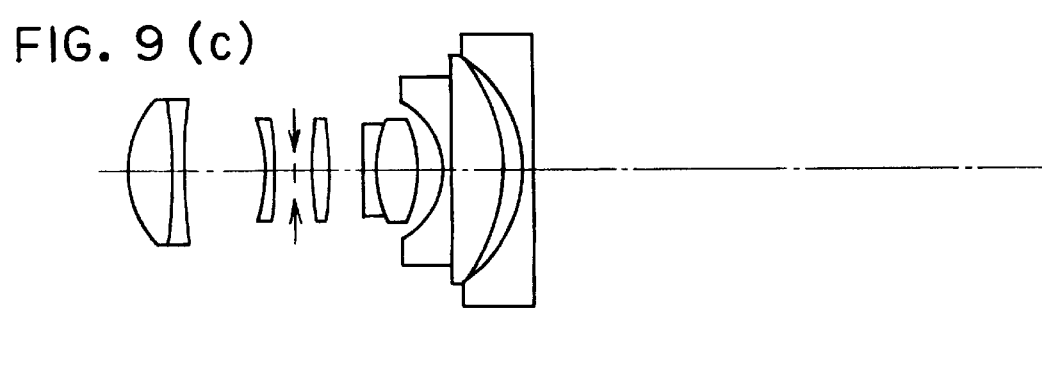
Figure 10:
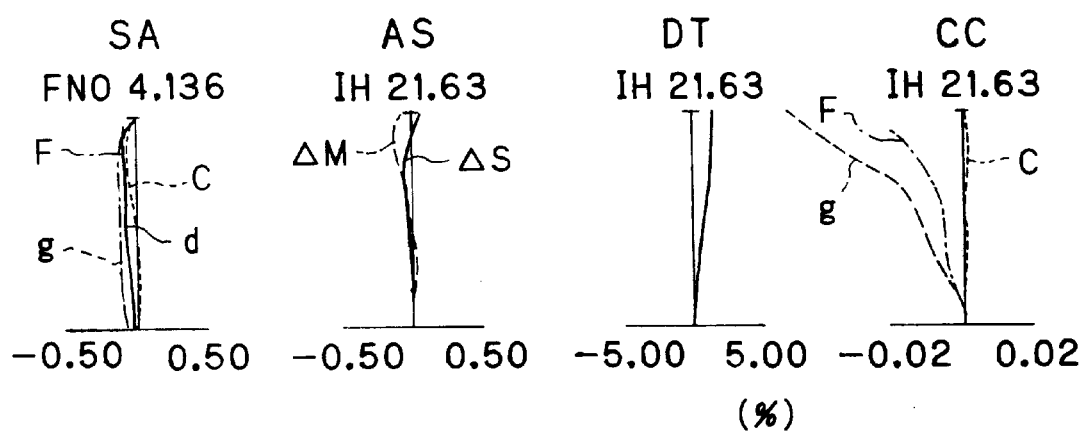
FIGS. 10(a), 10(b) and 10(c) are aberration diagrams for Example 5 of the invention.
Figure 10:
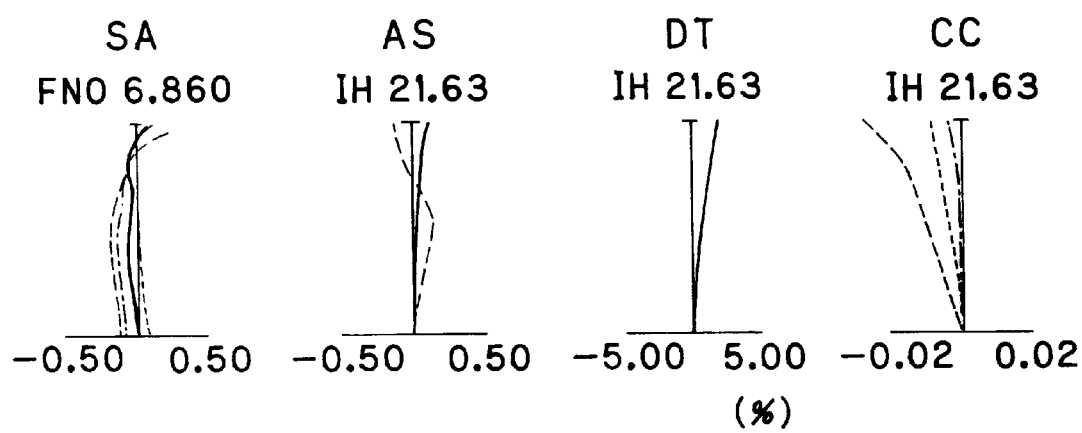
Figure 10:
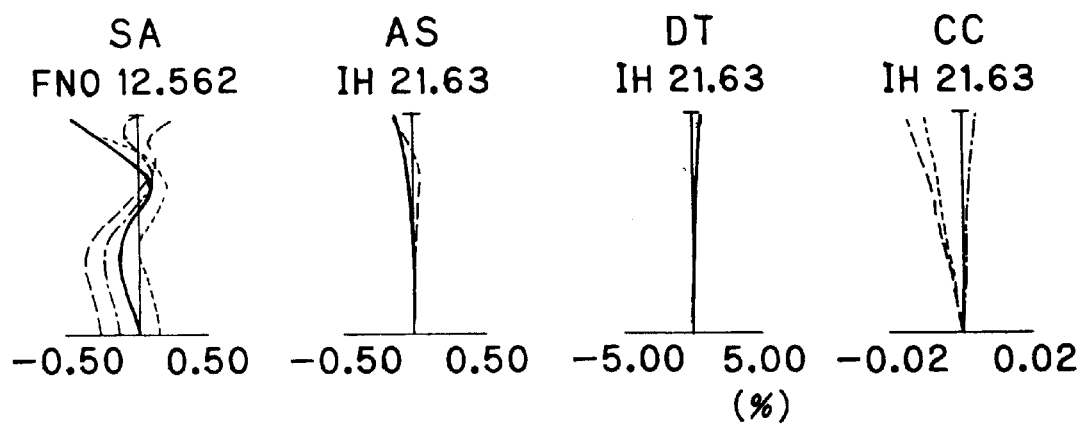

Example 5 is directed to a zoom lens system having a zoom ratio of 3.9 and consisting of three lens groups or nine lenses in all, as shown in FIGS. 9(a), 9(b) and 9(c) that are sectional lens arrangement views of the zoom lens system at its wide-angel end (a), intermediate setting (b) and telephoto end (c). FIGS. 10(a), 10(b) and 10(c) are aberration diagrams for the zoom lens system at its wide-angle end (a), intermediate setting (b) and telephoto end (c).

In this example, the first lens in the first lens group is made of a crown fluoride glass (having a low refractive index and an large Abbes number). This example is also different from Example 4; the doublet in each of the first and third lens groups in Example 4 is an air-spaced doublet with a slight space located between two lenses whereas that in this example is a cemented doublet, and a doublet in the third lens group consists of a negative meniscus lens and a positive meniscus lens. An explanation of other lens arrangements and where to use aspherical surfaces is omitted because of being the same as in Example 4.

The zoom lens system of this example has an F-number somewhat smaller than that of Example 4, and has a telephoto ratio of 0.641 at the telephoto end. The telephoto ratio is much smaller than that of a conventional lens system as in Example 1, so that satisfactory size reductions are achievable.

Since the doublet in each of the first and third lens groups is a cemented doublet, well-balanced image-formation capabilities are obtained. For instance, chromatic aberration of magnification is improved at the wide-angle end. A common crown fluoride lens (having a low refractive index and a large Abbe's number) is used for the first lens in the first lens group.

EXAMPLE 6

Figure 11:
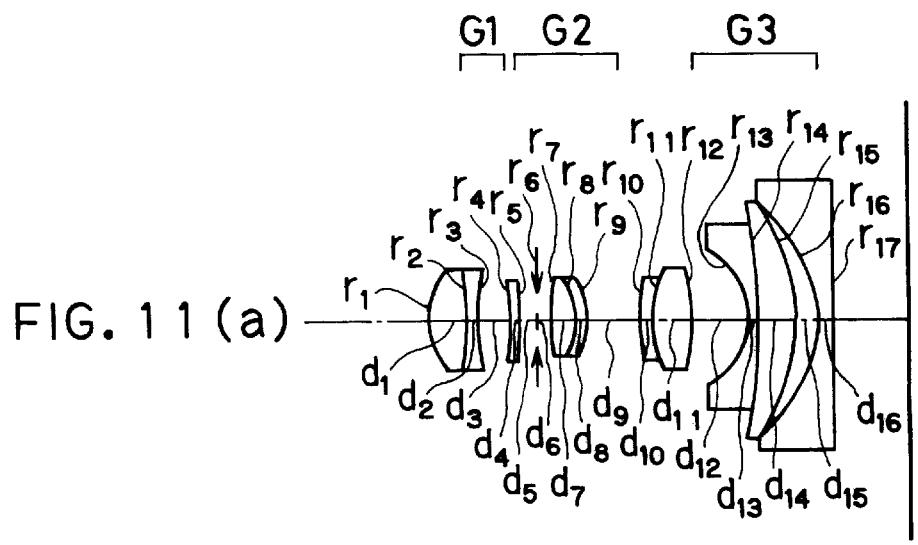
FIGS. 11(a), 11(b) and 11(c) are sectional views of the lens arrangement according to Example 6 of the zoom lens system of the invention.
Figure 11:
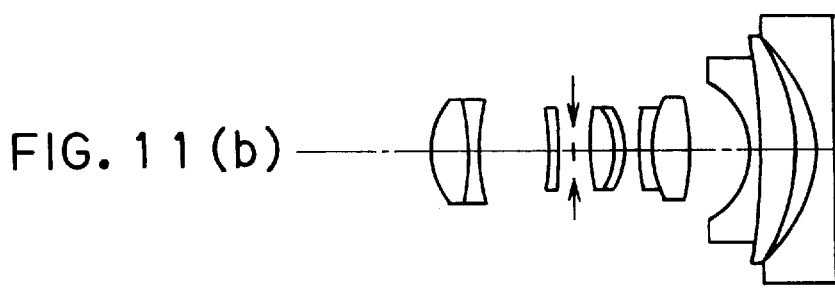
Figure 11:
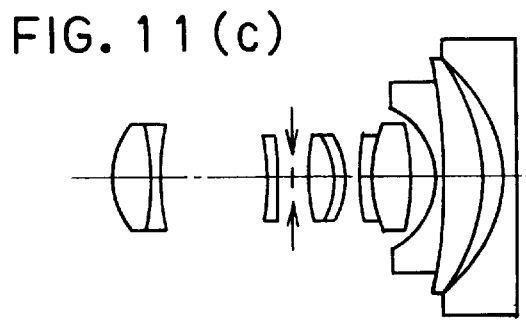
Figure 12:
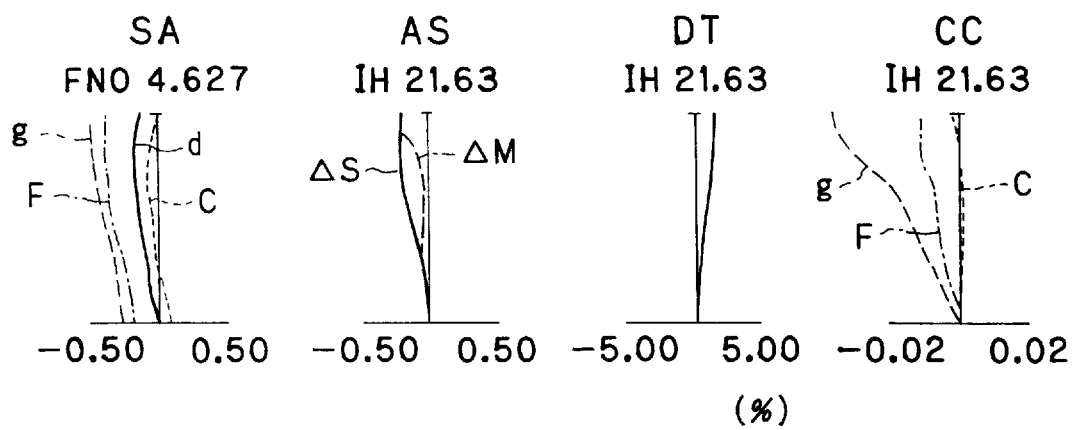
FIGS. 12(a), 12(b) and 12(c) are aberration diagrams for Example 6 of the invention.
Figure 12:
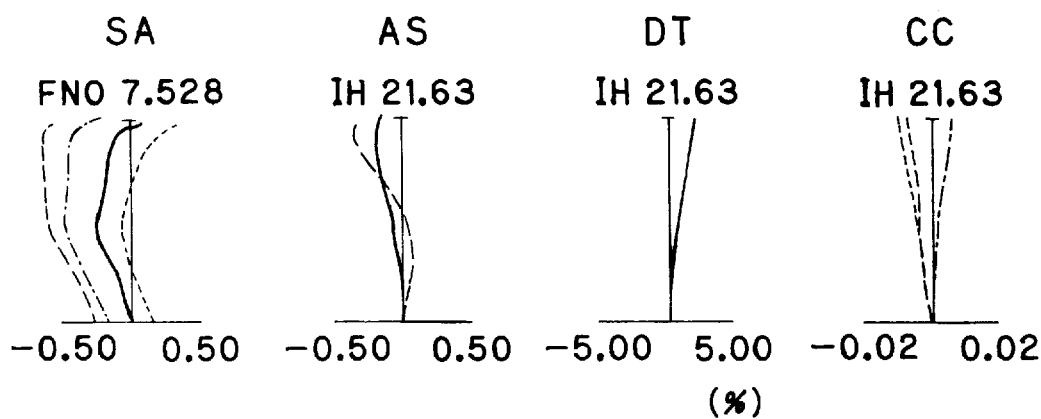
Figure 12:
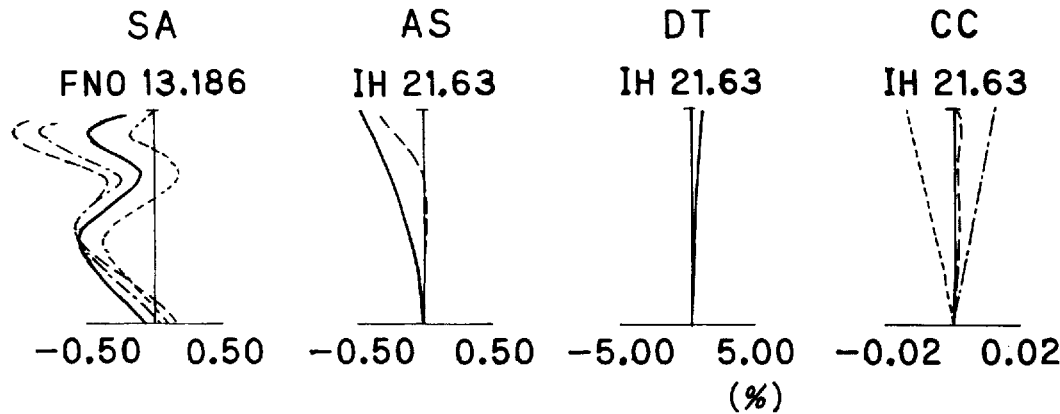

Example 6 is directed to a zoom lens system having a zoom ratio of 3.9 and consisting of three lens groups or ten lenses in all, as shown in FIGS. 11(a), 11(b) and 11(c) that are sectional lens arrangement views of the zoom lens system at its wide-angel end (a), intermediate setting (b) and telephoto end (c). FIGS. 12(a), 12(b) and 12(c) are aberration diagrams for the zoom lens system at its wide-angle end (a), intermediate setting (b) and telephoto end (c).

In this example, the first lens group consists of, in order from its object side, a cemented doublet made up of a double-convex lens having a strong convex surface on its object side and a double-concave lens. The second lens group consists of, in order from its object side, a negative meniscus lens concave on its object side, an aperture stop, a positive cemented doublet made up of a double-convex lens and a negative meniscus lens, and a positive cemented doublet made up of a negative meniscus lens convex on its object side and a double-convex lens. The third lens group consists of, in order from its object side, a cemented doublet made up of a negative meniscus lens having a strong concave surface on its object side and a positive meniscus lens having a strong convex surface on its image side, and a negative meniscus lens having a strong concave surface on its object side.

The zoom lens system of this example has much the same specification as in Example 4, and has a small telephoto ratio of 0.643 at the telephoto end. The telephoto ratio is much smaller than that of a conventional lens system as in Example 1, so that satisfactory size reductions are achievable.

In the zoom lens system of this example, the positive lens in the second lens group which is located just in the rear of the aperture stop is characterized by being made up of a cemented doublet consisting of a positive lens and a negative lens, with a reduced difference in dispersion therebetween. This characteristic feature makes a great contribution to image plane correction. For instance, field curvature at the wide-angle end is well corrected so that the sagittal plane can be in substantial coincidence with the meridional plane.

Regarding the use of aspherical surfaces, this example is the same as in Example 4 in terms of the first and third lens groups. This is also true of the second lens group with the exception that one aspherical surface is used for the object-side surface of the cemented doublet located just in the rear of the stop.

EXAMPLE 7

Figure 13:
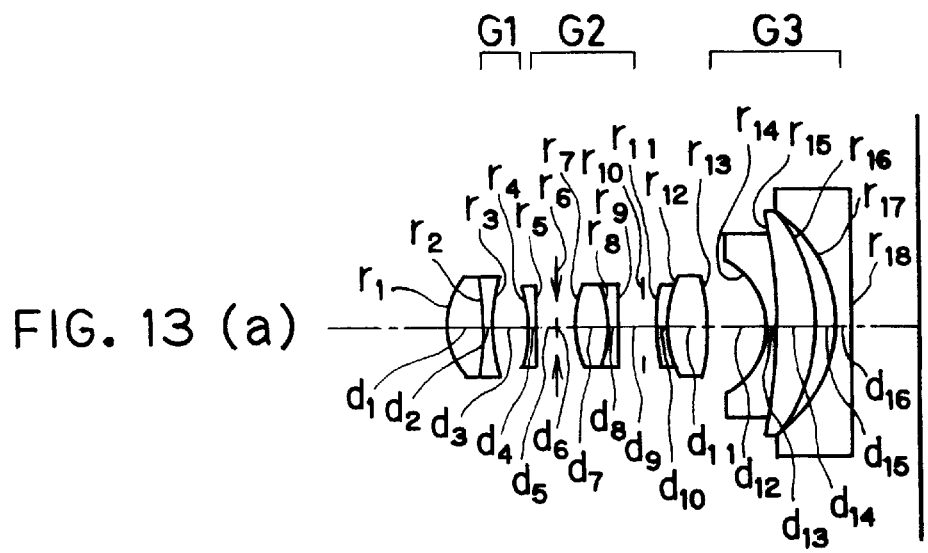
FIGS. 13(a), 13(b) and 13(c) are sectional views of the lens arrangement according to Example 7 of the zoom lens system of the invention.
Figure 13:
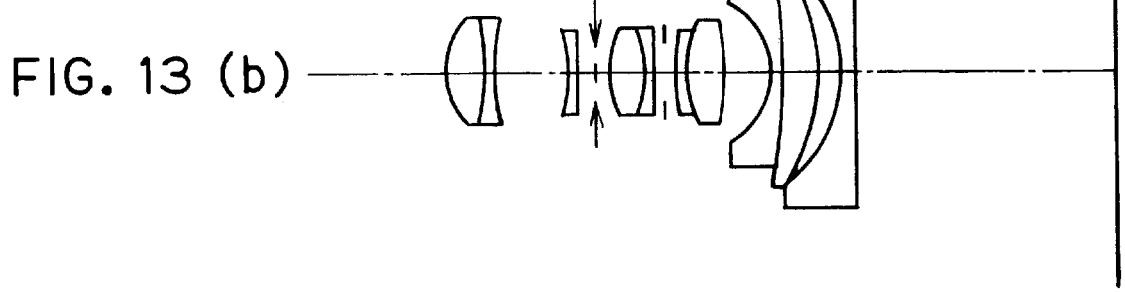
Figure 13:
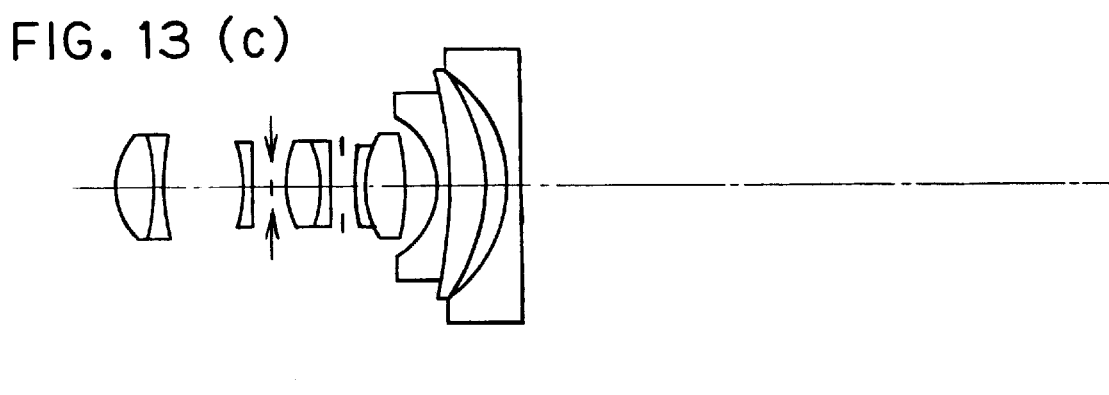
Figure 14:
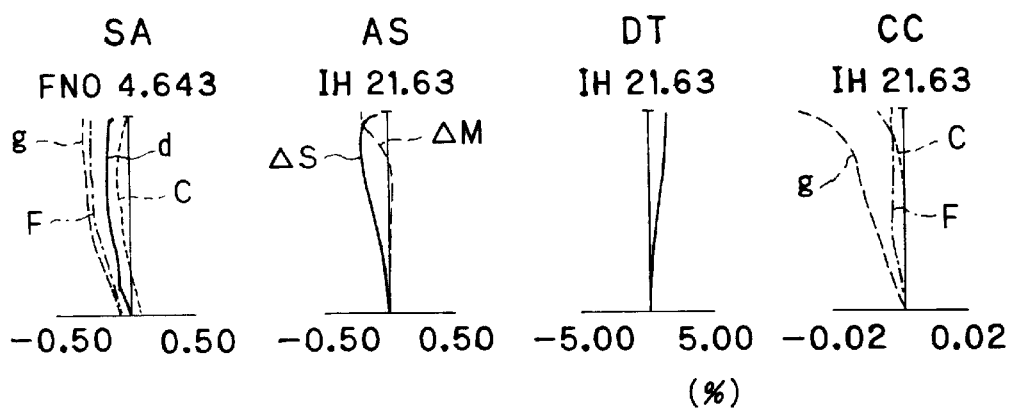
FIGS. 14(a), 14(b) and 14(c) are aberration diagrams for Example 7 of the invention.
Figure 14:
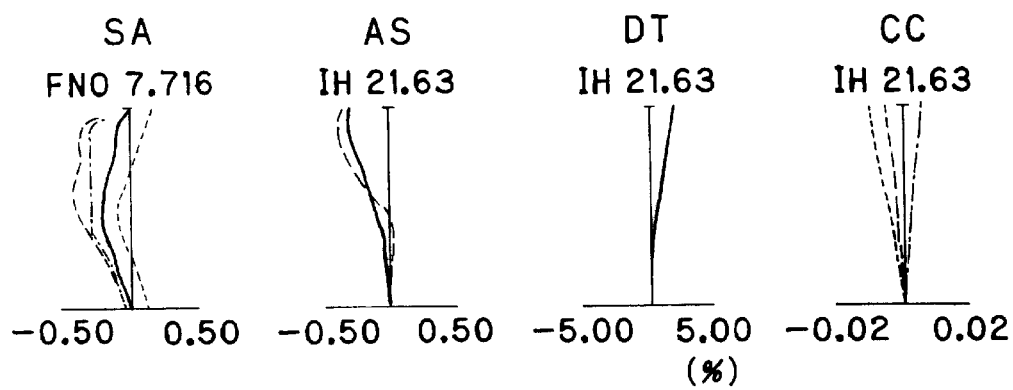
Figure 14:
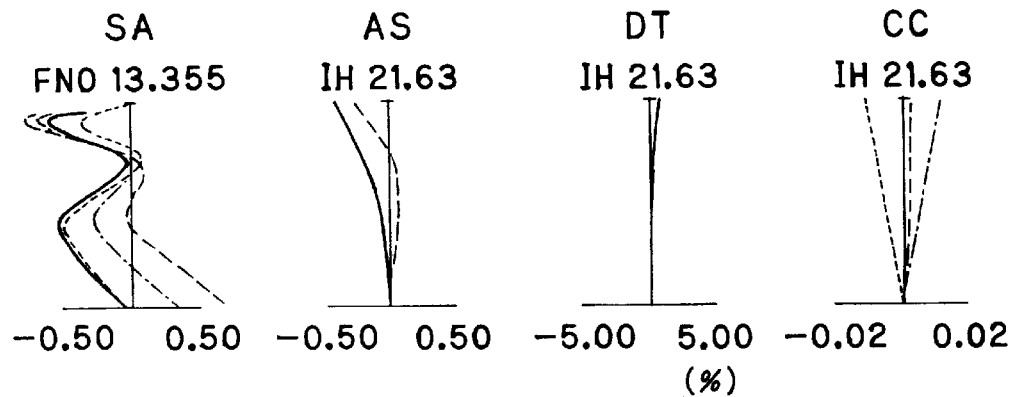

Example 7 is directed to a zoom lens system having a zoom ratio of 3.9 and consisting of three lens groups or ten lenses in all, as shown in FIGS. 13(a), 13(b) and 13(c) that are sectional lens arrangement views of the zoom lens system at its wide-angel end (a), intermediate setting (b) and telephoto end (c). FIGS. 14(a), 14(b) and 14(c) are aberration diagrams for the zoom lens system at its wide-angle end (a), intermediate setting (b) and telephoto end (c).

A difference between this example and Example 6 is that one aspherical surface is used for the image-side surface of the positive meniscus lens in the third lens group in Example 6 whereas one aspherical surface is used for the object-side surface of a negative meniscus lens on the image side in this example. An explanation of other lens arrangements and where to use aspherical surfaces is omitted because of being the same as in Example 6.

The zoom lens system of this example is substantially similar to Example 6 in terms of zoom ratio and F-number, and has a telephoto ratio of 0.651 at the telephoto end. The telephoto ratio is much smaller than that of a conventional lens system as Example 1, so that satisfactory size reductions are achievable.

Apart from the aperture stop (r6), a flare stop r10 for cutting off flare light produced by aberrations is located in the second lens group.

EXAMPLE 8

Figure 15:
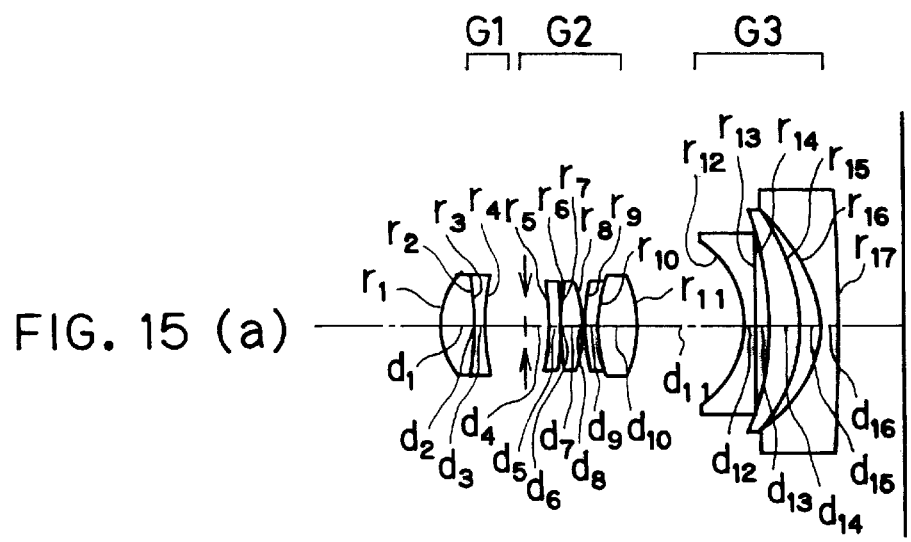
FIGS. 15(a), 15(b) and 15(c) are sectional views of the lens arrangement according to Example 8 of the zoom lens system of the invention.
Figure 15:
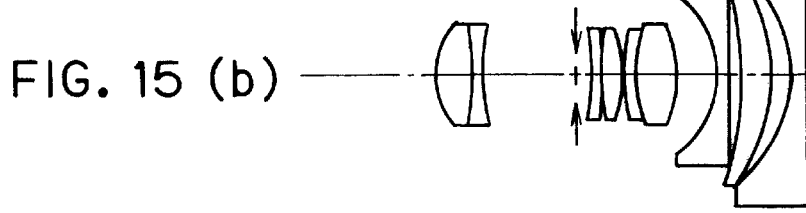
Figure 15:
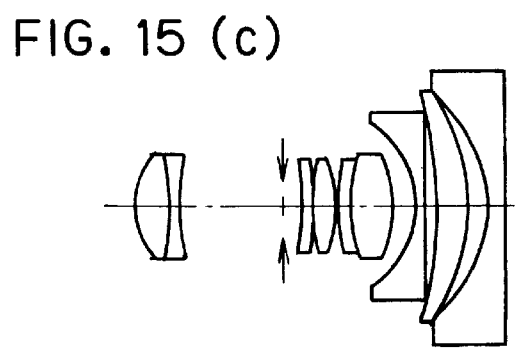
Figure 16:
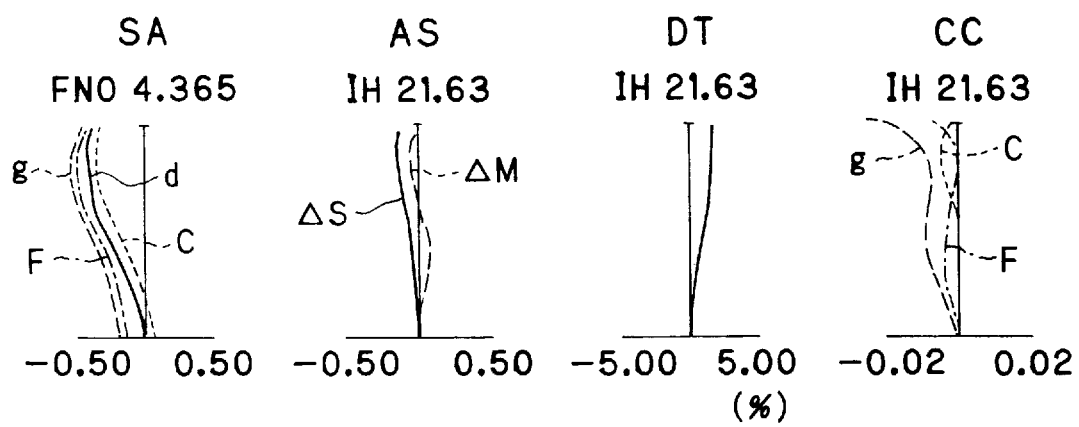
FIGS. 16(a), 16(b) and 16(c) are aberration diagrams for Example 8 of the invention.
Figure 16:
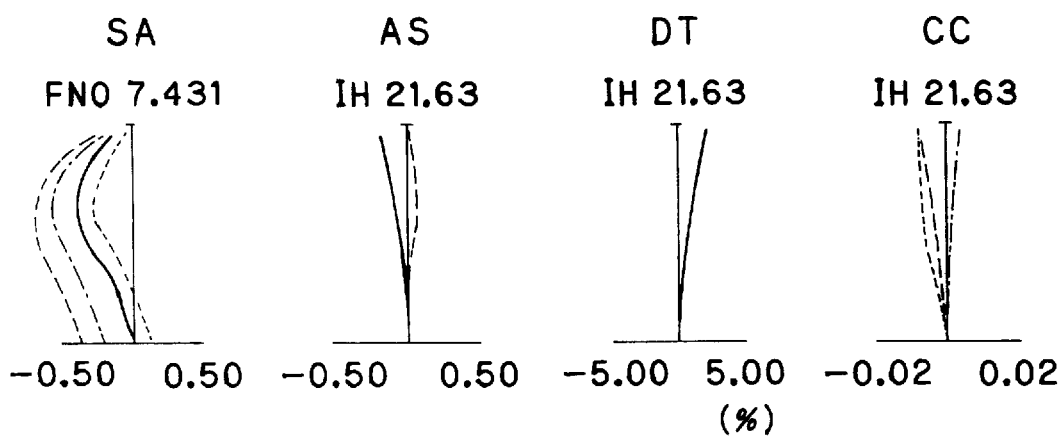
Figure 16:
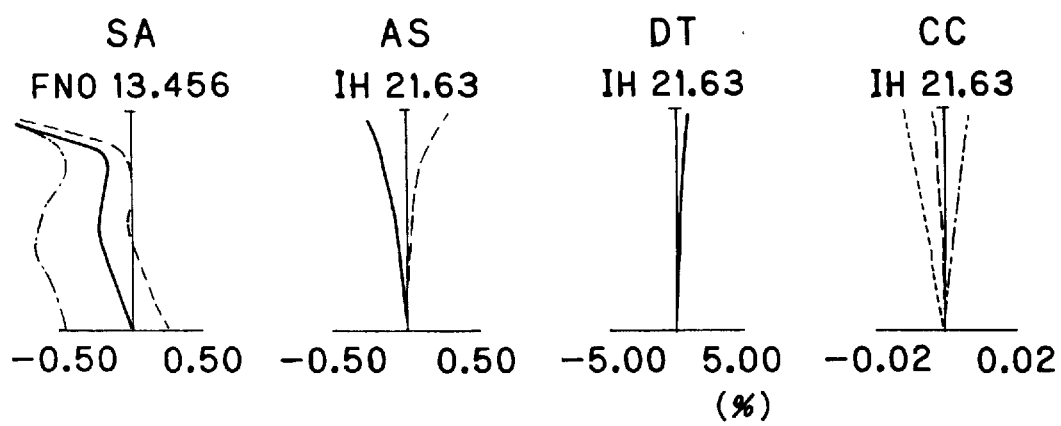

Example 8 is directed to a zoom lens system having a zoom ratio of 3.9 and consisting of three lens groups or nine lenses in all, as shown in FIGS. 15(a), 15(b) and 15(c) that are sectional lens arrangement views of the zoom lens system at its wide-angel end (a), intermediate setting (b) and telephoto end (c). FIGS. 16(a), 16(b) and 16(c) are aberration diagrams for the zoom lens system at its wide-angle end (a), intermediate setting (b) and telephoto end (c).

In this example, the first lens group consists of, in order from its object side, a cemented doublet made up of a double-convex lens having a strong convex surface on its object side and a double-concave lens. The second lens group consists of, in order from its object side, an aperture stop, a double-concave lens, a double-convex lens and a positive cemented doublet made up of a negative meniscus lens convex on its object side and a double-convex lens. The third lens group consists of, in order from its object side, an air-spaced doublet made up of a negative meniscus lens having a strong concave lens on its object side and a positive meniscus lens having a strong convex surface on its image side with a slight space located therebetween, and a negative meniscus lens having a strong concave surface on its object side.

The zoom lens system of this example has much the same specification as in Example 4, and has a small telephoto ratio of 0.694 at the telephoto end. The telephoto ratio is much smaller than that of a conventional lens system as in Example 1, so that satisfactory size reductions are achievable.

The zoom lens system of this example is characterized in that the aperture stop is located nearest to the object side in the second lens group, thereby simplifying the mechanical structure of the second lens group.

In the first lens group, one aspherical surface is used for the object-side surface of the positive lens. In the second lens group, four aspherical surfaces are used, one for the object-side surface of the double-concave lens located just in the rear of the aperture stop, two for both surfaces of the double-convex lens on the image side thereof, and one for the object-side surface of the double-concave lens located just in the rear of the aperture stop. In the third lens groups, aspherical surfaces are used for the object-side surfaces of all lenses.

The zoom lens system of this example is more simplified in terms of lens arrangements as compared with Example 6. Accordingly, some increase in the amount of movement of each lens group during zooming is acceptable, and image-formation capabilities are maintained by use of more aspherical surfaces.

EXAMPLE 9

Figure 17:
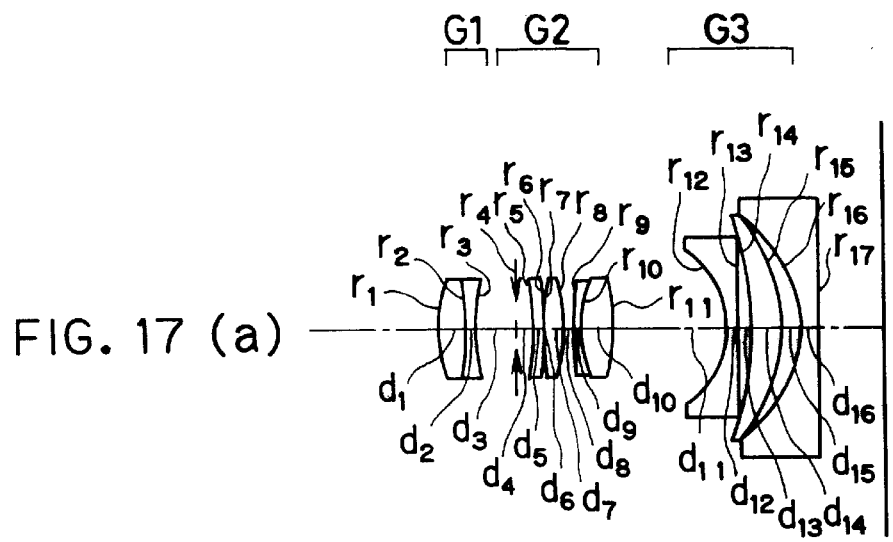
FIGS. 17(a), 17(b) and 17(c) are sectional views of the lens arrangement according to Example 9 of the zoom lens system of the invention.
Figure 17:
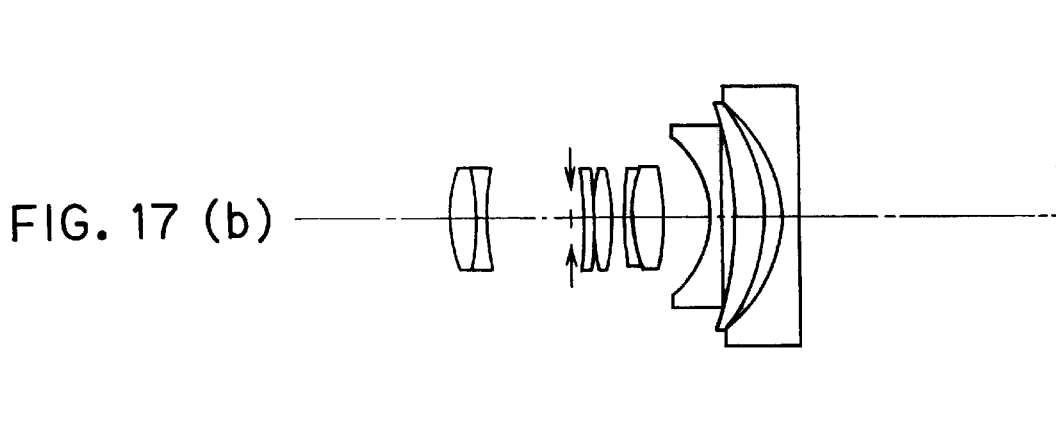
Figure 17:
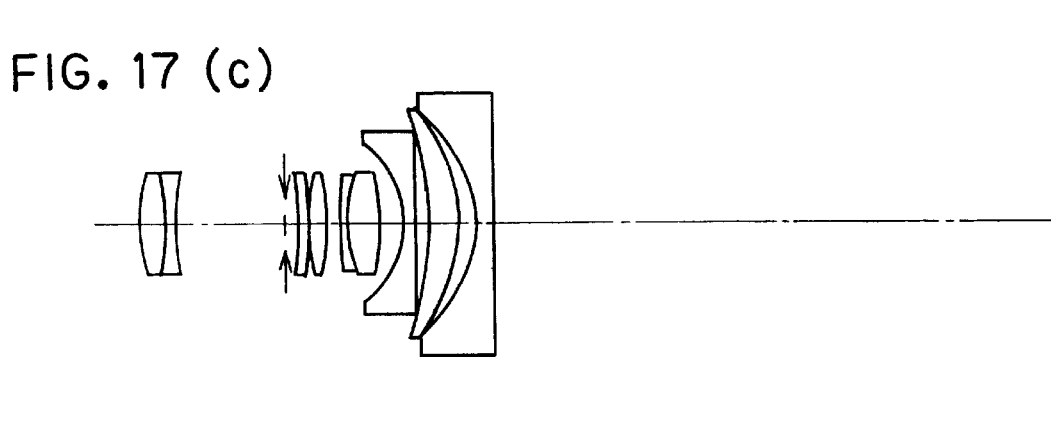
Figure 18:
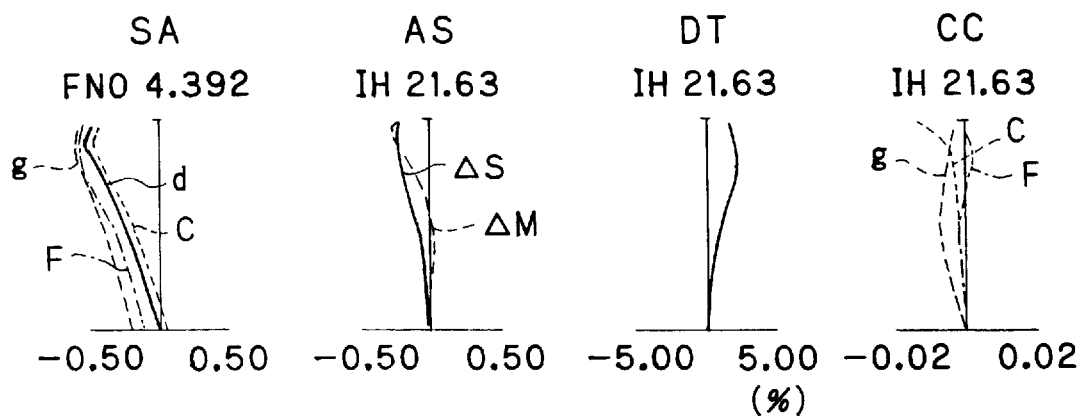
FIGS. 18(a), 18(b) and 18(c) are aberration diagrams for Example 9 of the invention.
Figure 18:
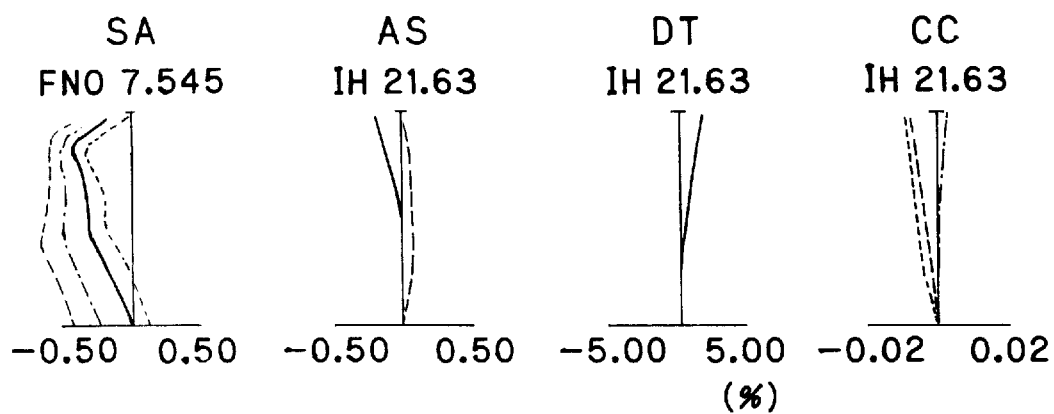
Figure 18:
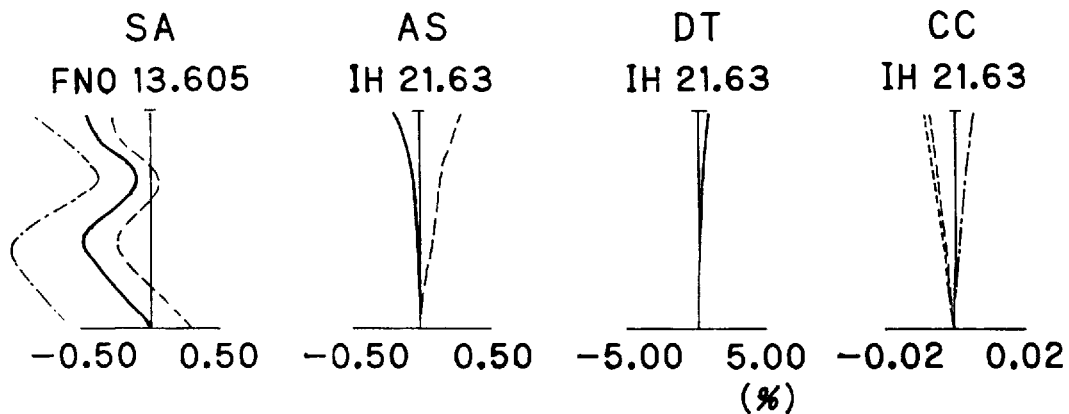

As in the case of Example 8, Example 9 is directed to a zoom lens system having a zoom ratio of 3.9 and consisting of three lens groups or nine lenses in all, as shown in FIGS. 17(a), 17(b) and 17(c) that are sectional lens arrangement views of the zoom lens system at its wide-angel end (a), intermediate setting (b) and telephoto end (c). FIGS. 18(a), 18(b) and 18(c) are aberration diagrams for the zoom lens system at its wide-angel end (a), intermediate setting (b) and telephoto end (c).

An explanation of the arrangements of the first, second and third lens groups and where to use aspherical surfaces is omitted because of being the same as in Example 8.

The zoom lens system of this example is smaller than that of Example 8 in terms of the amount of movement of each lens group during zooming. This is because the aspherical surfaces are more effectively used.

The zoom lens system of this example has a small telephoto ratio of 0.718 at the telephoto end. As is the case with Example 1, the telephoto ratio is much smaller than that of a conventional lens system, so that satisfactory size reductions are achievable.

EXAMPLE 10

Figure 19:
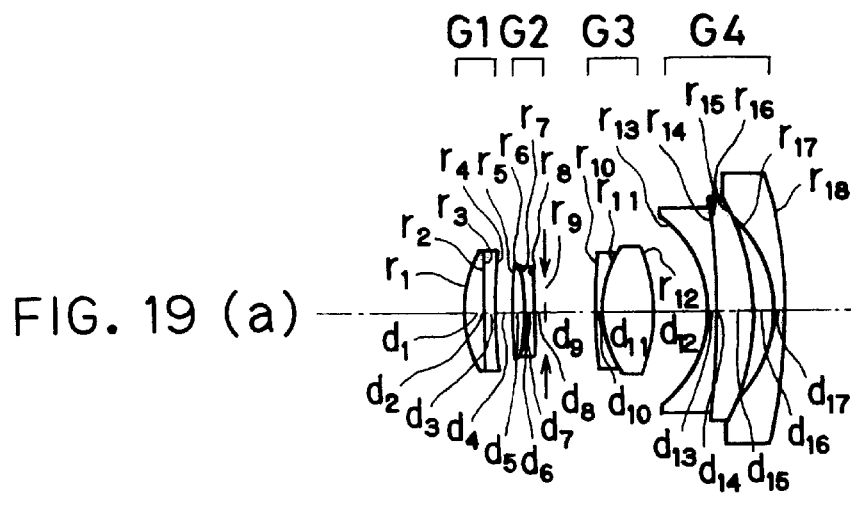
FIGS. 19(a), 19(b) and 19(c) are sectional views of the lens arrangement according to Example 10 of the zoom lens system of the invention.
Figure 19:
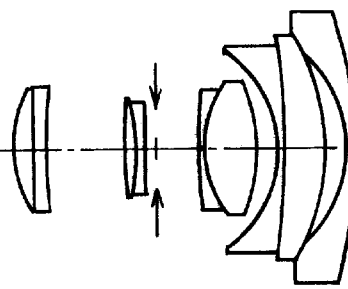
Figure 19:
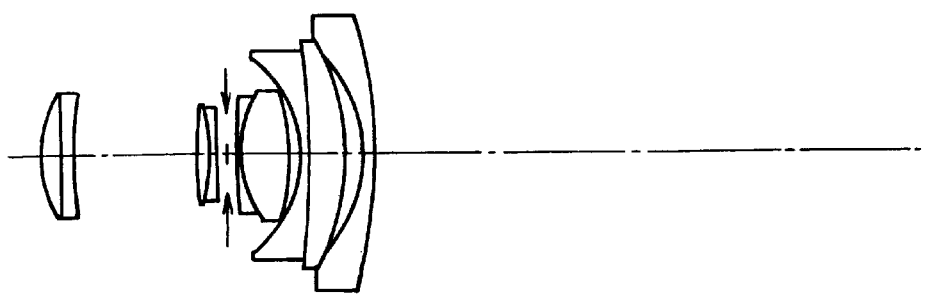

Example 10 is directed to a zoom lens system having a focal length of 39.0 to 131 mm and an aperture ratio of 1:4.54 to 11.74, and consisting of four lens groups or nine lenses in all, as shown in FIGS. 19(a), 19(b) and 19(c).

The first lens group G1 consists of a doublet (not cemented) made up of a positive meniscus lens having a strong concave surface on its object side and a negative meniscus lens convex on its object side. The second lens group G2 consists of a doublet (not cemented) made up of a double-convex positive lens and a negative meniscus lens convex on its image side, with an aperture stop located in the rear of the doublet. The third lens group G3 consists of a cemented doublet made up of a negative meniscus lens convex on its object side and a double-convex positive lens. The fourth lens group G4 consists of a non-cemented doublet made up of a negative meniscus lens having a strong concave surface on its object side and a positive meniscus lens having a strong convex surface on its image side, and a negative meniscus lens having a strong concave surface on its object side. In the first lens group G1, one aspherical surface is used for the object-side surface of the positive meniscus lens. In the second lens group G2 one aspherical surface is used for the object-side surface of the double-convex positive lens, and in the third lens group G3 one aspherical surface is used for the surface located nearest to the image side. In the fourth lens group G4 having large power, two aspherical surfaces are used, one for the strong concave surface of the first negative meniscus lens and another for the strong concave surface of the final negative meniscus lens. The aspherical surfaces in the fourth lens group G4 are very important to make correction for field curvature at the wide-angle zone. The zoom lens system has a telephoto ratio of 0.68 at the telephoto end.

Figure 20:
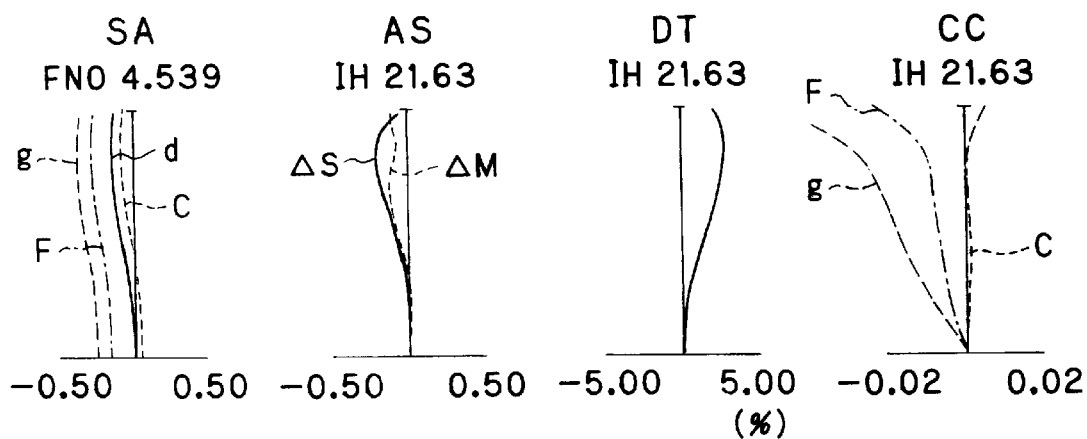
FIGS. 20(a), 20(b) and 20(c) are aberration diagrams for Example 10 of the invention.
Figure 20:
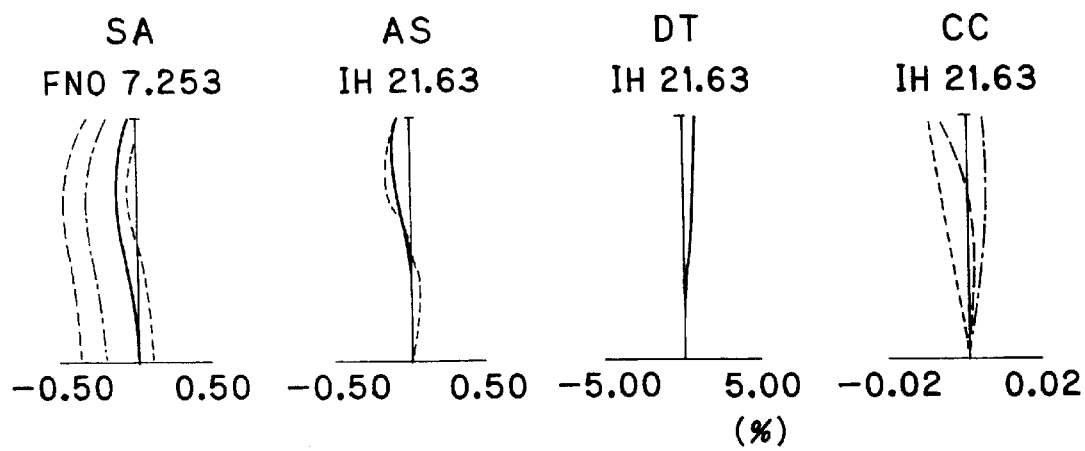
Figure 20:
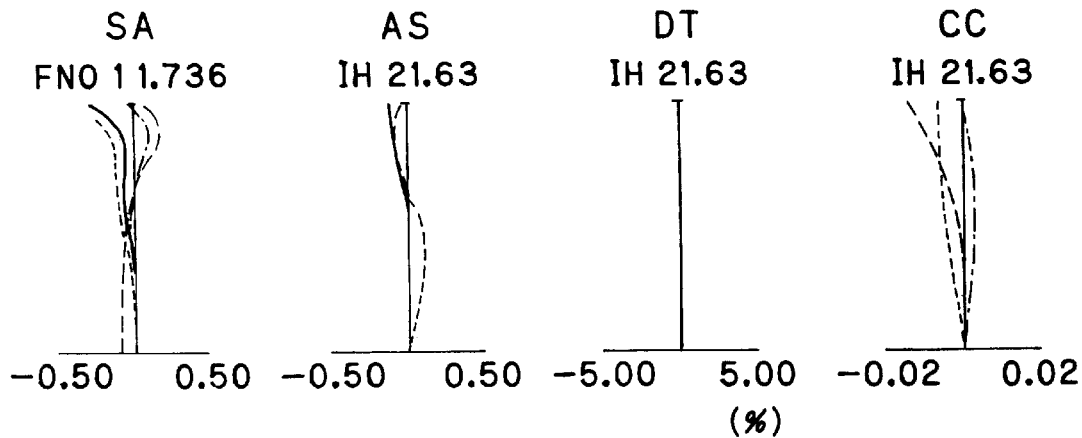

The aberration diagrams for this example are shown in FIGS. 20(a), 20(b) and 20(c), from which it is found that while the magnitude of chromatic aberration of magnification at the wide-angle end is somewhat unsatisfactory, other aberrations are corrected in a very well-balanced state. In particular, astigmatism is corrected to some considerable levels.

EXAMPLE 11

Figure 21:
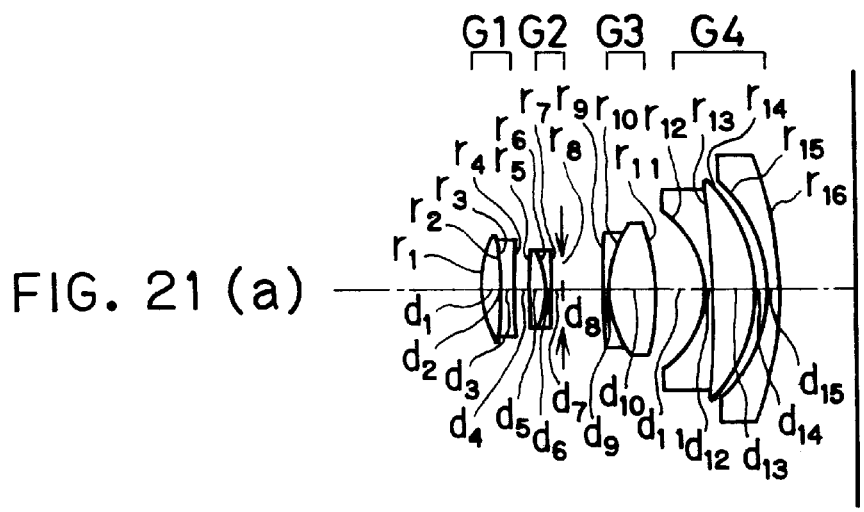
FIGS. 21(a), 21(b) and 21(c) are sectional views of the lens arrangement according to Example 11 of the zoom lens system of the invention.
Figure 21:
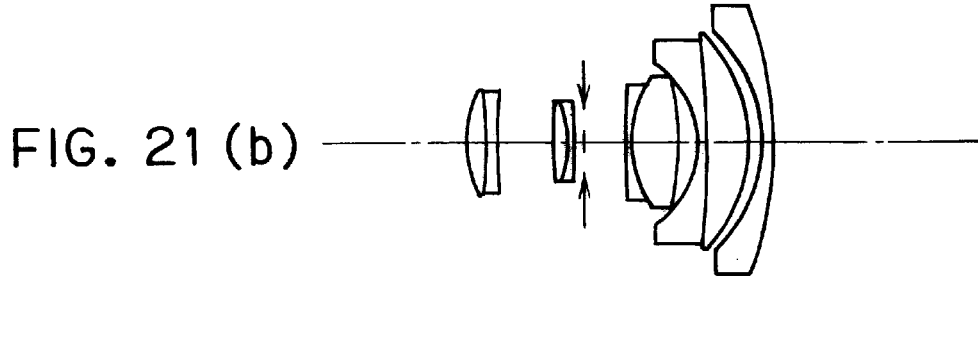
Figure 21:
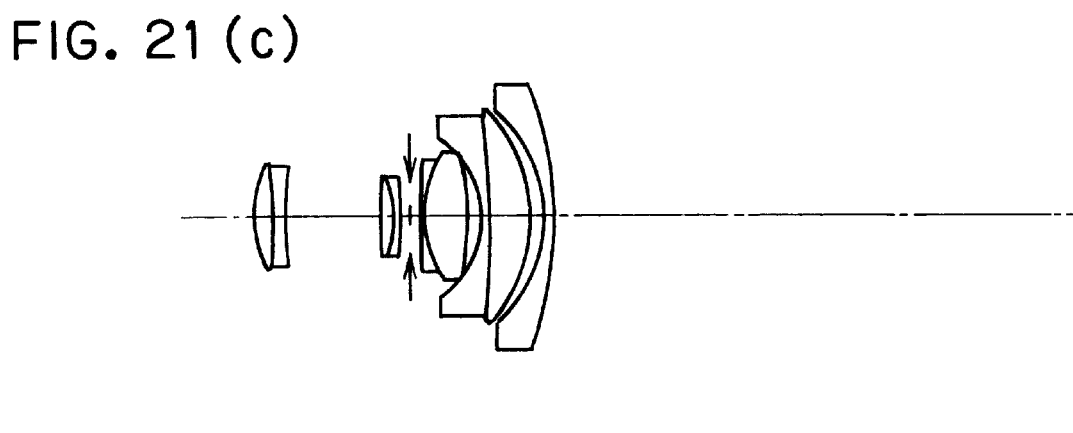

Example 11 is directed to a zoom lens system having a focal length of 39.0 to 131 mm and an aperture ratio of 1:5 to 13.94, and consisting of four lens groups or nine lenses in all, as shown in FIGS. 21(a), 21(b) and 21(c).

The first lens group G1 consists of a non-cemented doublet made up of a double-convex positive lens and a double-concave negative lens. The second lens group G2 consists of a cemented doublet made up of a double-convex positive lens and a negative meniscus lens convex on its image side, with an aperture stop located in the rear of the cemented doublet. The third lens group G3 consists of a cemented doublet made up of a negative meniscus lens convex on its object side and a double-convex positive lens. The fourth lens group G4 consists of a cemented doublet made up of a negative meniscus lens having a strong concave surface on its object side and a positive meniscus lens having a strong convex surface on its image side and a negative meniscus lens having a strong concave surface on its object side. In the first lens group GI, one aspherical surface is used for the object-side surface of the double-convex positive lens. In the second lens group G2 one aspherical surface is used for the object-side surface of the double-convex lens, and in the third lens group G3 one aspherical surface is used for the surface located nearest to the image side. In the fourth lens group G4, two aspherical surfaces are used, one for the strong concave surface of the first negative meniscus lens and another for the strong concave surface of the final negative meniscus lens. The object of this example is to make the length of the zoom lens system short at the expense of aperture ratios. This example is much larger than Example 10 in terms of the power of the fourth lens group G4, and has a telephoto ratio of 0.624 at the telephoto end.

Figure 22:
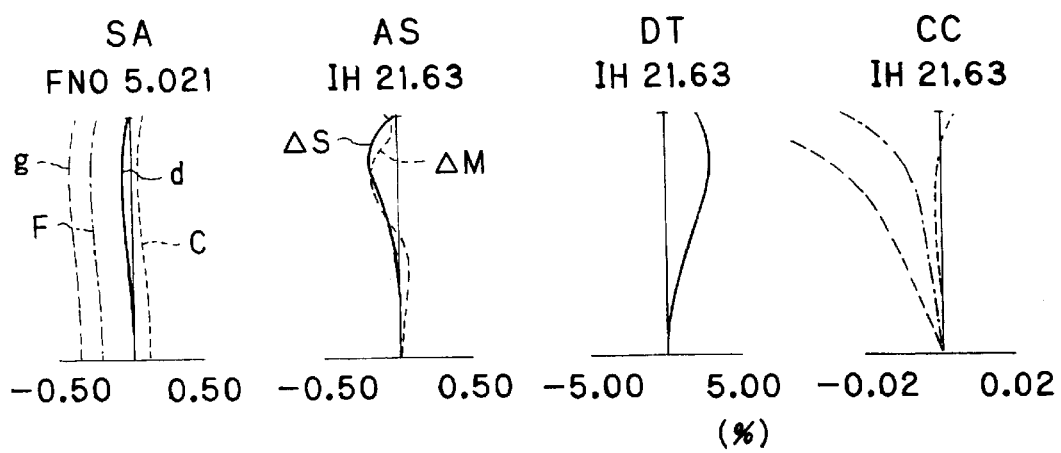
FIGS. 22(a), 22(b) and 22(c) are aberration diagrams for Example 11 of the invention.
Figure 22:
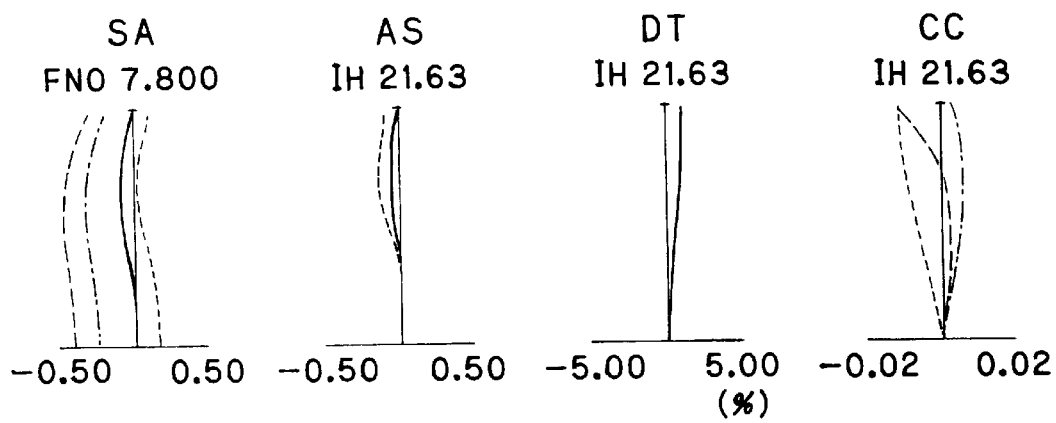
Figure 22:
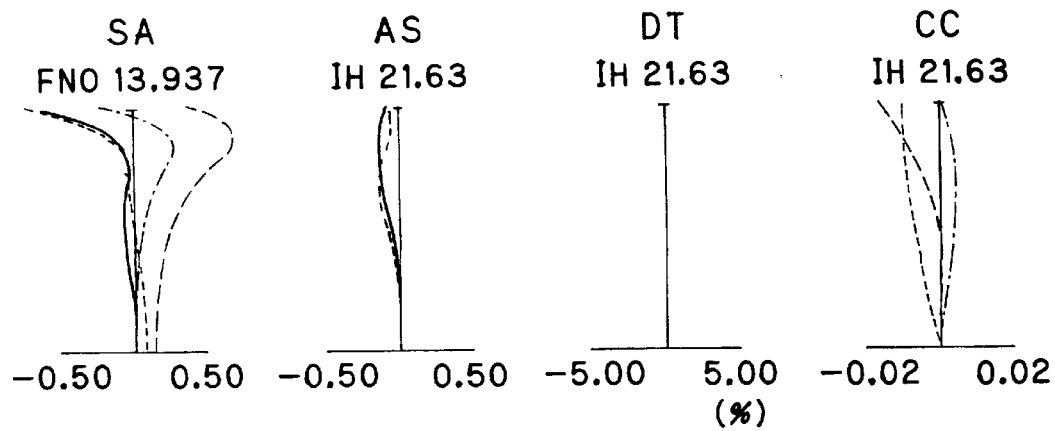

The aberration diagrams for this example are shown in FIGS. 22(a), 22(b) and 22(c). In terms of chromatic aberration of magnification, this example has the same tendency as in Example 10. However, the absolute amount of longitudinal chromatic aberration is large.

EXAMPLE 12

Figure 23:
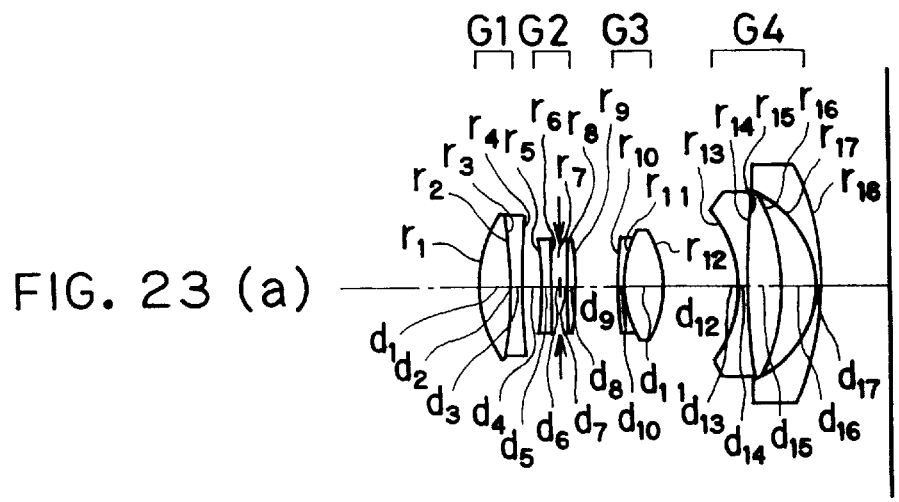
FIGS. 23(a), 23(b) and 23(c) are sectional views of the lens arrangement according to Example 12 of the zoom lens system of the invention.
Figure 23:
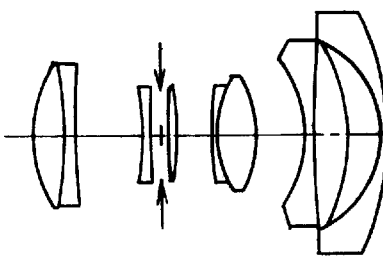
Figure 23:
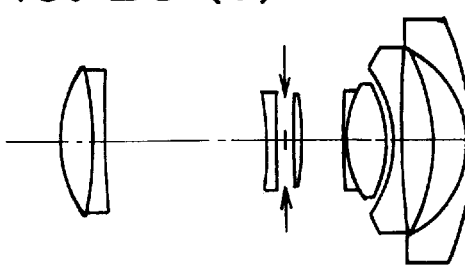

Example 12 is directed to a zoom lens system having a focal length of 38.9 to 170.5 mm and an aperture ratio of 1:4.23 to 12.36, and consisting of four lens groups or nine lenses in all, as shown in FIGS. 23(a), 23(b) and 23(c).

The first lens group G1 consists of a non-cemented doublet made up of a double-convex positive lens and a double-concave negative lens, and the second lens group G2 consists of a double-concave negative lens, a stop located in the rear thereof and a double-convex positive lens. The third lens group G3 consists of a cemented doublet made up of a negative meniscus lens convex on its object side and a double-convex positive lens. The fourth lens group G4 consists of a non-cemented doublet made up of a double-concave lens having a strong concave surface on its object side and a double-convex positive lens and a negative meniscus lens having a strong concave surface on its object side. In the first lens group G1, one aspherical surface is used for the object-side surface of the double-convex positive lens. In the second lens group G2, two aspherical surfaces are used, one for the object-side surface of the double-concave negative lens and another for the object-side surface of the double-convex positive lens. In the third lens group G3, one aspherical surface is used for the surface located nearest to the image side. In the fourth lens group G4, two aspherical surfaces are used, one for the strong concave surface of the double-concave negative lens and another for the image-side surface of the double-convex positive lens. This example has a telephoto ratio of 0.582. The length of the zoom lens system is much more reduced as compared with that of a conventional lens system.

Figure 24:
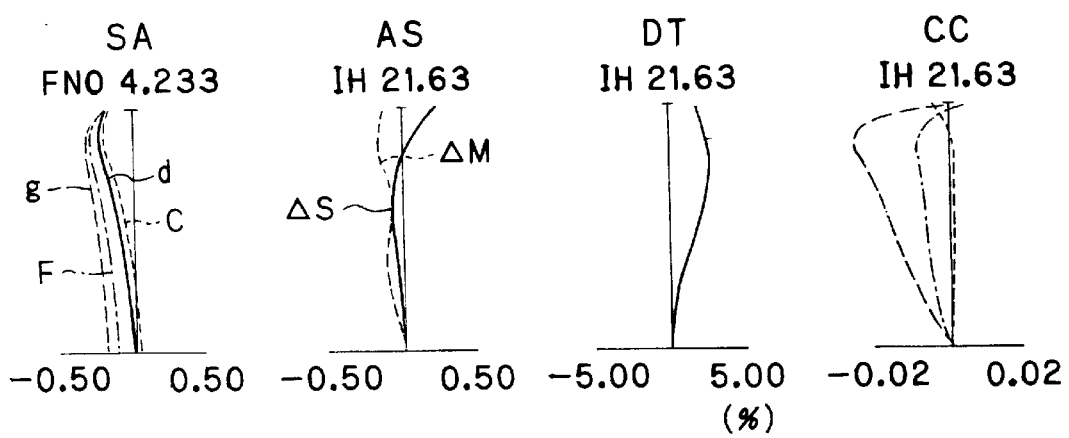
FIGS. 24(a), 24(b) and 24(c) are aberration diagrams for Example 12 of the invention.
Figure 24:
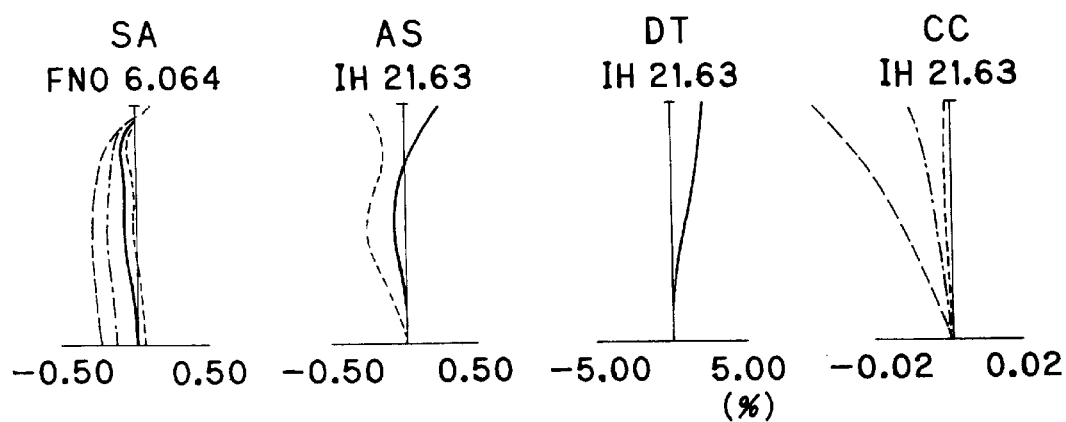
Figure 24:
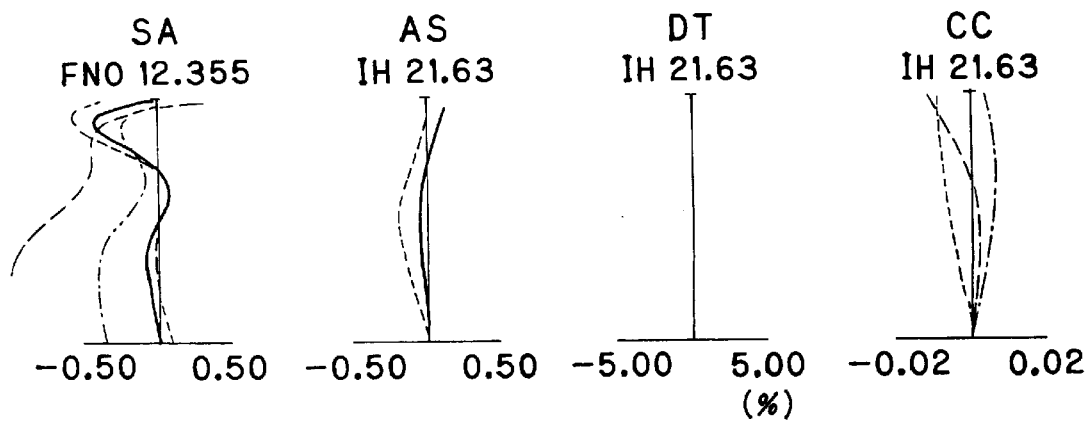

The aberration diagrams for this example are shown in FIGS. 24(*a*), 24(*b*) and 24(*c*), from which it is found that while chromatic aberration of magnification on the wide-angle side and longitudinal chromatic aberration at the telephoto end are somewhat unsatisfactory, it is possible to achieve a satisfactory performance balance on the whole. In this case, too, distortion at the telephoto end is very well corrected.

EXAMPLE 13

Figure 25:
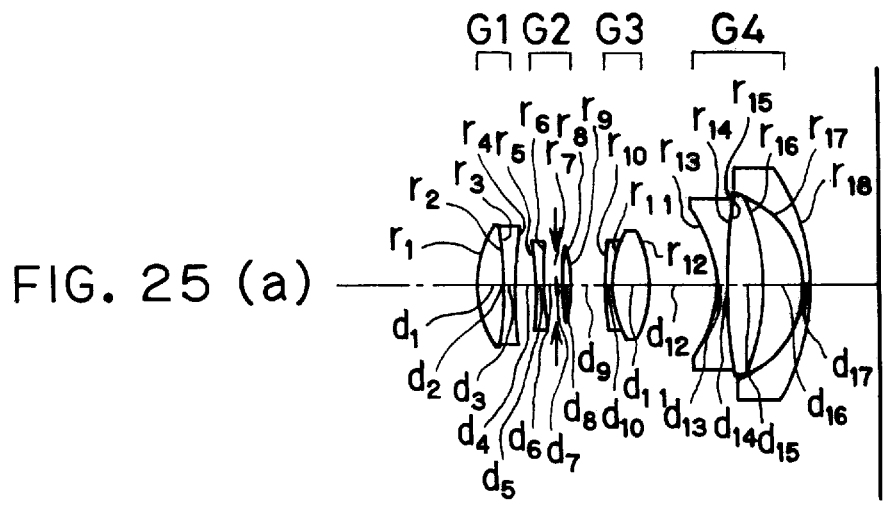
FIGS. 25(a), 25(b) and 25(c) are sectional views of the lens arrangement according to Example 13 of the zoom lens system of the invention.
Figure 25:
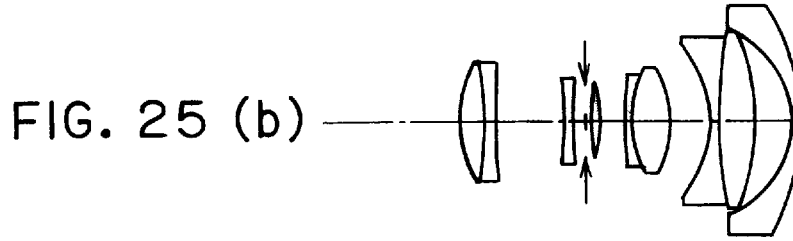
Figure 25:
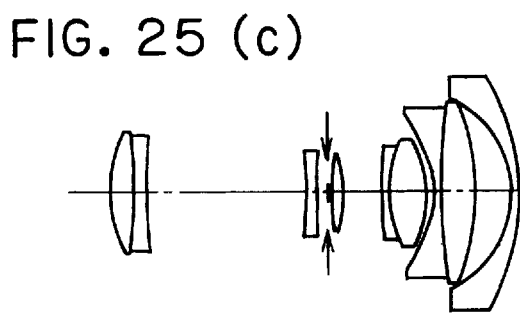

Example 13 is directed to a zoom lens system having a focal length of 38.87 to 170.5 mm and an aperture ratio of 1:5.4 to 15, and consisting of four lens groups or nine lenses in all, as shown in FIGS. 25(*a*), 25(*b*) and 25(*c*).

Figure 26:
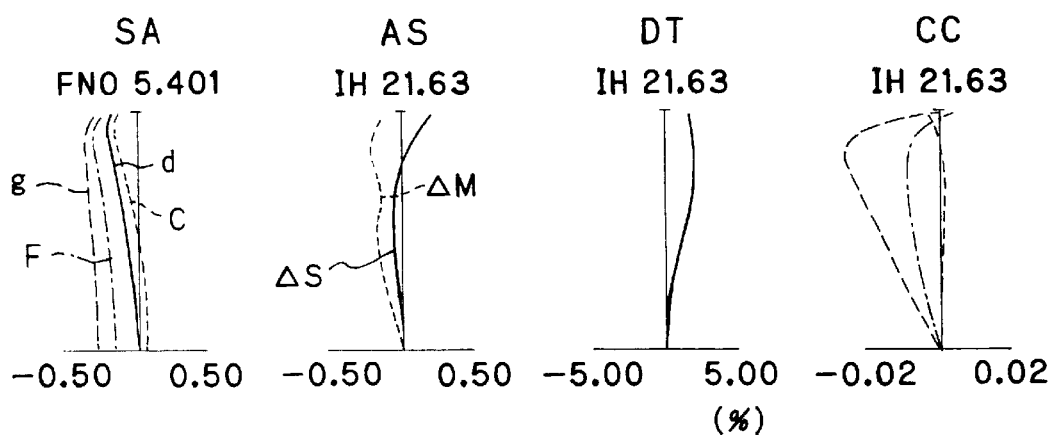
FIGS. 26(a), 26(b) and 26(c) are aberration diagrams for Example 13 of the invention.
Figure 26:
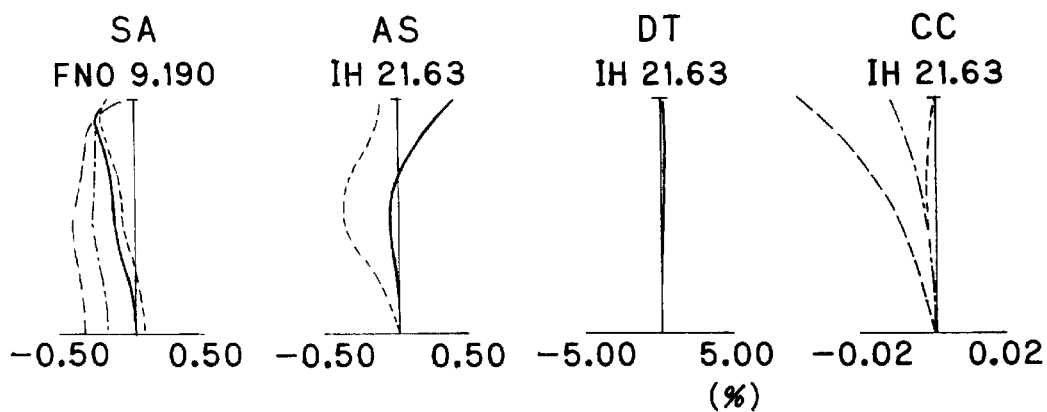
Figure 26:
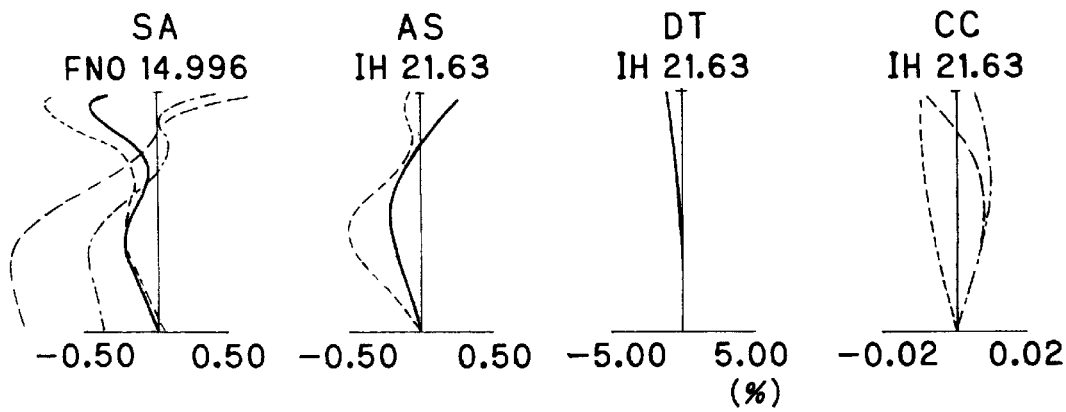

The first lens group G1 consists of a non-cemented doublet made up of a double-convex positive lens and a double-concave negative lens, and the second lens group G2 consists of a double-concave negative lens, a stop located in the rear thereof and a double-convex positive lens. The third lens group G3 consists of a cemented doublet made up of a negative meniscus lens convex on its object side and a double-convex positive lens. The fourth lens group G4 consists of a non-cemented doublet made up of a double-concave negative lens having a strong concave surface on its object side and a double-convex positive lens and a negative meniscus lens having a strong concave surface on its object side. In the first lens group G1, one aspherical surface is used for the object-side surface of the double-convex positive lens. In the second lens group G2 two aspherical surfaces are used, one for the object-side surface of the double-concave negative lens and another for the object-side surface of the double-convex positive lens. In the third lens group G3, one aspherical surface is used for the surface located nearest to the image side. In the fourth lens group G4, two aspherical surfaces are used, one for the strong concave surface of the double-concave negative lens and another for the image-side surface of the double-convex positive lens. The zoom lens system of this example has a telephoto ratio of 0.559 at the telephoto end. The aberration diagrams for this example are shown in FIGS. 26(*a*), 26(*b*) and 26(*c*).

EXAMPLE 14

Figure 27:
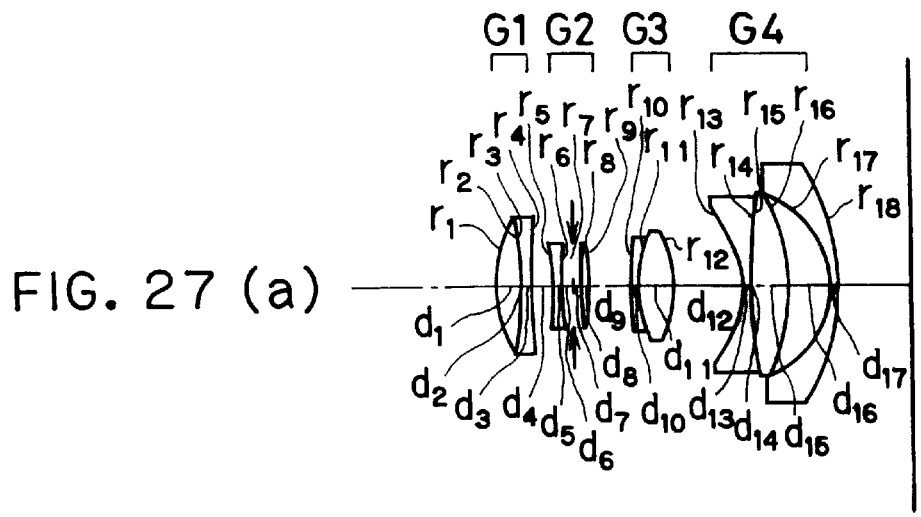
FIGS. 27(a), 27(b) and 27(c) are sectional views of the lens arrangement according to Example 14 of the zoom lens system of the invention.
Figure 27:
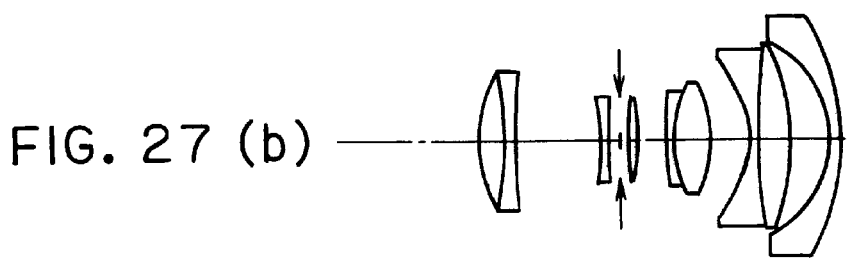
Figure 27:
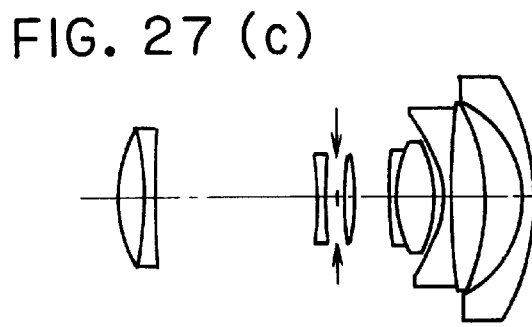

Example 14 is directed to a zoom lens system having a focal length of 38.9 to 170.51 mm and an aperture ratio of 1:4.8 to 13.29, and consisting of four lens groups or nine lenses in all, as shown in FIGS. 27(*a*), 27(*b*) and 27(*c*).

Figure 28:
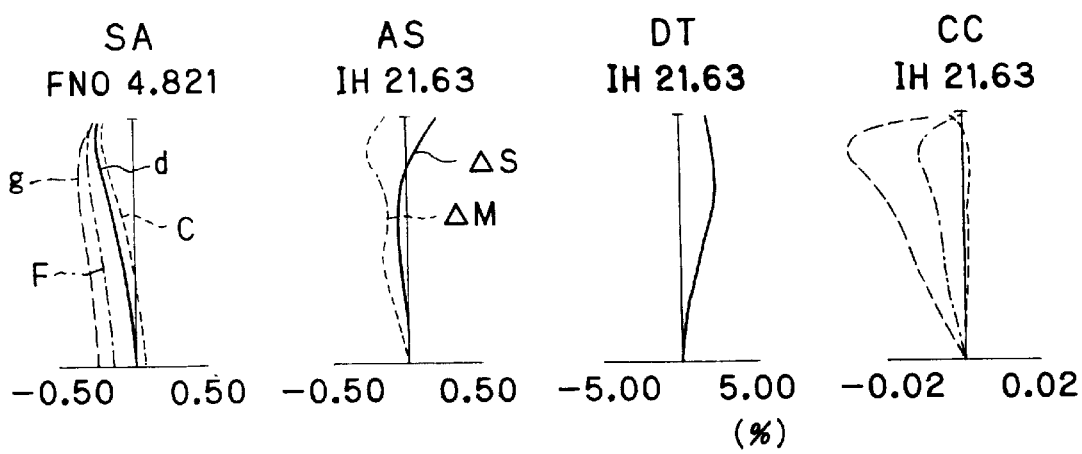
FIGS. 28(a), 28(b) and 28(c) are aberration diagrams for Example 14 of the invention.
Figure 28:
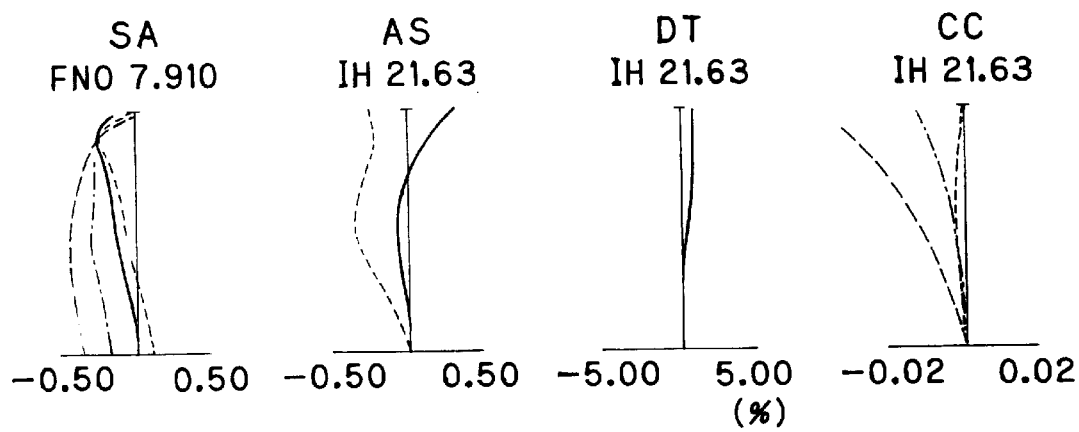
Figure 28:
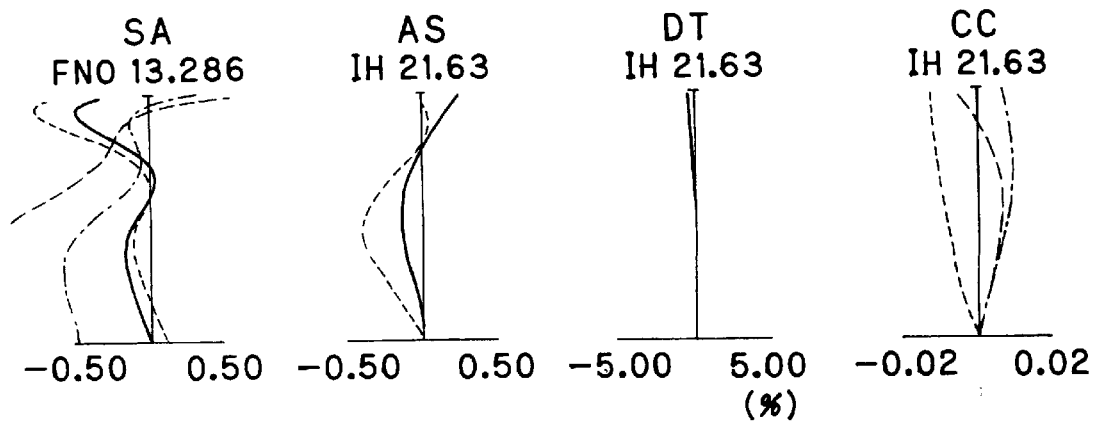

The first lens group G1 consists of a non-cemented doublet made up of a double-convex positive lens and a double-concave negative lens, and the second lens group G2 consists of a double-concave negative lens, a stop located in the rear thereof and a double-convex positive lens. The third lens group G3 consists of a cemented doublet made up of a negative meniscus lens convex on its object side and a double-convex positive lens. The fourth lens group G4 consists of a non-cemented doublet made up of a double-concave negative lens having a strong concave surface on its object side and a double-convex positive lens, and a negative meniscus lens having a strong concave surface on its object side. In the first lens group G1, one aspherical surface is used for the object-side surface of the double-convex positive lens. In the second lens group G2 two aspherical surfaces are used, one for the object-side surface of the double-concave negative lens and another for the object-side surface of the double-convex positive lens. In the third lens group G3, one aspherical surface is used for the surface located nearest to the image side. In the fourth lens group G4 two aspherical surfaces are used, one for the strong concave surface of the double-concave negative lens and another for the image-side surface of the double-convex positive lens. The zoom lens system of this example has a telephoto end of 0.564. The aberration diagrams for this example are shown in FIGS. 28(*a*), 28(*b*) and 28(*c*).

EXAMPLE 15

Figure 29:
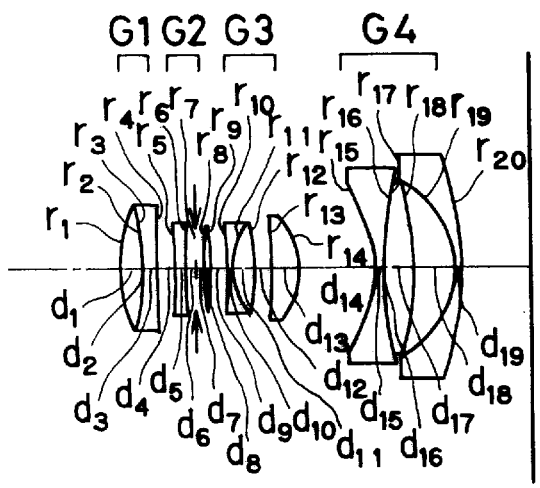
FIGS. 29(a), 29(b) and 29(c) are sectional views of the lens arrangement according to Example 15 of the zoom lens system of the invention.
Figure 29:
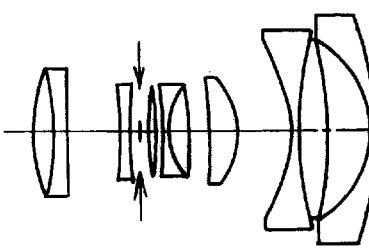
Figure 29:
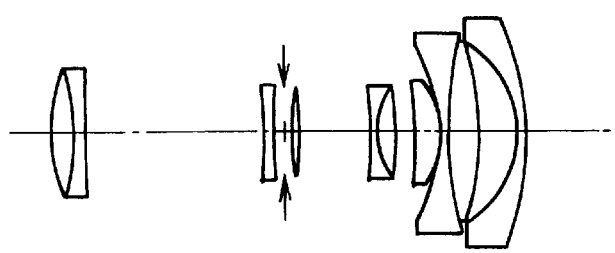

Example 15 is directed to a zoom lens system having a focal length of 38.9 to 195.689 mm and an aperture ratio of 1:4.53 to 15.78, and consisting of four lens groups or ten lenses in all, as shown in FIGS. 29(*a*), 29(*b*) and 29(*c*).

The first lens group G1 consists of a non-cemented doublet made up of a double-convex positive lens and a negative meniscus lens convex on its image side, and the second lens group G2 consists of a double-concave negative lens, a stop located in the rear thereof and a double-convex positive lens. The third lens group G3 consists of a cemented doublet made up of a double-concave negative lens and a double-convex positive lens, and a positive meniscus lens convex on its image side. The fourth lens group G4 consists of a non-cemented doublet made up of a double-concave negative lens having a strong concave surface on its object side and a double-convex positive lens, and a negative meniscus lens having a strong concave surface on its object side.

In this example, the power of the fourth lens group G4 is very large or −9.4773 mm. Basically, this example is similar to Example 14. However, the important point in this example is that the power of the third lens group G3 is dispersed to the doublet and the positive lens. In the first lens group G1 two aspherical surfaces are used, one for the object-side surface of the double-convex positive lens and another for the image-side surface of the negative meniscus lens. In the second lens group G2 two aspherical surfaces are used, one for the object-side surface of the double-concave negative lens and another for the image-side surface of the double-convex positive lens. In the third lens group G3 two aspherical surfaces are used, one for the image-side surface of the cemented doublet and another for the image-side surface of the positive meniscus lens. In the fourth lens group G4 two aspherical surfaces are used, one for the strong concave surface of the double-concave lens and another for the image-side surface of the double-convex positive lens. As a result, it is possible to achieve a zoom ratio of 5.03.

Figure 30:
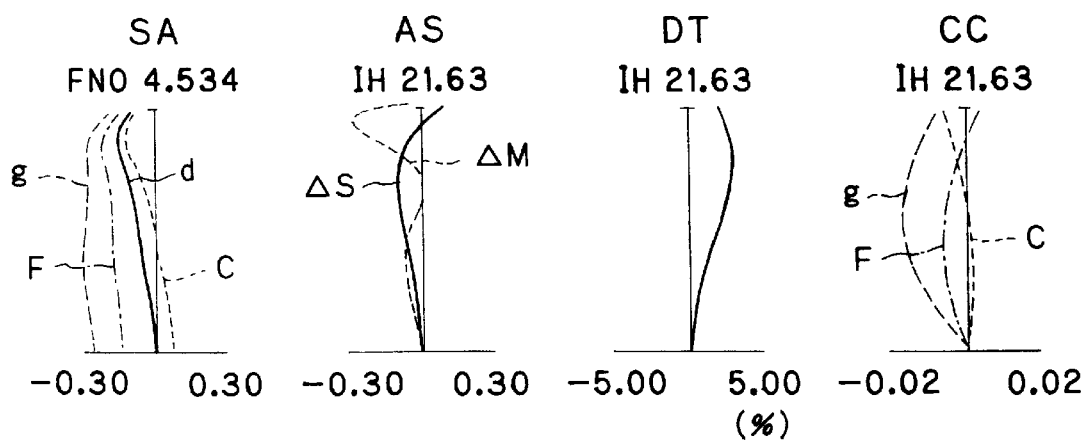
FIGS. 30(a), 30(b) and 30(c) are aberration diagrams for Example 15 of the invention.
Figure 30:
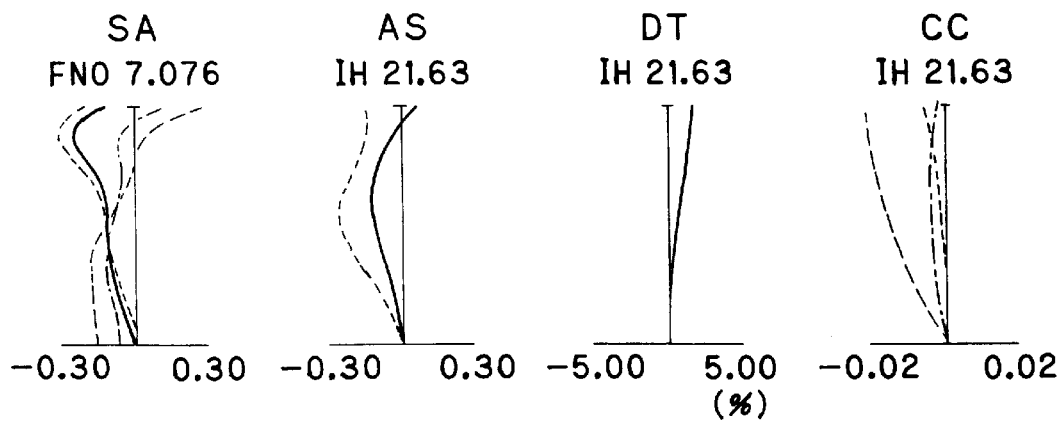
Figure 30:
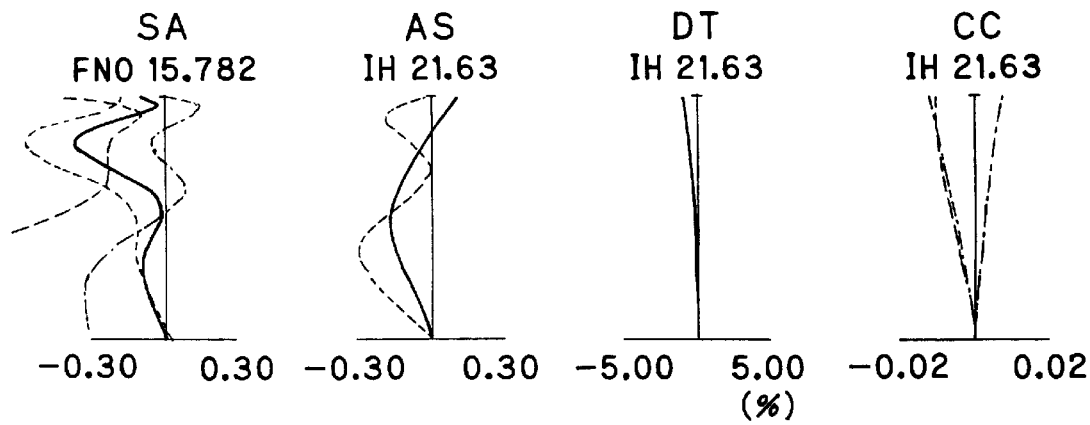

According to this example, a staggering telephoto ratio of 0.522 is achievable at the telephoto end. The aberration diagrams for this example are shown in FIGS. 30(*a*), 30(*b*) and 30(*c*).

EXAMPLE 16

Figure 31:
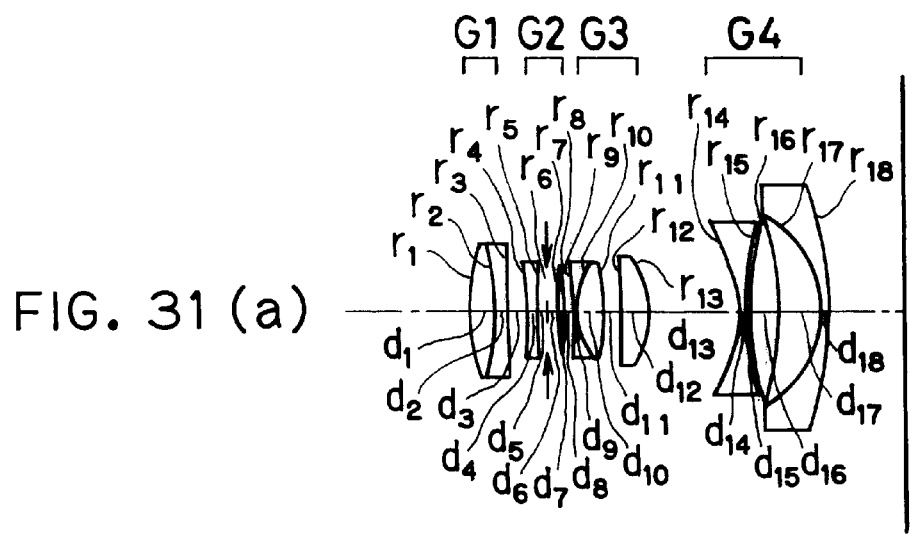
FIGS. 31(a), 31(b) and 31(c) are sectional views of the lens arrangement according to Example 16 of the zoom lens system of the invention.
Figure 31:
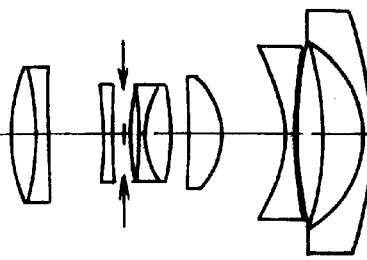
Figure 31:
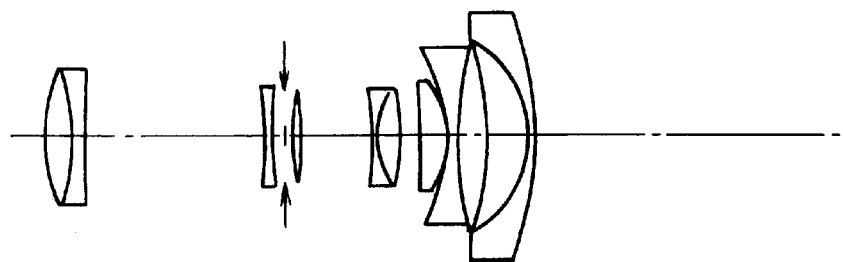

Example 16 is directed to a zoom lens system having a focal length of 38.9 to 195.5 mm and an aperture ratio of 1:4.54 to 15.77, and consisting of four lens groups or ten lenses in all, as shown in FIGS. 31(*a*), 31(*b*) and 31(*c*).

The first lens group G1 consists of a cemented doublet made up of a double-convex positive lens and a negative meniscus lens convex on its image side, and the second lens group G2 consists of a double-concave negative lens, a stop located in the rear thereof and a double-convex positive lens. The third lens group G3 consists of a cemented doublet made up of a double-concave negative lens and a double-convex positive lens, and a positive meniscus lens convex on its image side. The fourth lens group G4 consists of a non-cemented doublet made up of a double-concave negative lens having a strong concave surface on its object side and a double-convex positive lens, and a negative meniscus lens having a strong concave surface on its object side. In the first lens group G1, two aspherical surfaces are used for the object- and image-side surfaces of the cemented doublet. In the second lens group G2 two aspherical surfaces are used, one for the object-side surface of the double-concave negative lens and another for the object-side surface of the double-convex positive lens. In the third lens group G3 two aspherical surfaces are used, one for the image-side surface of the cemented doublet and another for the image-side surface of the positive meniscus lens. In the fourth lens group G4 two aspherical surfaces are used, one for the strong concave surface of the double-concave negative lens and another for the image-side surface of the double-convex positive lens.

Figure 32:
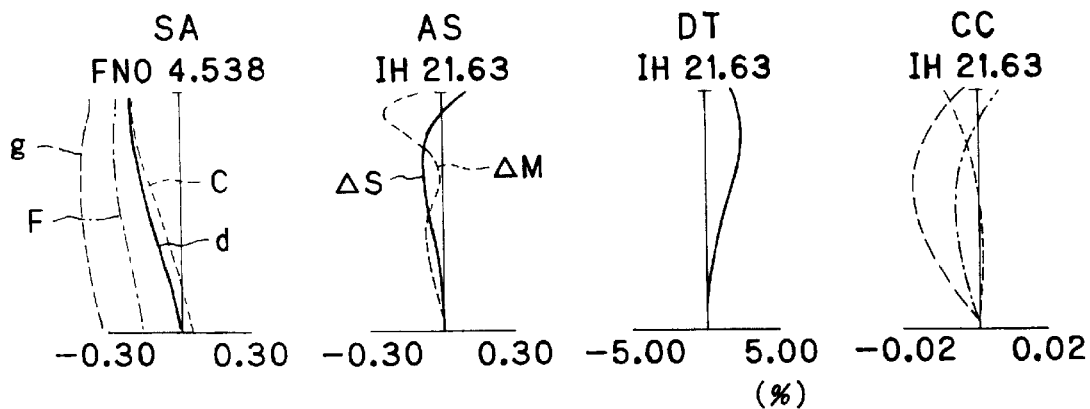
FIGS. 32(a), 32(b) and 32(c) are aberration diagrams for Example 16 of the invention.
Figure 32:
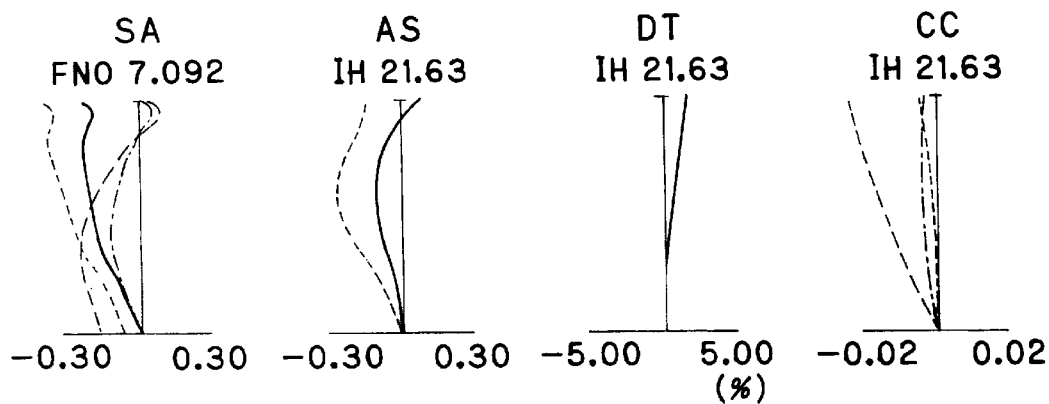
Figure 32:
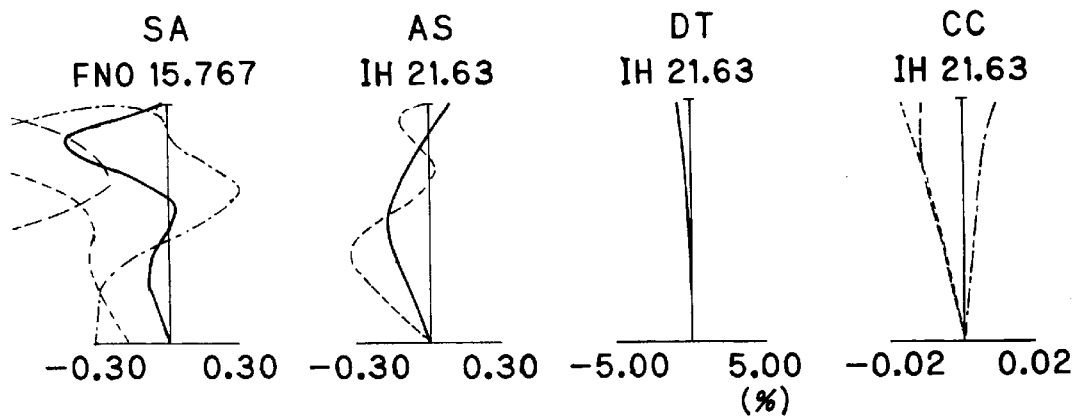

The aberration diagrams for this example are shown in FIGS. 32(a), 32(b) and 32(c). In this example, the first lens group G1 is made up of a cemented doublet whereas the first lens group G1 in Example 15 is made up of an air-spaced doublet. The telephoto ratio is 0.51 at the telephoto end. For the stability of chromatic aberrations, this example is better corrected than Example 15.

EXAMPLE 17

Figure 33:
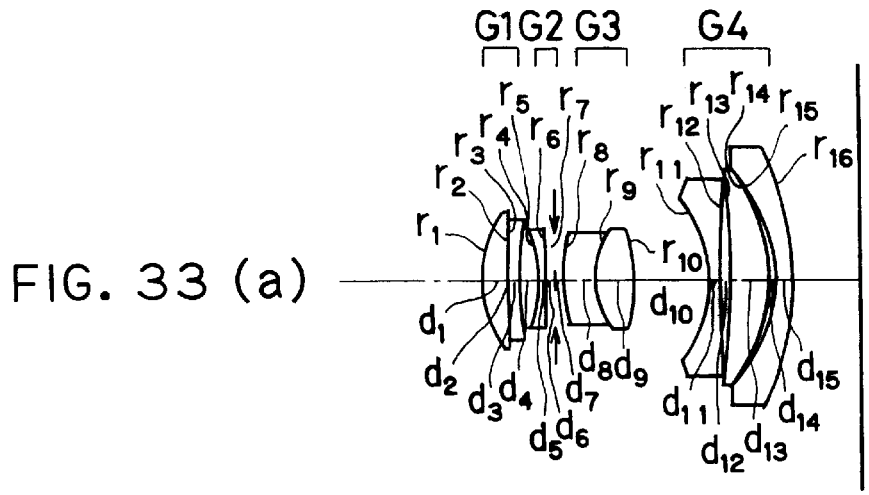
FIGS. 33(a), 33(b) and 33(c) are sectional views of the lens arrangement according to Example 17 of the zoom lens system of the invention.
Figure 33:
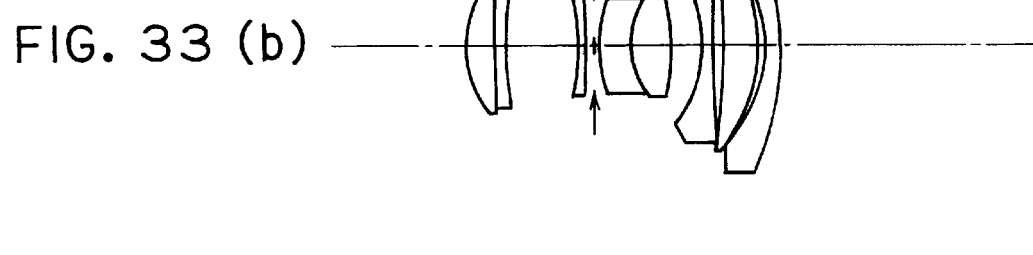
Figure 33:
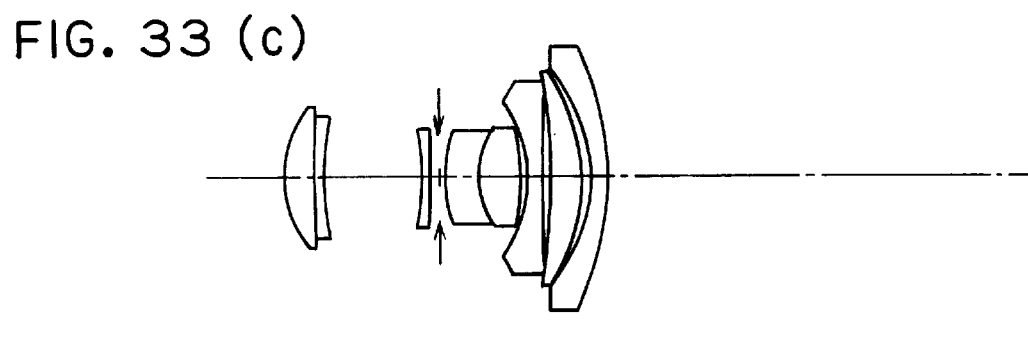

Example 17 is directed to a compact zoom lens system having a focal length of 38.37 to 102.5 mm and an aperture ratio of 1:4.1 to 8.95. As shown in FIGS. 33(a), 33(b) and 33(c), this zoom lens system is a basic type of four-group, eight-lens construction comprising, in order from its object side, a first lens group G1 having positive refracting power, a second lens group G2 having negative refracting power, a third lens group G3 having positive refracting power and a fourth lens group G4 having negative refracting power.

The first lens group G1 consists of a doublet made up of a positive meniscus lens having a strong concave surface on its object side and a negative meniscus lens concave on its object side. While this doublet is an air-spaced doublet with a slight space located between the two lenses, it is acceptable to use a cemented doublet. Even when the negative lens is followed by the positive lens, it is understood that the desired effect is achievable. In this example, an aspherical surface used for the object-side surface of the first positive lens has a great effect on correction of axial longitudinal spherical aberration. The second lens group G2 having negative refracting power consists of a single negative meniscus lens concave on its object side. In the instant example, an aperture stop is movable along with the second lens group G2. The third lens group G3 having positive refracting power consists of a doublet composed of a thick negative meniscus lens convex on its object side and a double-convex positive lens. In the instant example, an aspherical surface used for the image-side surface of the double-convex positive lens has a great effect on placing the performance of off-axial aberrations in a well-balanced state. The power of the fourth lens group G4 having negative refracting power is made larger than that used so far in the art, so that the amount of zooming movement from the wide-angle end to the telephoto end is reduced. To make better correction for aberrations at a wide-angle zone, therefore, the fourth lens group G4 consists of a non-cemented doublet composed of a double-concave negative lens having a strong concave surface on its object side and a positive meniscus lens convex on its image side, and one negative meniscus lens convex on its image side, and aspherical surfaces are used, one for the surface located nearest to the object side and another for the strong concave surface of the final negative meniscus lens. In this example, the telephoto ratio is 0.764 at the telephoto end.

Figure 34:
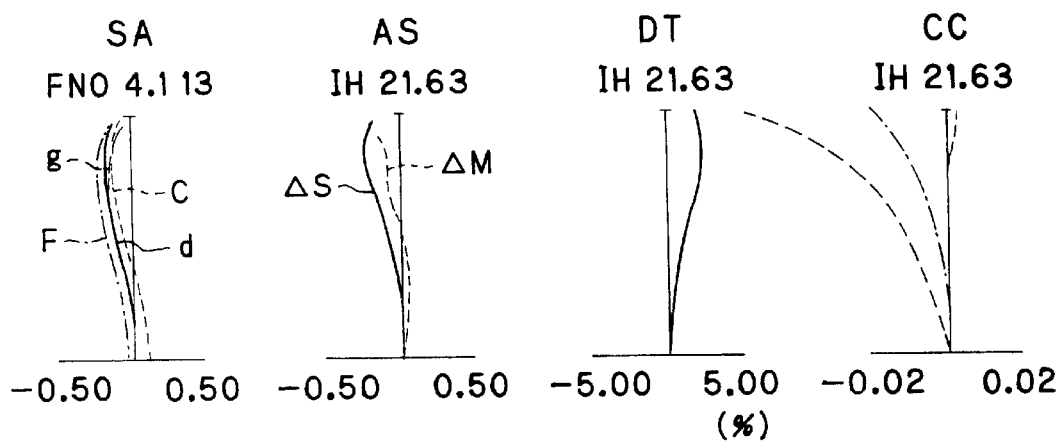
FIGS. 34(a), 34(b) and 34(c) are aberration diagrams for Example 17 of the invention.
Figure 34:
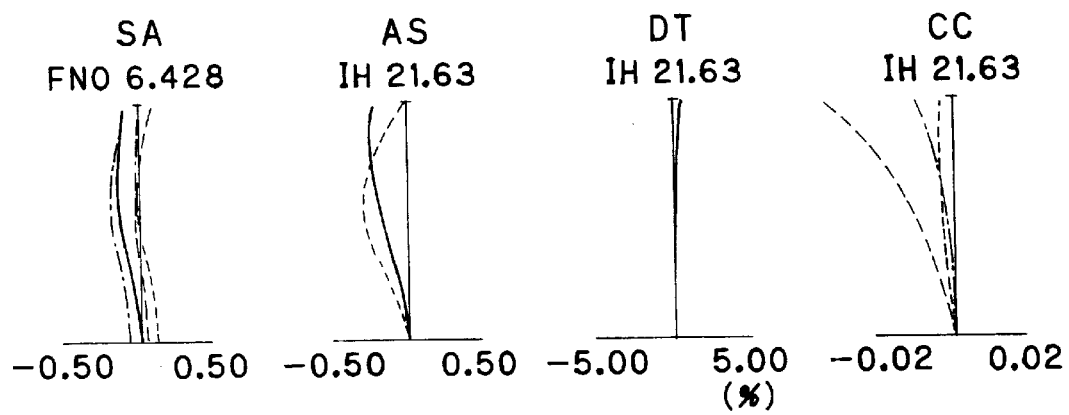
Figure 34:
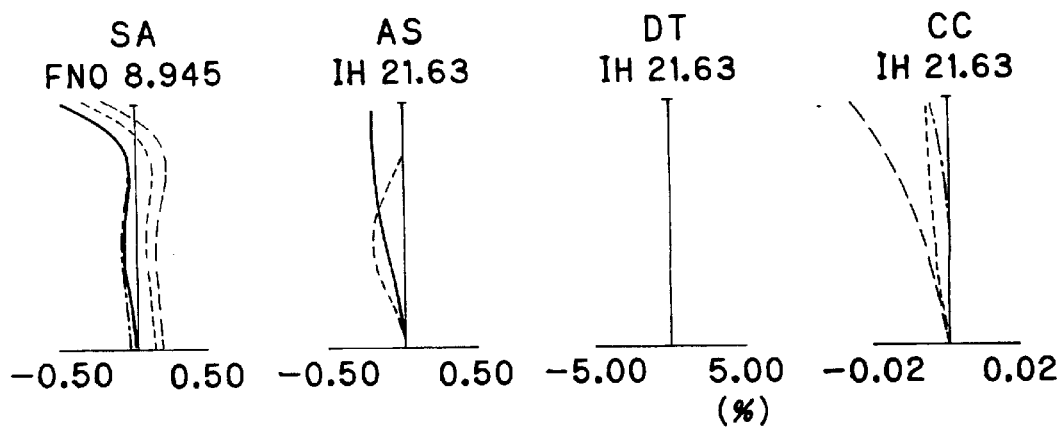

Focusing should preferably be carried out by moving the second lens group G2 along with the third lens group G3 because aberration variations are reduced. The aberration diagrams for this example are shown in FIGS. 34(a), 34(b) and 34(c).

EXAMPLE 18

Figure 35:
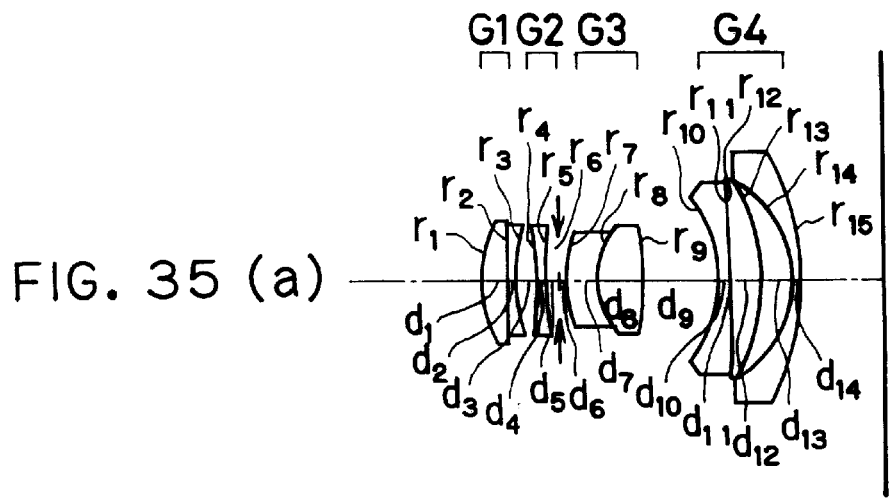
FIGS. 35(a), 35(b) and 35(c) are sectional views of the lens arrangement according to Example 18 of the zoom lens system of the invention.
Figure 35:
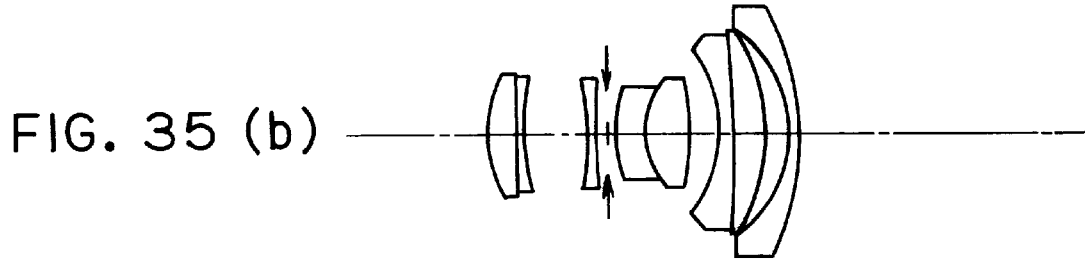
Figure 35:
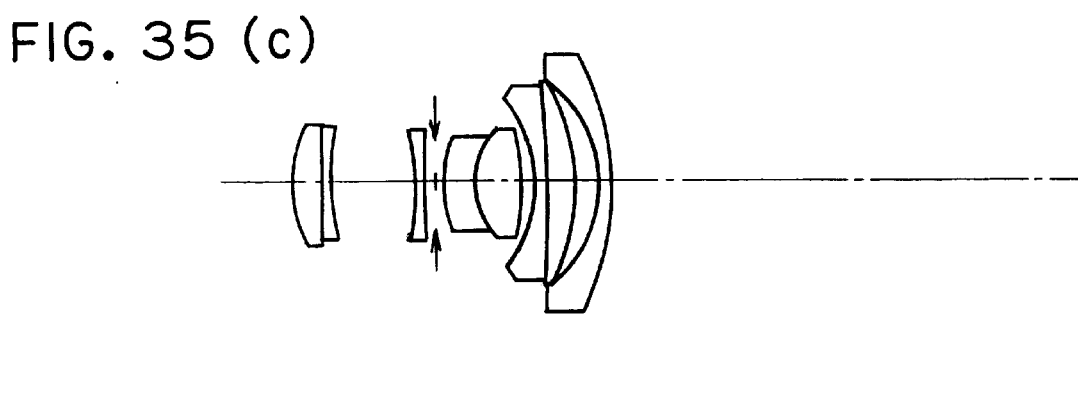

Example 18 is directed to a zoom lens system having a focal length of 38 to 102.5 mm and an aperture ratio of 1:4.67 to 10.84. As shown in FIGS. 35(a), 35(b) and 35(c), this zoom lens system is of four-group, eight-lens construction. A difference between Example 18 and Example 17 is that air lenses are used in the first and fourth lens groups G1 and G4 in Example 17 whereas a cemented doublet is used in the first lens group G1 in Example 18 and the fourth lens group G4 in Example 18 has an equal radius of curvature.

More exactly, the first lens group G1 consists of a cemented doublet composed of a positive meniscus lens having a strong convex surface on its object side and a negative meniscus lens convex on its object side. The second lens group G2 having negative refracting power consists of a single double-concave negative lens concave on its object side, and an aperture stop is movable along with the second lens group G2. The third lens group G3 having positive refracting power consists of a cemented doublet composed of a thick negative meniscus lens convex on its object side and a double-convex positive lens. The fourth lens group G4 having negative refracting power consists of a non-cemented doublet composed of a negative meniscus lens having a strong concave surface on its object side and a positive meniscus lens convex on its image side, and one negative meniscus lens convex on its image side. One aspherical surface is used for the object-side surface of the positive meniscus lens in the first lens group G1, and one aspherical surface is used for the image-side surface of the double-convex positive lens in the third lens group G3. In the fourth lens group G4 two aspherical surfaces are used, one for the surface located nearest to the image side and another for the strong concave surface of the final negative meniscus lens.

Figure 36:
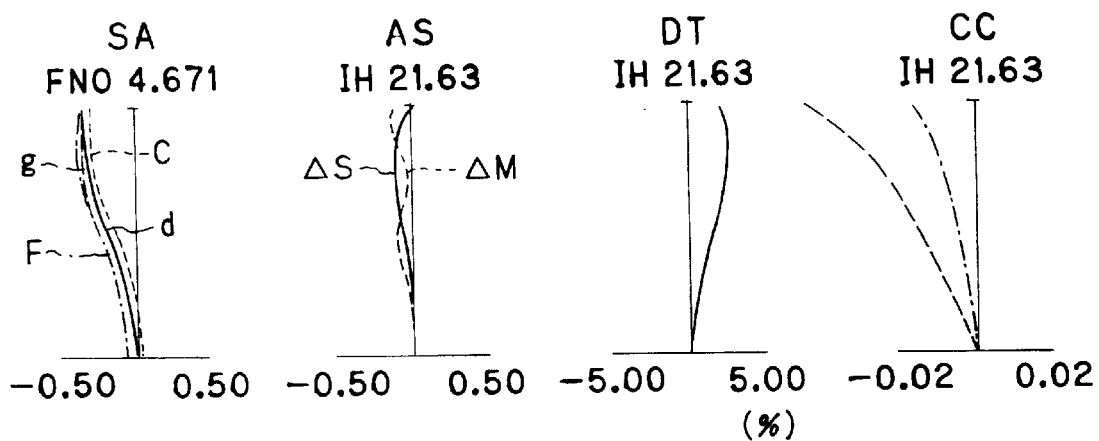
FIGS. 36(a), 36(b) and 36(c) are aberration diagrams for Example 18 of the invention.
Figure 36:
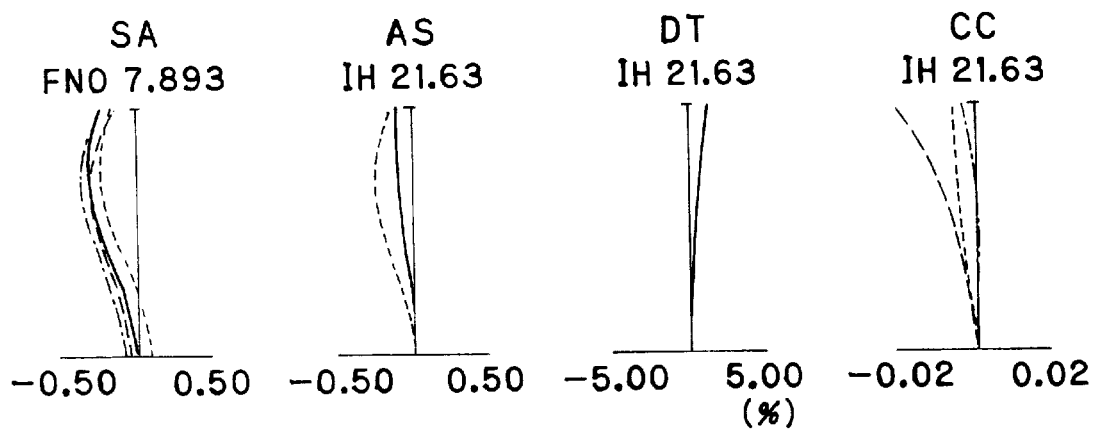
Figure 36:
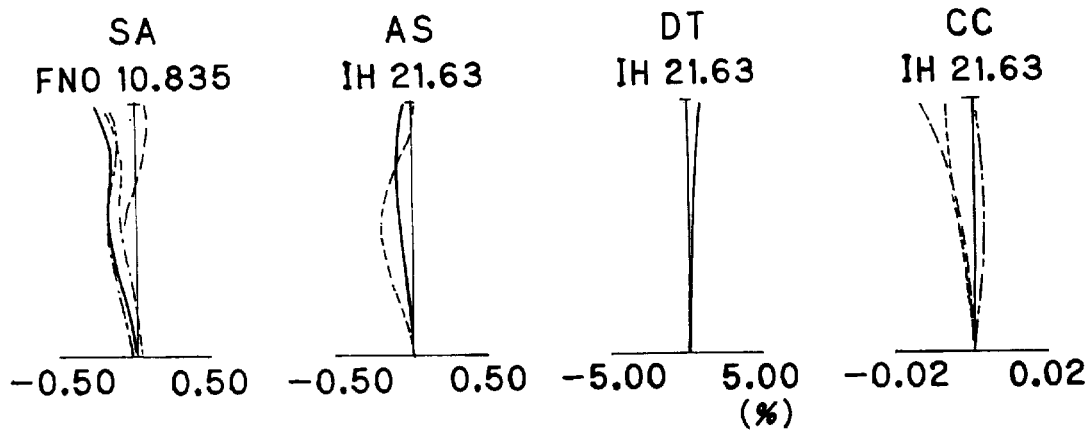

In this example, longitudinal spherical aberration and chromatic aberrations are strikingly improved on the telephoto side, as can be seen from the aberration diagrams shown in FIGS. 36(a), 36(b) and 36(c), while the aperture ratio on the telephoto side is sacrificed. On the other hand, the telephoto ratio is substantially similar (0.764) to that of Example 17.

EXAMPLE 19

Figure 37:
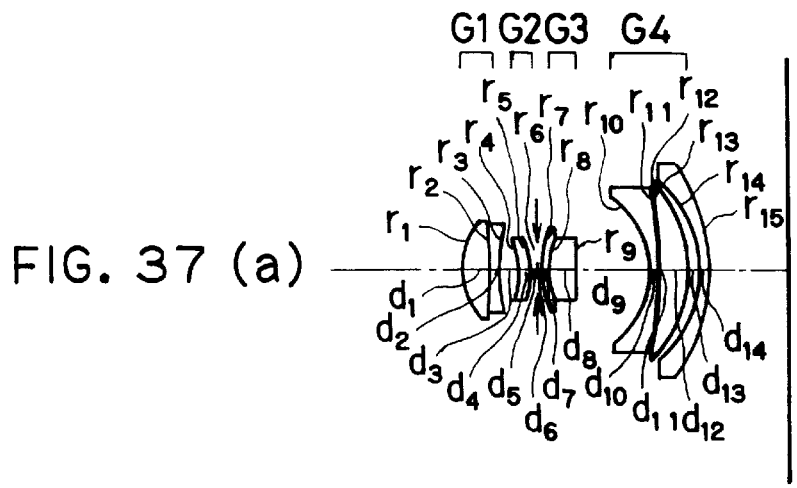
FIGS. 37(a), 37(b) and 37(c) are sectional views of the lens arrangement according to Example 19 of the zoom lens system of the invention.
Figure 37:
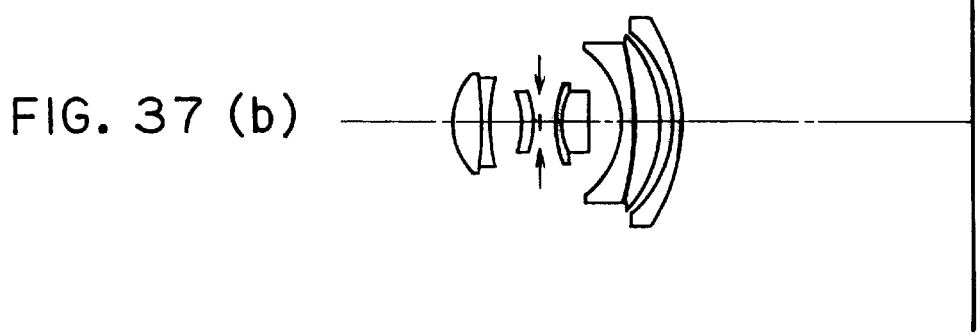
Figure 37:
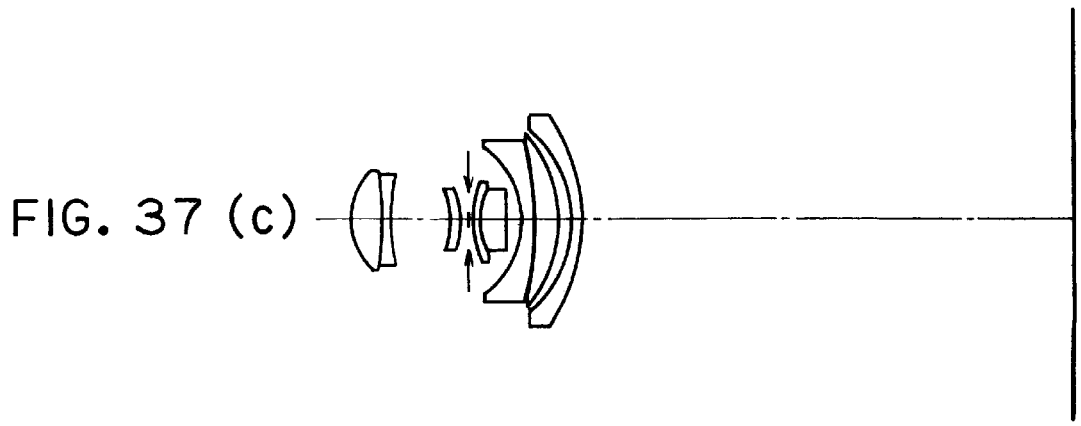

Example 19 is directed to a zoom lens system having a focal length of 38 to 104.04 mm and an aperture ratio of 1:6.75 to 15.8. This zoom lens system is of four-group, eight-lens construction as shown in FIGS. 37(a), 37(b) and 37(c). This example is dark as can be predicted from the aperture ratio of 1:6.75 to 15.8, and has a reduced telephoto ratio.

The first lens group G1 consists of a cemented doublet composed of a double-convex positive lens having a strong convex surface on its object side and a double-concave negative lens. The second lens group G2 having negative refracting power consists of a single negative meniscus lens, and an aperture stop is movable along with the second lens group G2. The third lens group G3 having positive refracting power consists of a cemented doublet composed of a thin negative meniscus lens convex on its object side and a positive meniscus lens having a strong convex surface on its object side. The fourth lens group G4 having negative refracting power consists of a non-cemented doublet composed of a negative meniscus lens having a strong concave surface on its object side and a positive meniscus lens convex on its image side, and one negative meniscus lens convex on its image side. One aspherical surface is used for the object-side surface of the double-convex positive lens in the first lens group G1, and one aspherical surface is used for the surface located nearest to the image side in the third lens group G3. In the fourth lens group G4 two aspherical surfaces are used, one for the surface located nearest to the object side and another for the strong concave surface of the final negative meniscus lens.

Figure 38:
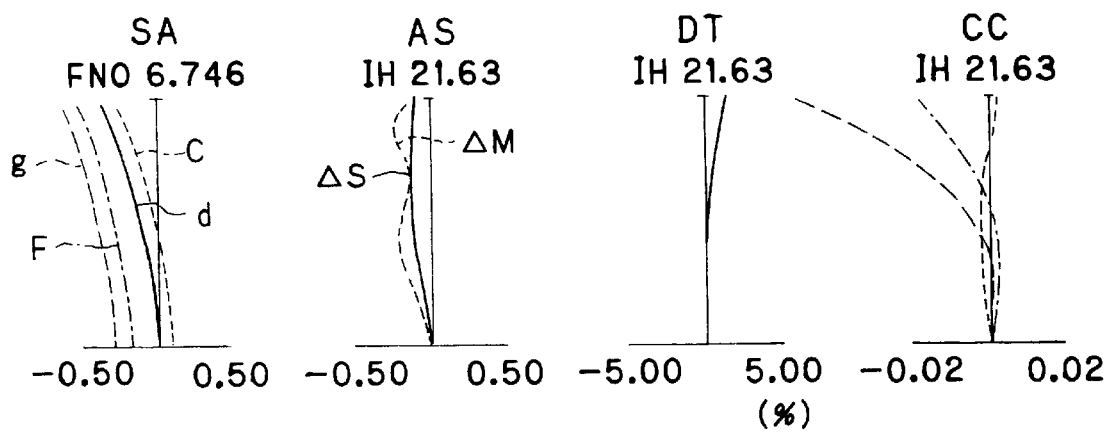
FIGS. 38(a), 38(b) and 38(c) are aberration diagrams for Example 19 of the invention.
Figure 38:
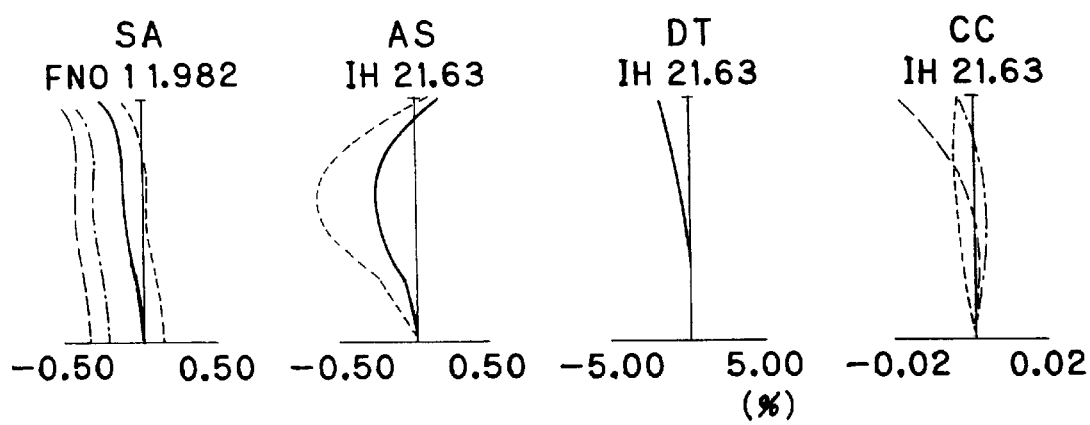
Figure 38:
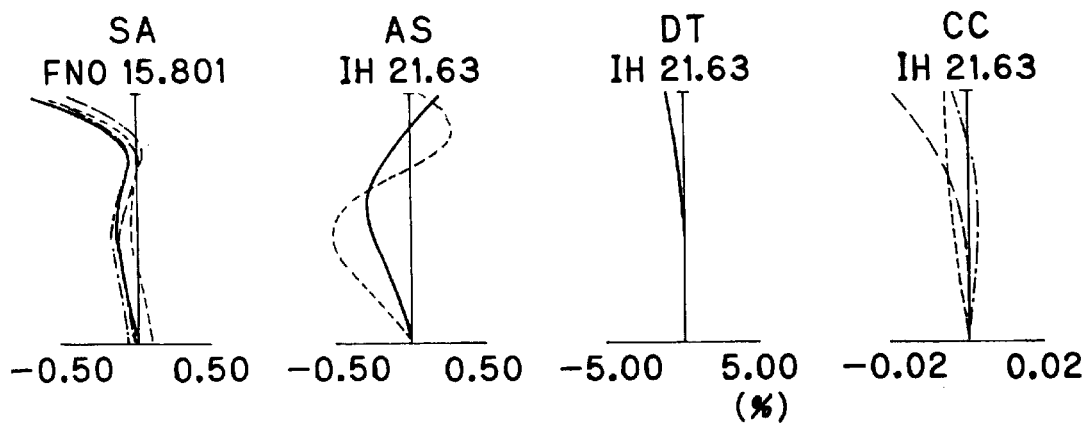

The aberration diagrams for this example are shown in FIGS. 38(*a*), 38(*b*) and 38(*c*). The instant example is characterized in that the overall length of the zoom lens system is considerably reduced at the wide-angle end. The telephoto ratio is 0.726 at the telephoto end.

EXAMPLE 20

Figure 39:
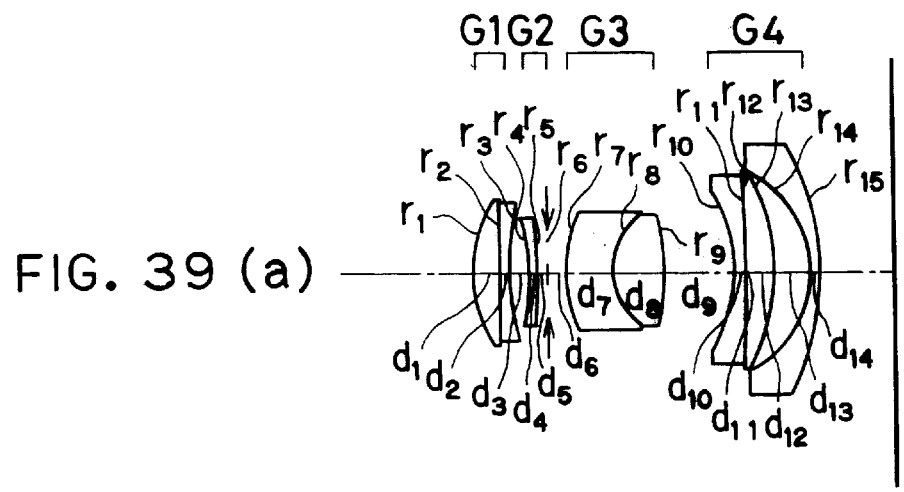
FIGS. 39(a), 39(b) and 39(c) are sectional views of the lens arrangement according to Example 20 of the zoom lens system of the invention.
Figure 39:
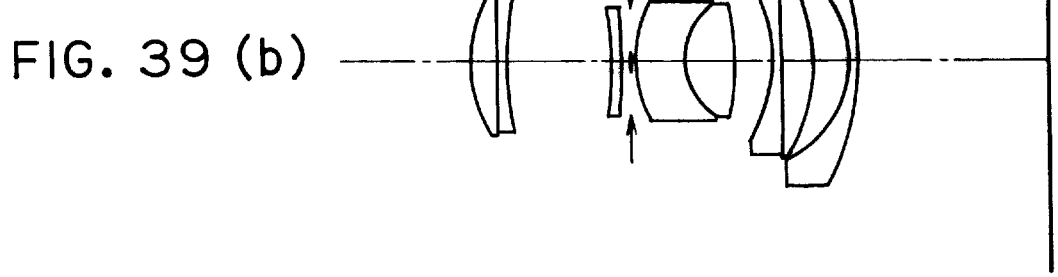
Figure 39:
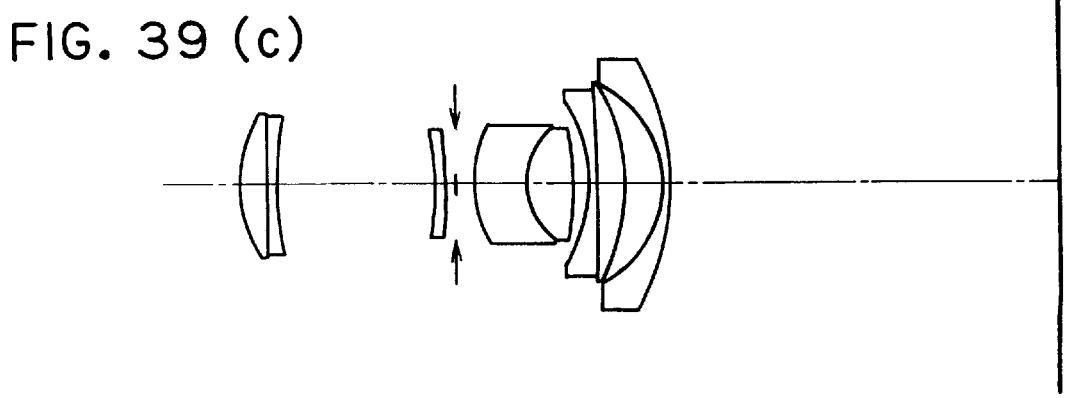

Example 20 is directed to a zoom lens system having a focal length of 38.9 to 102.5 mm and an aperture ratio of 1:4.32 to 7.45. The zoom lens system is of four-group, eight-lens construction, as shown in FIGS. 39(*a*), 39(*b*) and 39(*c*). The instant example intends to increase the aperture ratio and enhance image-formation capabilities. How to use aspherical surfaces is the same as in the former example. The telephoto ratio is 0.82 at the telephoto end.

The first lens group G1 consists of a cemented doublet composed of a positive meniscus lens having a strong convex surface on its object side and a negative meniscus lens convex on its object side. The second lens group G2 having negative refracting power consists of a single negative meniscus lens concave on its object side, and an aperture stop is designed to be movable along with the second lens group G2. The third lens group G3 having positive refracting power consists of a cemented doublet composed of a thick negative meniscus lens convex on its object side and a double-convex positive lens. The fourth lens group G4 having negative refracting power consists of a non-cemented doublet composed of a negative meniscus lens having a strong concave surface on its object side and a positive meniscus lens convex on its image side, and one negative meniscus lens convex on its image side. One aspherical surface is used for the object-side surface of the positive meniscus lens in the first lens group G1, and one aspherical surface is used for the surface of the cemented doublet, which is located nearest to the image side in the third lens group G3. In the fourth lens group G4 two aspherical surfaces are used, one for the surface located nearest to the object side and another for the strong concave surface of the final negative meniscus lens. In this example, the movement of the second and third lens groups G2 and G3 is effective for correction of aberrations, and has a great effect on correction of field curvature in particular.

Figure 40:
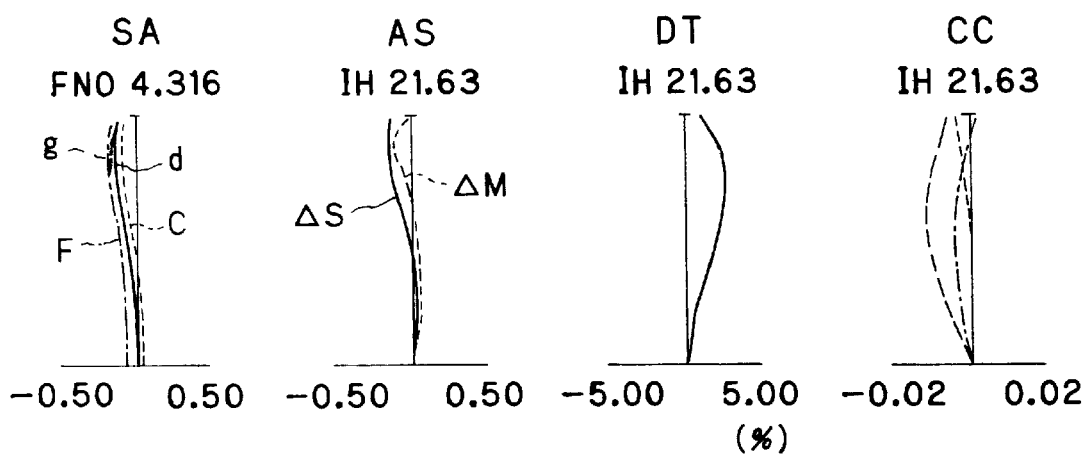
FIGS. 40(a), 40(b) and 40(c) are aberration diagrams for Example 20 of the invention.
Figure 40:
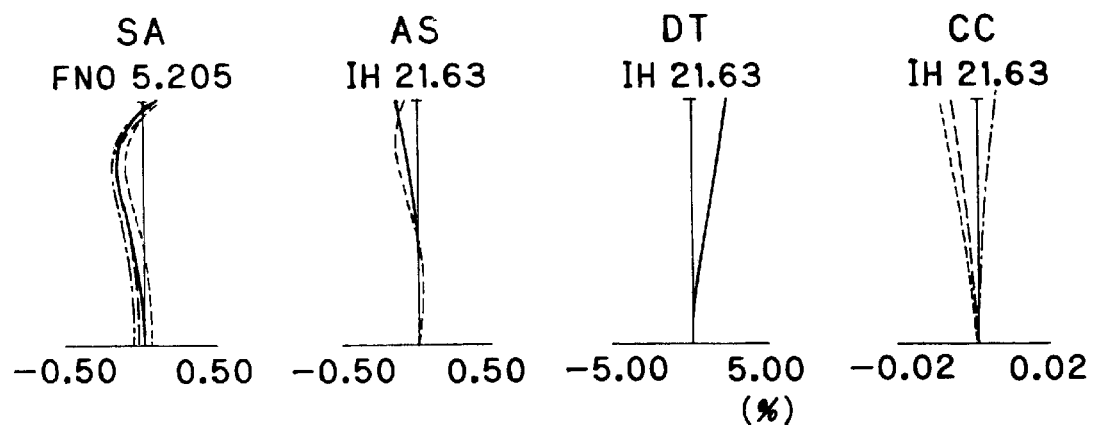
Figure 40:
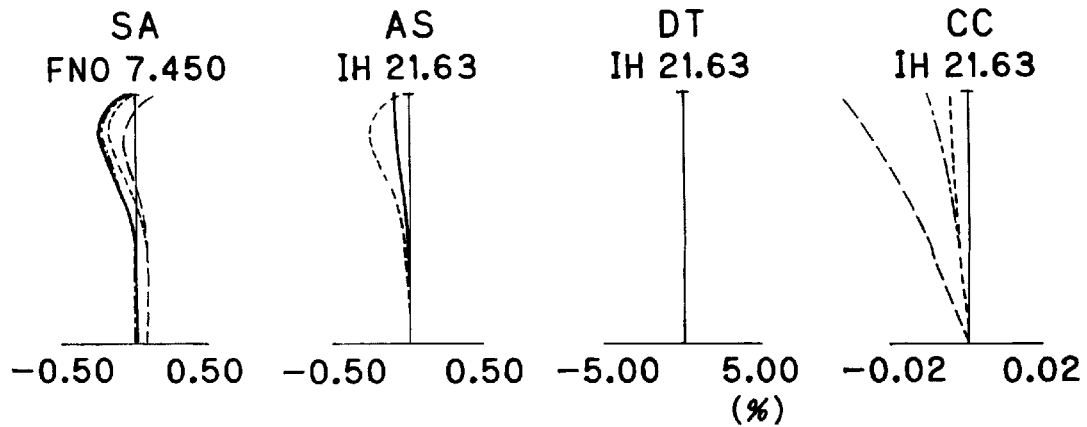

The aberration diagrams for this example are shown in FIGS. 40(*a*), 40(*b*) and 40(*c*). As can be seen from astigmatism, the zoom lens system has a very stable image plane property. Axial longitudinal spherical aberration, too, is very satisfactorily corrected. One feature of the instant example is that the power of the first lens group G1 is relatively small. On the other hand, the power of the fourth lens group G4 is very large, and has a value larger than those of Examples 17 to 3.

EXAMPLE 21

Figure 41:
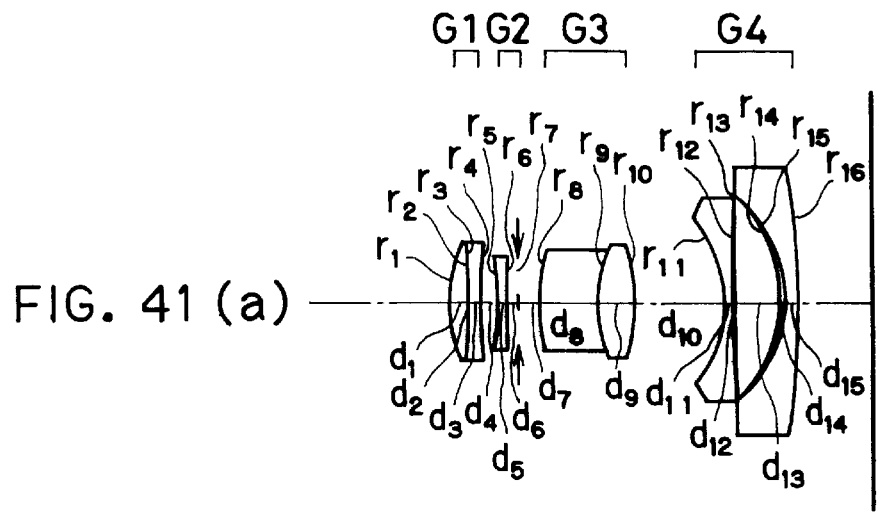
FIGS. 41(a), 41(b) and 41(c) are sectional views of the lens arrangement according to Example 21 of the zoom lens system of the invention.
Figure 41:
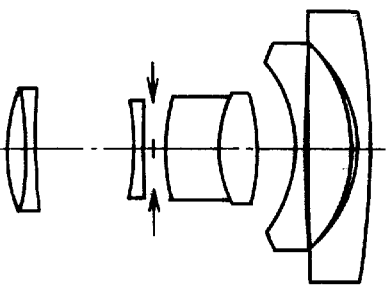
Figure 41:
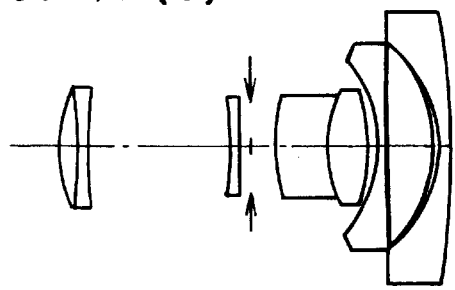

Example 21 is directed to a zoom lens system having a focal length of 38.9 to 131.09 mm and an aperture ratio of 1:4.34 to 11.86. The zoom lens system is of four-group, eight-lens construction, as shown in FIGS. 41(*a*), 41(*b*) and 41(*c*).

The first lens group G1 consists of a non-cemented doublet composed of a double-convex positive lens having a strong convex surface on its object side and a double-concave negative lens. The second lens group G2 having negative refracting power consists of a single double-concave negative lens, and an aperture stop is designed to be movable along with the second lens group G2. The third lens group G3 having positive refracting power consists of a cemented doublet composed of a thick negative meniscus lens convex on its object side and a double-convex positive lens. The fourth lens group G4 having negative refracting power consists of a non-cemented doublet composed of a double-concave negative lens having a strong concave surface on its object side and a positive meniscus lens convex on its image side, and one negative meniscus lens convex on its image side. One aspherical surface is used for the object-side surface of the double-convex positive lens in the first lens group G1, one aspherical surface is used for the object-side surface of the double-concave negative lens in the second lens group G2, and one aspherical surface is used for the surface of the cemented doublet, which is located nearest to the image side in the third lens group G3. In the fourth lens group G4 two aspherical surfaces are used, one for the surface located nearest to the object side and another for the strong concave surface of the final negative meniscus lens.

Figure 42:
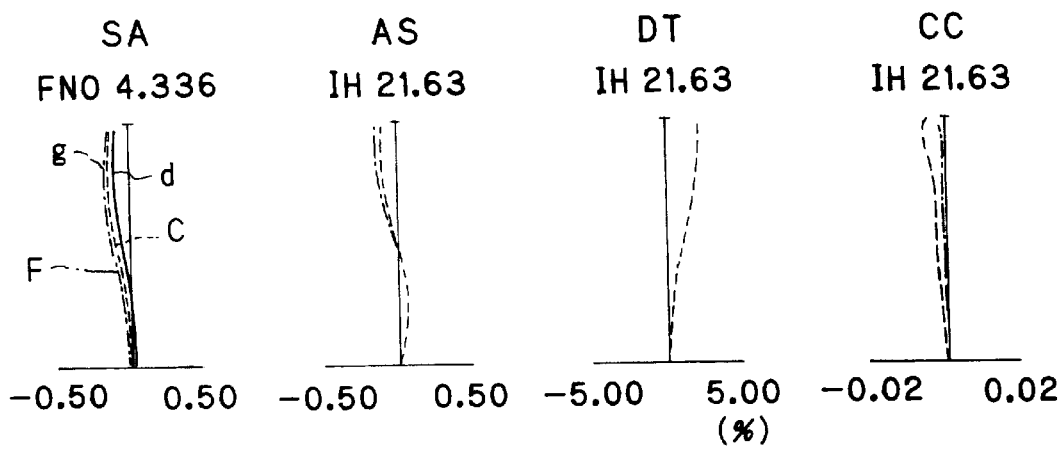
FIGS. 42(a), 42(b) and 42(c) are aberration diagrams for Example 21 of the invention.
Figure 42:
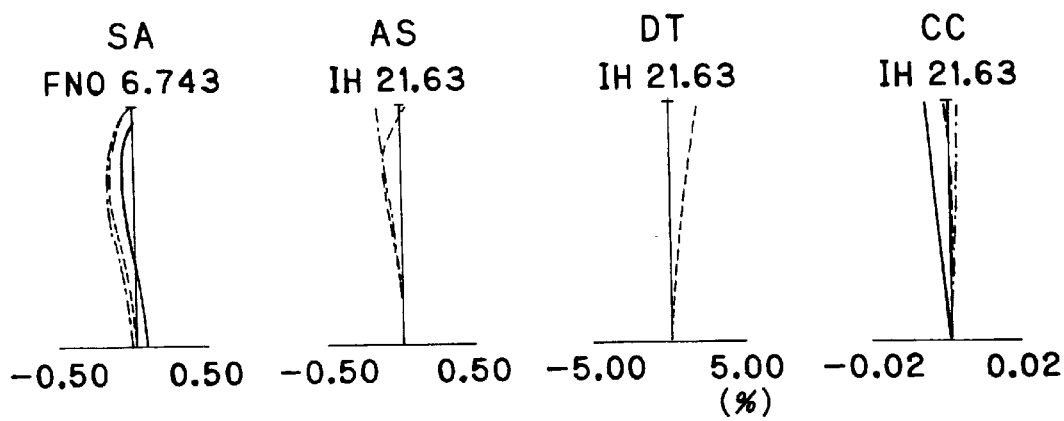
Figure 42:
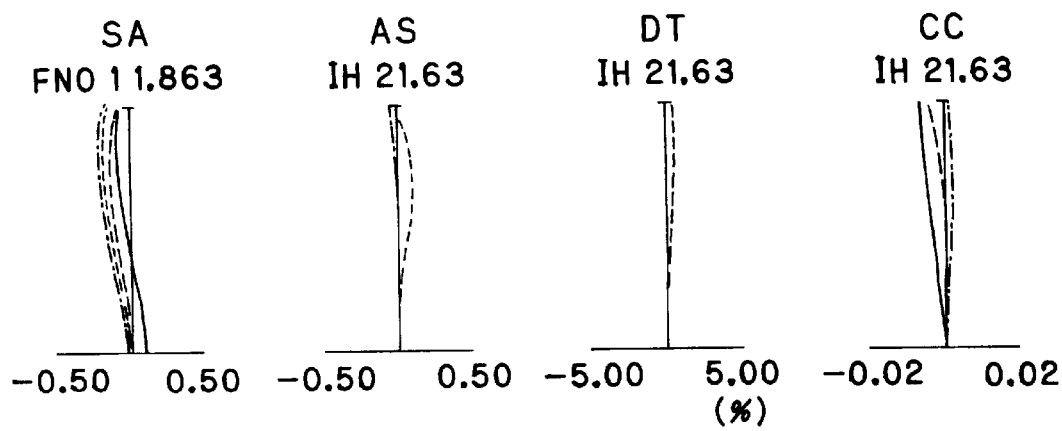

The aberration diagrams for this example are shown in FIGS. 42(*a*), 42(*b*) and 42(*c*). The instant zoom lens system is characterized by the lens arrangement of the fourth lens group G4. As can be predicted from these diagrams, the configurations and arrangement of the double-concave negative lens, positive meniscus lens and negative meniscus lens forming the fourth lens group G4 have a substantial relation to the reduction in the overall length of the zoom lens system. The air lens in particular, because of being thin, takes part in the generation of high-order aberrations and effective correction thereof. As can be predicted from the aberration diagrams, very satisfactory image-formation capabilities are obtained. The effect of the aspherical surface in the second lens group G2 can have a substantial relation to correction of distortion and coma. The telephoto ratio is 0.741 at the telephoto end.

EXAMPLE 22

Figure 43:
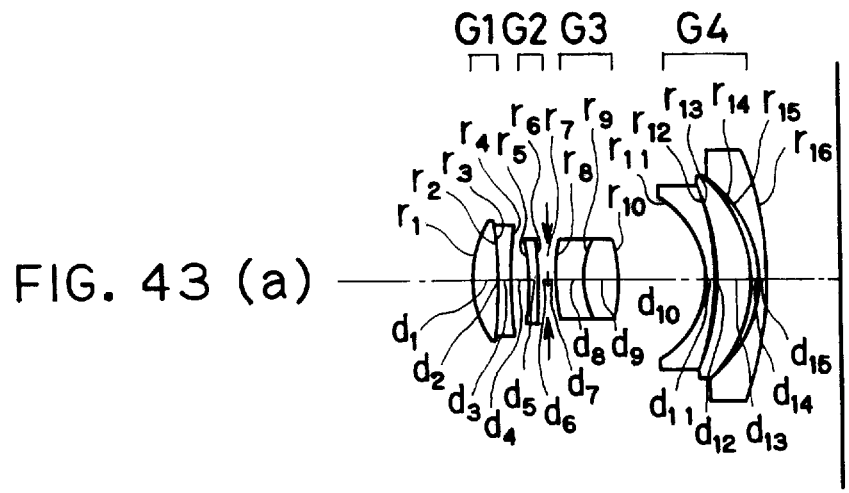
FIGS. 43(a), 43(b) and 43(c) are sectional views of the lens arrangement according to Example 22 of the zoom lens system of the invention.
Figure 43:
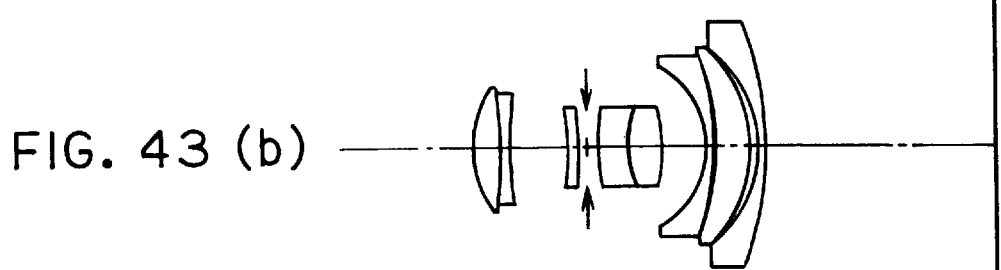
Figure 43:
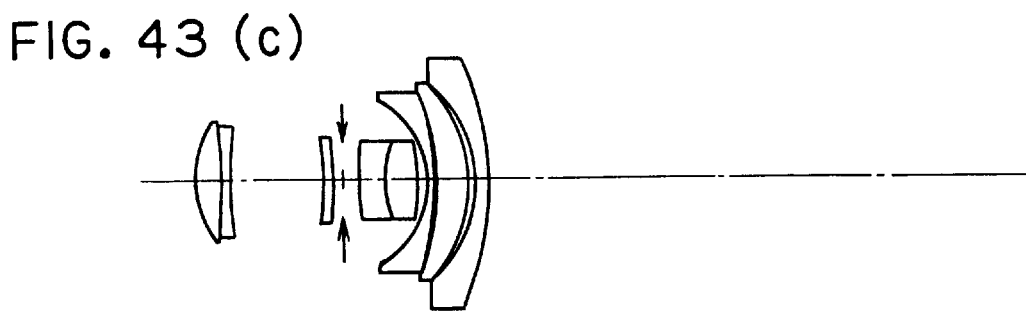

Example 22 is directed to a zoom lens system having a focal length of 38.9 to 131 mm and an aperture ratio of 1:4.84 to 12.07. The zoom lens system is of four-group, eight-lens construction, as shown in FIGS. 43(*a*), 43(*b*) and 43(*c*).

The first lens group G1 consists of a non-cemented doublet composed of a double-convex positive lens having a strong convex surface on its object side and a double-concave negative lens. The second lens group G2 having negative refracting power consists of a single negative meniscus lens concave on its object side, and an aperture stop is designed to be movable along with the second lens group G2. The third lens group G3 having positive refracting power consists of a cemented doublet composed of a thick negative meniscus lens convex on its object side and a double-convex positive lens. The fourth lens group G4 having negative refracting power consists of a non-cemented doublet composed of a negative meniscus lens having a strong concave surface on its object side and a positive meniscus lens convex on its image side, and one negative meniscus lens convex on its image side. One aspherical surface is used for the object-side surface of the double-convex positive lens in the first lens group G1, one aspherical surface is used for the object-side surface of the negative meniscus lens in the second lens group G2, and one aspherical surface is used for the surface of the cemented doublet, which is located to the image side in the third lens group G3. In the fourth lens group G4 two aspherical surfaces are used, one for the surface located nearest to the object side and another for the strong concave surface of the final negative meniscus lens.

Figure 44:
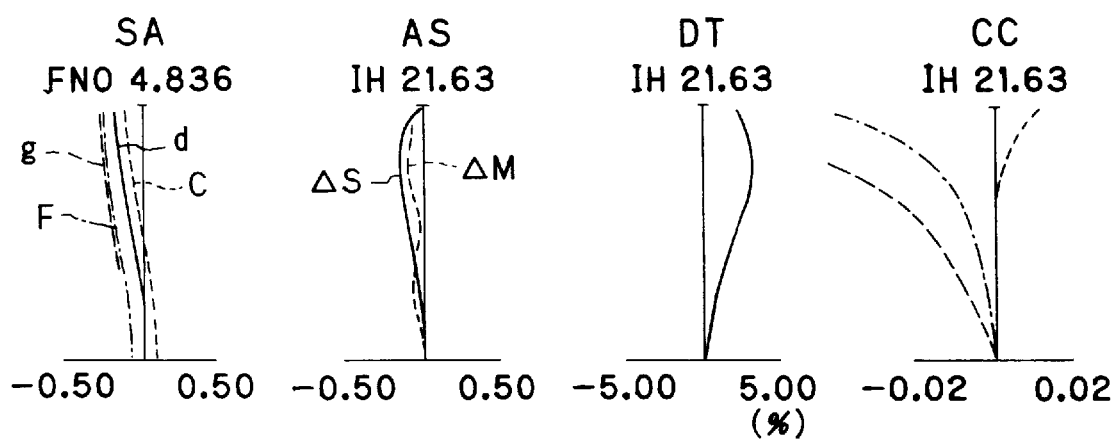
FIGS. 44(a), 44(b) and 44(c) are aberration diagrams for Example 22 of the invention.
Figure 44:
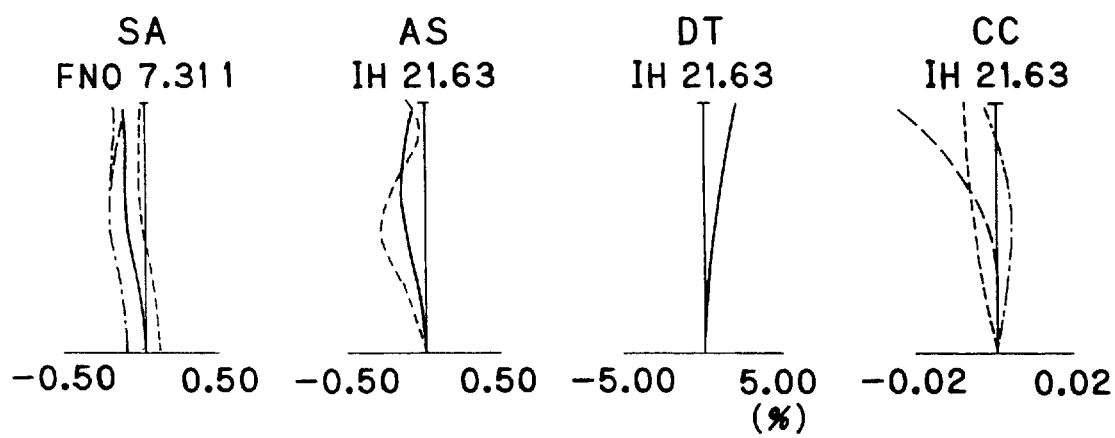
Figure 44:
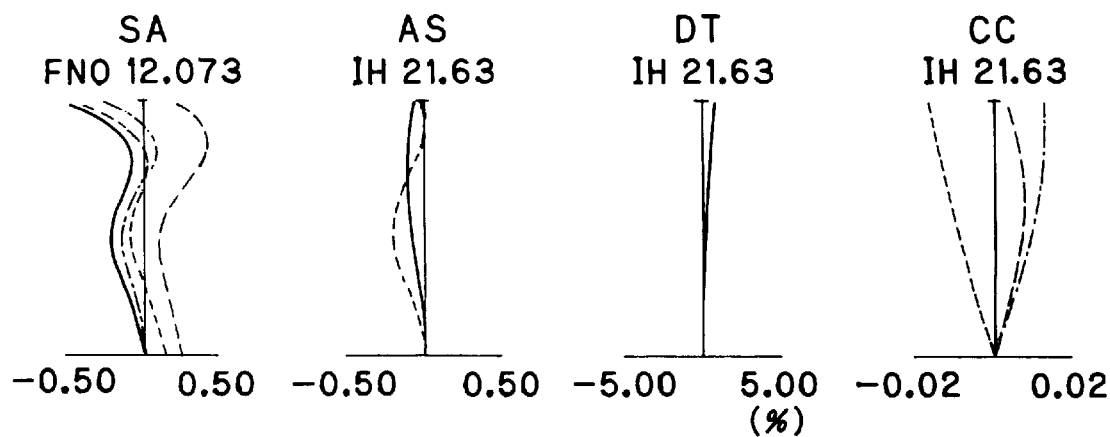

The aberration diagrams for this example are shown in FIGS. 44(*a*), 44(*b*) and 44(*c*). The overall length of the zoom lens system according to the instant example is reduced at the wide-angle end. The telephoto end is 0.658 at the telephoto end.

EXAMPLE 23

Figure 45:
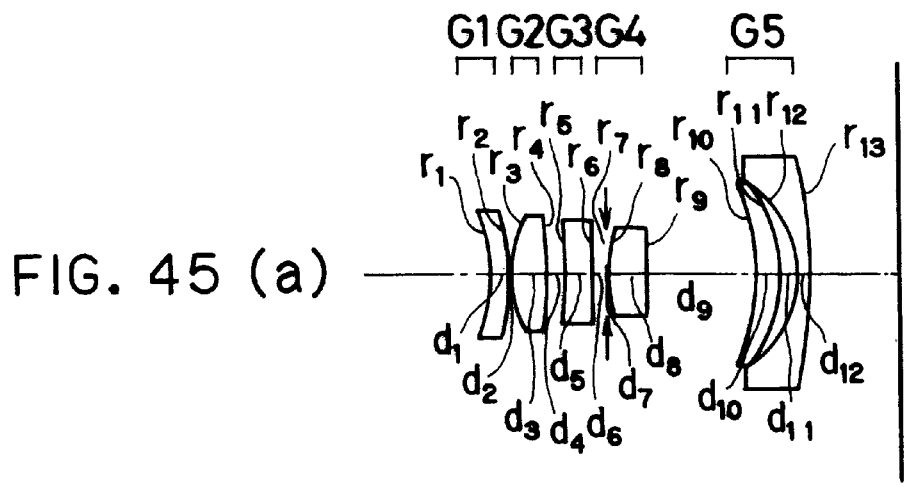
FIGS. 45(a), 45(b) and 45(c) are sectional views of the lens arrangement according to Example 23 of the zoom lens system of the invention.
Figure 45:
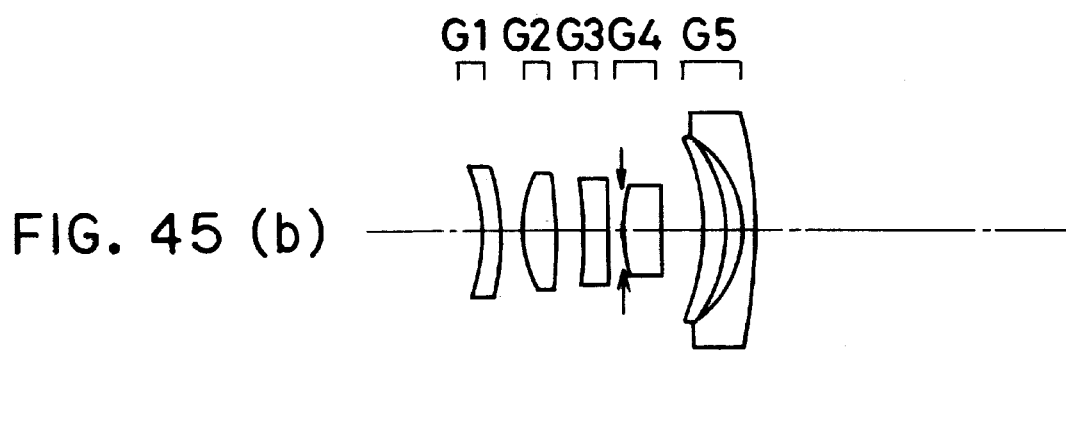
Figure 45:
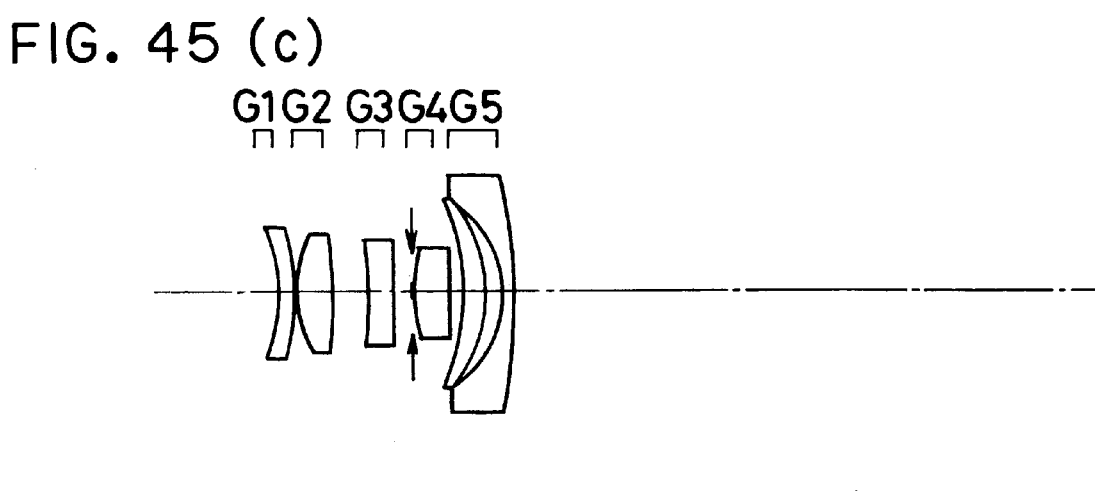

Example 23 is directed to a zoom lens system having a focal length of 38.06 to 102.24 mm and an F-number of 4.6 to 11.37. As shown in FIGS. 45(*a*), 45(*b*) and 45(*c*), the instant zoom lens system is of five-group construction or −+−+− refracting power construction in order from its object side. Each lens group is designed to move independently from the wide-angle end to the telephoto end of the lens system.

Figure 46:
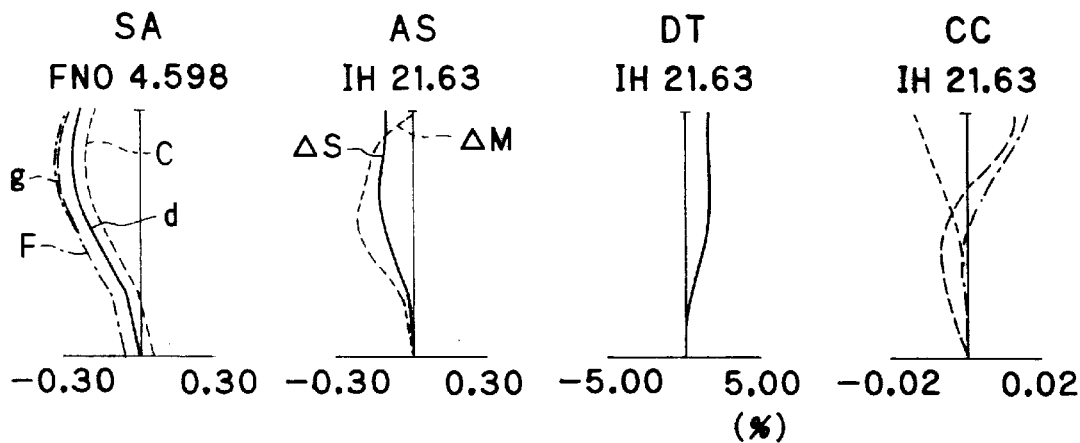
FIGS. 46(a), 46(b) and 46(c) are aberration diagrams for Example 23 of the invention.
Figure 46:
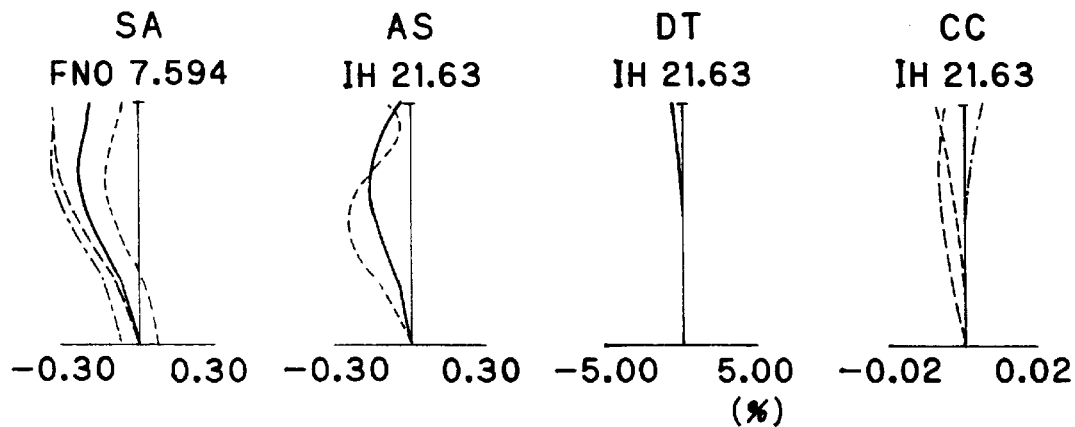
Figure 46:
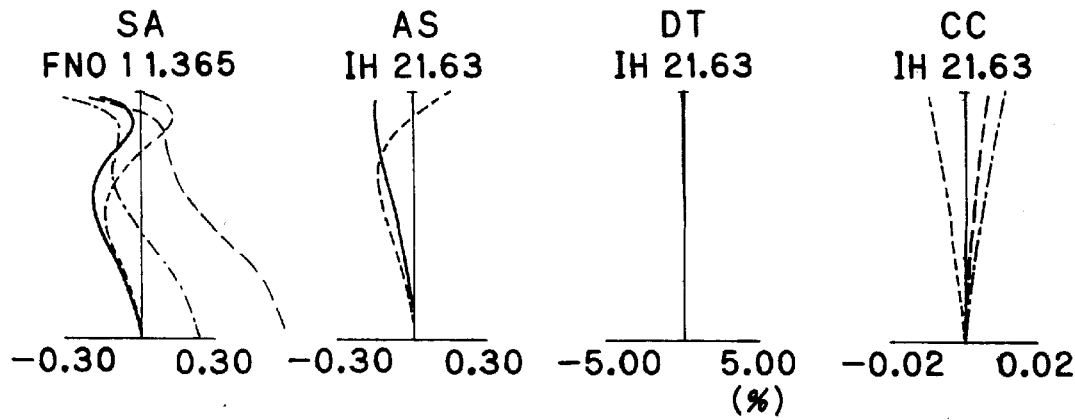

The first lens group G1 consists of one negative meniscus lens having a strong concave surface on its object side. The second lens group G2 consists of one double-convex positive lens, the third lens group G3 consists of one negative meniscus lens convex on its image side, and the fourth lens group G4 consists of one double-convex positive lens, with an aperture stop located in front thereof. The fifth lens group G5 consists of a positive meniscus lens convex on its image side and a negative meniscus lens having a strong concave surface on its object side or two lenses in all. Two aspherical surface are used for both surfaces of the negative meniscus lens in the first lens group G1. One aspherical surface is used for the object-side surface of the double-convex positive lens in the second lens group G2, one aspherical surface is used for the object-side surface of the negative meniscus lens in the third lens group G3 and one aspherical surface is used for the image-side surface of the double-convex positive lens in the fourth lens group G4. In the fifth lens group G5 two aspherical surfaces are used, one for the object-side surface of the positive meniscus lens and another for the object-side surface of the negative meniscus lens. Seven aspherical surfaces in all are used in the instant example. The aberration diagrams for this example are shown in FIGS. 46(*a*), 46(*b*) and 46(*c*).

In the instant example, the overall length of the zoom lens system is shortest at the wide-angle end and longest at the telephoto end. The instant zoom lens system of five-group construction has a zoom ratio of up to 3, and has a high performance potential while more aspherical surfaces are used. However, the amount of movement of the final or fifth lens group G5 having negative refracting power is more reduced than that used so far in the art. The telephoto ratio is 0.857 at the telephoto end, which is a value larger than contemplated in the present invention. However, the instant zoom lens system has a simplified lens arrangement with a long back focus at the wide-angle end, resulting in a reduction in the lens diameter of the lens arrangement.

EXAMPLE 24

Figure 47:
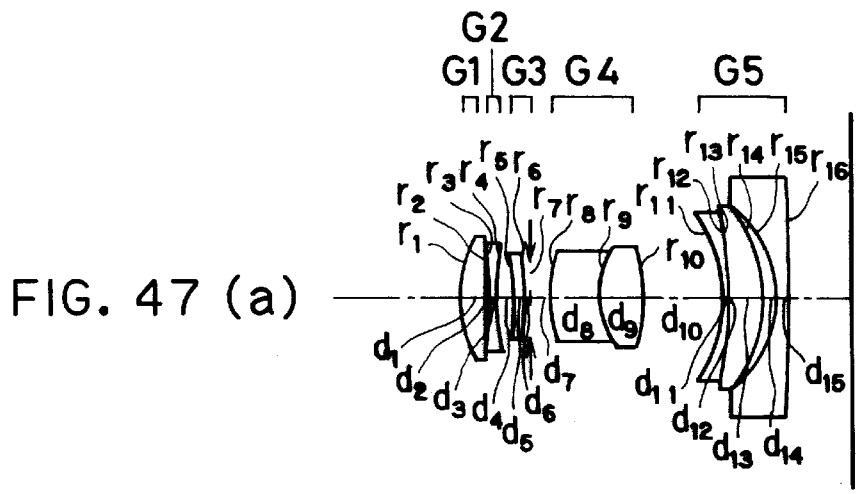
FIGS. 47(a), 47(b) and 47(c) are sectional views of the lens arrangement according to Example 24 of the zoom lens system of the invention.
Figure 47:
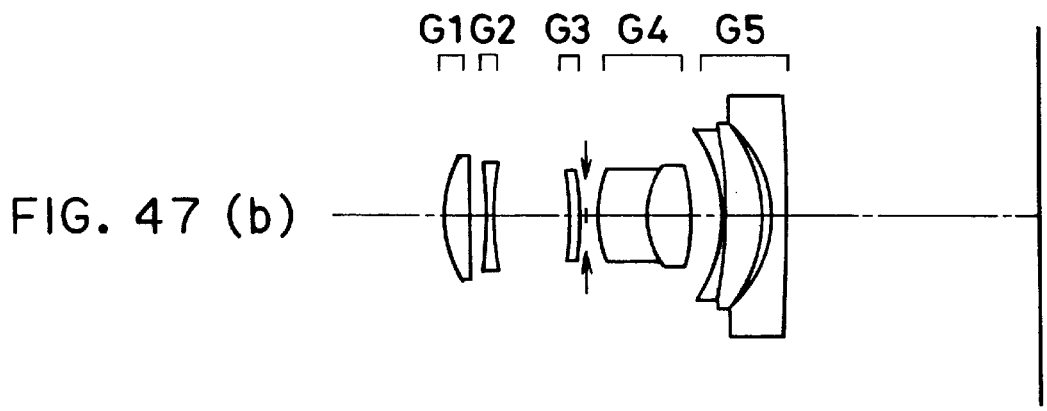
Figure 47:
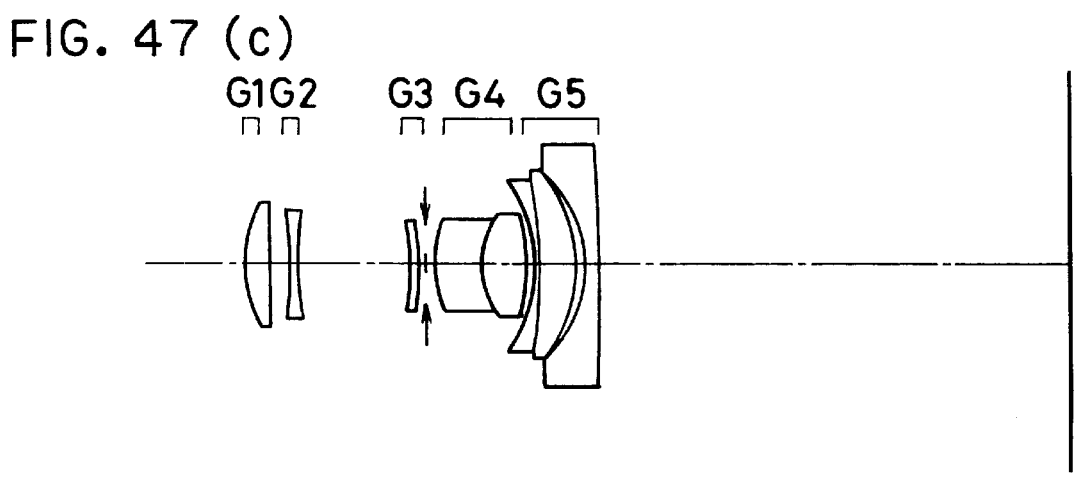

Example 24 is directed to a zoom lens system having a focal length of 38 to 115 mm and an F-number of 4.28 to 10.92. As shown in FIGS. 47(*a*), 47(*b*) and 47(*c*), the instant zoom lens system is of five-group construction or +−−+− refracting power construction in order from its object side. Each lens group is designed to move independently from the wide-angle end to the telephoto end of the lens system.

The first lens group G1 consists of one double-convex positive lens having a strong convex surface on its object side. The second lens group G2 consists of one double-concave negative lens, and the third lens group G3 consists of one negative meniscus lens that is convex on its image side and has a small refracting power, with aperture stops located in front and the rear thereof. The fourth lens group G4 consists of a cemented doublet composed of a negative meniscus lens convex on its object side and a double-convex positive lens or two lenses in all. The fifth lens group G5 consists of a non-cemented doublet composed of a negative meniscus lens convex on its image side and a positive meniscus lens convex on its image side and a negative meniscus lens having a strong concave surface on its object side or three lenses in all. Two aspherical surfaces having an effect on correction of distortion are provided, one for the object-side surface of the double-convex positive lens in the first lens group G3 and another for the surface located nearest to the image side in the fourth lens group G4. Three additional aspherical surfaces are used to improve the peripheral performance of the zoom lens system at a wide-angle zone, one for the surface located nearest to the image side in the fourth lens group G4, one for the surface located nearest to the object side in the fifth lens group G5, and one for the object-side surface of the negative meniscus lens located on the image side. Thus, five aspherical surfaces in all are used.

Figure 48:
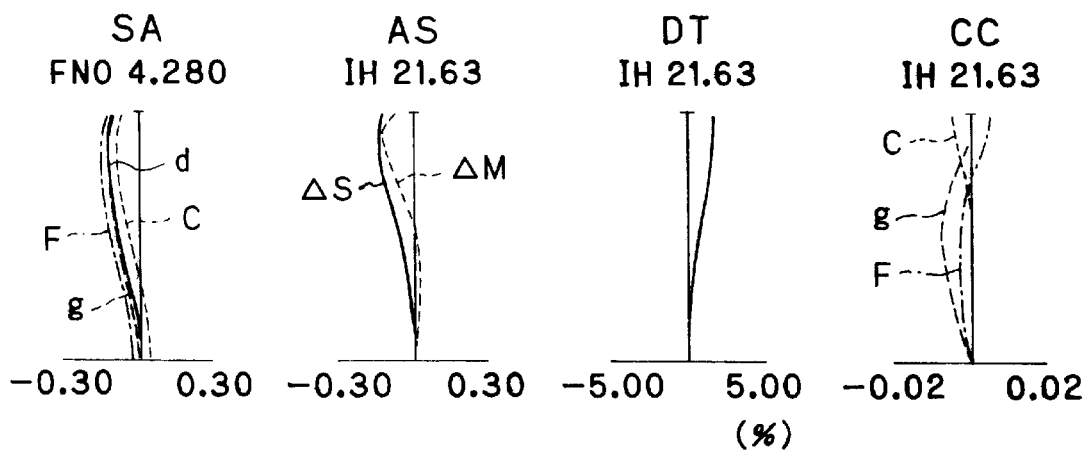
FIGS. 48(a), 48(b) and 48(c) are aberration diagrams for Example 24 of the invention.
Figure 48:
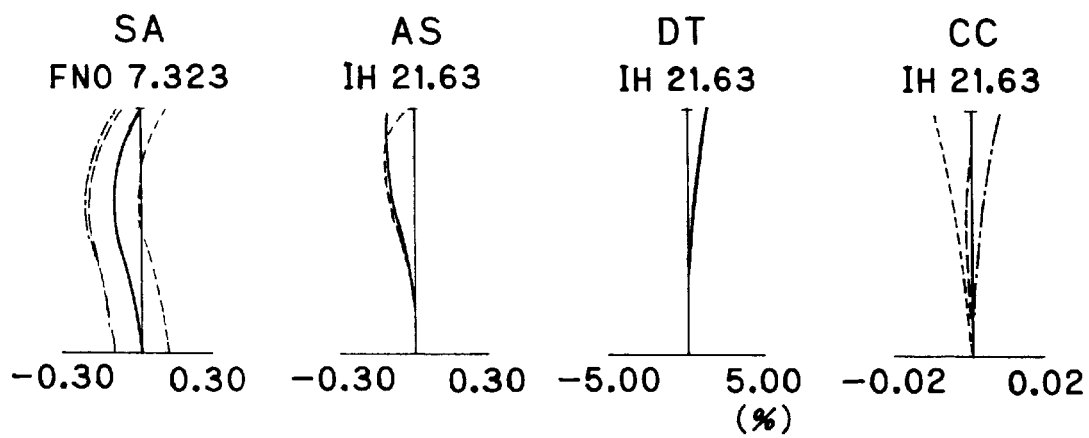
Figure 48:
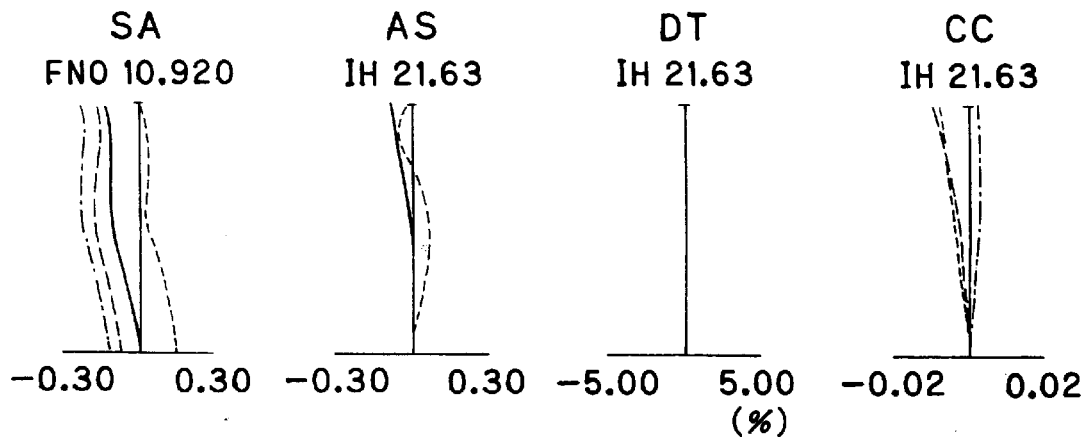

The aberration diagrams for this example are shown in FIGS. 48(*a*), 48(*b*) and 48(*c*). The telephoto ratio of this example at the telephoto end is 0.833. As can be depicted from FIGS. 48(*a*) to 48(*c*), all aberrations are very satisfactorily corrected.

EXAMPLE 25

Figure 49:
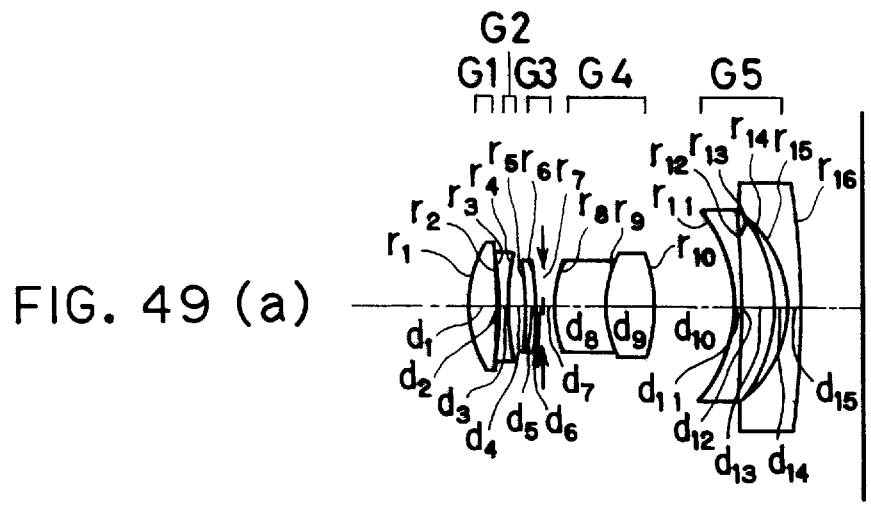
FIGS. 49(a), 49(b) and 49(c) are sectional views of the lens arrangement according to Example 25 of the zoom lens system of the invention.
Figure 49:
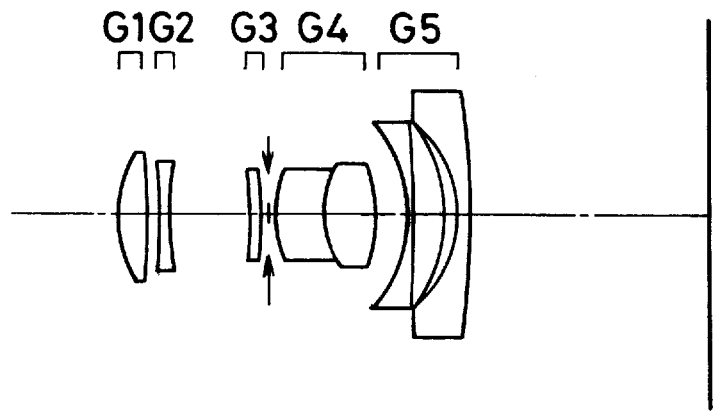
Figure 49:
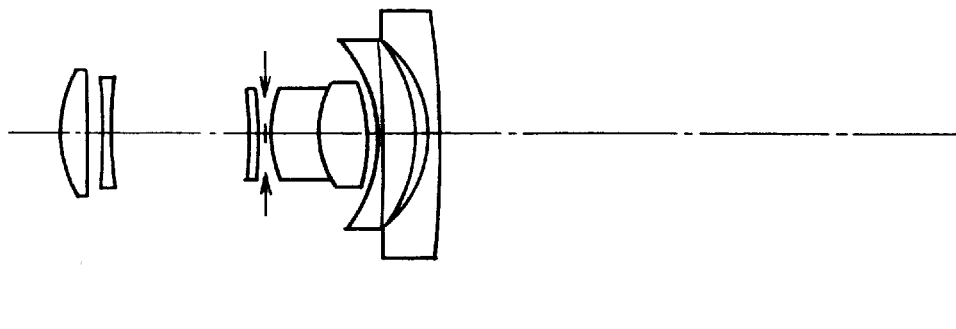

Example 25 is directed to a zoom lens system having much the same lens arrangement as in Example 24. However, the focal length is from 38.9 to 131.1 mm with an F-number of 4.33 to 11.8. As shown in FIGS. 49(*a*), 49(*b*) and 49(*c*), the instant zoom lens system is of five-group construction or +−−−+− refracting power construction in order from its object side. Each lens group moves independently from the wide-angle end to the telephoto end of the zoom lens system.

The first lens group G1 consists of one double-convex positive lens, the second lens group G2 consists of one double-concave negative lens, and the third lens group G3 consists of one negative meniscus lens that is convex on its image side and has a small refracting power, with apertures stops located in front and the rear thereof. The fourth lens group G4 consists of a cemented double composed of a negative meniscus lens convex on its object side and a double-convex positive lens or two lenses in all. The fifth lens group G5 consists of a non-cemented doublet composed of a negative meniscus lens convex on its image side and a positive meniscus lens convex on its image side and a negative meniscus lens having a strong concave surface on its object side or three lenses in all. One aspherical surface is used for the object-side surface of the double-convex positive lens in the first lens group G1, one aspherical surface is used for the object-side surface of the negative meniscus lens in the third lens group G3, and one aspherical surface is used for the surface located nearest to the image in the fourth lens group G4. In the fifth lens group G5 two aspherical surfaces are used, one for the surface located nearest to the object side and another for the object-side surface of the negative meniscus lens located on the image side. Thus, five aspherical surfaces in all are used.

Figure 50:
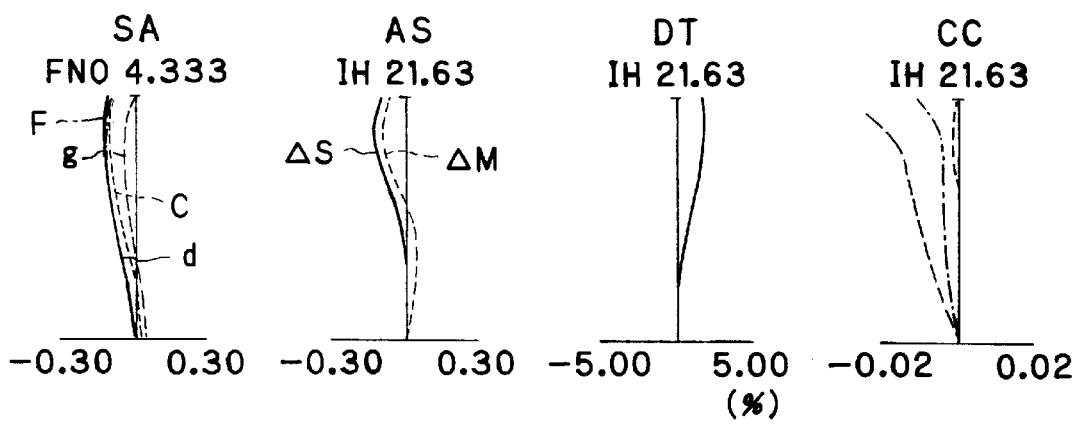
FIGS. 50(a), 50(b) and 50(c) are aberration diagrams for Example 25 of the invention.
Figure 50:
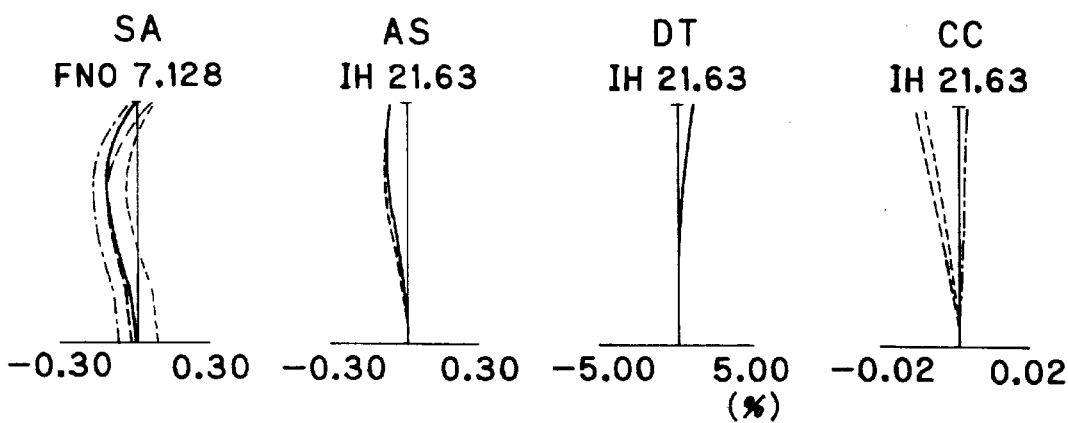
Figure 50:
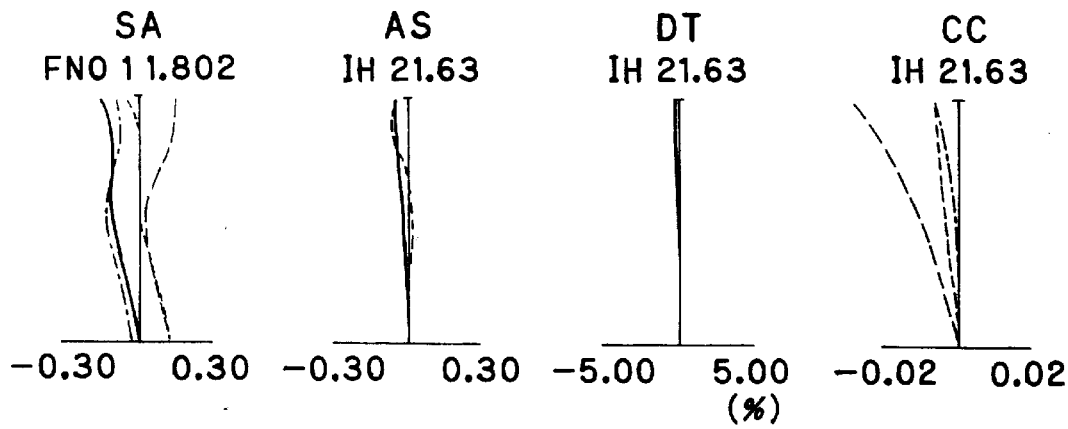

The aberration diagrams for this example are shown in FIGS. 50(a), 50(b) and 50(c). The telephoto ratio of this example at the telephoto end is 0.78 smaller than that contemplated in the present invention. As can be predicted from FIGS. 50(a) to 50(c), each aberration is very satisfactorily corrected.

EXAMPLE 26

Figure 51:
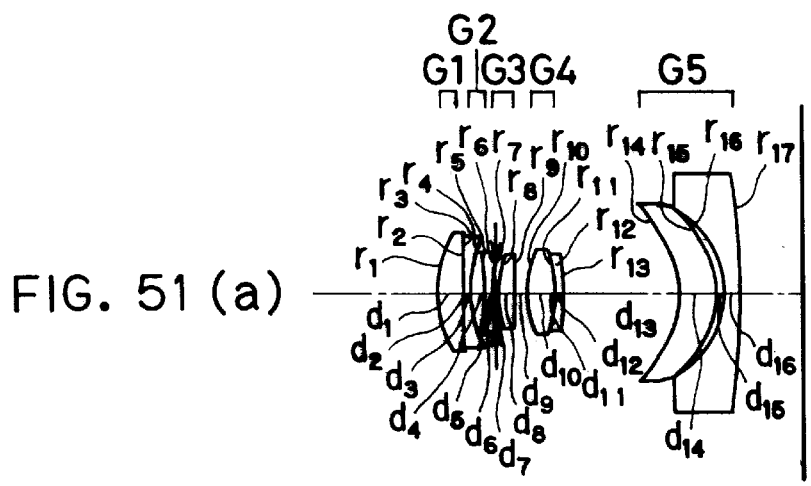
FIGS. 51(a), 51(b) and 51(c) are sectional views of the lens arrangement according to Example 26 of the zoom lens system of the invention.
Figure 51:
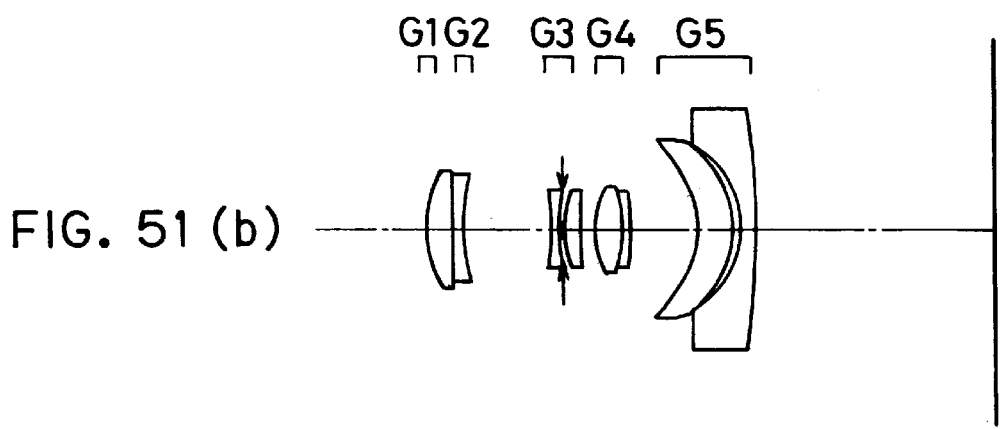
Figure 51:
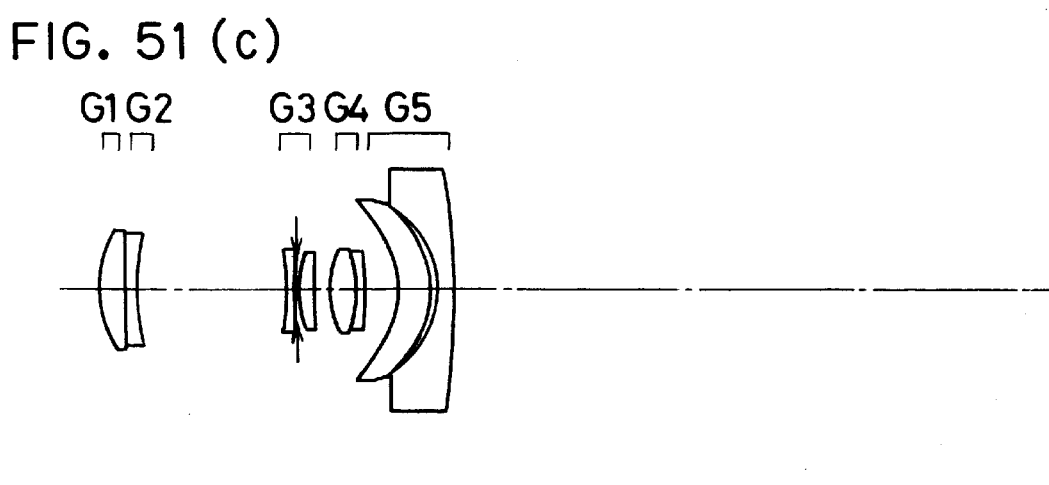

Example 26 is directed to a telephoto type zoom lens system having a focal length of 38.9 to 150 mm and an F-number of 4.79 to 13.38. As shown in FIGS. 51(a), 51(b) and 51(c), the instant zoom lens system is of five-group construction or +−−+− refracting power construction in order form its object side. Each lens group moves independently from the wide-angle end to the telephoto end of the zoom lens system.

The first lens group G1 consists of one positive meniscus lens convex on its object side, the second lens group G2 consists of one negative meniscus lens convex on its object side, and the third lens group G3 consists of two lenses or a double-concave negative lens and a positive meniscus lens convex on its object side with an aperture stop located between both lenses. The fourth lens group G4 consists of two lenses or a non-cemented doublet composed of a double-convex positive lens and a negative meniscus lens convex on its image side. The fifth lens group G5 consists of two lenses or a non-cemented doublet composed of a positive meniscus lens convex on its image side and a negative meniscus lens convex on its image side. One aspherical surface is used for the object-side surface of the positive meniscus lens in the first lens group G1, and one aspherical surface is used for the image-side surface of the negative meniscus lens in the second lens group G2. In the third lens group G3 three aspherical surfaces are used, one for the object-side surface of the double-concave negative lens and the remaining two for both surfaces of the positive meniscus lens. In the fourth lens group G4 one aspherical surface is used for the surface located nearest to the image side. In the fifth lens group G5 three aspherical surfaces are used, two for both surfaces of the positive meniscus lens and the remaining one for the object-side surface of the negative meniscus lens. Thus, nine aspherical surfaces in all are used.

Figure 52:
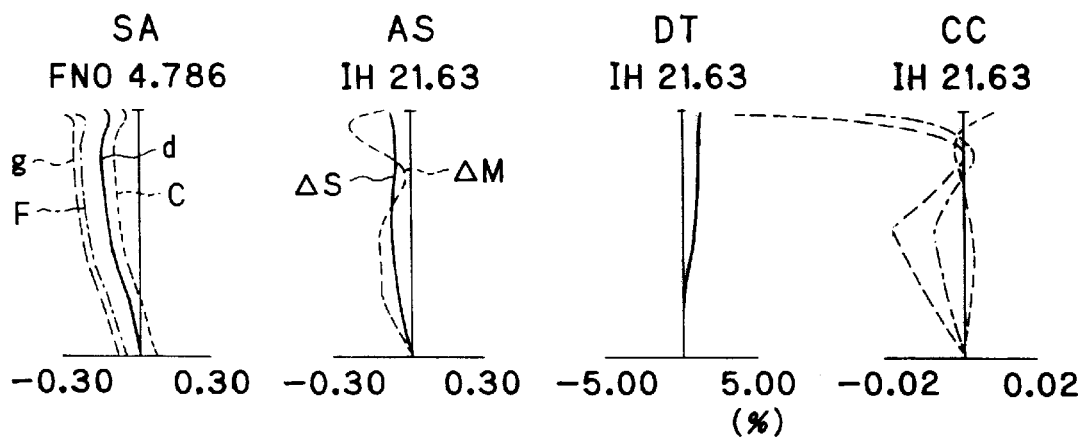
FIGS. 52(a), 52(b) and 52(c) are aberration diagrams for Example 26 of the invention.
Figure 52:
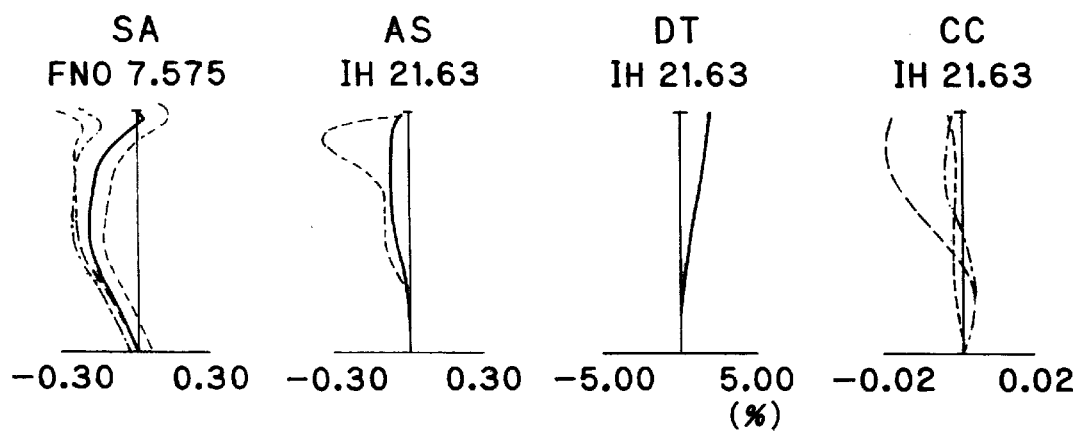
Figure 52:
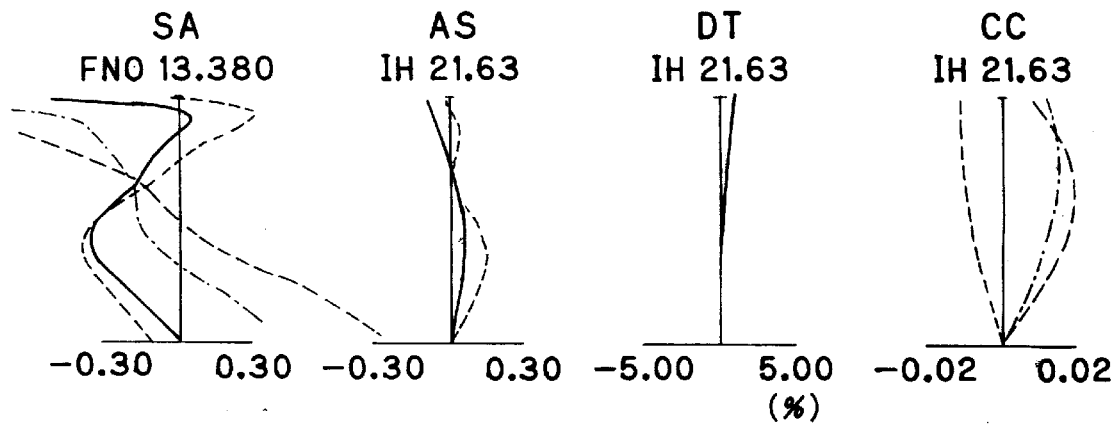

The aberration diagrams for this example are shown in FIGS. 52(a), 52(b) and 52(c). The telephoto ratio of this example at the telephoto end is 0.734. As can be seen from FIGS. 52(a) to 52(c), higher-order residual aberrations are contained in spherical aberrations at the telephoto end. To maintain performance at the telephoto end, too, the construction of the final lens group G5 is of importance.

EXAMPLE 27

Example 27 is directed to a zoom lens system having a focal length of 38.9 to 152 mm and an F-number of 4.57 to 13.16. As shown in FIGS. 53(a), 53(b) and 53(c), the instant zoom lens system is of five-group construction or +−++− refracting power construction in order form its object side. Each lens group moves independently from the wide-angle end to the telephoto end of the zoom lens system.

The first lens group G1 consists of three lenses or a negative meniscus lens concave on its object side and a non-cemented doublet composed of a double-convex positive lens and a negative meniscus lens concave on its object side. The second lens group G2 consists of one double-concave negative lens, and the third lens group G3 consists of a double-convex positive lens with an aperture stop located in front thereof. The fourth lens group G4 consists of two lenses or a cemented doublet composed of a negative meniscus lens convex on its object side and a double-convex positive lens. The fifth lens group G5 consists of three lenses or a non-cemented doublet composed of a negative meniscus lens convex on its image side and a positive meniscus lens convex on its image side and a negative meniscus lens convex on its image side. In the first lens group G1, one aspherical surface is used for the object-side surface of the double-convex positive lens. In the second lens group G2, one aspherical surface is used for the object-side surface of the double-concave negative lens. In the third lens group G3, one aspherical surface is used for the object-side surface of the double-convex positive lens. In the fourth lens group G4, one aspherical surface is used for the surface located nearest to the image side. In the fifth lens group G5, two aspherical surfaces are used, one for the object-side surface of the negative meniscus lens and another for the image-side surface of the positive meniscus lens. Thus, six aspherical surfaces are used.

Figure 54:
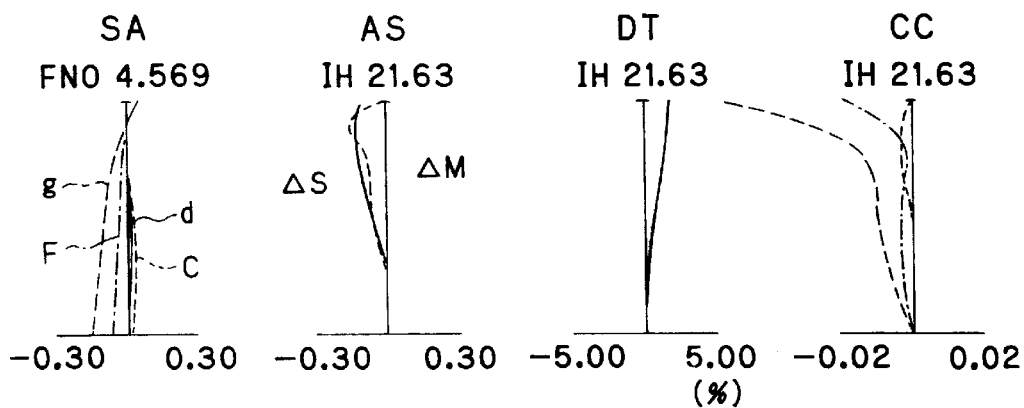
FIGS. 54(a), 54(b) and 54(c) are aberration diagrams for Example 27 of the invention.
Figure 54:
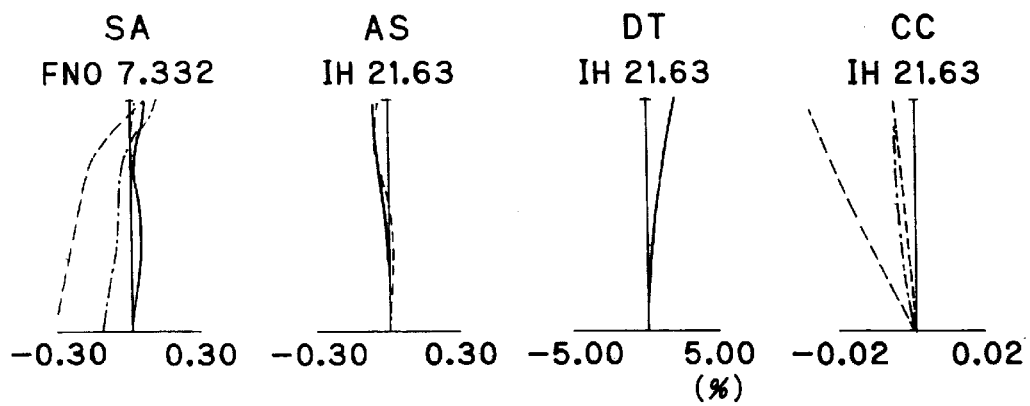
Figure 54:
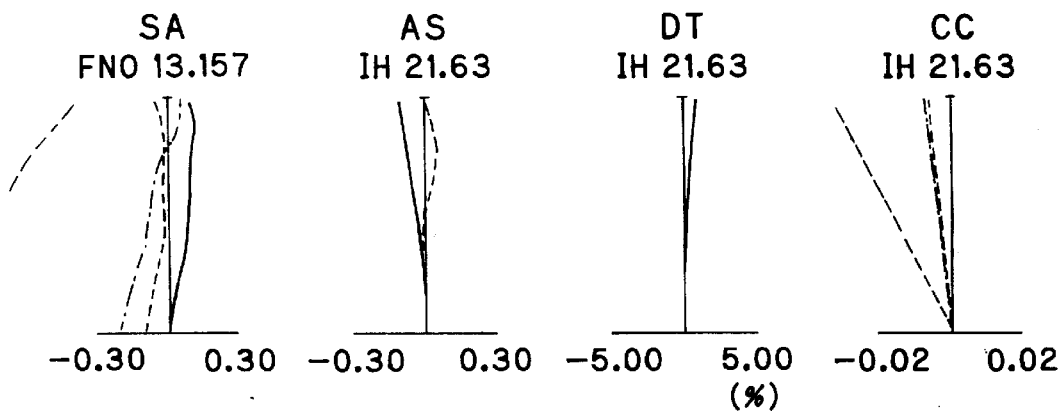

The aberration diagrams for this example are shown in FIGS. 54(a), 54(b) and 54(c). The telephoto ratio of this zoom lens system at the telephoto end is 0.667.

EXAMPLE 28

Figure 55:
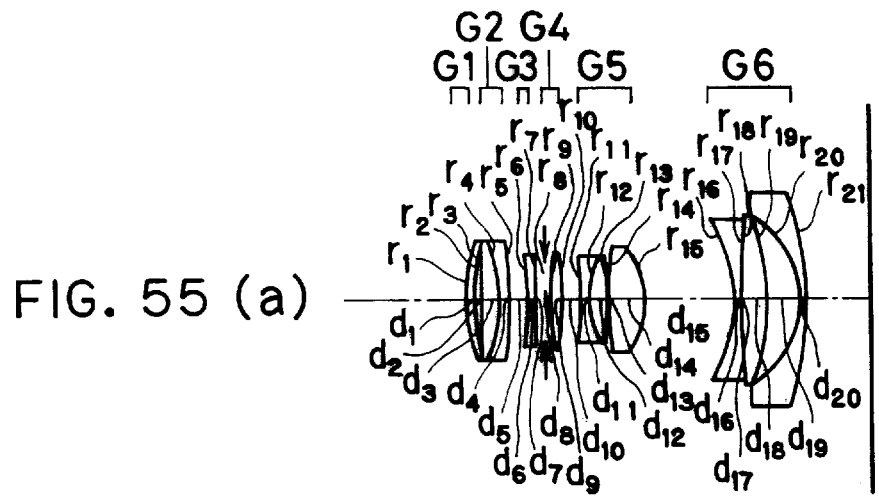
FIGS. 55(a), 55(b) and 55(c) are sectional views of the lens arrangement according to Example 28 of the zoom lens system of the invention.
Figure 55:
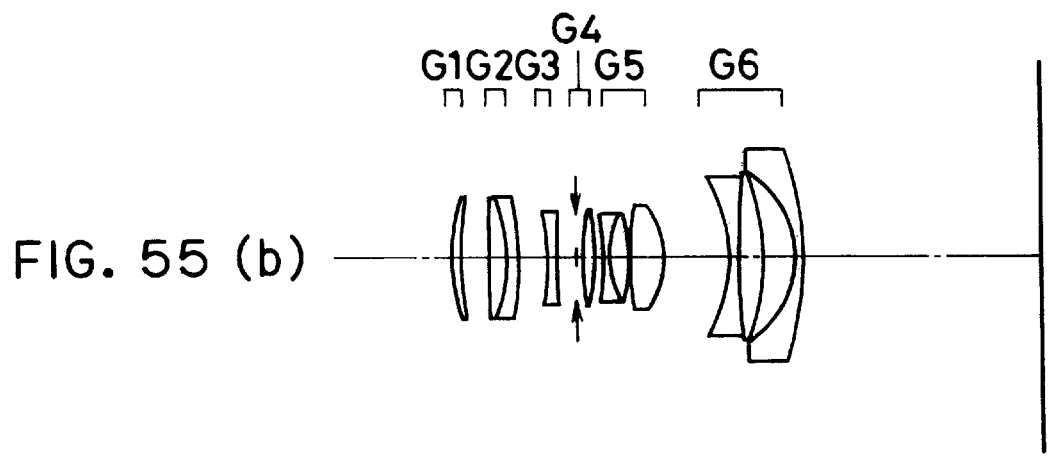
Figure 55:
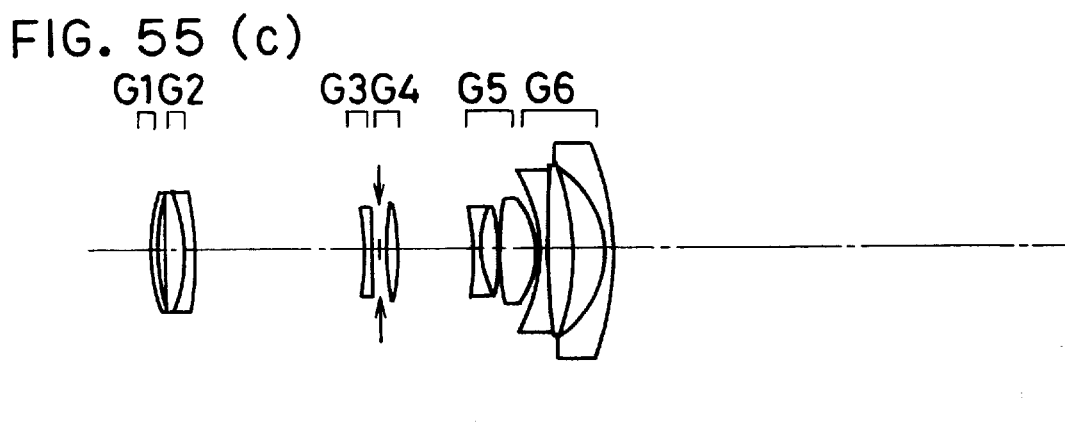

Example 28 is directed to a zoom lens system having a focal length of 38.9 to 195.5 mm and an F-number of 4.68 to 15.16. As shown in FIGS. 55(a), 55(b) and 55(c), the instant zoom lens system is of six-group construction or ++−++31 refracting power construction in order form its object side. Each lens group moves independently from the wide-angle end to the telephoto end of the zoom lens system.

The first lens group G1 consists of one positive meniscus lens convex on its object side, the second lens group G2 consists of two lenses or a cemented doublet composed of a double-convex positive lens and a negative meniscus lens concave on its object side, the third lens group G3 consists of one double-concave negative lens, and the fourth lens group G4 consists of one double-convex positive lens with an aperture stop located in front thereof. The fifth lens group G5 consists of three lenses or a cemented doublet composed of a double-concave negative lens and a double-convex positive lens and a double-convex positive lens. The sixth lens group G6 consists of three lenses or a non-cemented doublet composed of a double-concave negative lens and a double-convex positive lens and a negative meniscus lens convex on its image side. In the second lens group G2 two aspherical surfaces are used, one for the surface located nearest to the object side and another for the surface located nearest to the image side. In the third lens group G3 one aspherical surface is used for the object-side surface of the double-concave lens. In the fourth lens group G4 one aspherical surface is used for the object-side surface of the double-convex positive lens. In the fifth lens group G5 two aspherical surfaces are used, one for the surface of the cemented doublet located nearest to the image side and another for the image-side surface of the double-convex positive lens. In the sixth lens group G6 three aspherical surfaces are used, one for the object-side surface of the double-concave negative lens, one for the image-side surface of the double-convex positive lens and one for the object-side surface of the negative meniscus lens. Thus, nine aspherical surfaces in all are used.

Figure 56:
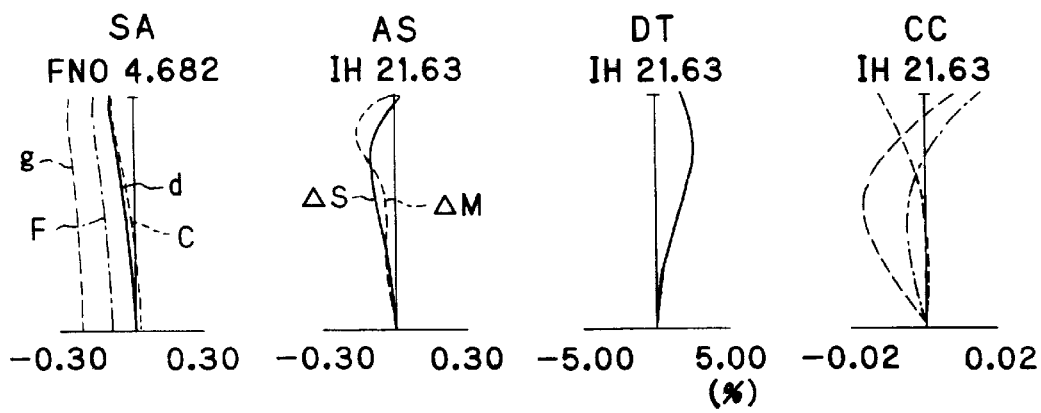
FIGS. 56(a), 56(b) and 56(c) are aberration diagrams for Example 28 of the invention.
Figure 56:
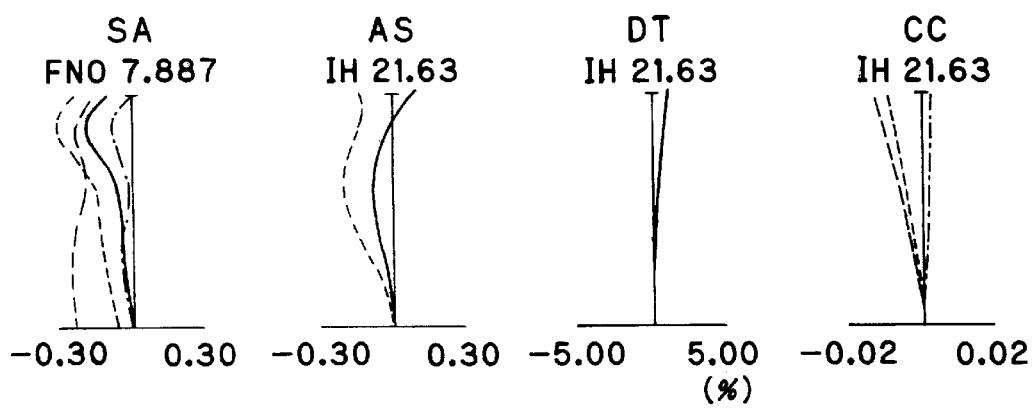
Figure 56:
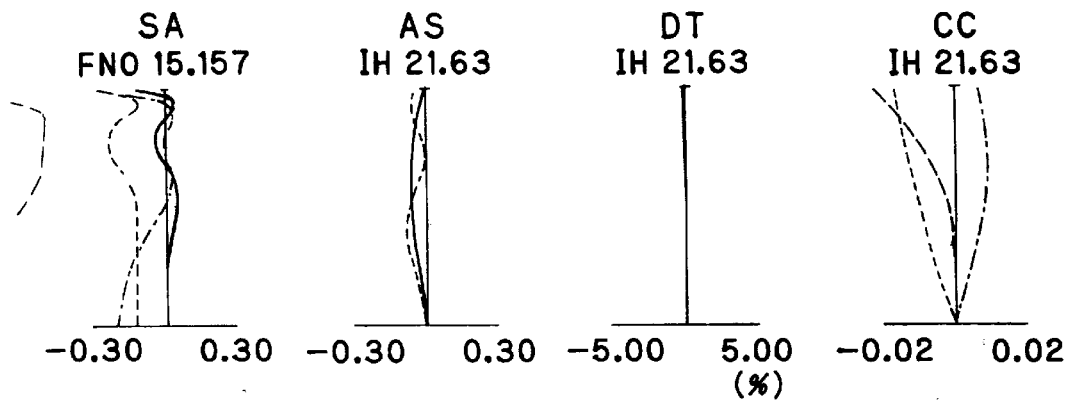

The aberration diagrams for this example are shown in FIGS. 56(a), 56(b) and 56(c). The telephoto ratio of this zoom lens system at the telephoto end is 0.538.

EXAMPLE 29

Example 29 is directed to a zoom lens system having a focal length of 38.9 to 198 mm and an F-number of 4.81 to 15.35. The lens arrangement is the same as in Example 28 with the exception that the fifth lens group G5 is divided into two movable subgroups; that is, this zoom lens system is on the whole of seven-group construction. As shown in FIGS. 57(a), 57(b) and 57(c), the instant zoom lens system is of seven-group construction or ++–+–+– refracting power construction in order form its object side. Each lens group moves independently from the wide-angle end to the telephoto end of the zoom lens system.

The first lens group G1 consists of one positive meniscus lens convex on its object side, the second lens group G2 consists of two lenses or a cemented doublet composed of a positive meniscus lens convex on its image side and a negative meniscus lens convex on its image side, the third lens group G3 consists of one negative meniscus lens convex on its image side, and the fourth lens group G4 consists of one double-convex positive lens with an aperture stop located in front thereof. The fifth lens group G5 consists of two lenses or a cemented doublet composed of a double-concave negative lens and a double-convex positive lens. The sixth lens group G6 consists of one double-convex positive lens. The seventh lens group G7 consists of three lenses or a non-cemented doublet composed of a double-concave negative lens and a double-convex positive lens and a negative meniscus lens convex on its image side. In the second lens group G2 two aspherical surfaces are used, one for the surface located nearest to the object side and another for the surface located nearest to the image side. In the third lens group G3 one aspherical surface is used for the object-side surface of the negative meniscus lens. In the fourth lens group G4 one aspherical surface is used for the object-side surface of the double-convex positive lens. In the fifth lens group G5 one aspherical surface is used for the surface of the cemented doublet located nearest to the image side. In the sixth lens group G6 one aspherical surface is used for the image-side surface of the double-convex positive lens. In the seventh lens group G7 three aspherical surfaces are used, one for the object-side surface of the double-concave negative lens, one for the image-side surface of the double-convex positive lens and one for the object-side surface of the negative meniscus lens. Thus, nine aspherical surfaces in all are used.

Figure 58:
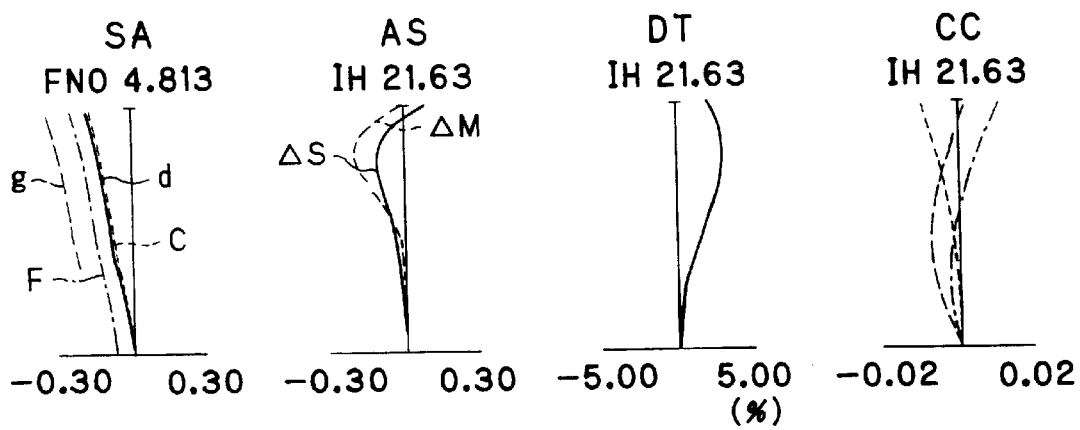
FIGS. 58(a), 58(b) and 58(c) are aberration diagrams for Example 29 of the invention.
Figure 58:
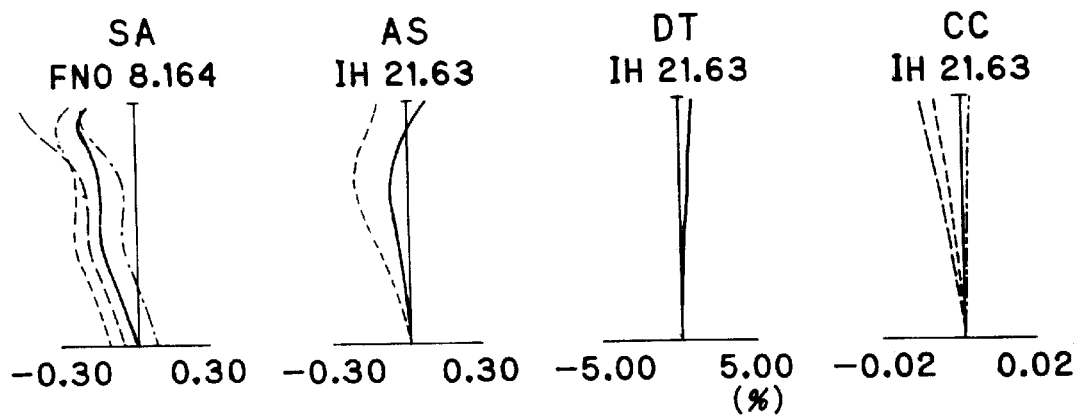
Figure 58:
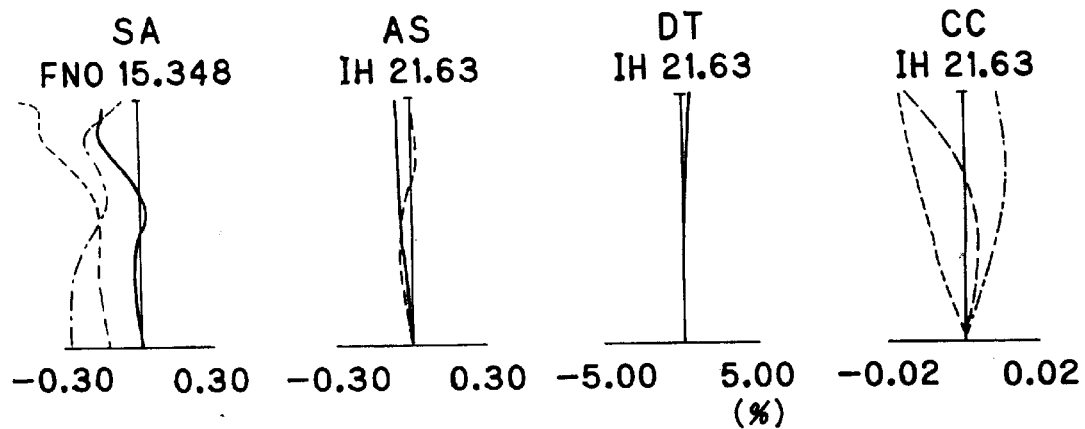

The aberration diagrams for this example are shown in FIGS. 58(a), 58(b) and 58(c). The telephoto ratio of this zoom lens system at the telephoto end is 0.55. From FIGS. 58(a) to 58(c), it is evident that correction of chromatic aberrations at the telephoto end is improved.

EXAMPLE 30

Figure 59:
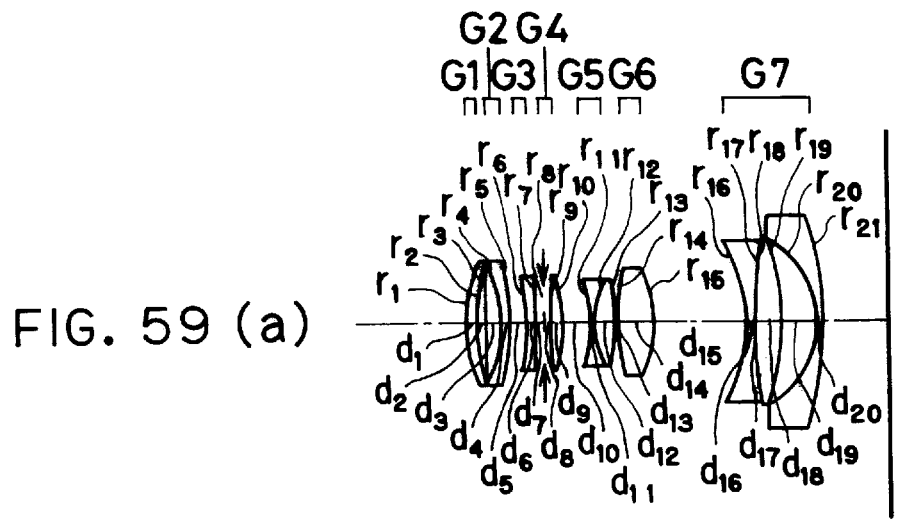
FIGS. 59(a), 59(b) and 59(c) are sectional views of the lens arrangement according to Example 30 of the zoom lens system of the invention.
Figure 59:
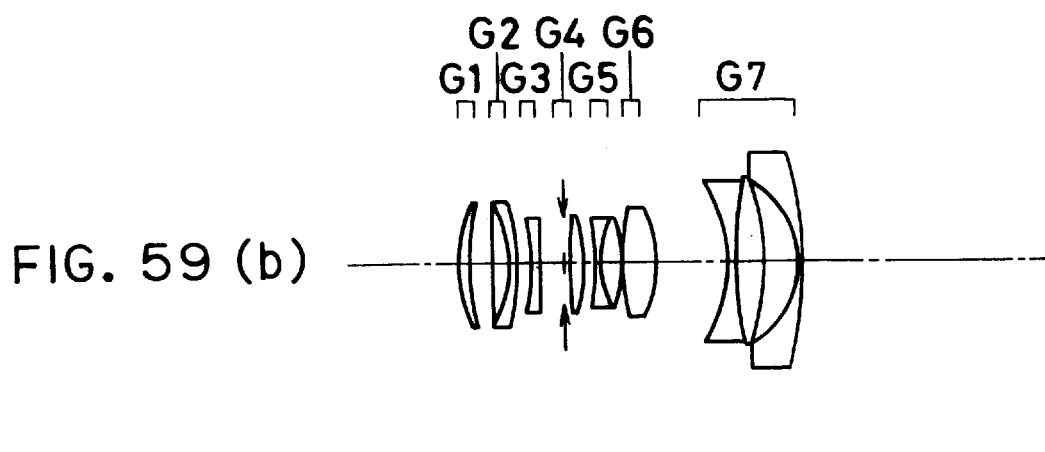
Figure 59:
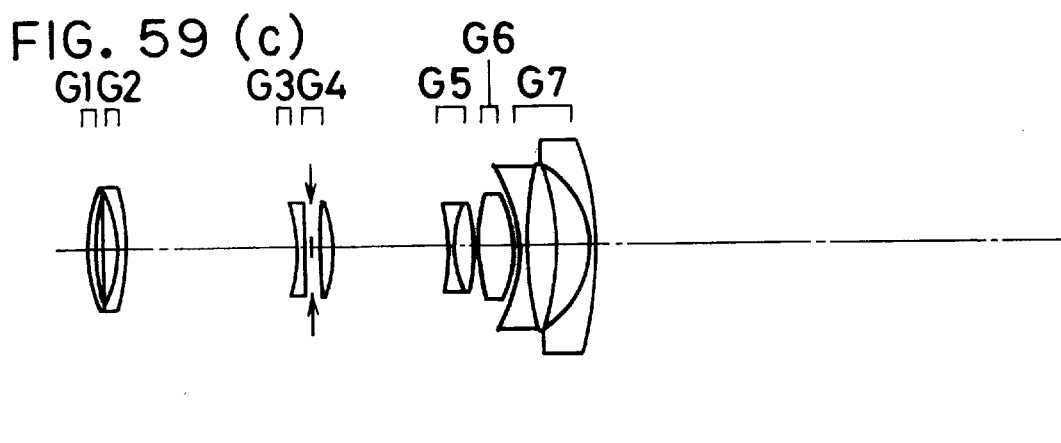

Example 30 is directed to a zoom lens system having a focal length of 38.9 to 201.58 mm and an F-number of 4.8 to 15.63. The lens arrangement is substantially the same as in Example 29; that is, this zoom lens system is on the whole of seven-group construction. As shown in FIGS. 59(a), 59(b) and 59(c), the instant zoom lens system is of seven-group construction or ++–+–+– refracting power construction in order form its object side. Each lens group moves independently from the wide-angle end to the telephoto end of the zoom lens system.

The first lens group G1 consists of one positive meniscus lens convex on its object side, the second lens group G2 consists of two lenses or a cemented doublet composed of a positive meniscus lens convex on its image side and a negative meniscus lens convex on its image side, the third lens group G3 consists of one negative meniscus lens convex on its image side, and the fourth lens group G4 consists of one double-convex positive lens with an aperture stop located in front thereof. The fifth lens group G5 consists of two lenses or a cemented doublet composed of a double-concave negative lens and a double-convex positive lens. The sixth lens group G6 consists of one double-convex positive lens. The seventh lens group G7 consists of three lenses or a non-cemented doublet composed of a double-concave negative lens and a double-convex positive lens and a negative meniscus lens convex on its image side. In the second lens group G2, two aspherical surfaces are used for the surfaces located nearest to the object and image sides. In the third lens group G3, one aspherical surface is used for the object-side surface of the negative meniscus lens. In the fourth lens group G4, one aspherical surface is used for the object-side surface of the double-convex positive lens. In the fifth lens group G5, one aspherical surface is used for the surface of the cemented doublet which is located nearest to the image side. In the sixth lens group G6, one aspherical surface is used for the image-side surface of the double-convex positive lens. In the seventh lens group G7, three aspherical surfaces are used, one for the object-side surface of the double-concave negative lens, one for the image-side surface of the double-convex positive lens and one for the object-side surface of the negative meniscus lens. Thus, nine aspherical surfaces in all are used.

Figure 60:
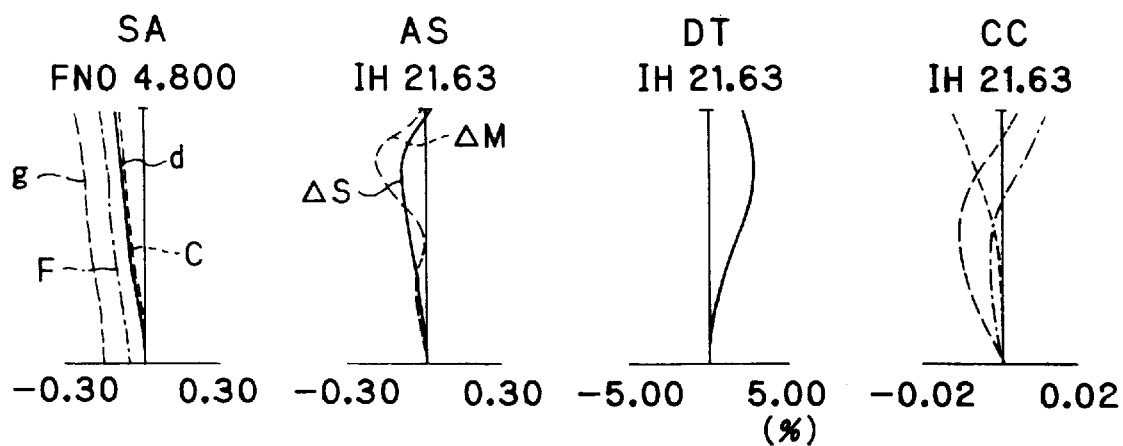
FIGS. 60(a), 60(b) and 60(c) are aberration diagrams for Example 30 of the invention.
Figure 60:
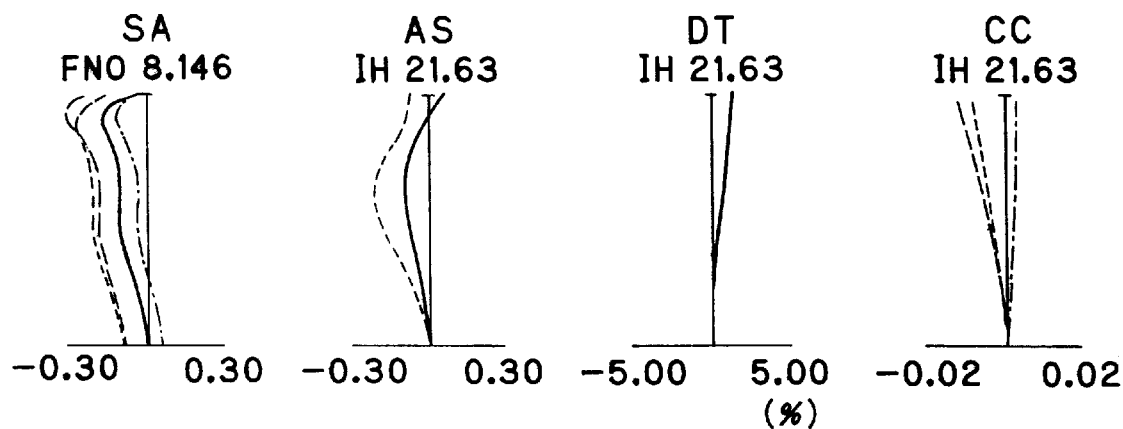
Figure 60:
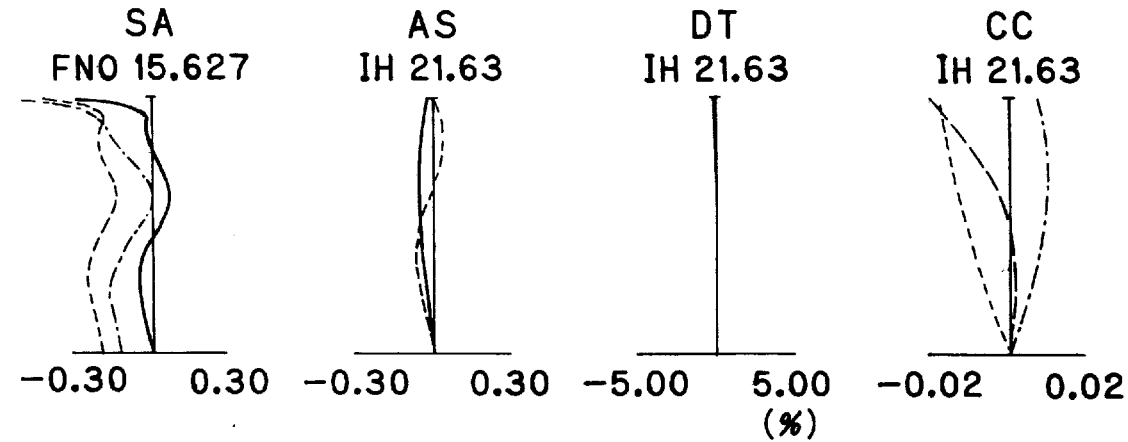

The aberration diagrams for this example are shown in FIGS. 60(a), 60(b) and 60(c). The telephoto ratio of the example at the telephoto end is 0.546.

Set out below are numerical data on Examples 1 to 30. The symbols used hereinafter but not hereinbefore have the following means:

f is the focal length of the zoom lens system, $F_{NO}$ is an F-number, $f_B$ is a back focus, WI is a wide-angle end, ST is an intermediate setting, TE is a telephoto end, $r_1, r_2, \ldots$ are the radii of curvature of lens surfaces, $d_1, d_2, \ldots$ are the separations between adjacent lens surfaces, $n_{d1}, n_{d2}, \ldots$ are the d-line indices of refraction of lenses, and $\upsilon_{d1}, \upsilon_{d2}, \ldots$ are the d-line Abbe's numbers of lenses.

In the data, length is given in mm. Here let x denote a positive direction of propagation of light and y represent a direction perpendicular to the optical axis. Then, aspherical shape is given by $$x=(y^2/r)/[1+\{1-(K+1)(y/r)^2\}^{1/2}]+A_4 y^4+A_6 y^4 A_6 y^6+A_8 y^8+A_{10} y^{10}$$

where r is the radius of paraxial curvature, K is a conical coefficient, and $A_4, A_6, A_8$ and $A_{10}$ are fourth-, sixth-, eighth- and tenth-order aspherical coefficients, respectively.

The values for conditions (I), (II) and (III)((3)–(12)) in each example are also given in Table 1.

EXAMPLE 1

| | | $f$ | $= 38.9 \sim 68.0 \sim 131.0$ | | |
|---|---|---|---|---|---|
| | | $F_{NO}$ | $= 4.86 \sim 7.08 \sim 11.59$ | | |
| | | $f_B$ | $= 7.12 \sim 23.17 \sim 56.13$ | | |
| $r_1 = 11.3217$ (Aspheric) | $d_1 = 2.5000$ | | $n_{d1} = 1.51633$ | | $v_{d1} = 64.14$ |
| $r_2 = -43.4496$ | $d_2 = 0.100$ | | | | |
| $r_3 = -45.6229$ | $d_3 = 1.0000$ | | $n_{d2} = 1.80440$ | | $v_{d2} = 39.59$ |
| $r_4 = 54.9597$ | $d_4 =$ (Variable) | | | | |
| $r_5 = -19.1025$ (Aspheric) | $d_5 = 1.0564$ | | $n_{d3} = 1.72916$ | | $v_{d3} = 54.68$ |
| $r_6 = -40.4140$ | $d_6 = 0.8218$ | | | | |
| $r_7 = \infty$ (Stop) | $d_7 = 0.6000$ | | | | |
| $r_8 = 23.0124$ | $d_8 = 1.7080$ | | $n_{d4} = 1.78800$ | | $v_{d4} = 47.37$ |
| $r_9 = 11.3881$ | $d_9 = 3.4132$ | | $n_{d5} = 1.51633$ | | $v_{d5} = 64.14$ |
| $r_{10} = -14.6457$ (Aspheric) | $d_{10} =$ (Variable) | | | | |
| $r_{11} = -9.1999$ (Aspheric) | $d_{11} = 0.7500$ | | $n_{d6} = 1.78800$ | | $v_{d6} = 47.37$ |
| $r_{12} = -42.2203$ | $d_{12} = 0.1100$ | | | | |
| $r_{13} = -47.3194$ | $d_{13} = 3.8800$ | | $n_{d7} = 1.72151$ | | $v_{d7} = 29.23$ |
| $r_{14} = -15.7864$ | $d_{14} = 0.4500$ | | | | |
| $r_{15} = -12.3668$ (Aspheric) | $d_{15} = 1.5000$ | | $n_{d8} = 1.49700$ | | $v_{d8} = 81.54$ |
| $r_{16} = -81.3068$ | | | | | |

Zooming Spaces

| | WI | ST | TE |
|---|---|---|---|
| $f$ | 38.9 | 68.0 | 131.0 |
| $d_4$ | 2.00000 | 6.82366 | 11.10539 |
| $d_{10}$ | 9.99976 | 5.08982 | 0.95000 |

Aspherical Coefficients

1st surface $K = 0$
$A_4 = 2.6134 \times 10^{-7}$
$A_6 = -6.5641 \times 10^{-8}$
$A_8 = 2.4330 \times 10^{-9}$
$A_{10} = -1.2582 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 10th surface $K = 0$
$A_4 = 8.1012 \times 10^{-5}$
$A_6 = -9.2536 \times 10^{-7}$
$A_8 = 2.4306 \times 10^{-8}$
$A_{10} = -1.1943 \times 10^{-9}$ 11th surface $K = 0$
$A_4 = 6.2104 \times 10^{-5}$
$A_6 = -2.4450 \times 10^{-6}$
$A_8 = 7.1762 \times 10^{-8}$
$A_{10} = -7.7274 \times 10^{-10}$ 15th surface $K = 0$
$A_4 = 7.9945 \times 10^{-5}$
$A_6 = 9.1737 \times 10^{-7}$
$A_8 = -6.5183 \times 10^{-9}$
$A_{10} = 4.7491 \times 10^{-11}$

EXAMPLE 2

| | | $f$ | $= 38.9 \sim 68.0 \sim 131.0$ | | |
|---|---|---|---|---|---|
| | | $F_{NO}$ | $= 5.52 \sim 8.04 \sim 12.60$ | | |
| | | $f_B$ | $= 7.10 \sim 22.61 \sim 54.26$ | | |
| $r_1 = 10.9328$ (Aspheric) | $d_1 = 2.5000$ | | $n_{d1} = 1.48749$ | | $v_{d1} = 70.23$ |
| $r_2 = -39.2551$ | $d_2 = 0.1000$ | | | | |
| $r_3 = -42.3641$ | $d_3 = 1.0000$ | | $n_{d2} = 1.80440$ | | $v_{d2} = 39.59$ |
| $r_4 = 79.7481$ | $d_4 =$ (Variable) | | | | |
| $r_5 = -16.1092$ (Aspheric) | $d_5 = 1.1765$ | | $n_{d3} = 1.78800$ | | $v_{d3} = 47.37$ |
| $r_6 = -21.3362$ | $d_6 = 0.7350$ | | | | |
| $r_7 = \infty$ (Stop) | $d_7 = 1.7308$ | | | | |
| $r_8 = 29.5907$ | $d_8 = 0.3504$ | | $n_{d4} = 1.78590$ | | $v_{d4} = 44.20$ |
| $r_9 = 9.8792$ | $d_9 = 3.3513$ | | $n_{d5} = 1.57099$ | | $v_{d5} = 50.80$ |
| $r_{10} = -17.8029$ (Aspheric) | $d_{10} =$ (Variable) | | | | |
| $r_{11} = -8.7279$ (Aspheric) | $d_{11} = 0.7500$ | | $n_{d6} = 1.77250$ | | $v_{d6} = 49.60$ |
| $r_{12} = -52.0458$ | $d_{12} = 0.0000$ | | | | |
| $r_{13} = -52.0458$ | $d_{13} = 3.8800$ | | $n_{d7} = 1.72825$ | | $v_{d7} = 28.46$ |
| $r_{14} = -13.6204$ | $d_{14} = 0.4500$ | | | | |
| $r_{15} = -11.6124$ (Aspheric) | $d_{15} = 1.5000$ | | $n_{d8} = 1.77250$ | | $v_{d8} = 49.60$ |
| $r_{16} = -32.3823$ | | | | | |

Zooming Spaces

| | WI | ST | TE |
|---|---|---|---|
| $f$ | 38.9 | 68.0 | 131.0 |
| $d_4$ | 2.00000 | 6.44212 | 10.56895 |
| $d_{10}$ | 9.71000 | 5.01726 | 0.95000 |

Aspherical Coefficients

1st surface $K = 0$
$A_4 = -3.9607 \times 10^{-11}$
$A_6 = -7.3702 \times 10^{-8}$
$A_8 = 1.4985 \times 10^{-9}$
$A_{10} = -1.4135 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 10th surface $K = 0$
$A_4 = 4.3785 \times 10^{-5}$
$A_6 = -2.2319 \times 10^{-6}$
$A_8 = 2.7917 \times 10^{-8}$
$A_{10} = -2.5374 \times 10^{-10}$ 11th surface $K = 0$
$A_4 = 1.2373 \times 10^{-4}$
$A_6 = -3.4150 \times 10^{-6}$
$A_8 = 1.2137 \times 10^{-7}$
$A_{10} = -1.2989 \times 10^{-9}$ 15th surface $K = 0$
$A_4 = 2.8188 \times 10^{-5}$
$A_6 = 1.0906 \times 10^{-6}$
$A_8 = -1.1822 \times 10^{-8}$
$A_{10} = 1.0684 \times 10^{-10}$

EXAMPLE 3

| | | f | = 38.9 ~ 8.0 ~ 131.0 | | |
|---|---|---|---|---|---|
| | | $F_{NO}$ | = 6.53 ~ 9.51 ~ 15.14 | | |
| | | $f_B$ | = 7.56 ~ 3.19 ~ 55.88 | | |
| $r_1$ = | 9.7618 | $d_1$ = 2.0000 | | $n_{d1}$ = 1.48749 | $\nu_{d1}$ = 70.23 |
| (Aspheric) | | | | | |
| $r_2$ = | −47.7516 | $d_2$ = 0.1000 | | | |
| $r_3$ = | −50.0335 | $d_3$ = 1.0000 | | $n_{d2}$ = 1.80440 | $\nu_{d2}$ = 39.59 |
| $r_4$ = | 65.7939 | $d_4$ = (Variable) | | | |
| $r_5$ = | −20.6074 | $d_5$ = 1.1384 | | $n_{d3}$ = 1.78800 | $\nu_{d3}$ = 47.37 |
| (Aspheric) | | | | | |
| $r_6$ = | −61.5927 | $d_6$ = 0.9345 | | | |
| $r_7$ = | ∞ (Stop) | $d_7$ = 0.6000 | | | |
| $r_8$ = | 17.5315 | $d_8$ = 1.0261 | | $n_{d4}$ = 1.78590 | $\nu_{d4}$ = 44.20 |
| $r_9$ = | 7.2494 | $d_9$ = 3.5035 | | $n_{d5}$ = 1.57099 | $\nu_{d5}$ = 50.80 |
| $r_{10}$ = | −16.5811 | $d_{10}$ = (Variable) | | | |
| (Aspheric) | | | | | |
| $r_{11}$ = | −7.7031 | $d_{11}$ = 0.7500 | | $n_{d6}$ = 1.77250 | $\nu_{d6}$ = 49.60 |
| (Aspheric) | | | | | |
| $r_{12}$ = | −45.3636 | $d_{12}$ = 0.0000 | | | |
| $r_{13}$ = | −45.3636 | $d_{13}$ = 3.8800 | | $n_{d7}$ = 1.72825 | $\nu_{d7}$ = 28.46 |
| $r_{14}$ = | −13.3190 | $d_{14}$ = 0.4500 | | | |
| $r_{15}$ = | −11.4317 | $d_{15}$ = 1.5000 | | $n_{d8}$ = 1.77250 | $\nu_{d8}$ = 49.60 |
| (Aspheric) | | | | | |
| $r_{16}$ = | −27.9273 | | | | |

Zooming Spaces

| | WI | ST | TE |
|---|---|---|---|
| f | 38.9 | 68.0 | 131.0 |
| $d_4$ | 2.00000 | 5.84330 | 9.05851 |
| $d_{10}$ | 8.77488 | 4.47604 | 0.95000 |

Aspherical Coefficients

1st surface

K = 0
$A_4$ = −4.4870 × 10$^{-6}$
$A_6$ = −2.0397 × 10$^{-7}$
$A_8$ = 8.3341 × 10$^{-9}$
$A_{10}$ = −1.1247 × 10$^{-10}$

5th surface

K = 0
$A_4$ = −2.0608 × 10$^{-6}$
$A_6$ = −5.5658 × 10$^{-7}$
$A_8$ = 1.0980 × 10$^{-8}$
$A_{10}$ = −1.4641 × 10$^{-10}$

10th surface

K = 0
$A_4$ = 4.3243 × 10$^{-5}$
$A_6$ = −3.0233 × 10$^{-7}$
$A_8$ = −1.8616 × 10$^{-7}$
$A_{10}$ = 5.7028 × 10$^{-10}$

11th surface

K = 0
$A_4$ = 1.5118 × 10$^{-4}$
$A_6$ = −2.1174 × 10$^{-6}$
$A_8$ = 1.2755 × 10$^{-7}$
$A_{10}$ = −1.5496 × 10$^{-9}$

15th surface

K = 0
$A_4$ = 3.2692 × 10$^{-5}$
$A_6$ = 8.1875 × 10$^{-7}$
$A_8$ = −7.7102 × 10$^{-9}$
$A_{10}$ = 1.0063 × 10$^{-10}$

EXAMPLE 4

| | | f | = 38.9 ~ 76.1 ~ 150.7 | | |
|---|---|---|---|---|---|
| | | $F_{NO}$ | = 4.47 ~ 7.33 ~ 13.08 | | |
| | | $f_B$ | = 7.07 ~ 24.20 ~ 58.81 | | |
| $r_1$ = | 12.8702 | $d_1$ = 2.8000 | | $n_{d1}$ = 1.49700 | $\nu_{d1}$ = 81.54 |
| (Aspheric) | | | | | |
| $r_2$ = | −43.5173 | $d_2$ = 0.1000 | | | |
| $r_3$ = | −40.0133 | $d_3$ = 1.0000 | | $n_d$ = 1.78800 | $\nu_{d2}$ = 47.37 |
| $r_4$ = | 77.4627 | $d_4$ = (Variable) | | | |
| $r_5$ = | −20.2947 | $d_5$ = 0.9000 | | $n_{d3}$ = 1.78800 | $\nu_{d3}$ = 47.37 |
| (Aspheric) | | | | | |
| $r_6$ = | −708.2576 | $d_6$ = 0.9891 | | | |
| $r_7$ = | ∞ (Stop) | $d_7$ = 0.6000 | | | |
| $r_8$ = | 54.5557 | $d_8$ = 1.6000 | | $n_{d4}$ = 1.72825 | $\nu_{d4}$ = 28.46 |
| (Aspheric) | | | | | |
| $r_9$ = | −16.9492 | $d_9$ = 2.8820 | | | |
| $r_{10}$ = | −160.0718 | $d_{10}$ = 1.1000 | | $n_{d5}$ = 1.80518 | $\nu_{d5}$ = 25.42 |
| $r_{11}$ = | 11.7033 | $d_{11}$ = 4.9188 | | $n_{d6}$ = 1.48749 | $\nu_{d6}$ = 70.23 |
| $r_{12}$ = | −11.6707 | $d_{12}$ = (Variable) | | | |
| (Aspheric) | | | | | |
| $r_{13}$ = | −9.1737 | $d_{13}$ = 1.1000 | | $n_{d7}$ = 1.78800 | $\nu_{d7}$ = 47.37 |
| (Aspheric) | | | | | |
| $r_{14}$ = | 2375.0456 | $d_{14}$ = 0.1000 | | | |
| $r_{15}$ = | 165.8060 | $d_{15}$ = 5.3000 | | $n_{d8}$ = 1.84666 | $\nu_{d8}$ = 23.78 |
| $r_{16}$ = | −17.7310 | $d_{16}$ = 1.0407 | | | |
| (Aspheric) | | | | | |
| $r_{17}$ = | −14.7032 | $d_{17}$ = 1.2000 | | $n_{d9}$ = 1.78800 | $\nu_{d9}$ = 47.37 |
| $r_{18}$ = | −235.7498 | | | | |

Zooming Spaces

| | WI | ST | TE |
|---|---|---|---|
| f | 38.9 | 76.1 | 150.7 |
| $d_4$ | 2.00000 | 7.95476 | 10.88922 |
| $d_{10}$ | 6.83851 | 3.06342 | 0.74148 |

Aspherical Coefficients

1st surface

K = 0
$A_4$ = 7.8195 × 10$^{-6}$
$A_6$ = 4.0040 × 10$^{-8}$
$A_8$ = 1.4347 × 10$^{-9}$
$A_{10}$ = 1.1850 × 10$^{-11}$

5th surface

K = 0
$A_4$ = −2.0608 × 10$^{-5}$
$A_6$ = −5.5658 × 10$^{-7}$
$A_8$ = 1.0980 × 10$^{-8}$
$A_{10}$ = −1.4641 × 10$^{-10}$

8th surface

K = 0
$A_4$ = −1.0497 × 10$^{-4}$
$A_6$ = −3.8779 × 10$^{-7}$
$A_8$ = 2.1987 × 10$^{-8}$
$A_{10}$ = 5.9028 × 10$^{-10}$

12th surface

K = 0
$A_4$ = 3.2108 × 10$^{-5}$
$A_6$ = −2.8786 × 10$^{-6}$
$A_8$ = 5.6865 × 10$^{-8}$
$A_{10}$ = −6.9948 × 10$^{-10}$

13th surface

K = 0
$A_4$ = 2.6508 × 10$^{-4}$
$A_6$ = −1.6970 × 10$^{-6}$
$A_8$ = 1.5329 × 10$^{-8}$
$A_{10}$ = 4.0109 × 10$^{-10}$

16th surface

K = 0
$A_4$ = 3.3397 × 10$^{-5}$

-continued $A_6 = -8.0450 \times 10^{-7}$
$A_8 = 3.9388 \times 10^{-9}$
$A_{10} = -5.1570 \times 10^{-12}$

EXAMPLE 5

$f = 38.9 \sim 76.1 \sim 150.7$
$F_{NO} = 4.14 \sim 6.86 \sim 12.56$
$f_B = 7.06 \sim 24.11 \sim 58.74$

| | | | |
|---|---|---|---|
| $r_1 = 12.9969$ (Aspheric) | $d_1 = 2.9770$ | $n_{d1} = 1.48749$ | $\nu_{d1} = 70.23$ |
| $r_2 = -33.2193$ | $d_2 = 0.9500$ | $n_{d2} = 1.79952$ | $\nu_{d2} = 42.22$ |
| $r_3 = 98.1161$ | $d_3 =$ (Variable) | | |
| $r_4 = -24.0737$ (Aspheric) | $d_4 = 0.9000$ | $n_{d3} = 1.78800$ | $\nu_{d3} = 47.37$ |
| $r_5 = 113.4698$ | $d_5 = 1.0752$ | | |
| $r_6 = \infty$ (Stop) | $d_6 = 0.7778$ | | |
| $r_7 = 39.8077$ (Aspheric) | $d_7 = 1.6500$ | $n_{d4} = 1.75520$ | $\nu_{d4} = 27.51$ |
| $r_8 = -21.6857$ | $d_8 = 3.1669$ | | |
| $r_9 = 40.7420$ | $d_9 = 1.0500$ | $n_{d5} = 1.84666$ | $\nu_{d5} = 23.78$ |
| $r_{10} = 10.7486$ | $d_{10} = 4.8299$ | $n_{d6} = 1.48749$ | $\nu_{d6} = 70.23$ |
| $r_{11} = -12.2382$ (Aspheric) | $d_{11} =$ (Variable) | | |
| $r_{12} = -8.8842$ (Aspheric) | $d_{12} = 1.1000$ | $n_{d7} = 1.78800$ | $\nu_{d7} = 47.37$ |
| $r_{13} = -1955.7589$ | $d_{13} = 5.5200$ | $n_{d8} = 1.84666$ | $\nu_{d8} = 23.78$ |
| $r_{14} = -15.6572$ (Aspheric) | $d_{14} = 1.2399$ | | |
| $r_{15} = -12.7714$ | $d_{15} = 1.3500$ | $n_{d9} = 1.78800$ | $\nu_{d9} = 47.37$ |
| $r_{16} = -103.1745$ | | | |

Zooming Spaces

| | WI | ST | TE |
|---|---|---|---|
| f | 38.9 | 76.1 | 150.7 |
| $d_4$ | 2.00000 | 7.71300 | 10.40671 |
| $d_{10}$ | 6.39422 | 3.00182 | 0.95000 |

Aspherical Coefficients

1st surface $K = 0$
$A_4 = 1.0535 \times 10^{-5}$
$A_6 = 1.9296 \times 10^{-8}$
$A_8 = 3.0475 \times 10^{-9}$
$A_{10} = -5.8121 \times 10^{-12}$ 4th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 7th surface $K = 0$
$A_4 = -7.1280 \times 10^{-5}$
$A_6 = -4.1495 \times 10^{-7}$
$A_8 = 2.3060 \times 10^{-8}$
$A_{10} = -6.7226 \times 10^{-10}$ 11th surface $K = 0$
$A_4 = 6.2665 \times 10^{-5}$
$A_6 = -4.1609 \times 10^{-6}$
$A_8 = 9.2323 \times 10^{-8}$
$A_{10} = -1.1671 \times 10^{-9}$ 12th surface $K = 0$
$A_4 = 3.2589 \times 10^{-4}$ -continued $A_6 = -1.5702 \times 10^{-6}$
$A_8 = 7.9979 \times 10^{-9}$
$A_{10} = 5.9805 \times 10^{-10}$ 14th surface $K = 0$
$A_4 = 3.9093 \times 10^{-5}$
$A_6 = -6.6786 \times 10^{-7}$
$A_8 = 5.7562 \times 10^{-10}$
$A_{10} = 8.2940 \times 10^{-12}$

EXAMPLE 6

$f = 39.0 \sim 76.1 \sim 150.3$
$F_{NO} = 4.63 \sim 7.53 \sim 13.19$
$f_B = 7.11 \sim 24.54 \sim 59.51$

| | | | |
|---|---|---|---|
| $r_1 = 12.8696$ (Aspheric) | $d_1 = 2.9500$ | $n_{d1} = 1.48749$ | $\nu_{d1} = 70.23$ |
| $r_2 = -35.3238$ | $d_2 = 0.8000$ | $n_{d2} = 1.79389$ | $\nu_{d2} = 43.54$ |
| $r_3 = 92.8471$ | $d_3 =$ (Variable) | | |
| $r_4 = -22.4158$ (Aspheric) | $d_4 = 0.9000$ | $n_{d3} = 1.72916$ | $\nu_{d3} = 54.68$ |
| $r_5 = 700.0836$ | $d_5 = 1.0115$ | | |
| $r_6 = \infty$ (Stop) | $d_6 = 0.8001$ | | |
| $r_7 = 36.3333$ (Aspheric) | $d_7 = 2.4500$ | $n_{d4} = 1.67284$ | $\nu_{d4} = 32.25$ |
| $r_8 = -9.1201$ | $d_8 = 0.7000$ | $n_{d5} = 1.80752$ | $\nu_{d5} = 35.64$ |
| $r_9 = -22.0252$ | $d_9 = 1.7445$ | | |
| $r_{10} = 25.8006$ | $d_{10} = 1.0500$ | $n_{d6} = 1.80518$ | $\nu_{d6} = 25.42$ |
| $r_{11} = 10.8494$ | $d_{11} = 4.6898$ | $n_{d7} = 1.48749$ | $\nu_{d7} = 70.23$ |
| $r_{12} = -16.4473$ (Aspheric) | $d_{12} =$ (Variable) | | |
| $r_{13} = -8.9680$ (Aspheric) | $d_{13} = 1.1000$ | $n_{d8} = 1.78648$ | $\nu_{d8} = 40.80$ |
| $r_{14} = -58.1567$ | $d_{14} = 5.0000$ | $n_{d9} = 1.80518$ | $\nu_{d9} = 25.42$ |
| $r_{15} = -14.7728$ (Aspheric) | $d_{15} = 0.9315$ | | |
| $r_{16} = -12.8419$ | $d_{16} = 1.3500$ | $n_{d10} = 1.78648$ | $\nu_{d10} = 49.80$ |
| $r_{17} = -100.1776$ | | | |

Zooming Spaces

| | WI | ST | TE |
|---|---|---|---|
| f | 39.0 | 76.1 | 150.3 |
| $d_4$ | 2.00000 | 7.33738 | 10.05958 |
| $d_{10}$ | 7.34685 | 3.78482 | 1.61331 |

Aspherical Coefficients

1st surface $K = 0$
$A_4 = 1.0073 \times 10^{-5}$
$A_6 = 6.8256 \times 10^{-8}$
$A_8 = 1.9309 \times 10^{-9}$
$A_{10} = 4.8800 \times 10^{-12}$ 4th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 7th surface $K = 0$
$A_4 = 2.1236 \times 10^{-6}$
$A_6 = -1.4352 \times 10^{-6}$
$A_8 = 1.1201 \times 10^{-7}$
$A_{10} = -2.8256 \times 10^{-9}$ -continued 12th surface K = 0
$A_4 = 6.8933 \times 10^{-5}$
$A_6 = -1.4455 \times 10^{-6}$
$A_8 = 2.3666 \times 10^{-8}$
$A_{10} = -1.3155 \times 10^{-10}$ 13th surface K = 0
$A_4 = 2.7859 \times 10^{-4}$
$A_6 = -5.0975 \times 10^{-7}$
$A_8 = -5.1045 \times 10^{-9}$
$A_{10} = 5.8428 \times 10^{-10}$ 15th surface K = 0
$A_4 = 3.3215 \times 10^{-5}$
$A_6 = -5.7698 \times 10^{-7}$
$A_8 = 4.2850 \times 10^{-11}$
$A_{10} = 1.2363 \times 10^{-11}$

EXAMPLE 7

| | | | |
|---|---|---|---|
| f = 39.0 ~ 76.1 ~ 150.3 | | | |
| $F_{NO}$ = 4.64 ~ 7.72 ~ 13.36 | | | |
| $f_B$ = 7.12 ~ 25.20 ~ 61.33 | | | |
| $r_1$ = 12.5724 (Aspheric) | $d_1$ = 2.9500 | $n_{d1}$ = 1.48749 | $\nu_{d1}$ = 70.23 |
| $r_2$ = -34.2394 | $d_2$ = 0.8000 | $n_{d2}$ = 1.80400 | $\nu_{d2}$ = 46.57 |
| $r_3$ = 68.0812 | $d_3$ = (Variable) | | |
| $r_4$ = -25.0518 (Aspheric) | $d_4$ = 0.9000 | $n_{d3}$ = 1.72916 | $\nu_{d3}$ = 54.68 |
| $r_5$ = 217.4258 | $d_5$ = 1.0371 | | |
| $r_6$ = ∞ (Stop) | $d_6$ = 0.7778 | | |
| $r_7$ = 20.6537 | $d_7$ = 2.4500 | $n_{d4}$ = 1.66680 | $\nu_{d4}$ = 33.05 |
| $r_8$ = -11.0629 | $d_8$ = 0.7000 | $n_{d5}$ = 1.80100 | $\nu_{d5}$ = 34.97 |
| $r_9$ = -32.9641 (Aspheric) | $d_9$ = 1.0245 | | |
| $r_{10}$ = ∞ (Flare stop) | $d_{10}$ = 0.7000 | | |
| $r_{11}$ = 23.8718 | $d_{11}$ = 1.0500 | $n_{d6}$ = 1.80518 | $\nu_{d6}$ = 25.42 |
| $r_{12}$ = 10.0663 | $d_{12}$ = 4.3410 | $n_{d7}$ = 1.48749 | $\nu_{d7}$ = 70.23 |
| $r_{13}$ = -19.1265 (Aspheric) | $d_{13}$ = (Variable) | | |
| $r_{14}$ = -9.3791 (Aspheric) | $d_{14}$ = 1.1000 | $n_{d8}$ = 1.77250 | $\nu_{d8}$ = 49.60 |
| $r_{15}$ = -59.0525 (Aspheric) | $d_{15}$ = 5.0000 | $n_{d9}$ = 1.84666 | $\nu_{d9}$ = 23.78 |
| $r_{16}$ = -15.4230 | $d_{16}$ = 0.7777 | | |
| $r_{17}$ = -12.7768 (Aspheric) | $d_{18}$ = 1.3500 | $n_{d10}$ = 1.78800 | $\nu_{d10}$ = 47.37 |
| $r_{18}$ = -129.4511 | | | |

Zooming Spaces

| | WI | ST | TE |
|---|---|---|---|
| f | 39.0 | 76.1 | 150.3 |
| $d_4$ | 2.00000 | 7.23869 | 9.98634 |
| $d_{10}$ | 7.21914 | 3.71482 | 1.61866 |

Aspherical Coefficients

1st surface

K = 0
$A_4 = 1.1427 \times 10^{-5}$
$A_6 = 1.2721 \times 10^{-7}$
$A_8 = 1.1644 \times 10^{-9}$
$A_{10} = 1.5896 \times 10^{-11}$ 4th surface K = 0
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 9th surface K = 0
$A_4 = -1.7064 \times 10^{-5}$
$A_6 = 1.6356 \times 10^{-6}$
$A_8 = -1.1806 \times 10^{-7}$
$A_{10} = 2.9691 \times 10^{-9}$ 13th surface K = 0
$A_4 = 1.3428 \times 10^{-4}$
$A_6 = -2.2088 \times 10^{-6}$
$A_8 = 6.0879 \times 10^{-8}$
$A_{10} = -9.2974 \times 10^{-10}$ 14th surface K = 0
$A_4 = 2.2880 \times 10^{-4}$
$A_6 = -4.5921 \times 10^{-7}$
$A_8 = -2.5380 \times 10^{-9}$
$A_{10} = 1.4377 \times 10^{-10}$ 17th surface $A_4 = -6.9845 \times 10^{-6}$
$A_6 = 4.7047 \times 10^{-7}$
$A_8 = 4.2878 \times 10^{-11}$
$A_{10} = 1.4785 \times 10^{-11}$

EXAMPLE 8

| | | | |
|---|---|---|---|
| f = 39.0 ~ 76.0 ~ 151.5 | | | |
| $F_{NO}$ = 4.36 ~ 7.43 ~ 13.46 | | | |
| f = 7.17 ~ 27.85 ~ 69.38 | | | |
| $r_1$ = 12.8744 (Aspheric) | $d_1$ = 2.9500 | $n_{d1}$ = 1.51648 | $\nu_{d1}$ = 67.66 |
| $r_2$ = -37.3056 | $d_2$ = 0.8000 | $n_{d2}$ = 1.78422 | $\nu_{d2}$ = 49.93 |
| $r_3$ = 52.2405 | $d_3$ = (Variable) | | |
| $r_4$ ∞ (Stop) | $d_4$ = 1.0000 | | |
| $r_5$ = -18.5214 (Aspheric) | $d_5$ = 0.9000 | $n_{d3}$ = 1.75132 | $\nu_{d3}$ = 37.88 |
| $r_6$ = 184.6535 | $d_6$ = 0.2000 | | |
| $r_7$ = 22.0167 (Aspheric) | $d_7$ = 1.9623 | $n_{d4}$ = 1.84666 | $\nu_{d4}$ = 23.90 |
| $r_8$ = -37.2246 (Aspheric) | $d_8$ = 0.4000 | | |
| $r_9$ = 276.7800 | $d_9$ = 1.0500 | $n_{d5}$ = 1.83115 | $\nu_{d5}$ = 24.36 |
| $r_{10}$ = 14.0427 | $d_{10}$ = 4.6981 | $n_{d6}$ = 1.50581 | $\nu_{d6}$ = 78.46 |
| $r_{11}$ = -12.2505 (Aspheric) | $d_{11}$ = (Variable) | | |
| $r_{12}$ = -9.9838 (Aspheric) | $d_{12}$ = 1.0000 | $n_{d7}$ = 1.78882 | $\nu_{d7}$ = 47.65 |
| $r_{13}$ = -42.9282 | $d_{13}$ = 0.4500 | | |
| $r_{14}$ = -48.9860 (Aspheric) | $d_{14}$ = 5.0000 | $n_{d8}$ = 1.83519 | $\nu_{d8}$ = 25.47 |
| $r_{15}$ = -15.5379 | $d_{15}$ = 0.7777 | | |

-continued $r_{16} = -12.7408$  $d_{16} = 1.3500$  $n_{d9} = 1.68023$  $\nu_{d9} = 57.59$
(Aspheric)
$r_{17} = -123.9876$ Zooming Spaces

|   | WI | ST | TE |
|---|---|---|---|
| f | 39.0 | 76.0 | 151.5 |
| $d_4$ | 3.50000 | 8.59796 | 11.66312 |
| $d_{10}$ | 9.46194 | 4.16209 | 1.50000 |

Aspherical Coefficients

1st surface $K = 0$
$A_4 = 9.3084 \times 10^{-6}$
$A_6 = 1.2921 \times 10^{-7}$
$A_8 = -5.7435 \times 10^{-11}$
$A_{10} = 1.8161 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 7th surface $K = 0$
$A_4 = -2.9710 \times 10^{-5}$
$A_6 = -2.3497 \times 10^{-6}$
$A_8 = 2.4942 \times 10^{-8}$
$A_{10} = -4.4893 \times 10^{-9}$ 8th surface $K = 0$
$A_4 = 2.6581 \times 10^{-5}$
$A_6 = -1.9171 \times 10^{-6}$
$A_8 = -1.3320 \times 10^{-8}$
$A_{10} = -3.6848 \times 10^{-9}$ 11th surface $K = 0$
$A_4 = 8.7404 \times 10^{-5}$
$A_6 = 4.1687 \times 10^{-7}$
$A_8 = 3.8713 \times 10^{-9}$
$A_{10} = -2.6178 \times 10^{-10}$ 12th surface $K = 0$
$A_4 = 2.1084 \times 10^{-4}$
$A_6 = 9.8587 \times 10^{-7}$
$A_8 = -1.8722 \times 10^{-8}$
$A_{10} = 7.5975 \times 10^{-11}$ 14th surface $K = 0$
$A_4 = -4.8597 \times 10^{-5}$
$A_6 = -1.9530 \times 10^{-7}$
$A_8 = 1.5501 \times 10^{-9}$
$A_{10} = 1.2106 \times 10^{-11}$ 16th surface $K = 0$
$A_4 = 2.9833 \times 10^{-6}$
$A_6 = 2.5273 \times 10^{-7}$
$A_8 = 4.1317 \times 10^{-9}$
$A_{10} = -2.3739 \times 10^{-12}$

EXAMPLE 9

$f = 39.0 \sim 76.1 \sim 150.4$
$F_{NO} = 4.39 \sim 7.54 \sim 13.60$
$f_B = 7.19 \sim 29.10 \sim 72.16$ $r_1 = 13.0037$  $d_1 = 2.9500$  $n_{d1} = 1.50811$  $\nu_{d1} = 72.00$
(Aspheric)
$r_2 = -33.0052$  $d_2 = 0.8000$  $n_{d2} = 1.70076$  $\nu_{d2} = 56.13$
$r_3 = 40.7995$  $d_3 = $ (Variable)
$r_4 = \infty$ (Stop)  $d_4 = 1.0000$
$r_5 = -22.9500$  $d_5 = 0.9000$  $n_{d3} = 1.69317$  $\nu_{d3} = 46.12$
(Aspheric)
$r_6 = 177.1484$  $d_6 = 0.2000$
$r_7 = 26.7782$  $d_7 = 1.8013$  $n_{d4} = 1.84666$  $\nu_{d4} = 23.90$
(Aspheric)
$r_8 = -71.1578$  $d_8 = 0.4000$
(Aspheric)
$r_9 = 65.9232$  $d_9 = 1.0500$  $n_{d5} = 1.83950$  $\nu_{d5} = 25.37$
$r_{10} = 13.1937$  $d_{10} = 4.6403$  $n_{d6} = 1.49974$  $\nu_{d6} = 79.80$
$r_{11} = -11.7339$  $d_{11} = $ (Variable)
(Aspheric)
$r_{12} = -10.8109$  $d_{12} = 1.0000$  $n_{d7} = 1.74349$  $\nu_{d7} = 52.60$
(Aspheric)
$r_{13} = -42.9282$  $d_{13} = 0.9500$
$r_{14} = -28.1164$  $d_{14} = 4.5410$  $n_{d8} = 1.84065$  $\nu_{d8} = 25.12$
(Aspheric)
$r_{15} = -14.6344$  $d_{15} = 0.7777$
$r_{16} = -12.0553$  $d_{16} = 1.3500$  $n_{d9} = 1.63957$  $\nu_{d9} = 60.71$
(Aspheric)
$r_{17} = -77.1672$ Zooming Spaces

|   | WI | ST | TE |
|---|---|---|---|
| f | 39.0 | 76.1 | 150.4 |
| $d_4$ | 3.50000 | 8.74979 | 11.94833 |
| $d_{10}$ | 8.63073 | 4.19708 | 1.50000 |

Aspherical Coefficients

1st surface $K = 0$
$A_4 = 9.6099 \times 10^{-6}$
$A_6 = 1.1216 \times 10^{-7}$
$A_8 = -1.2384 \times 10^{-10}$
$A_{10} = 2.3047 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 7th surface $K = 0$
$A_4 = -2.2073 \times 10^{-4}$
$A_6 = -1.4306 \times 10^{-5}$
$A_8 = 2.9491 \times 10^{-7}$
$A_{10} = -1.8124 \times 10^{-8}$ 8th surface $K = 0$
$A_4 = -2.0275 \times 10^{-4}$
$A_6 = -1.2809 \times 10^{-5}$
$A_8 = 1.1998 \times 10^{-7}$
$A_{10} = -9.0718 \times 10^{-9}$ 11th surface $K = 0$
$A_4 = 1.2921 \times 10^{-4}$
$A_6 = 5.2904 \times 10^{-7}$
$A_8 = 6.1501 \times 10^{-8}$
$A_{10} = -8.1376 \times 10^{-10}$ -continued 12th surface K = 0
$A_4 = 2.0154 \times 10^{-4}$
$A_6 = -1.4695 \times 10^{-6}$
$A_8 = 4.0230 \times 10^{-8}$
$A_{10} = -3.9527 \times 10^{-10}$ 14th surface K = 0
$A_4 = -6.0168 \times 10^{-5}$
$A_6 = 1.1649 \times 10^{-6}$
$A_8 = -2.1082 \times 10^{-8}$
$A_{10} = 1.2439 \times 10^{-10}$ 16th surface $A_4 = 1.4370 \times 10^{-5}$
$A_6 = 1.5096 \times 10^{-7}$
$A_8 = 6.4638 \times 10^{-10}$
$A_{10} = 3.7300 \times 10^{-11}$

EXAMPLE 10

| | f | = 38.900 ~ 72.127 ~ 131.000 | | |
| | $F_{NO}$ | = 4.539 ~ 7.253 ~ 11.736 | | |
| | $f_B$ | = 7.130 ~ 23.328 ~ 55.778 | | |
| $r_1$ = 12.3955 (Aspheric) | $d_1$ = 2.0000 | | $n_{d1}$ = 1.49700 | $\nu_{d1}$ = 81.54 |
| $r_2$ = 149.3462 | $d_2$ = 0.1000 | | | |
| $r_3$ = −184.3987 | $d_3$ = 1.0000 | | $n_{d2}$ = 1.78800 | $\nu_{d2}$ = 47.37 |
| $r_4$ = 48.1818 (Aspheric) | $d_4$ = (Variable) | | | |
| $r_5$ = 39.7315 (Aspheric) | $d_5$ = 1.3500 | | $n_{d3}$ = 1.61772 | $\nu_{d3}$ = 49.81 |
| $r_6$ = −19.8503 | $d_6$ = 0.1000 | | | |
| $r_7$ = −19.4178 | $d_7$ = 0.8888 | | $n_{d4}$ = 1.78800 | $\nu_{d4}$ = 47.37 |
| $r_8$ = −107.9985 | $d_8$ = 0.9242 | | | |
| $r_9$ = ∞ (Stop) | $d_9$ = (Variable) | | | |
| $r_{10}$ = 64.0102 | $d_{10}$ = 0.7770 | | $n_{d5}$ = 1.80440 | $\nu_{d5}$ = 39.59 |
| $r_{11}$ = 11.5871 | $d_{11}$ = 5.0290 | | $n_{d6}$ = 1.57135 | $\nu_{d6}$ = 52.95 |
| $r_{12}$ = −15.0152 (Aspheric) | $d_{12}$ = (Variable) | | | |
| $r_{13}$ = −10.0699 (Aspheric) | $d_{13}$ = 0.7500 | | $n_{d7}$ = 1.69680 | $\nu_{d7}$ = 55.53 |
| $r_{14}$ = −59.1291 | $d_{14}$ = 0.1000 | | | |
| $r_{15}$ = −59.1293 | $d_{15}$ = 3.7000 | | $n_{d8}$ = 1.84666 | $\nu_{d8}$ = 23.78 |
| $r_{16}$ = −20.8670 | $d_{16}$ = 1.5770 | | | |
| $r_{17}$ = −12.6393 (Aspheric) | $d_{17}$ = 1.1000 | | $n_{d9}$ = 1.77250 | $\nu_{d9}$ = 49.60 |
| $r_{18}$ = −49.8003 | | | | |

Zooming spaces

| | WI | ST | TE |
|---|---|---|---|
| f | 38.900 | 72.127 | 131.000 |
| $d_4$ | 1.70000 | 8.10722 | 12.29582 |
| $d_9$ | 4.77702 | 4.29345 | 0.70000 |
| $d_{12}$ | 5.62694 | 2.00553 | 0.95000 |

Aspherical Coefficients

1st surface

K = 0
$A_4 = -3.5635 \times 10^{-6}$
$A_6 = 8.0737 \times 10^{-8}$
$A_8 = -2.7849 \times 10^{-9}$
$A_{10} = 4.1470 \times 10^{-11}$ 5th surface K = 0
$A_4 = -2.0608 \times 10^{-6}$
$A_6 = -5.5658 \times 10^{-7}$ -continued $A_8 = 1.0980 \times 10^{-8}$
$A_{10} = -1.4641 \times 10^{-10}$ 12th surface K = 0
$A_4 = 9.7423 \times 10^{-5}$
$A_6 = -6.7565 \times 10^{-8}$
$A_8 = 7.1568 \times 10^{-9}$
$A_{10} = -7.8485 \times 10^{-11}$ 13th surface K = 0
$A_4 = 1.8346 \times 10^{-4}$
$A_6 = 3.8923 \times 10^{-7}$
$A_8 = 7.6107 \times 10^{-9}$
$A_{10} = -8.7159 \times 10^{-11}$ 17th surface K = 0
$A_4 = 2.9258 \times 10^{-5}$
$A_6 = 4.9354 \times 10^{-7}$
$A_8 = -2.8024 \times 10^{-9}$
$A_{10} = 3.8630 \times 10^{-11}$

EXAMPLE 11

| | f | = 38.900 ~ 68.000 ~ 131.000 | | |
| | $F_{NO}$ | = 5.021 ~ 7.800 ~ 13.937 | | |
| | $f_B$ | = 7.103 ~ 20.339 ~ 51.907 | | |
| $r_1$ = 10.0913 (Aspheric) | $d_1$ = 2.0000 | | $n_{d1}$ = 1.48749 | $\nu_{d1}$ = 70.23 |
| $r_2$ = −49.4980 | $d_2$ = 0.1000 | | | |
| $r_3$ = −45.7408 | $d_3$ = 1.0000 | | $n_{d2}$ = 1.79952 | $\nu_{d2}$ = 42.22 |
| $r_4$ = 39.8705 | $d_4$ = (Variable) | | | |
| $r_5$ = 94.4892 (Aspheric) | $d_5$ = 1.3500 | | $n_{d3}$ = 1.60562 | $\nu_{d3}$ = 43.70 |
| $r_6$ = 10.7208 | $d_6$ = 0.8994 | | $n_{d4}$ = 1.78590 | $\nu_{d4}$ = 44.20 |
| $r_7$ = −32.2467 | $d_7$ = 0.8223 | | | |
| $r_8$ = ∞ (Stop) | $d_8$ = (Variable) | | | |
| $r_9$ = 48.6685 | $d_9$ = 0.7770 | | $n_{d5}$ = 1.78590 | $\nu_{d5}$ = 44.20 |
| $r_{10}$ = 11.6896 | $d_{10}$ = 4.7359 | | $n_{d6}$ = 1.57099 | $\nu_{d6}$ = 50.80 |
| $r_{11}$ = −15.8138 (Aspheric) | $d_{11}$ = (Variable) | | | |
| $r_{12}$ = −7.9539 (Aspheric) | $d_{12}$ = 0.7500 | | $n_{d7}$ = 1.77250 | $\nu_{d7}$ = 49.60 |
| $r_{13}$ = −94.6627 | $d_{13}$ = 3.7000 | | $n_{d8}$ = 1.74000 | $\nu_{d8}$ = 28.28 |
| $r_{14}$ = −16.6020 | $d_{14}$ = 1.5770 | | | |
| $r_{15}$ = −11.7913 (Aspheric) | $d_{19}$ = 1.1000 | | $n_{d9}$ = 1.77250 | $\nu_{d9}$ = 49.60 |
| $r_{16}$ = −36.3246 | | | | |

Zooming Spaces

| | WI | ST | TE |
|---|---|---|---|
| f | 38.900 | 68.000 | 131.000 |
| $d_4$ | 1.70000 | 5.52766 | 9.35963 |
| $d_8$ | 3.89423 | 3.92395 | 0.70000 |
| $d_{11}$ | 4.46489 | 1.80147 | 0.95000 |

Aspherical Coefficients

1st surface

K = 0
$A_4 = -6.1561 \times 10^{-6}$
$A_6 = 5.4935 \times 10^{-8}$
$A_8 = -6.6750 \times 10^{-9}$
$A_{10} = 2.2399 \times 10^{-10}$ 5th surface K = 0
$A_4 = -2.0608 \times 10^{-5}$
$A_6 = -5.5658 \times 10^{-7}$ -continued $A_8 = 1.0980 \times 10^{-8}$
$A_{10} = -1.4641 \times 10^{-10}$ 11th surface $K = 0$
$A_4 = 1.8044 \times 10^{-4}$
$A_6 = -4.3057 \times 10^{-6}$
$A_8 = 1.8028 \times 10^{-7}$
$A_{10} = -2.6432 \times 10^{-9}$ 12th surface $K = 0$
$A_4 = 3.2466 \times 10^{-4}$
$A_6 = -2.9739 \times 10^{-6}$
$A_8 = 1.3414 \times 10^{-7}$
$A_{10} = -1.0713 \times 10^{-9}$ 15th surface $K = 0$
$A_4 = 2.7100 \times 10^{-5}$
$A_6 = 1.1157 \times 10^{-6}$
$A_8 = -9.0648 \times 10^{-9}$
$A_{10} = 8.8990 \times 10^{-11}$

EXAMPLE 12

| | | | |
|---|---|---|---|
| | f = 38.899 ~ 63.000 ~ 170.500 | | |
| | $F_{NO}$ = 4.233 ~ 6.064 ~ 12.355 | | |
| | $f_B$ = 7.153 ~ 18.142 ~ 56.984 | | |
| $r_1$ = 15.2499 (Aspheric) | $d_1$ = 3.0000 | $n_{d1}$ = 1.49700 | $\nu_{d1}$ = 81.54 |
| $r_2$ = -34.3500 | $d_2$ = 0.1000 | | |
| $r_3$ = -34.0373 | $d_3$ = 1.0000 | $n_{d2}$ = 1.78800 | $\nu_{d2}$ = 47.37 |
| $r_4$ = 141.6060 | $d_4$ = (Variable) | | |
| $r_5$ = -23.6404 (Aspheric) | $d_5$ = 0.7704 | $n_{d3}$ = 1.78800 | $\nu_{d3}$ = 47.37 |
| $r_6$ = 108.9119 | $d_6$ = 1.0871 | | |
| $r_7$ = ∞ (Stop) | $d_7$ = 0.6000 | | |
| $r_8$ = 51.9720 (Aspheric) | $d_8$ = 1.0351 | $n_{d4}$ = 1.72825 | $\nu_{d4}$ = 28.46 |
| $r_9$ = -24.8664 | $d_9$ = (Variable) | | |
| $r_{10}$ = 30.7493 | $d_{10}$ = 0.7030 | $n_{d5}$ = 1.80518 | $\nu_{d5}$ = 25.42 |
| $r_{11}$ = 11.2456 | $d_{11}$ = 4.0000 | $n_{d6}$ = 1.48749 | $\nu_{d6}$ = 70.23 |
| $r_{12}$ = -12.4600 (Aspheric) | $d_{12}$ = (Variable) | | |
| $r_{13}$ = -9.3838 (Aspheric) | $d_{13}$ = 0.7000 | $n_{d7}$ = 1.78800 | $\nu_{d7}$ = 47.37 |
| $r_{14}$ = 82.3876 | $d_{14}$ = 0.1000 | | |
| $r_{15}$ = 93.9940 | $d_{15}$ = 3.8000 | $n_{d8}$ = 1.84666 | $\nu_{d8}$ = 23.78 |
| $r_{16}$ = -18.5910 (Aspheric) | $d_{16}$ = 3.1000 | | |
| $r_{17}$ = -10.7107 | $d_{17}$ = 0.4800 | $n_{d9}$ = 1.78800 | $\nu_{d9}$ = 47.37 |
| $r_{18}$ = -29.5940 | | | |

Zooming Spaces

| | WI | ST | TE |
|---|---|---|---|
| f | 38.899 | 63.000 | 170.500 |
| $d_4$ | 2.00000 | 7.03771 | 16.83611 |
| $d_9$ | 4.18635 | 3.44383 | 4.09255 |
| $d_{12}$ | 7.57624 | 5.06826 | 0.76416 |

Aspherical Coefficients

1st surface $K = 0$
$A_4 = 3.7309 \times 10^{-6}$
$A_6 = 1.2867 \times 10^{-8}$
$A_8 = 1.0173 \times 10^{-9}$
$A_{10} = -5.9905 \times 10^{-12}$ 5th surface -continued $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 8th surface $K = 0$
$A_4 = -4.2948 \times 10^{-5}$
$A_6 = -5.8967 \times 10^{-7}$
$A_8 = 4.3206 \times 10^{-8}$
$A_{10} = -1.3004 \times 10^{-9}$ 12th surface $K = 0$
$A_4 = 3.5172 \times 10^{-5}$
$A_6 = -5.0215 \times 10^{-7}$
$A_8 = -1.9435 \times 10^{-8}$
$A_{10} = 2.9223 \times 10^{-10}$ 13th surface $K = 0$
$A_4 = 2.9996 \times 10^{-4}$
$A_6 = 5.8601 \times 10^{-7}$
$A_8 = -2.2238 \times 10^{-8}$
$A_{10} = 6.0535 \times 10^{-10}$ 16th surface $K = 0$
$A_4 = 3.1651 \times 10^{-5}$
$A_6 = -1.3318 \times 10^{-7}$
$A_8 = -7.2577 \times 10^{-9}$
$A_{10} = 3.9663 \times 10^{-11}$

EXAMPLE 13

| | | | |
|---|---|---|---|
| | f = 38.875 ~ 76.000 ~ 170.505 | | |
| | $F_{NO}$ = 5.401 ~ 9.190 ~ 14.996 | | |
| | $f_B$ = 7.183 ~ 24.380 ~ 53.073 | | |
| $r_1$ = 13.5596 (Aspheric) | $d_1$ = 2.5556 | $n_{d1}$ = 1.49700 | $\nu_{d1}$ = 81.54 |
| $r_2$ = -30.3701 | $d_2$ = 0.1000 | | |
| $r_3$ = -30.7258 | $d_3$ = 1.0000 | $n_{d2}$ = 1.78800 | $\nu_{d2}$ = 47.37 |
| $r_4$ = 102.1466 | $d_4$ = (Variable) | | |
| $r_5$ = -28.3624 (Aspheric) | $d_5$ = 0.8475 | $n_{d3}$ = 1.78800 | $\nu_{d3}$ = 47.37 |
| $r_6$ = 34.6645 | $d_6$ = 1.1855 | | |
| $r_7$ = ∞ (Stop) | $d_7$ = 0.6000 | | |
| $r_8$ = 30.4980 (Aspheric) | $d_8$ = 0.8234 | $n_{d4}$ = 1.72825 | $\nu_{d4}$ = 28.46 |
| $r_9$ = -24.0049 | $d_9$ = (Variable) | | |
| $r_{10}$ = 47.4414 | $d_{10}$ = 0.7786 | $n_{d5}$ = 1.80518 | $\nu_{d5}$ = 25.42 |
| $r_{11}$ = 11.8417 | $d_{11}$ = 4.0000 | $n_{d6}$ = 1.48749 | $\nu_{d6}$ = 70.23 |
| $r_{12}$ = -9.8436 (Aspheric) | $d_{12}$ = (Variable) | | |
| $r_{13}$ = -8.3684 (Aspheric) | $d_{13}$ = 0.7000 | $n_{d7}$ = 1.78800 | $\nu_{d7}$ = 47.37 |
| $r_{14}$ = 68.8908 | $d_{14}$ = 0.1000 | | |
| $r_{15}$ = 68.9885 | $d_{15}$ = 3.7000 | $n_{d8}$ = 1.84666 | $\nu_{d8}$ = 23.78 |
| $r_{16}$ = -20.6437 (Aspheric) | $d_{16}$ = 3.8000 | | |
| $r_{17}$ = -9.8902 | $d_{17}$ = 0.7700 | $n_{d9}$ = 1.78800 | $\nu_{d9}$ = 47.37 |
| $r_{18}$ = -21.7642 | | | |

Zooming Spaces

| | WI | ST | TE |
|---|---|---|---|
| f | 38.875 | 76.000 | 170.505 |
| $d_4$ | 2.00000 | 7.19289 | 16.38487 |
| $d_9$ | 3.62892 | 2.63768 | 4.16286 |
| $d_{12}$ | 6.71060 | 4.14546 | 0.65343 |

Aspherical Coefficients

-continued

1st surface $K = 0$
$A_4 = 3.5822 \times 10^{-6}$
$A_6 = -7.2087 \times 10^{-8}$
$A_8 = 3.9598 \times 10^{-9}$
$A_{10} = -3.9823 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 8th surface $K = 0$
$A_4 = -8.9744 \times 10^{-5}$
$A_6 = -2.1252 \times 10^{-6}$
$A_8 = 2.0142 \times 10^{-7}$
$A_{10} = -8.1010 \times 10^{-9}$ 12th surface $K = 0$
$A_4 = 7.5275 \times 10^{-5}$
$A_6 = -4.3680 \times 10^{-7}$
$A_8 = -2.7804 \times 10^{-8}$
$A_{10} = 4.7168 \times 10^{-10}$ 13th surface $K = 0$
$A_4 = 3.9428 \times 10^{-4}$
$A_6 = 2.6694 \times 10^{-6}$
$A_8 = -6.1052 \times 10^{-8}$
$A_{10} = 1.5157 \times 10^{-9}$ 16th surface $K = 0$
$A_4 = 2.9340 \times 10^{-5}$
$A_6 = 1.0814 \times 10^{-7}$
$A_8 = -1.0943 \times 10^{-8}$
$A_{10} = 6.8944 \times 10^{-11}$

EXAMPLE 14

| | | | | | |
|---|---|---|---|---|---|
| f | = 38.901 ~ 76.003 ~ 170.510 | | | | |
| $F_{NO}$ | = 4.821 ~ 7.911 ~ 13.286 | | | | |
| $f_B$ | = 7.190 ~ 23.544 ~ 54.667 | | | | |
| $r_1 = 14.3382$ (Aspheric) | $d_1 = 2.5556$ | $n_{d1} = 1.49700$ | $v_{d1} = 81.54$ |
| $r_2 = -32.8810$ | $d_2 = 0.1000$ | | |
| $r_3 = -32.8810$ | $d_3 = 1.0000$ | $n_{d2} = 1.78800$ | $v_{d2} = 47.37$ |
| $r_4 = 146.7425$ | $d_4 = $ (Variable) | | |
| $r_5 = 34.4464$ (Aspheric) | $d_5 = 0.8259$ | $n_{d3} = 1.78800$ | $v_{d3} = 47.37$ |
| $r_6 = 31.0427$ | $d_6 = 1.2343$ | | |
| $r_7 = \infty$ (Stop) | $d_7 = 0.6000$ | | |
| $r_8 = 28.7619$ (Aspheric) | $d_8 = 0.9265$ | $n_{d4} = 1.75251$ | $v_{d4} = 27.33$ |
| $r_9 = -33.6187$ | $d_9 = $ (Variable) | | |
| $r_{10} = 29.7595$ | $d_{10} = 0.7123$ | $n_{d5} = 1.80518$ | $v_{d5} = 25.42$ |
| $r_{11} = 10.1990$ | $d_{11} = 4.0000$ | $n_{d6} = 1.48749$ | $v_{d6} = 70.23$ |
| $r_{12} = -10.3343$ (Aspheric) | $d_{12} = $ (Variable) | | |
| $r_{13} = -8.3096$ (Aspheric) | $d_{13} = 0.7000$ | $n_{d7} = 1.78800$ | $v_{d7} = 47.37$ |
| $r_{14} = 61.6854$ | $d_{14} = 0.1000$ | | |
| $r_{15} = 73.2586$ | $d_{15} = 3.7000$ | $n_{d8} = 1.84666$ | $v_{d8} = 23.78$ |
| $r_{16} = -18.5768$ (Aspheric) | $d_{16} = 3.8000$ | | |
| $r_{17} = -10.0069$ | $d_{17} = 0.7700$ | $n_{d9} = 1.78800$ | $v_{d9} = 47.37$ |
| $r_{18} = -23.5186$ | | | |

-continued

ZoomingSpaces

| | WI | ST | TE |
|---|---|---|---|
| f | 38.901 | 76.003 | 170.510 |
| $d_4$ | 2.00000 | 8.28701 | 16.24547 |
| $d_9$ | 4.05726 | 2.79254 | 3.45195 |
| $d_{12}$ | 6.61820 | 3.85187 | 0.70625 |

Aspherical Coefficients

1st surface $K = 0$
$A_4 = 3.1413 \times 10^{-6}$
$A_6 = -3.2310 \times 10^{-8}$
$A_8 = 2.1936 \times 10^{-9}$
$A_{10} = -1.6581 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 8th surface $K = 0$
$A_4 = -6.2449 \times 10^{-5}$
$A_6 = -1.4278 \times 10^{-6}$
$A_8 = 9.6247 \times 10^{-8}$
$A_{10} = -3.4425 \times 10^{-9}$ 12th surface $K = 0$
$A_4 = 6.0235 \times 10^{-5}$
$A_6 = -2.3375 \times 10^{-7}$
$A_8 = -6.0300 \times 10^{-8}$
$A_{10} = 8.9424 \times 10^{-10}$ 13th surface $K = 0$
$A_4 = 3.8259 \times 10^{-4}$
$A_6 = 2.8864 \times 10^{-6}$
$A_8 = -9.9366 \times 10^{-8}$
$A_{10} = 2.0212 \times 10^{-9}$ 16th surface $K = 0$
$A_4 = 2.6439 \times 10^{-5}$
$A_6 = 9.2963 \times 10^{-8}$
$A_8 = -1.5396 \times 10^{-8}$
$A_{10} = 8.7003 \times 10^{-11}$

EXAMPLE 15

| | | | | | |
|---|---|---|---|---|---|
| f | = 38.900 ~ 64.000 ~ 195.689 | | | | |
| $F_{NO}$ | = 4.534 ~ 7.076 ~ 15.782 | | | | |
| $f_B$ | = 7.128 ~ 19.361 ~ 52.905 | | | | |
| $r_1 = 16.3446$ (Aspheric) | $d_1 = 2.5556$ | $n_{d1} = 1.49700$ | $v_{d1} = 81.54$ |
| $r_2 = -22.4860$ | $d_2 = 0.1000$ | | |
| $r_3 = -20.6652$ | $d_3 = 1.0000$ | $n_{d2} = 1.79952$ | $v_{d2} = 42.22$ |
| $r_4 = -564.8973$ (Aspheric) | $d_4 = $ (Variable) | | |
| $r_5 = -33.0967$ (Aspheric) | $d_5 = 0.7359$ | $n_{d3} = 1.49700$ | $v_{d3} = 81.54$ |
| $r_6 = 36.8748$ | $d_6 = 1.2417$ | | |
| $r_7 = \infty$ (Stop) | $d_7 = 0.6000$ | | |
| $r_8 = 19.2468$ (Aspheric) | $d_8 = 1.1380$ | $n_{d4} = 1.68893$ | $v_{d4} = 31.07$ |
| $r_9 = -44.8913$ | $d_9 = $ (Variable) | | |
| $r_{10} = -30.9069$ | $d_{10} = 0.4000$ | $n_{d5} = 1.78590$ | $v_{d5} = 44.20$ |
| $r_{11} = 7.6437$ | $d_{11} = 2.5000$ | $n_{d6} = 1.48749$ | $v_{d6} = 70.23$ |

-continued

| | | | |
|---|---|---|---|
| $r_{12} = -14.2605$ (Aspheric) | $d_{12} = 1.4109$ | | |
| $r_{13} = -67.0280$ | $d_{13} = 3.0000$ | $n_{d7} = 1.49700$ | $\nu_{d7} = 81.54$ |
| $r_{14} = -8.5250$ (Aspheric) | $d_{14} = $ (Variable) | | |
| $r_{15} = -9.2654$ (Aspheric) | $d_{15} = 0.7000$ | $n_{d8} = 1.77250$ | $\nu_{d8} = 49.60$ |
| $r_{16} = 46.6477$ | $d_{16} = 0.1000$ | | |
| $r_{17} = 42.1310$ | $d_{17} = 3.4847$ | $n_{d9} = 1.69895$ | $\nu_{d9} = 30.13$ |
| $r_{18} = -18.5243$ (Aspheric) | $d_{18} = 3.6777$ | | |
| $r_{19} = -10.3352$ | $d_{19} = 0.7700$ | $n_{d10} = 1.77250$ | $\nu_{d10} = 49.60$ |
| $r_{20} = -33.1778$ | | | |

Zooming Spaces

| | WI | ST | TE |
|---|---|---|---|
| f | 38.900 | 64.000 | 195.689 |
| $d_4$ | 2.00000 | 4.74993 | 18.90160 |
| $d_9$ | 1.30395 | 0.72450 | 5.99970 |
| $d_{14}$ | 8.39794 | 6.77987 | 0.47770 |

Aspherical Coefficients

1st surface

K = 0
$A_4 = -2.7646 \times 10^{-5}$
$A_6 = -6.0389 \times 10^{-7}$
$A_8 = 7.3423 \times 10^{-9}$
$A_{10} = -2.0840 \times 10^{-10}$ 4th surface K = 0
$A_4 = -4.6115 \times 10^{-5}$
$A_6 = -4.0388 \times 10^{-7}$
$A_8 = 4.7911 \times 10^{-9}$
$A_{10} = -1.0123 \times 10^{-10}$ 5th surface K = 0
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 8th surface K = 0
$A_4 = -8.1613 \times 10^{-5}$
$A_6 = -4.1056 \times 10^{-7}$
$A_8 = 3.3730 \times 10^{-8}$
$A_{10} = -1.1601 \times 10^{-9}$ 12th surface K = 0
$A_4 = 1.7833 \times 10^{-4}$
$A_6 = 6.3902 \times 10^{-6}$
$A_8 = -2.5179 \times 10^{-7}$
$A_{10} = 1.4001 \times 10^{-8}$ 14th surface K = 0
$A_4 = -4.0596 \times 10^{-5}$
$A_6 = -2.6173 \times 10^{-6}$
$A_8 = 3.9432 \times 10^{-8}$
$A_{10} = -2.9819 \times 10^{-9}$ 15th surface K = 0
$A_4 = 4.4633 \times 10^{-4}$
$A_6 = 9.7579 \times 10^{-7}$
$A_8 = -2.8289 \times 10^{-8}$
$A_{10} = 5.0637 \times 10^{-10}$ 18th surface K = 0
$A_4 = 1.0316 \times 10^{-4}$
$A_6 = 2.8356 \times 10^{-8}$ -continued $A_8 = -1.0128 \times 10^{-8}$
$A_{10} = 4.1695 \times 10^{-11}$

EXAMPLE 16

| | | | |
|---|---|---|---|
| f | $= 38.899 \sim 63.997 \sim 195.501$ | | |
| $F_{NO}$ | $= 4.538 \sim 7.092 \sim 15.767$ | | |
| $f_B$ | $= 7.202 \sim 19.558 \sim 48.980$ | | |
| $r_1 = 16.2017$ (Aspheric) | $d_1 = 2.9000$ | $n_{d1} = 1.49700$ | $\nu_{d1} = 81.54$ |
| $r_2 = -19.9744$ | $d_2 = 1.0000$ | $n_{d2} = 1.80440$ | $\nu_{d2} = 39.59$ |
| $r_3 = -88490.000$ (Aspheric) | $d_3 = $ (Variable) | | |
| $r_4 = -24.4652$ (Aspheric) | $d_4 = 0.7423$ | $n_{d3} = 1.49700$ | $\nu_{d3} = 81.54$ |
| $r_5 = 70.1741$ | $d_5 = 1.1274$ | | |
| $r_6 = \infty$ (Stop) | $d_6 = 0.6000$ | | |
| $r_7 = 25.0730$ (Aspheric) | $d_7 = 0.9391$ | $n_{d4} = 1.80518$ | $\nu_{d4} = 25.42$ |
| $r_8 = -58.8960$ | $d_8 = $ (Variable) | | |
| $r_9 = -30.6068$ | $d_9 = 0.4000$ | $n_{d5} = 1.78800$ | $\nu_{d5} = 47.37$ |
| $r_{10} = 7.1455$ | $d_{10} = 2.5000$ | $n_{d6} = 1.49700$ | $\nu_{d6} = 81.54$ |
| $r_{11} = -15.0067$ (Aspheric) | $d_{11} = 1.6465$ | | |
| $r_{12} = -305.2271$ | $d_{12} = 3.0000$ | $n_{d7} = 1.49700$ | $\nu_{d7} = 81.54$ |
| $r_{13} = -8.6119$ (Aspheric) | $d_{13} = $ (Variable) | | |
| $r_{14} = -9.6215$ (Aspheric) | $d_{14} = 0.7000$ | $n_{d8} = 1.78800$ | $\nu_{d8} = 47.37$ |
| $r_{15} = 42.3893$ | $d_{15} = 0.1000$ | | |
| $r_{16} = 37.9381$ | $d_{16} = 3.6778$ | $n_{d9} = 1.67270$ | $\nu_{d9} = 32.10$ |
| $r_{17} = -17.3559$ (Aspheric) | $d_{17} = 3.7777$ | | |
| $r_{18} = -10.4451$ | $d_{18} = 0.7700$ | $n_{d10} = 1.78800$ | $\nu_{d10} = 47.37$ |
| $r_{19} = -34.2222$ | | | |

Zooming Spaces

| | WI | ST | TE |
|---|---|---|---|
| f | 38.899 | 63.997 | 195.501 |
| $d_3$ | 2.00000 | 4.67508 | 18.83544 |
| $d_8$ | 0.83701 | 0.27700 | 7.75213 |
| $d_{13}$ | 9.04819 | 7.37482 | 0.35500 |

Aspherical Coefficients

1st surface

K = 0
$A_4 = -3.1325 \times 10^{-5}$
$A_6 = -5.9183 \times 10^{-7}$
$A_8 = 4.7621 \times 10^{-9}$
$A_{10} = -2.3762 \times 10^{-10}$ 3rd surface K = 0
$A_4 = -4.6149 \times 10^{-5}$
$A_6 = -3.3764 \times 10^{-7}$
$A_8 = 1.8164 \times 10^{-11}$
$A_{10} = -7.5224 \times 10^{-11}$ 4th surface K = 0
$A_4 = -2.0608 \times 10^{-5}$
$A_6 = -5.5657 \times 10^{-7}$
$A_8 = 1.0980 \times 10^{-8}$
$A_{10} = -1.4641 \times 10^{-10}$ 7th surface K = 0
$A_4 = -5.6017 \times 10^{-5}$
$A_6 = -8.2392 \times 10^{-8}$ -continued $A_8 = 1.4472 \times 10^{-9}$
$A_{10} = -4.1085 \times 10^{-11}$ 11th surface $K = 0$
$A_4 = 1.4337 \times 10^{-4}$
$A_6 = 5.5698 \times 10^{-6}$
$A_8 = -1.9751 \times 10^{-7}$
$A_{10} = 1.1794 \times 10^{-8}$ 13th surface $K = 0$
$A_4 = -4.3762 \times 10^{-5}$
$A_6 = -2.1626 \times 10^{-6}$
$A_8 = 1.0046 \times 10^{-8}$
$A_{10} = -1.9370 \times 10^{-9}$ 14th surface $K = 0$
$A_4 = 3.8853 \times 10^{-4}$
$A_6 = 8.9123 \times 10^{-7}$
$A_8 = -1.2769 \times 10^{-8}$
$A_{10} = 2.2980 \times 10^{-10}$ 17th surface $K = 0$
$A_4 = 8.5322 \times 10^{-5}$
$A_6 = 9.8306 \times 10^{-8}$
$A_8 = -4.3369 \times 10^{-9}$
$A_{10} = -4.1004 \times 10^{-12}$

EXAMPLE 17

$f = 38.368 \sim 71.000 \sim 102.500$
$F_{NO} = 4.113 \sim 6.428 \sim 8.945$
$f_B = 7.068 \sim 26.485 \sim 44.690$

| | | | | |
|---|---|---|---|---|
| $r_1 = 11.5582$ (Aspheric) | $d_1 = 2.7500$ | $n_{d1} = 1.48749$ | $\nu_{d1} = 70.23$ | |
| $r_2 = 122.2804$ | $d_2 = 0.1000$ | | | |
| $r_3 = 115.5311$ | $d_3 = 1.0000$ | $n_{d2} = 1.80440$ | $\nu_{d2} = 39.59$ | |
| $r_4 = 29.4402$ | $d_4 = $ (Variable) | | | |
| $r_5 = -17.5941$ | $d_5 = 0.8015$ | $n_{d3} = 1.48749$ | $\nu_{d3} = 70.23$ | |
| $r_6 = -63.5759$ | $d_6 = 0.8436$ | | | |
| $r_7 = \infty$ (Stop) | $d_7 = $ (Variable) | | | |
| $r_8 = 16.2511$ | $d_8 = 3.6484$ | $n_{d4} = 1.84666$ | $\nu_{d4} = 23.78$ | |
| $r_9 = 9.1743$ | $d_9 = 4.2921$ | $n_{d5} = 1.57099$ | $\nu_{d5} = 50.80$ | |
| $r_{10} = -17.3932$ (Aspheric) | $d_{10} = $ (Variable) | | | |
| $r_{11} = -11.8105$ (Aspheric) | $d_{11} = 1.1000$ | $n_{d6} = 1.77250$ | $\nu_{d6} = 49.60$ | |
| $r_{12} = 1282.9495$ | $d_{12} = 1.0777$ | | | |
| $r_{13} = -56.9184$ | $d_{13} = 3.6200$ | $n_{d7} = 1.84666$ | $\nu_{d7} = 23.78$ | |
| $r_{14} = -16.7949$ | $d_{14} = 0.7700$ | | | |
| $r_{15} = -12.6636$ (Aspheric) | $d_{15} = 1.5000$ | $n_{d8} = 1.78800$ | $\nu_{d8} = 47.37$ | |
| $r_{16} = -31.2231$ | | | | |

Zooming Spaces

| | WI | ST | TE |
|---|---|---|---|
| f | 38.368 | 71.000 | 102.500 |
| $d_4$ | 2.00000 | 7.90736 | 10.30299 |
| $d_7$ | 0.73252 | 0.37000 | 0.70000 |
| $d_{10}$ | 7.76420 | 3.07868 | 1.10000 |

Aspherical Coefficients

1st surface $K = 0$
$A_4 = -5.5218 \times 10^{-6}$
$A_6 = -1.0430 \times 10^{-7}$ -continued $A_8 = 1.5627 \times 10^{-9}$
$A_{10} = -1.1766 \times 10^{-11}$ 10th surface $K = 0$
$A_4 = 1.2323 \times 10^{-4}$
$A_6 = -4.6225 \times 10^{-8}$
$A_8 = 1.2523 \times 10^{-8}$
$A_{10} = -3.5240 \times 10^{-10}$ 11th surface $K = 0$
$A_4 = 3.1603 \times 10^{-5}$
$A_6 = -1.2912 \times 10^{-7}$
$A_8 = 1.2697 \times 10^{-8}$
$A_{10} = -3.6932 \times 10^{-10}$ 15th surface $K = 0$
$A_4 = 5.8265 \times 10^{-5}$
$A_6 = 3.6115 \times 10^{-7}$
$A_8 = -2.0809 \times 10^{-9}$
$A_{10} = 3.7992 \times 10^{-11}$

EXAMPLE 18

$f = 38.000 \sim 71.000 \sim 102.499$
$F_{NO} = 4.671 \sim 7.893 \sim 10.835$
$f_B = 7.582 \sim 27.923 \sim 46.955$

| | | | | |
|---|---|---|---|---|
| $r_1 = 10.8785$ (Aspheric) | $d_1 = 2.7500$ | $n_{d1} = 1.48749$ | $\nu_{d1} = 70.23$ | |
| $r_2 = 562.7049$ | $d_2 = 1.0000$ | $n_{d2} = 1.79952$ | $\nu_{d2} = 42.22$ | |
| $r_3 = 25.1515$ | $d_3 = $ (Variable) | | | |
| $r_4 = -20.0313$ | $d_4 = 0.7800$ | $n_{d3} = 1.48749$ | $\nu_{d3} = 70.23$ | |
| $r_5 = 158.2946$ | $d_5 = 1.0560$ | | | |
| $r_6 = \infty$ (Stop) | $d_6 = $ (Variable) | | | |
| $r_7 = 11.5132$ | $d_7 = 3.1700$ | $n_{d4} = 1.80518$ | $\nu_{d4} = 25.42$ | |
| $r_8 = 7.0364$ | $d_8 = 4.6500$ | $n_{d5} = 1.57135$ | $\nu_{d5} = 52.95$ | |
| $r_9 = -21.3857$ | $d_9 = $ (Variable) | | | |
| $r_{10} = -10.5733$ (Aspheric) | $d_{10} = 1.0000$ | $n_{d6} = 1.78800$ | $\nu_{d6} = 47.37$ | |
| $r_{11} = -106.0650$ | $d_{11} = 0.1000$ | | | |
| $r_{12} = -106.7580$ | $d_{12} = 3.2000$ | $n_{d7} = 1.84666$ | $\nu_{d7} = 23.78$ | |
| $r_{13} = -18.1519$ | $d_{13} = 2.4137$ | | | |
| $r_{14} = -11.3561$ (Aspheric) | $d_{14} = 1.0000$ | $n_{d8} = 1.78800$ | $\nu_{d8} = 47.37$ | |
| $r_{15} = -26.0000$ | | | | |

Zooming Spaces

| | WI | ST | TE |
|---|---|---|---|
| f | 38.000 | 71.000 | 102.499 |
| $d_3$ | 2.00000 | 6.30857 | 8.23895 |
| $d_6$ | 0.68973 | 0.64113 | 0.70000 |
| $d_9$ | 7.33769 | 3.11753 | 1.44528 |

Aspherical Coefficients

1st surface $K = 0$
$A_4 = 1.3648 \times 10^{-6}$
$A_6 = -2.5481 \times 10^{-7}$
$A_8 = 1.0741 \times 10^{-8}$
$A_{10} = -1.2945 \times 10^{-10}$ 9th surface $K = 0$
$A_4 = 1.6387 \times 10^{-4}$
$A_6 = 2.7074 \times 10^{-6}$
$A_8 = -4.8760 \times 10^{-8}$
$A_{10} = 4.3112 \times 10^{-10}$ -continued 10th surface K = 0
$A_4 = 1.2054 \times 10^{-4}$
$A_6 = 3.0604 \times 10^{-6}$
$A_8 = -3.4777 \times 10^{-8}$
$A_{10} = 2.2971 \times 10^{-10}$ 14th surface K = 0
$A_4 = 9.7476 \times 10^{-6}$
$A_6 = 7.9913 \times 10^{-8}$
$A_8 = -7.7106 \times 10^{-9}$
$A_{10} = 9.4422 \times 10^{-11}$

EXAMPLE 19

$f = 38.000 \sim 70.975 \sim 104.035$
$F_{NO} = 6.746 \sim 11.983 \sim 15.801$
$f_B = 8.004 \sim 30.280 \sim 51.793$

| | | | | | | |
|---|---|---|---|---|---|---|
| $r_1$ = | 7.9613 | $d_1$ = | 2.7500 | $n_{d1}$ = 1.48749 | $v_{d1}$ = 70.23 |
| (Aspheric) | | | | | |
| $r_2$ = | −42.4257 | $d_2$ = | 1.0000 | $n_{d2}$ = 1.78800 | $v_{d2}$ = 47.37 |
| $r_3$ = | 22.6076 | $d_3$ = | (Variable) | | |
| $r_4$ = | 1.2378 | $d_4$ = | 1.2378 | $n_{d3}$ = 1.80518 | $v_{d3}$ = 25.42 |
| $r_5$ = | −9.7747 | $d_5$ = | 0.6128 | | |
| $r_6$ = | ∞ (Stop) | $d_6$ = | (Variable) | | |
| $r_7$ = | 11.7299 | $d_7$ = | 0.5500 | $n_{d4}$ = 1.77250 | $v_{d4}$ = 49.60 |
| $r_8$ = | 6.6769 | $d_8$ = | 2.9797 | $n_{d5}$ = 1.53996 | $v_{d5}$ = 59.46 |
| $r_9$ = | 530.4140 | $d_9$ = | (Variable) | | |
| (Aspheric) | | | | | |
| $r_{10}$ = | −7.9278 | $d_{10}$ = | 1.1000 | $n_{d6}$ = 1.78800 | $v_{d6}$ = 47.37 |
| (Aspheric) | | | | | |
| $r_{11}$ = | −28.7936 | $d_{11}$ = | 0.1000 | | |
| $r_{12}$ = | −32.6790 | $d_{12}$ = | 2.5400 | $n_{d7}$ = 1.72151 | $v_{d7}$ = 29.23 |
| $r_{13}$ = | −13.8121 | $d_{13}$ = | 1.3496 | | |
| $r_{14}$ = | −10.7456 | $d_{14}$ = | 1.1000 | $n_{d8}$ = 1.72916 | $v_{d8}$ = 54.68 |
| (Aspheric) | | | | | |
| $r_{15}$ = | −19.0477 | | | | |

Zooming Spaces

| | WI | ST | TE |
|---|---|---|---|
| f | 38.000 | 70.975 | 104.035 |
| $d_3$ | 2.00000 | 3.43786 | 6.16123 |
| $d_6$ | 0.63101 | 1.96829 | 0.70000 |
| $d_9$ | 7.83743 | 3.43691 | 1.55072 |

Aspherical Coefficients

1st surface

K = 0
$A_4 = 4.3030 \times 10^{-6}$
$A_6 = -1.4892 \times 10^{-6}$
$A_8 = 8.6811 \times 10^{-8}$
$A_{10} = -1.1354 \times 10^{-9}$ 9th surface K = 0
$A_4 = 1.5717 \times 10^{-4}$
$A_6 = 4.3159 \times 10^{-6}$
$A_8 = -8.1577 \times 10^{-7}$
$A_{10} = 2.4927 \times 10^{-8}$ 10th surface K = 0
$A_4 = 4.1125 \times 10^{-5}$
$A_6 = 1.8010 \times 10^{-6}$
$A_8 = -4.5850 \times 10^{-8}$
$A_{10} = 2.1417 \times 10^{-9}$ -continued 14th surface K = 0
$A_4 = 8.8083 \times 10^{-5}$
$A_6 = 5.1072 \times 10^{-7}$
$A_8 = -3.1372 \times 10^{-9}$
$A_{10} = 2.6050 \times 10^{-11}$

EXAMPLE 20

$f = 38.900 \sim 63.100 \sim 102.501$
$F_{NO} = 4.316 \sim 5.205 \sim 7.450$
$f_B = 7.081 \sim 19.138 \sim 39.817$

| | | | | | | |
|---|---|---|---|---|---|---|
| $r_1$ = | 14.4920 | $d_1$ | 2.7500 | $n_{d1}$ = 1.48749 | $v_{d1}$ = 70.23 |
| (Aspheric) | | | | | |
| $r_2$ = | 474.3321 | $d_2$ = | 1.0000 | $n_{d2}$ = 1.79952 | $v_{d2}$ = 42.22 |
| $r_3$ = | 31.5033 | $d_3$ = | (Variable) | | |
| $r_4$ = | −21.1491 | $d_4$ = | 0.9138 | $n_{d3}$ = 1.71700 | $v_{d4}$ = 47.92 |
| $r_5$ = | −51.3952 | $d_5$ = | 0.8666 | | |
| $r_6$ = | ∞ (Stop) | $d_6$ = | (Variable) | | |
| $r_7$ = | 12.7290 | $d_7$ = | 5.5579 | $n_{d4}$ = 1.80518 | $v_{d4}$ = 25.42 |
| $r_8$ = | 6.9185 | $d_8$ = | 4.9171 | $n_{d5}$ = 1.57099 | $v_{d5}$ = 50.80 |
| $r_9$ = | −19.8296 | $d_9$ = | (Variable) | | |
| (Aspheric) | | | | | |
| $r_{10}$ = | −11.0129 | $d_{10}$ = | 1.0000 | $n_{d6}$ = 1.78800 | $v_{d6}$ = 47.37 |
| (Aspheric) | | | | | |
| $r_{11}$ = | −109.9254 | $d_{11}$ = | 0.0500 | | |
| $r_{12}$ = | −111.1094 | $d_{12}$ = | 3.2000 | $n_{d7}$ = 1.84666 | $v_{d7}$ = 23.78 |
| $r_{13}$ = | −18.1871 | $d_{13}$ = | 3.5000 | | |
| $r_{14}$ = | −10.8935 | $d_{14}$ = | 1.0000 | $n_{d8}$ = 1.78800 | $v_{d8}$ = 47.37 |
| (Aspheric) | | | | | |
| $r_{15}$ = | −26.0000 | | | | |

Zooming Spaces

| | WI | ST | TE |
|---|---|---|---|
| f | 38.900 | 63.100 | 102.501 |
| $d_3$ | 2.00000 | 11.21359 | 16.74605 |
| $d_6$ | 1.58525 | 0.37000 | 2.01225 |
| $d_9$ | 7.15929 | 3.94703 | 1.50000 |

Aspherical Coefficients

1st surface

K = 0
$A_4 = -2.0435 \times 10^{-6}$
$A_6 = -4.9824 \times 10^{-8}$
$A_8 = 7.0504 \times 10^{-10}$
$A_{10} = -7.3534 \times 10^{-12}$ 9th surface K = 0
$A_4 = 1.4020 \times 10^{-4}$
$A_6 = -1.8453 \times 10^{-6}$
$A_8 = 1.2534 \times 10^{-7}$
$A_{10} = -2.6473 \times 10^{-9}$ 10th surface K = 0
$A_4 = 1.8245 \times 10^{-4}$
$A_6 = 1.4492 \times 10^{-6}$
$A_8 = -6.7267 \times 10^{-9}$
$A_{10} = 1.1881 \times 10^{-10}$ 14th surface K = 0
$A_4 = -1.1125 \times 10^{-5}$
$A_6 = 2.6278 \times 10^{-7}$
$A_8 = -5.7782 \times 10^{-9}$
$A_{10} = 7.0254 \times 10^{-11}$

EXAMPLE 21

$f = 38.911 \sim 73.021 \sim 131.094$
$F_{NO} = 4.336 \sim 6.743 \sim 11.863$
$f_B = 7.119 \sim 25.590 \sim 56.318$

| | | | |
|---|---|---|---|
| $r_1 = 14.6969$ (Aspheric) | $d_1 = 2.0000$ | $n_{d1} = 1.51693$ | $\nu_{d1} = 66.31$ |
| $r_2 = -62.3828$ | $d_2 = 0.1000$ | | |
| $r_3 = -64.9369$ | $d_3 = 1.0000$ | $n_{d2} = 1.79441$ | $\nu_{d2} = 43.22$ |
| $r_4 = 51.6467$ | $d_4 = $ (Variable) | | |
| $r_5 = -30.8971$ (Aspheric) | $d_5 = 0.8975$ | $n_{d3} = 1.49800$ | $\nu_{d3} = 80.20$ |
| $r_6 = 210.4975$ | $d_6 = 1.0453$ | | |
| $r_7 = \infty$ (Stop) | $d_7 = $ (Variable) | | |
| $r_8 = 18.6356$ | $d_8 = 5.6801$ | $n_{d4} = 1.84476$ | $\nu_{d4} = 23.95$ |
| $r_9 = 10.7170$ | $d_9 = 4.5319$ | $n_{d5} = 1.57302$ | $\nu_{d5} = 59.44$ |
| $r_{10} = -17.2268$ (Aspheric) | $d_{10} = $ (Variable) | | |
| $r_{11} = -11.7040$ (Aspheric) | $d_{11} = 0.5000$ | $n_{d6} = 1.77250$ | $\nu_{d6} = 49.60$ |
| $r_{12} = 398.6733$ | $d_{12} = 0.3540$ | | |
| $r_{13} = -234.3182$ | $d_{13} = 4.7272$ | $n_{d7} = 1.72825$ | $\nu_{d7} = 28.46$ |
| $r_{14} = -14.4914$ | $d_{14} = 0.4037$ | | |
| $r_{15} = -12.8026$ | $d_{15} = 1.5000$ | $n_{d8} = 1.67114$ | $\nu_{d8} = 58.23$ |
| $r_{16} = -76.9428$ | | | |

Zooming Spaces

| | WI | ST | TE |
|---|---|---|---|
| f | 38.911 | 73.021 | 131.094 |
| $d_4$ | 2.00000 | 10.41885 | 14.76530 |
| $d_7$ | 2.26033 | 1.15781 | 2.34714 |
| $d_{10}$ | 9.00000 | 4.00982 | 0.95000 |

Aspherical Coefficients

1st surface $K = 0$
$A_4 = 2.0637 \times 10^{-6}$
$A_6 = 2.1306 \times 10^{-9}$
$A_8 = 1.0394 \times 10^{-9}$
$A_{10} = -1.2020 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 10th surface $K = 0$
$A_4 = 7.8963 \times 10^{-5}$
$A_6 = -1.2330 \times 10^{-7}$
$A_8 = 2.0248 \times 10^{-9}$
$A_{10} = -1.3898 \times 10^{-11}$ 11th surface $K = 0$
$A_4 = 8.8890 \times 10^{-5}$
$A_6 = 6.3801 \times 10^{-7}$
$A_8 = -7.8462 \times 10^{-9}$
$A_{10} = -4.3770 \times 10^{-11}$ 15th surface $K = 0$
$A_4 = 2.1323 \times 10^{-5}$
$A_6 = 7.9708 \times 10^{-8}$
$A_8 = -1.2854 \times 10^{-8}$
$A_{10} = 4.1007 \times 10^{-11}$

EXAMPLE 22

$f = 38.900 \sim 68.000 \sim 131.001$
$F_{NO} = 4.836 \sim 7.311 \sim 12.073$
$f_B = 7.257 \sim 23.159 \sim 56.072$

| | | | |
|---|---|---|---|
| $r_1 = 11.2486$ (Aspheric) | $d_1 = 2.5000$ | $n_{d1} = 1.51633$ | $\nu_{d1} = 64.14$ |
| $r_2 = -47.0932$ | $d_2 = 0.1000$ | | |
| $r_3 = -49.7560$ | $d_3 = 1.0000$ | $n_{d2} = 1.80610$ | $\nu_{d2} = 40.92$ |
| $r_4 = 49.0566$ | $d_4 = $ (Variable) | | |
| $r_5 = -21.6874$ (Aspheric) | $d_5 = 1.1168$ | $n_{d3} = 1.78800$ | $\nu_{d3} = 47.37$ |
| $r_6 = -38.6082$ | $d_6 = 0.8149$ | | |
| $r_7 = \infty$ (Stop) | $d_7 = $ (Variable) | | |
| $r_8 = 21.6420$ | $d_8 = 3.1231$ | $n_{d4} = 1.77250$ | $\nu_{d4} = 49.60$ |
| $r_9 = 10.3018$ | $d_9 = 3.4298$ | $n_{d5} = 1.51633$ | $\nu_{d5} = 64.14$ |
| $r_{10} = -16.0625$ (Aspheric) | $d_{10} = $ (Variable) | | |
| $r_{11} = -8.3804$ (Aspheric) | $d_{11} = 0.8500$ | $n_{d6} = 1.78800$ | $\nu_{d6} = 47.37$ |
| $r_{12} = -21.7095$ | $d_{12} = 0.1100$ | | |
| $r_{13} = -23.7221$ | $d_{13} = 3.2500$ | $n_{d7} = 1.84666$ | $\nu_{d7} = 23.78$ |
| $r_{14} = -13.9829$ | $d_{14} = 0.9255$ | | |
| $r_{15} = -11.4447$ (Aspheric) | $d_{15} = 1.0000$ | $n_{d8} = 1.74100$ | $\nu_{d8} = 52.64$ |
| $r_{16} = -32.3585$ | | | |

Zooming Spaces

| | WI | ST | TE |
|---|---|---|---|
| f | 38.900 | 68.000 | 131.001 |
| $d_4$ | 2.00000 | 6.01171 | 9.49632 |
| $d_7$ | 0.60000 | 1.02474 | 1.39939 |
| $d_{10}$ | 9.04323 | 4.57222 | 0.95000 |

Aspherical Coefficients

1st surface $K = 0$
$A_4 = 1.9054 \times 10^{-6}$
$A_6 = -7.8075 \times 10^{-8}$
$A_8 = 4.0479 \times 10^{-9}$
$A_{10} = -2.5101 \times 10^{-11}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 10th surface $K = 0$
$A_4 = 7.6068 \times 10^{-5}$
$A_6 = 1.4543 \times 10^{-7}$
$A_8 = -1.3692 \times 10^{-7}$
$A_{10} = 4.8791 \times 10^{-9}$ 11th surface $K = 0$
$A_4 = 1.8989 \times 10^{-4}$
$A_6 = -1.7894 \times 10^{-6}$
$A_8 = 8.8543 \times 10^{-8}$
$A_{10} = -9.3587 \times 10^{-10}$ 15th surface $K = 0$
$A_4 = 1.5988 \times 10^{-6}$
$A_6 = 8.3859 \times 10^{-7}$
$A_8 = -9.6874 \times 10^{-9}$
$A_{10} = 1.1964 \times 10^{-10}$

EXAMPLE 23

| | f | = 38.059 ~ 63.050 ~ 102.244 | | |
|---|---|---|---|---|
| | $F_{NO}$ | = 4.598 ~ 7.594 ~ 11.365 | | |
| | $f_B$ | = 9.198 ~ 33.175 ~ 62.636 | | |
| $r_1$ = −14.0060 | $d_1$ = 1.8000 | | $n_{d1}$ = 1.75500 | $\nu_{d1}$ = 52.32 |
| (Aspheric) | | | | |
| $r_2$ = −22.9843 | $d_2$ = (Variable) | | | |
| (Aspheric) | | | | |
| $r_3$ = 14.2132 | $d_3$ = 3.6000 | | $n_{d2}$ = 1.51633 | $\nu_{d2}$ = 64.14 |
| (Aspheric) | | | | |
| $r_4$ = −51.3575 | $d_4$ = (Variable) | | | |
| $r_5$ = −46.5658 | $d_5$ = 3.0000 | | $n_{d3}$ = 1.80518 | $\nu_{d3}$ = 25.42 |
| (Aspheric) | | | | |
| $r_6$ = −291.8552 | $d_6$ = (Variable) | | | |
| $r_7$ = ∞ (Stop) | $d_7$ = 0.1000 | | | |
| $r_8$ = 20.5143 | $d_8$ = 4.0000 | | $n_{d4}$ = 1.49700 | $\nu_{d4}$ = 81.54 |
| $r_9$ = −264.7711 | $d_9$ = (Variable) | | | |
| (Aspheric) | | | | |
| $r_{10}$ = −19.2167 | $d_{10}$ = 2.5500 | | $n_{d5}$ = 1.84666 | $\nu_{d5}$ = 23.78 |
| (Aspheric) | | | | |
| $r_{11}$ = −14.1563 | $d_{11}$ = 1.5000 | | | |
| $r_{12}$ = −9.9072 | $d_{12}$ = 1.2000 | | $n_{d6}$ = 1.77250 | $\nu_{d6}$ = 49.60 |
| (Aspheric) | | | | |
| $r_{13}$ = −52.5574 | | | | |

Zooming Spaces

| | WI | ST | TE |
|---|---|---|---|
| f | 38.059 | 63.050 | 102.244 |
| $d_2$ | 0.25000 | 2.29964 | 0.25000 |
| $d_4$ | 2.00000 | 2.80499 | 3.74053 |
| $d_6$ | 1.31193 | 1.35937 | 1.88227 |
| $d_9$ | 11.69348 | 4.49808 | 1.41266 |

Aspherical Coefficients

1st surface

K = 0
$A_4$ = 1.1528 × 10⁻⁵
$A_6$ = 6.7714 × 10⁻⁷
$A_8$ = 1.8698 × 10⁻⁸
$A_{10}$ = −2.2979 × 10⁻¹⁰

2nd surface

K = 0
$A_4$ = 2.0922 × 10⁻⁷
$A_6$ = 8.0082 × 10⁻⁷
$A_8$ = 1.0450 × 10⁻⁸
$A_{10}$ = −1.5194 × 10⁻¹⁰

3rd surface

K = 0
$A_4$ = 2.1010 × 10⁻⁵
$A_6$ = 8.1352 × 10⁻⁷
$A_8$ = −1.7738 × 10⁻⁸
$A_{10}$ = 2.2732 × 10⁻¹⁰

5th surface

K = 0
$A_4$ = −2.0608 × 10⁻⁵
$A_6$ = −5.5658 × 10⁻⁷
$A_8$ = 1.0980 × 10⁻⁸
$A_{10}$ = −1.4641 × 10⁻¹⁰

9th surface

K = 0
$A_4$ = 9.0155 × 10⁻⁵
$A_6$ = 3.0648 × 10⁻⁶
$A_8$ = −1.7431 × 10⁻⁷
$A_{10}$ = 4.0297 × 10⁻⁹

10th surface

K = 0.4858
$A_4$ = −4.0146 × 10⁻⁶
$A_6$ = 1.3249 × 10⁻⁶

-continued $A_8$ = −4.9357 × 10⁻⁸
$A_{10}$ = 4.6993 × 10⁻¹⁰

12th surface

K = 0
$A_4$ = 6.6916 × 10⁻⁵
$A_6$ = −4.4638 × 10⁻⁷
$A_8$ = 3.2423 × 10⁻⁸
$A_{10}$ = −1.2494 × 10⁻¹⁰

EXAMPLE 24

| | f | = 38.002 ~ 73.000 ~ 115.000 | | |
|---|---|---|---|---|
| | $F_{NO}$ | = 4.280 ~ 7.323 ~ 10.920 | | |
| | $f_B$ | = 7.088 ~ 28.774 ~ 54.310 | | |
| $r_1$ = 14.4546 | $d_1$ = 3.0500 | | $n_{d1}$ = 1.51633 | $\nu_{d1}$ = 64.14 |
| (Aspheric) | | | | |
| $r_2$ = −671.8706 | $d_2$ = (Variable) | | | |
| $r_3$ = −62.6335 | $d_3$ = 1.0000 | | $n_{d2}$ = 1.79952 | $\nu_{d2}$ = 42.22 |
| $r_4$ = 32.4674 | $d_4$ = (Variable) | | | |
| $r_5$ = −26.3881 | $d_5$ = 1.1382 | | $n_{d3}$ = 1.49700 | $\nu_{d3}$ = 81.54 |
| (Aspheric) | | | | |
| $r_6$ = −35.7460 | $d_6$ = 0.7146 | | | |
| $r_7$ = ∞ (Stop) | $d_7$ = (Variable) | | | |
| $r_8$ = 16.9552 | $d_8$ = 5.6730 | | $n_{d4}$ = 1.84666 | $\nu_{d4}$ = 23.78 |
| $r_9$ = 10.6607 | $d_9$ = 5.2733 | | $n_{d5}$ = 1.53996 | $\nu_{d5}$ = 59.46 |
| $r_{10}$ = −17.7599 | $d_{10}$ = (Variable) | | | |
| $r_{11}$ = −14.1323 | $d_{11}$ = 0.5000 | | $n_{d6}$ = 1.77250 | $\nu_{d6}$ = 49.60 |
| (Aspheric) | | | | |
| $r_{12}$ = −44.7798 | $d_{12}$ = 0.1054 | | | |
| $r_{13}$ = −40.8798 | $d_{13}$ = 3.9500 | | $n_{d7}$ = 1.80518 | $\nu_{d7}$ = 25.42 |
| $r_{14}$ = −16.4958 | $d_{14}$ = 1.3147 | | | |
| $r_{15}$ = −12.8273 | $d_{15}$ = 1.5000 | | $n_{d8}$ = 1.69680 | $\nu_{d8}$ = 55.53 |
| (Aspheric) | | | | |
| $r_{16}$ = −248.8666 | | | | |

Zooming Spaces

| | WI | ST | TE |
|---|---|---|---|
| f | 38.002 | 73.000 | 115.000 |
| $d_2$ | 0.35000 | 1.78561 | 2.11023 |
| $d_4$ | 2.00000 | 8.98372 | 13.09008 |
| $d_7$ | 2.26766 | 1.50702 | 1.14260 |
| $d_{10}$ | 8.91049 | 3.22697 | 0.95000 |

Aspherical Coefficients

1st surface

K = 0
$A_4$ = 4.2252 × 10⁻⁶
$A_6$ = 5.9088 × 10⁻⁸
$A_8$ = 2.7236 × 10⁻¹⁰
$A_{10}$ = 4.5907 × 10⁻¹³

5th surface

K = 0
$A_4$ = −2.0608 × 10⁻⁵
$A_6$ = −5.5658 × 10⁻⁷
$A_8$ = 1.0980 × 10⁻⁸
$A_{10}$ = −1.4641 × 10⁻¹⁰

10th surface

K = 0
$A_4$ = 9.2344 × 10⁻⁵
$A_6$ = 1.8561 × 10⁻⁷
$A_8$ = −6.8685 × 10⁻⁹
$A_{10}$ = 9.0798 × 10⁻¹¹

-continued

11th surface

K = 0
$A_4$ = 9.3383 × 10$^{-5}$
$A_6$ = 5.0709 × 10$^{-7}$
$A_8$ = −8.0068 × 10$^{-9}$
$A_{10}$ = 9.0706 × 10$^{-12}$

15th surface

K = 0
$A_4$ = 1.4397 × 10$^{-5}$
$A_6$ = −9.9242 × 10$^{-8}$
$A_8$ = 1.2126 × 10$^{-9}$
$A_{10}$ = 2.3789 × 10$^{-11}$

EXAMPLE 25 f = 38.897 ~ 73.000 ~ 131.100
$F_{NO}$ = 4.333 ~ 7.128 ~ 11.802
$f_B$ = 7.083 ~ 26.715 ~ 59.151

$r_1$ = 14.7061  $d_1$ = 3.0500  $n_{d1}$ = 1.51633  $v_{d1}$ = 64.14
(Aspheric)
$r_2$ = −158.1131  $d_2$ = (Variable)
$r_3$ = −60.6963  $d_3$ = 1.0000  $n_{d2}$ = 1.79952  $v_{d2}$ = 42.22
$r_4$ = 35.1034  $d_4$ = (Variable)
$r_5$ = −28.5115  $d_5$ = 1.0933  $n_{d3}$ = 1.49700  $v_{d3}$ = 81.54
(Aspheric)
$r_6$ = −49.4509  $d_6$ = 0.7993
$r_7$ = ∞ (Stop)  $d_7$ = (Variable)
$r_8$ = 17.3966  $d_8$ = 5.5443  $n_{d4}$ = 1.84666  $v_{d4}$ = 23.78
$r_9$ = 10.4518  $d_9$ = 5.8476  $n_{d5}$ = 1.53996  $v_{d5}$ = 59.46
$r_{10}$ = −16.8542  $d_{10}$ = (Variable)
$r_{11}$ = −13.9280  $d_{11}$ = 0.5000  $n_{d6}$ = 1.77250  $v_{d6}$ = 49.60
$r_{12}$ = −159.6178  $d_{12}$ = 0.2675
$r_{13}$ = −86.9727  $d_{13}$ = 3.3785  $n_{d7}$ = 1.80518  $v_{d7}$ = 25.42
$r_{14}$ = −17.0860  $d_{14}$ = 1.3667
$r_{15}$ = −12.5327  $d_{15}$ = 1.5000  $n_{d8}$ = 1.69680  $v_{d8}$ = 55.53
(Aspheric)
$r_{16}$ = −101.4662

Zooming Spaces

| | WI | ST | TE |
|---|---|---|---|
| f | 38.897 | 73.000 | 131.100 |
| $d_2$ | 0.37017 | 1.51923 | 1.70067 |
| $d_4$ | 2.00000 | 9.46621 | 15.38094 |
| $d_7$ | 1.33156 | 0.70578 | 0.55500 |
| $d_{10}$ | 9.00000 | 3.66752 | 0.95000 |

Aspherical Coefficients

1st surface

K = 0
$A_4$ = 2.6416 × 10$^{-6}$
$A_6$ = 2.9459 × 10$^{-8}$
$A_8$ = 4.7002 × 10$^{-10}$
$A_{10}$ = −2.3451 × 10$^{-12}$

5th surface $A_4$ = −2.0608 × 10$^{-5}$
$A_6$ = −5.3538 × 10$^{-7}$
$A_8$ = 1.0980 × 10$^{-8}$
$A_{10}$ = −1.4641 × 10$^{-10}$ 10th surface K = 0
$A_4$ = 8.7152 × 10$^{-5}$
$A_6$ = 1.2204 × 10$^{-8}$
$A_8$ = −3.1142 × 10$^{-9}$
$A_{10}$ = 4.7041 × 10$^{-11}$ -continued 11th surface K = 0
$A_4$ = 8.4612 × 10$^{-5}$
$A_6$ = 5.5309 × 10$^{-7}$
$A_8$ = −7.3453 × 10$^{-9}$
$A_{10}$ = −1.4465 × 10$^{-11}$ 15th surface K = 0
$A_4$ = 3.1681 × 10$^{-5}$
$A_6$ = −9.7381 × 10$^{-8}$
$A_8$ = 9.2552 × 10$^{-10}$
$A_{10}$ = 3.5899 × 10$^{-11}$

EXAMPLE 26 f = 38.900 ~ 73.369 ~ 149.998
$F_{NO}$ = 4.786 ~ 7.575 ~ 13.380
$f_B$ = 7.144 ~ 26.936 ~ 69.439

$r_1$ = 12.4841  $d_1$ = 2.9500  $n_{d1}$ = 1.49700  $v_{d1}$ = 81.54
(Aspheric)
$r_2$ = 107.1351  $d_2$ = (Variable)
$r_3$ = 291.1124  $d_3$ = 1.0648  $n_{d2}$ = 1.61800  $v_{d2}$ = 63.33
$r_4$ = 23.6685  $d_4$ = (Variable)
(Aspheric)
$r_5$ = −20.9081  $d_5$ = 0.9000  $n_{d3}$ = 1.78800  $v_{d3}$ = 47.37
(Aspheric)
$r_6$ = 30.8797  $d_6$ = 0.2406
$r_7$ = ∞ (Stop)  $d_7$ = 0.2576
$r_8$ = 11.2006  $d_8$ = 1.7272  $n_{d4}$ = 1.59551  $v_{d4}$ = 39.24
(Aspheric)
$r_9$ = 23.4895  $d_9$ = (Variable)
$r_{10}$ = 10.0875  $d_{10}$ = 3.4500  $n_{d5}$ = 1.51633  $v_{d5}$ = 64.14
$r_{11}$ = −10.1510  $d_{11}$ = 0.1000
$r_{12}$ = −10.4155  $d_{12}$ = 0.6426  $n_{d6}$ = 1.80440  $v_{d6}$ = 39.59
$r_{13}$ = −20.5016  $d_{13}$ = (Variable)
(Aspheric)
$r_{14}$ = −10.1853  $d_{14}$ = 4.1817  $n_{d7}$ = 1.84666  $v_{d7}$ = 23.78
(Aspheric)
$r_{15}$ = −10.1307  $d_{15}$ = 0.7029
(Aspheric)
$r_{16}$ = −9.9961  $d_{16}$ = 1.8765  $n_{d8}$ = 1.69680  $v_{d8}$ = 55.53
(Aspheric)
$r_{17}$ = −85.6799

Zooming Spaces

| | WI | ST | TE |
|---|---|---|---|
| f | 38.900 | 73.369 | 149.998 |
| $d_2$ | 0.22966 | 0.20916 | 0.14744 |
| $d_4$ | 1.26045 | 10.60613 | 17.22560 |
| $d_9$ | 1.66686 | 1.64151 | 1.54087 |
| $d_{13}$ | 13.14006 | 7.59327 | 3.58522 |

Aspherical Coefficients

1st surface

K = 0
$A_4$ = 4.2485 × 10$^{-5}$
$A_6$ = 4.8108 × 10$^{-7}$
$A_8$ = 3.5843 × 10$^{-9}$
$A_{10}$ = 1.4395 × 10$^{-10}$

4th surface

K = 0
$A_4$ = 7.3233 × 10$^{-5}$
$A_6$ = 5.0761 × 10$^{-7}$
$A_8$ = 1.6623 × 10$^{-8}$
$A_{10}$ = 3.1165 × 10$^{-11}$

5th surface

K = 0
$A_4$ = −2.0608 × 10$^{-5}$

-continued $A_6 = -5.5658 \times 10^{-7}$
$A_8 = 1.0980 \times 10^{-8}$
$A_{10} = -1.4641 \times 10^{-10}$
8th surface $K = 0$
$A_4 = -1.7620 \times 10^{-4}$
$A_6 = -2.0071 \times 10^{-5}$
$A_8 = 4.4917 \times 10^{-7}$
$A_{10} = -3.9443 \times 10^{-8}$
9th surface $K = 0$
$A_4 = -3.8193 \times 10^{-4}$
$A_6 = -2.1704 \times 10^{-5}$
$A_8 = -5.3608 \times 10^{-8}$
$A_{10} = -1.5986 \times 10^{-8}$
13th surface $K = 0$
$A_4 = 3.6523 \times 10^{-4}$
$A_6 = 5.7051 \times 10^{-6}$
$A_8 = 5.8546 \times 10^{-8}$
$A_{10} = -2.5500 \times 10^{-9}$
14th surface $A_4 = 6.9325 \times 10^{-5}$
$A_6 = 4.5484 \times 10^{-6}$
$A_8 = -6.1047 \times 10^{-8}$
$A_{10} = 4.3884 \times 10^{-10}$
15th surface $K = 0$
$A_4 = -2.8736 \times 10^{-4}$
$A_6 = 9.5370 \times 10^{-6}$
$A_8 = -8.4693 \times 10^{-8}$
$A_{10} = 4.1007 \times 10^{-10}$
16th surface $K = 0$
$A_4 = -3.8125 \times 10^{-4}$
$A_6 = 1.0648 \times 10^{-5}$
$A_8 = -9.4641 \times 10^{-8}$
$A_{10} = 4.6459 \times 10^{-10}$

EXAMPLE 27

$f = 38.900 \sim 76.140 \sim 152.000$
$F_{NO} = 4.569 \sim 7.332 \sim 13.157$
$f_B = 7.040 \sim 26.015 \sim 63.796$

| | | | | |
|---|---|---|---|---|
| $r_1 = -24.9882$ | $d_1 = 0.4500$ | $n_{d1} = 1.78800$ | $\nu_{d1} = 47.37$ |
| $r_2 = -44.9958$ | $d_2 = 0.1025$ | | |
| $r_3 = 14.4174$ | $d_3 = 2.8003$ | $n_{d2} = 1.49700$ | $\nu_{d2} = 81.54$ |
| (Aspheric) | | | |
| $r_4 = -27.6222$ | $d_4 = 0.0770$ | | |
| $r_5 = -25.9905$ | $d_5 = 0.7700$ | $n_{d3} = 1.80100$ | $\nu_{d3} = 34.97$ |
| $r_6 = -37.5232$ | $d_6 = $ (Variable) | | |
| (Aspheric) | | | |
| $r_7 = -654.1460$ | $d_7 = 0.900$ | $n_{d4} = 1.78800$ | $\nu_{d4} = 47.37$ |
| (Aspheric) | | | |
| $r_8 = 13.2682$ | $d_8 = $ (Variable) | | |
| $r_9 = \infty$ (Stop) | $d_9 = 0.6000$ | | |
| $r_{10} = 15.4357$ | $d_{10} = 1.6000$ | $n_{d5} = 1.84666$ | $\nu_{d5} = 23.78$ |
| (Aspheric) | | | |
| $r_{11} = -4.837.9551$ | $d_{11} = $ (Variable) | | |
| $r_{12} = 38.7220$ | $d_{12} = 1.1000$ | $n_{d6} = 1.80518$ | $\nu_{d6} = 25.42$ |
| $r_{13} = 9.6623$ | $d_{13} = 4.8575$ | $n_{d7} = 1.49700$ | $\nu_{d7} = 81.54$ |
| $r_{14} = -12.3131$ | $d_{14} = $ (Variable) | | |
| (Aspheric) | | | |
| $r_{15} = -9.9433$ | $d_{15} = 1.1186$ | $n_{d8} = 1.78800$ | $\nu_{d8} = 47.37$ |
| (Aspheric) | | | |
| $r_{16} = -256.9877$ | $d_{16} = 0.1815$ | | |
| $r_{17} = -144.9281$ | $d_{17} = 5.4395$ | $n_{d9} = 1.84666$ | $\nu_{d9} = 23.78$ |
| $r_{18} = -16.3931$ | $d_{18} = 0.5003$ | | |

-continued

| | | | | |
|---|---|---|---|---|
| (Aspheric) | | | | |
| $r_{19} = -15.3585$ | $d_{19} = 1.4148$ | $n_{d10} = 1.78800$ | $\nu_{d10} = 47.37$ |
| $r_{20} = -157.6784$ | | | |

Zooming Spaces

| | WI | ST | TE |
|---|---|---|---|
| f | 38.900 | 76.140 | 152.000 |
| $d_6$ | 2.08386 | 7.31022 | 10.29067 |
| $d_8$ | 1.64992 | 1.77703 | 1.83163 |
| $d_{11}$ | 3.05008 | 2.88130 | 2.89011 |
| $d_{14}$ | 9.00000 | 3.99218 | 0.73309 |

Aspherical Coefficients

3rd surface $K = 0$
$A_4 = -1.9526 \times 10^{-5}$
$A_6 = -1.4626 \times 10^{-7}$
$A_8 = 1.2590 \times 10^{-9}$
$A_{10} = -1.3293 \times 10^{-11}$
7th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$
10th surface $K = 0$
$A_4 = -4.1413 \times 10^{-5}$
$A_6 = 7.1824 \times 10^{-7}$
$A_8 = -4.9070 \times 10^{-8}$
$A_{10} = 9.3592 \times 10^{-10}$
14th surface $K = 0$
$A_4 = 2.8041 \times 10^{-5}$
$A_6 = -1.8088 \times 10^{-6}$
$A_8 = 5.2892 \times 10^{-8}$
$A_{10} = -1.1802 \times 10^{-9}$
15th surface $K = 0$
$A_4 = 1.6762 \times 10^{-4}$
$A_6 = 3.4046 \times 10^{-8}$
$A_8 = 1.2657 \times 10^{-9}$
$A_{10} = 3.6134 \times 10^{-11}$
18th surface $K = 0$
$A_4 = 1.5852 \times 10^{-5}$
$A_6 = -1.6358 \times 10^{-7}$
$A_8 = 8.9669 \times 10^{-10}$
$A_{10} = -1.0195 \times 10^{-11}$

EXAMPLE 28

$f = 38.900 \sim 75.994 \sim 195.500$
$F_{NO} = 4.682 \sim 7.887 \sim 15.157$
$f_B = 7.118 \sim 26.600 \sim 52.376$

| | | | | |
|---|---|---|---|---|
| $r_1 = 18.3538$ | $d_1 = 1.1500$ | $n_{d1} = 1.581244$ | $\nu_{d1} = 40.75$ |
| $r_2 = 30.5183$ | $d_2 = $ (Variable) | | |
| $r_3 = 116.7105$ | $d_3 = 2.4550$ | $n_{d2} = 1.49700$ | $\nu_{d2} = 81.54$ |
| (Aspheric) | | | |
| $r_4 = -14.1353$ | $d_4 = 1.0000$ | $n_{d3} = 1.80100$ | $\nu_{d3} = 34.97$ |
| $r_5 = -40.4249$ | $d_5 = $ (Variable) | | |
| (Aspheric) | | | |
| $r_6 = -23.1325$ | $d_6 = 0.9000$ | $n_{d4} = 1.77250$ | $\nu_{d4} = 49.60$ |
| (Aspheric) | | | |
| $r_7 = 307.8116$ | $d_7 = $ (Variable) | | |

-continued

| | | | |
|---|---|---|---|
| $r_8 = \infty$ (Stop) | $d_8 = 0.6000$ | | |
| $r_9 = 28.5430$ (Aspheric) | $d_9 = 1.4500$ | $n_{d5} = 1.69895$ | $\nu_{d5} = 30.13$ |
| $r_{10} = -26.0382$ | $d_{10}$ = (Variable) | | |
| $r_{11} = -26.0579$ | $d_{11} = 0.6500$ | $n_{d6} = 1.78800$ | $\nu_{d6} = 47.37$ |
| $r_{12} = 9.5547$ | $d_{12} = 2.2500$ | $n_{d7} = 1.49700$ | $\nu_{d7} = 81.54$ |
| $r_{13} = -20.2569$ | $d_{13} = 0.1000$ | | |
| $r_{14} = 45.7262$ | $d_{14} = 4.1000$ | $n_{d8} = 1.49700$ | $\nu_{d8} = 81.54$ |
| $r_{15} = -10.5876$ | $d_{15}$ = (Variable) | | |
| $r_{16} = -10.8438$ | $d_{16} = 0.7300$ | $n_{d9} = 1.78800$ | $\nu_{d9} = 47.37$ |
| $r_{17} = 101.3343$ | $d_{17} = 0.0500$ | | |
| $r_{18} = 138.1544$ | $d_{18} = 3.0000$ | $n_{d10} = 1.80518$ | $\nu_{d10} = 25.42$ |
| $r_{19} = -22.6461$ (Aspheric) | $d_{19} = 3.7700$ | | |
| $r_{20} = -10.7522$ (Aspheric) | $d_{20} = 0.5500$ | $n_{d11} = 1.78800$ | $\nu_{d11} = 47.37$ |
| $r_{21} = -34.0000$ | | | |

Zooming Spaces

| | WI | ST | TE |
|---|---|---|---|
| f | 38.900 | 75.994 | 195.500 |
| $d_2$ | 0.37700 | 3.40901 | 0.77000 |
| $d_5$ | 2.00000 | 3.33979 | 19.02364 |
| $d_7$ | 1.02966 | 2.34774 | 0.88000 |
| $d_{10}$ | 2.06965 | 0.84963 | 8.86434 |
| $d_{15}$ | 9.83203 | 7.35444 | 0.55000 |

Aspherical Coefficients

3rd surface $K = 0$
$A_4 = -4.2216 \times 10^{-5}$
$A_6 = -3.4001 \times 10^{-7}$
$A_8 = 5.2219 \times 10^{-9}$
$A_{10} = -8.2945 \times 10^{-11}$ 5th surface $K = 0$
$A_4 = -4.9522 \times 10^{-5}$
$A_6 = -2.2537 \times 10^{-7}$
$A_8 = 4.3427 \times 10^{-9}$
$A_{10} = -5.4843 \times 10^{-11}$ 6th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 9th surface $K = 0$
$A_4 = -4.5200 \times 10^{-5}$
$A_6 = 9.7792 \times 10^{-8}$
$A_8 = 7.1610 \times 10^{-9}$
$A_{10} = -2.1245 \times 10^{-10}$ 13th surface $K = 0$
$A_4 = 9.4868 \times 10^{-5}$
$A_6 = 3.2005 \times 10^{-6}$
$A_8 = -5.4224 \times 10^{-8}$
$A_{10} = 3.8493 \times 10^{-9}$ 15th surface $K = 0$
$A_4 = -3.3742 \times 10^{-5}$
$A_6 = -2.1472 \times 10^{-6}$
$A_8 = 1.8856 \times 10^{-8}$
$A_{10} = -1.2064 \times 10^{-9}$ 16th surface $K = 0$
$A_4 = 2.7807 \times 10^{-4}$
$A_6 = 1.4022 \times 10^{-6}$
$A_8 = -2.4666 \times 10^{-8}$
$A_{10} = 2.2446 \times 10^{-10}$ 19th surface $K = 0$
$A_4 = 1.5409 \times 10^{-5}$
$A_6 = 8.7408 \times 10^{-7}$
$A_8 = -1.3045 \times 10^{-8}$
$A_{10} = 5.9160 \times 10^{-11}$ 20th surface $K = 0$
$A_4 = -4.1301 \times 10^{-5}$
$A_6 = 2.1001 \times 10^{-7}$
$A_8 = -1.9550 \times 10^{-9}$
$A_{10} = 2.3273 \times 10^{-11}$

EXAMPLE 29

$f = 38.900 \sim 70.571 \sim 197.989$
$F_{NO} = 4.813 \sim 8.164 \sim 15.348$
$f_B = 7.144 \sim 27.105 \sim 52.833$

| | | | |
|---|---|---|---|
| $r_1 = 16.7102$ | $d_1 = 1.0500$ | $n_{d1} = 1.58144$ | $\nu_{d1} = 40.75$ |
| $r_2 = 23.2731$ | $d_2$ = (Variable) | | |
| $r_3 = -245.7686$ (Aspheric) | $d_3 = 2.0500$ | $n_{d2} = 1.49700$ | $\nu_{d2} = 81.54$ |
| $r_4 = -11.3525$ | $d_4 = 0.5000$ | $n_{d3} = 1.80100$ | $\nu_{d3} = 34.97$ |
| $r_5 = -24.9633$ (Aspheric) | $d_5$ = (Variable) | | |
| $r_6 = -17.1245$ (Aspheric) | $d_6 = 0.9000$ | $n_{d4} = 1.77250$ | $\nu_{d4} = 49.60$ |
| $r_7 = -90.7512$ | $d_7$ = (Variable) | | |
| $r_8 = \infty$ (Stop) | $d_8 = 0.6000$ | | |
| $r_9 = 42.4810$ (Aspheric) | $d_9 = 1.4500$ | $n_{d5} = 1.69895$ | $\nu_{d5} = 30.13$ |
| $r_{10} = -20.6455$ | $d_{10}$ = (Variable) | | |
| $r_{11} = -24.6802$ | $d_{11} = 0.6500$ | $n_{d6} = 1.78800$ | $\nu_{d6} = 47.37$ |
| $r_{12} = 10.6701$ | $d_{12} = 2.2500$ | $n_{d7} = 1.49700$ | $\nu_{d7} = 81.54$ |
| $r_{13} = -20.8102$ (Aspheric) | $d_{13}$ = (Variable) | | |
| $r_{14} = 33.2817$ | $d_{14} = 4.1000$ | $n_{d8} = 1.49700$ | $\nu_{d8} = 81.54$ |
| $r_{15} = -11.3160$ (Aspheric) | $d_{15}$ = (Variable) | | |
| $r_{16} = -11.1044$ (Aspheric) | $d_{16} = 0.7300$ | $n_{d9} = 1.77250$ | $\nu_{d9} = 49.60$ |
| $r_{17} = 72.1298$ | $d_{17} = 0.0500$ | | |
| $r_{18} = 94.5956$ | $d_{18} = 3.4500$ | $n_{d10} = 1.72151$ | $\nu_{d10} = 29.23$ |
| $r_{19} = -22.0046$ (Aspheric) | $d_{19} = 3.7700$ | | |
| $r_{20} = -11.1347$ (Aspheric) | $d_{20} = 0.5500$ | $n_{d11} = 1.78800$ | $\nu_{d11} = 47.37$ |
| $r_{21} = -34.0000$ | | | |

Zooming Spaces

| | WI | ST | TE |
|---|---|---|---|
| f | 38.900 | 70.571 | 197.989 |
| $d_2$ | 1.27000 | 2.39180 | 0.77000 |
| $d_5$ | 2.0000 | 1.63000 | 19.04448 |
| $d_7$ | 0.90000 | 2.82481 | 0.88000 |

-continued

| | | | |
|---|---|---|---|
| $d_{10}$ | 2.26608 | 0.93066 | 12.52134 |
| $d_{13}$ | 0.22344 | 0.18592 | 0.29355 |
| $d_{15}$ | 10.29365 | 7.90848 | 0.55000 |

Aspheric Coefficients

3rd surface $K = 0$
$A_4 = -4.9968 \times 10^{-5}$
$A_6 = -3.0993 \times 10^{-7}$
$A_8 = 6.5332 \times 10^{-9}$
$A_{10} = -6.2392 \times 10^{-11}$ 5th surface $K = 0$
$A_4 = -5.3087 \times 10^{-5}$
$A_6 = -2.4946 \times 10^{-7}$
$A_8 = 5.0351 \times 10^{-8}$
$A_{10} = -4.8011 \times 10^{-11}$ 6th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 9th surface $K = 0$
$A_4 = -2.7634 \times 10^{-5}$
$A_6 = 6.0064 \times 10^{-8}$
$A_8 = 8.9130 \times 10^{-9}$
$A_{10} = -2.0494 \times 10^{-10}$ 13th surface $K = 0$
$A_4 = 8.3664 \times 10^{-5}$
$A_6 = 2.9972 \times 10^{-6}$
$A_8 = -3.5771 \times 10^{-8}$
$A_{10} = 2.0351 \times 10^{-9}$ 15th surface $K = 0$
$A_4 = -1.3598 \times 10^{-5}$
$A_6 = -1.8198 \times 10^{-6}$
$A_8 = 1.2790 \times 10^{-8}$
$A_{10} = -4.6464 \times 10^{-10}$ 16th surface $K = 0$
$A_4 = 2.5559 \times 10^{-4}$
$A_6 = 8.4280 \times 10^{-7}$
$A_8 = -2.2033 \times 10^{-8}$
$A_{10} = 2.2846 \times 10^{-10}$ 19th surface $K = 0$
$A_4 = 2.6201 \times 10^{-6}$
$A_6 = 7.3539 \times 10^{-7}$
$A_8 = -1.8396 \times 10^{-8}$
$A_{10} = 8.7036 \times 10^{-11}$ 20th surface $K = 0$
$A_4 = -4.9362 \times 10^{-5}$
$A_6 = 2.2412 \times 10^{-7}$
$A_8 = -6.3289 \times 10^{-9}$
$A_{10} = -8.7032 \times 10^{-12}$

EXAMPLE 30

$f = 38.900 \sim 71.362 \sim 201.579$
$F_{NO} = 4.800 \sim 8.146 \sim 15.627$
$f_B = 7.116 \sim 27.103 \sim 53.165$

| | | | |
|---|---|---|---|
| $r_1 = 16.5678$ | $d_1 = 1.0500$ | $n_{d1} = 1.58144$ | $\nu_{d1} = 40.75$ |
| $r_2 = 22.9631$ | $d_2 = $ (Variable) | | |
| $r_3 = -216.5376$ (Aspheric) | $d_3 = 2.0500$ | $n_{d2} = 1.49700$ | $\nu_{d2} = 81.54$ |
| $r_4 = -11.5136$ | $d_4 = 0.5000$ | $n_{d3} = 1.80100$ | $\nu_{d3} = 34.97$ |
| $r_5 = -24.9210$ (Aspheric) | $d_5 = $ (Variable) | | |
| $r_6 = -17.6659$ (Aspheric) | $d_6 = 0.9000$ | $n_{d4} = 1.77250$ | $\nu_{d4} = 49.60$ |
| $r_7 = -88.9985$ | $d_7 = $ (Variable) | | |
| $r_8 = \infty$ (Stop) | $d_8 = 0.6000$ | | |
| $r_9 = 62.6527$ (Aspheric) | $d_9 = 1.4500$ | $n_{d5} = 1.69895$ | $\nu_{d5} = 30.13$ |
| $r_{10} = -19.3662$ | $d_{10} = $ (Variable) | | |
| $r_{11} = -21.5320$ | $d_{11} = 0.6500$ | $n_{d6} = 1.78800$ | $\nu_{d6} = 47.37$ |
| $r_{12} = 11.5159$ | $d_{12} = 2.2500$ | $n_{d7} = 1.49700$ | $\nu_{d7} = 81.54$ |
| $r_{13} = -19.2137$ (Aspheric) | $d_{13} = $ (Variable) | | |
| $r_{14} = 27.5724$ | $d_{14} = 4.1000$ | $n_{d8} = 1.49700$ | $\nu_{d8} = 81.54$ |
| $r_{15} = -11.6200$ (Aspheric) | $d_{15} = $ (Variable) | | |
| $r_{16} = -11.5986$ (Aspheric) | $d_{16} = 0.7300$ | $n_{d9} = 1.77250$ | $\nu_{d9} = 49.60$ |
| $r_{17} = 39.7469$ | $d_{17} = 0.0500$ | | |
| $r_{18} = 46.2208$ | $d_{18} = 3.4500$ | $n_{10} = 1.72151$ | $\nu_{d10} = 29.23$ |
| $r_{19} = -23.2175$ (Aspheric) | $d_{19} = 3.7700$ | | |
| $r_{20} = -11.2583$ (Aspheric) | $d_{20} = 0.5500$ | $n_{11} = 1.78800$ | $\nu_{d11} = 47.37$ |
| $r_{21} = -35.6670$ | | | |

Zooming Spaces

| | WI | ST | TE |
|---|---|---|---|
| f | 38.900 | 71.362 | 201.579 |
| $d_2$ | 1.27000 | 2.89033 | 0.77000 |
| $d_5$ | 2.00000 | 1.63000 | 19.05125 |
| $d_7$ | 0.90000 | 2.73016 | 0.88000 |
| $d_{10}$ | 2.99882 | 1.44677 | 13.21403 |
| $d_{13}$ | 0.15081 | 0.10000 | 0.42017 |
| $d_{15}$ | 10.03359 | 7.68677 | 0.55000 |

Aspherical Coefficients

3rd surface $K = 0$
$A_4 = -5.8379 \times 10^{-5}$
$A_6 = -3.4837 \times 10^{-7}$
$A_8 = 7.4622 \times 10^{-9}$
$A_{10} = 1.0236 \times 10^{-10}$ 5th surface $K = 0$
$A_4 = -5.6224 \times 10^{-5}$
$A_6 = -2.4072 \times 10^{-7}$
$A_8 = 5.2060 \times 10^{-9}$
$A_{10} = -6.5536 \times 10^{-11}$ 6th surfaee $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 9th surface $K = 0$
$A_4 = -2.6617 \times 10^{-5}$
$A_6 = 1.1990 \times 10^{-8}$
$A_8 = 1.5381 \times 10^{-8}$
$A_{10} = -3.7377 \times 10^{-10}$ -continued 13th surface K = 0
$A_4 = 6.9157 \times 10^{-5}$
$A_6 = 1.7878 \times 10^{-6}$
$A_8 = 1.9695 \times 10^{-9}$
$A_{10} = -9.1711 \times 10^{-10}$ 15th surface K = 0
$A_4 = 3.0974 \times 10^{-7}$
$A_6 = -9.7504 \times 10^{-7}$
$A_8 = -8.0093 \times 10^{-9}$
$A_{10} = -4.7999 \times 10^{-12}$ 16th surface K = 0
$A_4 = 2.4183 \times 10^{-4}$
$A_6 = 8.3100 \times 10^{-7}$
$A_8 = -2.0799 \times 10^{-8}$
$A_{10} = 1.6817 \times 10^{-10}$ 19th surface K = 0
$A_4 = -9.2730 \times 10^{-6}$
$A_6 = 8.2199 \times 10^{-7}$
$A_8 = -1.4913 \times 10^{-8}$
$A_{10} = 7.4949 \times 10^{-11}$ 20th surface K = 0
$A_4 = -5.6465 \times 10^{-5}$
$A_6 = 2.4101 \times 10^{-7}$
$A_8 = -6.8726 \times 10^{-9}$
$A_{10} = 4.5832 \times 10^{-11}$

TABLE 1

| Example | (I) $\|f_L\|/f_T$ (1), (4), (7), (10) | (II) $\Delta X_{LT}/f_T$ (2), (5), (8), (11) | (III) $\beta_{LT}/\beta_{LW}$ (3), (6), (9), (12) |
|---|---|---|---|
| 1 | 0.1125 | 0.374 | 2.848 |
| 2 | 0.1051 | 0.360 | 2.854 |
| 3 | 0.0974 | 0.369 | 2.923 |
| 4 | 0.0782 | 0.343 | 3.226 |
| 5 | 0.0743 | 0.343 | 3.253 |
| 6 | 0.0766 | 0.349 | 3.270 |
| 7 | 0.0785 | 0.361 | 3.341 |
| 8 | 0.0935 | 0.411 | 3.360 |
| 9 | 0.0977 | 0.432 | 3.349 |
| 10 | 0.0971 | 0.3714 | 3.079 |
| 11 | 0.0782 | 0.3420 | 3.0971 |
| 12 | 0.0655 | 0.2923 | 3.2525 |
| 13 | 0.0582 | 0.2691 | 3.1165 |
| 14 | 0.0585 | 0.2784 | 3.1874 |
| 15 | 0.0484 | 0.2339 | 3.2328 |
| 16 | 0.04875 | 0.2137 | 3.01854 |
| 17 | 0.1526 | 0.3670 | 2.320 |
| 18 | 0.1471 | 0.3840 | 2.4589 |
| 19 | 0.1479 | 0.4209 | 2.5453 |
| 20 | 0.1444 | 0.3194 | 2.2506 |
| 21 | 0.1217 | 0.3753 | 2.7582 |
| 22 | 0.1085 | 0.3726 | 2.9057 |
| 23 | 0.216 | 0.523 | 2.625 |
| 24 | 0.144 | 0.411 | 2.746 |
| 25 | 0.123 | 0.397 | 2.953 |
| 26 | 0.120 | 0.415 | 3.106 |
| 27 | 0.087 | 0.373 | 3.240 |
| 28 | 0.0528 | 0.232 | 3.179 |
| 29 | 0.0530 | 0.231 | 3.150 |
| 30 | 0.052 | 0.228 | 3.178 |

$|f_3|/f_T$, $\Delta X_{3T}/f_T$ and $\beta_{3T}/\beta_{3W}$ for the three-group zoom lens systems in the foregoing examples have the values given in Table 1, and are within the following ranges or the ranges defined by conditions (I), (II) and (III). Thus, these zoom lens systems are reduced in terms of length during lens collapsing or at the wide-angle ends as well as the telephoto ends, with well-corrected aberrations, although they have high zoom ratios.

$$0.07 < |f_3|/f_3|/f_T < 0.12$$

$$0.34 < \Delta X_{3T}/f_T < 0.44$$

$$2.8 < \beta_{3T}/\beta_{3W} < 3.4$$

As already explained, the third lens group comprises a cemented or air-spaced doublet composed of a negative meniscus lens having a strong concave surface on its object side and a positive lens, and a negative meniscus lens having a strong concave surface on its object side. From a comparison on an absolute value basis of the radius of curvature of the object-side concave surface of the negative meniscus lens located on the object side with that of the negative meniscus lens located on the image side, it is found that the object-side concave surface of the negative meniscus lens located on the object side has a smaller radius of curvature.

The radius of curvature of the object-side concave surface of the negative meniscus lens located on the image side is so smallest that when the second and third lens groups are proximate to each other, the apex of the surface of the lens located nearest to the object side in the second lens group is positioned closer to the image side than to the peripheral portion of the lens located nearest to the object side in the third lens group (a position where a chamfered surface intersects a spherical surface). Accordingly, the lens located nearest to the image side in the second lens group can move in a space defined by this concave surface. As a result, not only can the length of the lens system at the telephoto end be reduced but also the size of the camera during lens collapsing can be reduced.

The thickness on the optical axis of the positive lens is larger than that of each of the two negative meniscus lens. In addition, this thickness is about 1.7 to 2.3 times as large as the total thickness of the two negative meniscus lenses on the optical axis.

The three-group zoom lens system of the invention has a zoom ratio of 3 or greater and a telephoto ratio of about 0.8 to 0.5. The zoom lens systems exemplified herein have a zoom ratio of 3.37 to 3.88 and a telephoto ratio of 0.63 to 0.72.

$|f_4|/f_T$, $\Delta X_{4T}/f_T$ and $\beta_{4T}/\beta_{4W}$ for the four-group zoom lens systems of +++− construction in the foregoing examples have the values given in Table 1, and are within the following ranges or the ranges defined by conditions (4), (5) and (6). Thus, these zoom lens systems are reduced in terms of length during lens collapsing or at the wide-angle ends as well as the telephoto ends, with well-corrected aberrations, although they have high zoom ratios.

$$0.045 < |f_4|/f_T < 0.10$$

$$0.21 < \Delta X_{4T}/f_T < 0.38$$

$$3.0 < \beta_{4T}/\beta_{4W} < 3.4$$

As already explained, the fourth lens group G4 comprises a doublet composed of a negative meniscus lens having a strong concave surface on its objet side and a positive meniscus lens or a double-concave negative lens having a strong concave surface on its object side and a double-convex positive lens, and a negative meniscus lens having a strong concave surface on its object side. From a comparison on an absolute value basis of the radius of curvature of the object-side concave surface of the negative meniscus lens located on the object side with that of the negative meniscus lens located on the image side, it is found that the object-side concave surface of the negative meniscus lens located on the object side has a smaller radius of curvature.

The radius of curvature of the object-side concave surface of the negative lens located on the object side is smallest or second-smallest in the zoom optical system and the outer diameter of the fourth lens group G4 is larger than that of the third lens group G3, so that when the third and fourth lens groups G3 and G4 are proximate to each other, the apex of the surface of the lens located nearest to the image side in the third lens group G3 is positioned closer to the image side than to the peripheral portion of the lens located nearest to the object side in the fourth lens group G4. Accordingly, the lens located nearest to the image side in the third lens group G3 can move in a space defined by this concave surface. As a result, not only can the length of the lens system at the telephoto end be reduced but also the size of the camera during lens collapsing can be reduced.

The thickness on the optical axis of the positive lens is larger than that of each of the two negative meniscus lens. In addition, this thickness is about 2 to 3.3 times as large as the total thickness of the two negative meniscus lenses.

The four-group zoom lens system of +++− construction according to the invention has a zoom ratio of 3 or greater and a telephoto ratio of about 0.8 to 0.5. The zoom lens systems exemplified herein have a zoom ratio of 3.37 to 5.03 and a telephoto ratio of 0.51 to 0.68.

$|f_4|/f_T$, $\Delta X_{4T}/f_T$ and $\beta_{4T}/\beta_{4W}$ for the four-group zoom lens systems of +−+− construction in the foregoing examples have the values given in Table 1, and are within the following ranges or the ranges defined by conditions (7), (8) and (9). Thus, these zoom lens systems are reduced in terms of length during lens collapsing or at the wide-angle ends as well as the telephoto ends, with well-corrected aberrations, although they have high zoom ratios.

$0.1 < |f_4|/f_T < 0.16$ $0.31 < \Delta X_{4T}/f_T < 0.43$ $2.2 < \beta_{4T}/\beta_{4W} < 3.0$ For the fourth lens group G4, the same as explained in conjunction with the four-group zoom lens system of +++− construction holds.

The radius of curvature of the object-side concave surface of the negative lens located on the object side is smallest or second-smallest in the fourth lens group G4 and the outer diameter of the fourth lens group G4 is larger than that of the third lens group G3, so that the same action and effect as those of the four-group zoom lens system of +++− construction are obtainable. As a result, not only can the length of the lens system at the telephoto end be reduced but also the size of the camera during lens collapsing can be reduced.

The four-group zoom lens system of +−+− construction according to the invention has a zoom ratio of 3 or greater and a telephoto ratio of about 0.85 to 0.6. The zoom lens systems exemplified herein have a zoom ratio of 2.63 to 3.37 and a telephoto ratio of 0.65 to 0.83.

The thickness on the optical axis of the positive lens is larger than that of each of the two negative meniscus lens. In addition, this thickness is about 1.1 to 2.4 times as large as the total thickness of the two negative meniscus lenses.

$|f_L|/f_T$, $\Delta X_{LT}/f_T$ and $\beta_{LT}/\beta_{LW}$ for the four-group zoom lens systems comprising at least five lens groups in the foregoing examples have the values given in Table 1, and are within the following ranges or the ranges defined by conditions (10), (11) and (12). Thus, these zoom lens systems are reduced in terms of length during lens collapsing or at the wide-angle ends as well as the telephoto ends, with well-corrected aberrations, although they have high zoom ratios.

$0.05 < |f_L|/f_T < 0.22$ $0.22 < \Delta X_{LT}/f_T < 0.53$ $2.6 < \beta_{LT}/\beta_{LW} < 3.3$ The final lens group comprises a doublet composed of a positive meniscus lens concave on its object side and a negative meniscus lens having a strong concave surface on its object side or a negative meniscus lens concave on its object side and a positive lens, and a negative meniscus lens having a strong concave surface on its object side.

The zoom lens system according to each example is of the type that the magnification varies continuously from the wide-angle to the telephoto end. However, it is noted that the present invention may also be applied to a zoom lens system of the type that it has varied magnifications at its wide-angle end and telephoto end or its wide-angle end, intermediate setting and telephoto end.

The radius of curvature of the object-side concave surface of the negative lens on the object side in the final lens group is very small and the outer diameter of the final lens group is larger than that of a lens group just in front of the final lens group, so that the same action and effect as those of the three-, and four-group zoom lens systems are obtainable. As a result, not only can the length of the lens system at the telephoto end be reduced but also the size of the camera during lens collapsing can be reduced.

The zoom lens system comprising at least five lens groups according to the invention has a zoom ratio of 3 or greater and a telephoto ratio of about 0.85 to 0.55. The zoom lens systems exemplified herein have a zoom ratio of 3.03 to 5.18 and a telephoto ratio of 0.55 to 0.86.

As explained above, the present invention provides a zoom lens system comprising a front lens group located nearest to its object side and a rear lens group located nearest to its image side with at least one lens group located between the front and rear lens groups, wherein the front lens group has positive or negative refracting power while the rear lens group has negative refracting power, a separation between adjacent lens group varies for zooming from its wide-angle end to its telephoto end, and the specific conditions are satisfied with the focal length of the rear lens group, the amount of movement of the rear lens group and the zoom ratio shared by the rear lens group. Thus, it is possible to achieve a zoom lens system which, albeit having a high zoom ratio, is compact as expressed by a small telephoto ratio, so that an associated camera is not only reduced in size but also be minimized in terms of a change in the center of gravity. Thus, the present invention makes it possible to provide an easy-to-use camera.

What is claimed is:

1. A zoom lens system comprising, in order from an object side thereof, a positive front lens group and a negative rear lens group, wherein:

said positive front lens group comprises a plurality of lens groups, said negative rear lens group comprises at least one lens group, a separation between adjacent lens groups varies for zooming from a wide-angle end to a telephoto end of said zoom lens system, a separation between said front lens group and said rear lens group becomes narrow for said zooming, and said negative rear lens group satisfies the following conditions:

$$0.02<|f_L|/f_T<0.03 \quad (I)$$

$$0.1<\Delta X_{LT}/f_T<0.7 \quad (II)$$

$$1.5<\beta_{LT}/\beta_{LW}|<6 \quad (III)$$

where $f_L$ is a focal length of said rear lens group, $f_T$ is a focal length of said zoom lens system at said telephoto end, $\Delta X_{LT}$ is an amount, on the basis of said wide-angle end, of zooming movement of said negative rear lens group to said telephoto end, $\beta_{LT}$ is a transverse magnification of said negative rear lens group at said telephoto end, and $\beta_{LW}$ is a transverse magnification of said negative rear lens group at said wide-angle end.

2. The zoom lens system according to claim 1, which satisfies the following condition:

$$0.03<|f_L|/f_T<0.25 \quad (I').$$

3. The zoom lens system according to claim 1, which satisfies the following condition:

$$0.1<\Delta X_{LT}/f_T<0.5 \quad (II').$$

4. The zoom lens system according to claim 1, which satisfies the following condition:

$$0.2<\Delta X_{LT}/f_T<0.6 \quad (II'').$$

5. The zoom lens system according to claim 1, which satisfies the following condition:

$$0.2<\Delta X_{LT}/f_T<0.44 \quad (II''').$$

6. The zoom lens system according to any one of claims 1 to 5, wherein said negative rear lens group comprising one lens group.

7. The zoom lens system according to claim 6, wherein said negative rear lens group comprises, in order from an object side thereof, a negative lens element, a positive lens element and a negative lens element.

8. A zoom lens system comprising a front lens group located nearest to an object side of said zoom lens system, a rear lens group located nearest to an image side of said zoom lens system and at least one lens group located between said front lens group and said rear lens group, wherein:

said front lens group has positive or negative refracting power, and said rear lens group has negative refracting power, a separation between adjacent lens groups varies for zooming from a wide-angle end to a telephoto end of said zoom lens system, and conditions (I), (II) and (III) are satisfied:

$$0.02<|f_L|/f_T<0.03 \quad (I)$$

$$0.1<\Delta X_{LT}/f_T<0.7 \quad (II)$$

$$1.5<\beta_{LT}/\beta_{LW}|<6 \quad (III)$$

where $f_L$ is a focal length of said rear lens group, $f_T$ is a focal length of said zoom lens system at said telephoto end, $\Delta X_{LT}$ is an amount, on the basis of said wide-angle end, of zooming movement of said negative rear lens group to said telephoto end, $\beta_{LT}$ is a transverse magnification of said negative rear lens group at said telephoto end, and $\beta_{LW}$ is a transverse magnification of said negative rear lens group at said wide-angle end.

9. The zoom lens system according to claim 8 comprising, in order from an object side of said zoom lens system, a first lens group having positive refracting power, a second lens group having positive refracting power and a third lens group having negative refracting power, wherein a separation between said first lens group and said second lens group becomes wide for zooming, a separation between said second lens group and said third lens group becomes narrow for zooming, and conditions (1), (2) and (3) are satisfied:

$$0.03<|f_L|/f_T<0.25 \quad (1)$$

$$0.2<\Delta X_{LT}/f_T<0.44 \quad (2)$$

$$1.5<\beta_{LT}/\beta_{LW}|<6.0 \quad (3).$$

10. The zoom lens system according to claim 8 comprising, in order from an object side of said zoom lens system, a first lens group having positive refracting power, a second lens group having positive refracting power, a third lens group having positive refracting power and a fourth lens group having negative refracting power, wherein a separation between said first lens group and said second lens group becomes wide for zooming, a separation between said third lens group and said fourth lens group becomes narrow for zooming, and conditions (4), (5) and (6) are satisfied:

$$0.02<|f_L|/f_T<0.3 \quad (4)$$

$$0.1<\Delta X_{LT}/f_T<0.5 \quad (5)$$

$$1.5<\beta_{LT}/\beta_{LW}|<6 \quad (6).$$

11. The zoom lens system according to claim 8 comprising, in order from an object side of said zoom lens system, a first lens group having positive refracting power, a second lens group having negative refracting power, a third lens group having positive refracting power and a fourth lens group having negative refracting power, wherein a separation between said first lens group and said second lens group becomes wide for zooming, a separation between said third lens group and said fourth lens group becomes narrow for zooming, and conditions (7), (8) and (9) are satisfied:

$$0.02<|f_L|/f_T<0.3 \quad (7)$$

$$0.2<\Delta X_{LT}/f_T<0.6 \quad (8)$$

$$1.5<\beta_{LT}/\beta_{LW}|<6 \quad (9).$$

12. A zoom lens system comprising a front lens group located nearest to an object side of said zoom lens system, a rear lens group located nearest to an image side of said zoom lens system and at least one lens group located between said front lens group and said rear lens group, wherein:

said front lens group has positive or negative refracting power, and said rear lens group has negative refracting power, a separation between adjacent lens groups varies for zooming from a wide-angle end to a telephoto end of said zoom lens system, an object-side surface of a lens located nearest to an object side in said rear lens group has strong concavity on said object side, and in a state where said rear lens group is proximate to a lens group just in front of said rear lens group, an apex of a lens surface located nearest to an image side in said lens group is positioned closer to said image side than to a peripheral portion of a lens located nearest to the object side in said rear lens group.

13. A zoom lens system comprising a front lens group located nearest to an object side of said zoom lens system, a rear lens group located nearest to an image side of said zoom lens system and at least one lens group located between said front lens group and said rear lens group, wherein:

said front lens group has positive or negative refracting power, and said rear lens group has negative refracting power, a separation between adjacent lens groups varies for zooming from a wide-angle end to a telephoto end of said zoom lens system, said rear lens group comprises a negative lens, a positive lens and a negative meniscus lens, and a radius of curvature of an object-side surface of said negative lens is smaller than that of an object-side surface of said negative meniscus lens.

* * * * *